(12) United States Patent
Fukagawa et al.

(10) Patent No.: US 7,646,457 B2
(45) Date of Patent: Jan. 12, 2010

(54) LIQUID CRYSTAL DISPLAY DEVICE

(75) Inventors: Nobutaka Fukagawa, Minami-ashigara (JP); Hiromoto Haruta, Minami-ashigara (JP); Hiroaki Sata, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 266 days.

(21) Appl. No.: 11/496,432

(22) Filed: Aug. 1, 2006

(65) Prior Publication Data

US 2007/0182895 A1 Aug. 9, 2007

(30) Foreign Application Priority Data

Aug. 1, 2005 (JP) .............................. 2005/223456
Apr. 26, 2006 (JP) .............................. 2006/121750

(51) Int. Cl.
  *G02F 1/1335* (2006.01)
(52) U.S. Cl. .......................................... 349/122; 349/9
(58) Field of Classification Search ................. 349/122, 349/9
  See application file for complete search history.

(56) References Cited

U.S. PATENT DOCUMENTS

| | | | | |
|---|---|---|---|---|
| 5,499,126 | A | * | 3/1996 | Abileah et al. ............... 349/106 |
| 5,818,615 | A | * | 10/1998 | Abileah et al. ............... 349/117 |
| 6,169,590 | B1 | * | 1/2001 | Abileah et al. ............... 349/120 |
| 6,342,934 | B1 | * | 1/2002 | Kameyama et al. ........... 349/98 |
| 7,336,330 | B2 | * | 2/2008 | Tanaka ....................... 349/118 |
| 2005/0219449 | A1 | * | 10/2005 | Tanaka ....................... 349/119 |
| 2005/0243245 | A1 | * | 11/2005 | Taguchi et al. ................ 349/96 |
| 2009/0027599 | A1 | * | 1/2009 | Ohgaru et al. ................. 349/96 |

FOREIGN PATENT DOCUMENTS

| | | |
|---|---|---|
| CN | 1491370 A | 4/2004 |
| JP | 2004-326089 A | 11/2004 |
| JP | 2005-77853 A | 3/2005 |
| JP | 2005-099191 A | 4/2005 |
| WO | 03/032060 A1 | 4/2003 |
| WO | WO 03032060 A1 * | 4/2003 |
| WO | WO 2004/079414 A1 | 9/2004 |

* cited by examiner

*Primary Examiner*—K. Cyrus Kianni
(74) *Attorney, Agent, or Firm*—Buchanan Ingersoll & Rooney PC

(57) ABSTRACT

A liquid crystal display device comprising a liquid crystal cell, two polarizing plates having a polarizer and a protective film satisfying (1) and (2) below, and an optical compensatory film satisfying (3)-(8) below and disposed between the liquid crystal cell and the polarizer:

$0 \text{ nm} \leq Re(\lambda) \leq 5 \text{ nm}$  (1)

$-20 \text{ nm} \leq Rth(\lambda) \leq 20 \text{ nm}$  (2)

$20 \text{ nm} < Re(548) < 150 \text{ nm}$  (3)

$50 \text{ nm} < Rth(548) < 400 \text{ nm}$  (4)

$0.5 < Re(446)/Re(548) < 1$  (5)

$1.0 < Re(628)/Re(548) < 2.0$  (6)

$1.0 < Rth(446)/Rth(548) < 2.0$  (7)

$0.5 < Rth(628)/Rth(548) < 1.0$  (8).

2 Claims, 3 Drawing Sheets

Fig.1

Constitution 1

| Protective Film |
| --- |
| Polarizer |
| Low Retardation Film |
| Liquid crystal Cell |
| Retardation Film (slow axis in machine direction) |
| Biaxial Film (slow axis in cross direction) |
| Polarizer |
| Protectiove Film |

Constitution 2

| Protective Film |
| --- |
| Polarizer |
| Low Retardation Film |
| Liquid crystal Cell |
| Plate C |
| Plate A (slow axis in cross direction) |
| Low Retardation Film |
| Polarizer |
| Protective Film |

Constitution 3

| Protective Film |
| --- |
| Polarizer |
| Low Retardation Film of the Invention |
| Optical Compensatory Film B |
| Liquid cryastal Cell |
| Optical Compensatoriy Film A (slow axis in cross direction) |
| Polarizer |
| Protective Film | though
LIQUID CRYSTAL DISPLAY DEVICE

BACKGROUND OF THE INVENTION

1. Field of the Invention

The present invention relates to a liquid crystal display device.

2. Description of the Related Art

Every year applications of liquid crystal display devices are broadening for power-saving and space-saving image display devices. Heretofore, one serious defect of liquid crystal display devices is that the viewing angle dependence of images is large, but recently, VA mode, broad viewing angle liquid crystal display devices have been put into practical use, by which the demand for liquid crystal display devices is rapidly increasing also in the market that requires high quality images like in TVs.

VA mode has an advantage in that, as compared with other liquid crystal display modes, the contrast is generally high, but on the other hand, it has a problem in that the viewing angle-dependent contrast and color tone change is great. For this, it is known that use of an optical compensatory film having a different chromatic dispersion characteristic between the in-plane retardation and the retardation in a thickness direction of the film is effective for solving the problem, and WO 2003/032060 and JP-A-2005-77853 disclose a method of using two polymer films that have different optical properties. JP-A-2004-326089 discloses a method of forming a polymerizing liquid crystal layer on a stretched polymer film.

These methods could have some effects for solving the problem but are still unsatisfactory in that the viewing angle-dependent color tone change therein is great, and further improvements on them are desired.

SUMMARY OF THE INVENTION

An object of the invention is to provide a liquid crystal display device improved in point of the viewing angle dependence of color tone expression therein.

The present inventors have assiduously studied and, as a result, have found that, in a liquid crystal display device, the retardation of the protective film of the polarizing plate that is provided on the side toward the liquid crystal cell has an influence on the viewing angle-dependent color tone change, and therefore, it is necessary to control not only the retardation of the optical compensatory film but also the total retardation of both the optical compensatory film and the protective film of the polarizing plate on the side toward the liquid crystal cell for reducing the viewing angle-dependent color tone change in the device. Further, the inventors have found that, of the two polarizing plates in a liquid crystal display device, when at least one protective film on the side toward the liquid crystal cell is made to have substantially no retardation, then the total retardation of both the optical compensatory film and the protective film on the side toward the liquid crystal cell can be readily controlled. On the basis of these findings, the inventors have completed the present invention. Concretely, the inventors have attained the object according to the following means:

(1) A liquid crystal display device comprising a liquid crystal cell, two polarizing plates disposed on both sides of the liquid crystal cell and an optical compensatory film, wherein the polarizing plate comprises a polarizer and a protective film of the polarizer disposed on at least the side toward the liquid crystal cell, the optical compensatory film is disposed between the liquid crystal cell and the polarizer provided that the optical compensatory film and the protective film disposed on the side toward the liquid crystal cell may be the same, and the protective film satisfies the relation of the following formulae (1) and (2) within a wavelength range of from 400 to 700 nm and the optical compensatory film satisfies the relation of the following formulae (3) to (8):

$$0 \text{ nm} \leq Re(\lambda) \leq 5 \text{ nm} \tag{1}$$

$$-20 \text{ nm} \leq Rth(\lambda) \leq 20 \text{ nm} \tag{2}$$

$$20 \text{ nm} < Re(548) < 150 \text{ nm} \tag{3}$$

$$50 \text{ nm} < Rth(548) < 400 \text{ nm} \tag{4}$$

$$0.5 < Re(446)/Re(548) < 1 \tag{5}$$

$$1.0 < Re(628)/Re(548) < 2.0 \tag{6}$$

$$1.0 < Rth(446)/Rth(548) < 2.0 \tag{7}$$

$$0.5 < Rth(628)/Rth(548) < 1.0 \tag{8}$$

wherein Re ($\lambda$) represents an in-plane retardation at a wavelength $\lambda$ and Rth($\lambda$) represents a retardation in the thickness direction of the film at a wavelength $\lambda$.

(2) The liquid crystal display device of (1), wherein the optical compensatory film satisfying the relation of the formulae (3) to (8) comprises at least two stretched polymer films, and the at least two stretched polymer films are so laminated that their stretching directions are perpendicular to each other.

(3) The liquid crystal display device of (1), wherein the optical compensatory film satisfying the relation of the formulae (3) to (8) is a laminate that comprises a stretched polymer film and a coating layer of a liquid crystalline compound on the stretched polymer film.

(4) A liquid crystal display device comprising a liquid crystal cell, two polarizing plates disposed on both sides of the liquid crystal cell and at least two optical compensatory films disposed between the polarizing plate and the liquid crystal cell, wherein the polarizing plate comprises a polarizer and two protective films disposed on both sides of the polarizer provided that one of the protective films on the side toward the liquid crystal cell and the optical compensatory film may be the same, and at least one of the protective films on the side toward the liquid crystal cell satisfies the relation of the following formulae (1) and (2) within a wavelength range of from 400 to 700 nm, one of the optical compensatory films satisfies the relation of the following formulae (9) to (12), and the other one of the optical compensatory films satisfies the following formulae (13) to (16):

$$0 \text{ nm} \leq Re(\lambda) \leq 5 \text{ nm} \tag{1}$$

$$-20 \text{ nm} \leq Rth(\lambda) \leq 20 \text{ nm} \tag{2}$$

$$50 \text{ nm} < Re(548) < 200 \text{ nm} \tag{9}$$

$$30 \text{ nm} < Rth(548) < 150 \text{ nm} \tag{10}$$

$$0.5 < Re(446)/Re(548) < 1 \tag{11}$$

$$1.0 < Re(628)/Re(548) < 2.0 \tag{12}$$

$$0 \text{ nm} \leq Re(548) < 10 \text{ nm} \tag{13}$$

$100 \text{ nm} < Rth(548) < 300 \text{ nm}$ (14)

$1.0 < Rth(446)/Rth(548) < 2.0$ (15)

$0.5 < Rth(628)/Rth(548) < 1.0$ (16)

wherein Re(λ) represents an in-plane retardation at a wavelength λ and Rth(λ) represents a retardation in the thickness direction of the film at a wavelength λ.

(5) The liquid crystal display device of (4), wherein the optical compensatory film satisfying the formulae (13) to (16) is formed on a protective film of cellulose acylate that satisfies the relation of the formulae (1) and (2) and/or the following formula (17):

$-10 \text{ nm} \leq Rth(446) - Rth(629) \leq 10 \text{ nm}$ (17)

(6) The liquid crystal display device of any one of (1) to (5), wherein the protective film satisfying the relation of the formulae (1) and (2) satisfies the following formula (17):

$-10 \text{ nm} \leq Rth(446) - Rth(629) \leq 10 \text{ nm}$ (17)

(7) The liquid crystal display device of any one of (1) to (6), wherein the protective film satisfying the relation of the formulae (1) and (2) is a cellulose acylate film.

(8) The liquid crystal display device of any one of (1) to (4), wherein the protective film satisfying the relation of the formulae (1) and (2) is a cellulose acylate film satisfying a relation of the following formula (17):

$-10 \text{ nm} \leq Rth(446) - Rth(629) \leq 10 \text{ nm}$ (17)

(9) The liquid crystal display device of any one of (1) to (8), wherein the protective film satisfying the relation of the formulae (1) and (2) contains at least one compound of the following formula (A):

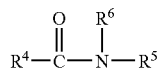

Formula (A)

wherein $R^4$, $R^5$ and $R^6$ each independently represents a substituted or unsubstituted alkyl group.

(10) The liquid crystal display device of any one of (1) to (9), wherein the protective film satisfying the relation of the formulae (1) and (2) contains at least one compound of the following formula (B):

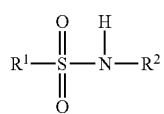

Formula (B)

wherein $R^1$ and $R^2$ each independently represents an alkyl group or an aryl group.

(11) The liquid crystal display device of any one of (1) to (10), wherein the liquid crystal cell is a VA mode cell.

The invention provides a liquid crystal display device capable of producing at low costs and in a simplified manner and improved in point of the viewing angle dependence of color tone expression therein.

BRIEF DESCRIPTION OF THE DRAWINGS

FIG. 1 is an outline view showing preferred configuration examples of an optical compensatory film and a polarizer-protective film in the invention.

Figure 2:
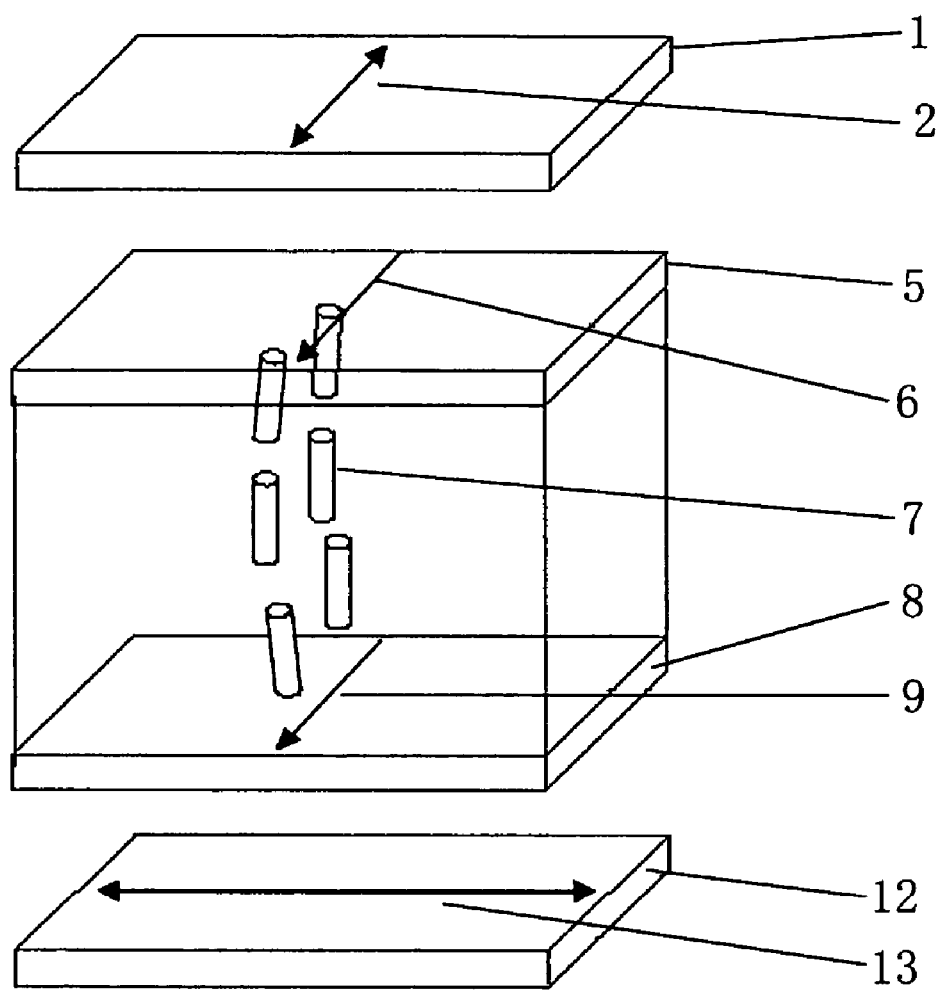
FIG. 2 is a schematic view showing an example of the liquid crystal display device of the invention.

In these drawings, 1 is an upper polarizing plate; 2 is the direction of the absorption axis of the upper polarizing plate; 5 is an upper electrode substrate of a liquid crystal cell; 6 is the alignment control direction of the upper substrate; 7 is a liquid crystal layer; 8 is a lower electrode substrate of a liquid crystal cell; 9 is the alignment control direction of the lower substrate; 10 is a liquid crystal display device; 12 is a lower polarizing plate; 13 is the direction of the absorption axis of the lower polarizing plate.

BEST MODE FOR CARRYING OUT THE INVENTION

The contents of the invention are described in detail hereinunder. The contents of the invention are described in detail hereinunder. In this description, the numerical range expressed by the wording "a number to another number" means the range that falls between the former number indicating the lowermost limit of the range and the latter number indicating the uppermost limit thereof. In this description, the numerical range expressed by the wording "a number to another number" means the range that falls between the former number indicating the lowermost limit of the range and the latter number indicating the uppermost limit thereof. "n" indicating a number of the repetitive units in this description is a positive integer, unless otherwise specifically indicated, and it may be suitably defined in accordance with the range within which the invention exhibits its effect.

In this description, the film that satisfies the relation of the formulae (1) and (2) within a wavelength range of from 400 to 700 nm is referred to as a "low retardation film". The low retardation film comprising cellulose acylate as the main material thereof may be referred to as a "low retardation cellulose acylate film".

In the liquid crystal display device of the invention, the protective film of at least one of the two polarizing plates that is provided on the side toward the liquid crystal cell satisfies the relation of the formulae (1) and (2) within a wavelength range of from 400 to 700 nm.

The liquid crystal display device of the invention may have two different constitutions. The first constitution has an optical compensatory film satisfying the relation of the formulae (3) to (8). The optical compensatory film is disposed between the polarizer and the liquid crystal cell, and it may be so constituted that it serves also as the protective film of the polarizing plate (this is hereinafter simply referred to as "protective film"). Alternatively, it may be provided separately from the protective film. In the liquid crystal display device of the invention, the optical compensatory film satisfying the formulae (3) to (8) is preferably used as the protective film on the side toward the liquid crystal cell.

The liquid crystal display device of the second constitution of the invention has both an optical compensatory film satisfying the relation of the formulae (9) to (12) and an optical compensatory film satisfying the relation of the formulae (13) to (16). The optical compensatory film satisfying the relation of the formulae (9) to (12) is preferably provided on the side toward the liquid crystal cell, and in this case, the protective film is preferably a cellulose acylate film. The optical compensatory film satisfying the relation of the formulae (13) to (16) may also serve as the protective film on the side toward the liquid crystal cell.

<Protective Film in Polarizing Plate on the Side Toward Liquid Crystal Cell>

The low retardation film to be employed in the invention may be roughly classified into two types.

The first is a polymer film prepared by polymerizing a monomer component having a small intrinsic birefringence, such as typically a norbornene-based film.

The second is of a type having both a positive intrinsic birefringent component and a negative intrinsic birefringent component, in which the expressibility of the two is cancelled out each other, and the film therefore expresses substantially no retardation. For introduction of the positive intrinsic birefringent component and the negative intrinsic birefringent component into the film, known are a method of forming a polymer of the two into a film, as in JP-A-2003-321535, JP-A-2004-176051; a method of blending a polymer of a positive birefringent component and a polymer of a negative birefringent component, as in JP-A-2003-292639; and a method of using a cellulose acylate polymer having a main chain and side branches, in which the main chain is made to function as a positive intrinsic birefringent component and the side branches are made to function as a negative intrinsic birefringent component.

Of those, the method of using a cellulose acylate film is especially preferable since the starting material is inexpensive and the film is readily workable into polarizing plates.

[Cellulose Acylate]

Cellulose acylate favorably used for the low retardation film to be employed in the invention is described.

The substitution degree in cellulose acylate means the ratio of acylation of the three hydroxyl groups existing in the constitutive unit (glucose with $\beta1\rightarrow4$ glycoside bond) of cellulose. The substitution degree may be calculated by measuring the amount of the bonding fatty acid per the constitutive unit weight of cellulose. The measurement is carried out in accordance with ASTM-D817-91. The substitution degree at each of the 2-, 3- and 6-positions of glucose with $\beta1\rightarrow4$ glycoside bond may be calculated from the peak intensity that corresponds to the carbonyl carbon in the acyl group in $C^{13}$-NMR analysis.

Cellulose acylate of the following two types is preferred for the low retardation film in the invention.

The first type is cellulose acetate having a degree of acetylation of from 2.7 to 3.0. The degree of acetylation is preferably from 2.85 to 2.98, more preferably from 2.90 to 2.97.

The second type has at least two acyl groups each having from 2 to 6 carbon atoms. The degree of acylation of this type is preferably from 2.6 to 2.98, more preferably from 2.7 to 2.95. The acyl group is preferably an acetyl group, a propionyl group or a butyryl group. In case where the cellulose acylate film in the invention has an acetyl group and any other acyl group, then the degree of acetylation of the film is preferably less than 2.5, more preferably less than 2.0.

Cellulose acylate in the invention preferably has a weight-average degree of polymerization of from 350 to 800, more preferably from 370 to 600. Also preferably, cellulose acylate in the invention has a number-average molecular weight of from 70000 to 230000, more preferably from 75000 to 230000, most preferably from 78000 to 120000.

Cellulose acylate in the invention may be produced, using an acid anhydride or an acid chloride as the acylating agent. In case where the acylating agent is an acid anhydride, then an organic acid (e.g., acetic acid) or methylene chloride may be used as the reaction solvent. For the catalyst, usable is a protic catalyst such as sulfuric acid. In case where the acylating agent is an acid chloride, then a basic compound is used as the catalyst. In a production method that is industrially most general, cellulose is esterified with a mixed organic acid component that contains an organic acid (e.g., acetic acid, propionic acid, butyric acid) or its acid anhydride (e.g., acetic anhydride, propionic anhydride, butyric anhydride) corresponding to an acetyl group and any other acyl group to thereby produce a cellulose acylate. In this method, cellulose such as cotton linter or wood pulp is activated with an organic acid such as acetic acid, and then esterified with a mixed organic acid component liquid as in the above, in the presence of a sulfuric acid catalyst, and this is popular for the cellulose of the type. The organic acid anhydride component is generally used in an excessive amount over the amount of the hydroxyl group existing in cellulose. In this esterification treatment, hydrolysis reaction (depolymerization reaction) of the cellulose main chain ($\beta1\rightarrow4$ glycoside bond) goes on in addition to the esterification reaction. When the hydrolysis of the main chain goes on, then the degree of polymerization of cellulose acylate lowers, and the physical properties of the cellulose acylate film to be produced may worsen. Accordingly, it is desirable that the reaction condition including the reaction temperature is determined in consideration of the degree of polymerization and the molecular weight of the cellulose acylate to be obtained.

For obtaining cellulose acylate having a high degree of polymerization (having a large molecular weight), it is important that the highest temperature in the esterification step is controlled to be at most 50° C. The highest temperature is preferably controlled to be from 35 to 50° C., more preferably from 37 to 47° C. The reaction temperature is controlled to be not lower than 35° C., whereby the esterification reaction may be attained more smoothly. The reaction temperature is controlled to be not higher than 50° C., whereby the reduction in the degree of polymerization of cellulose acylate may be more effectively inhibited. After the esterification, the reaction is stopped while preventing the temperature increase, whereby the reduction in the degree of polymerization may be further inhibited and a cellulose acylate having a high degree of polymerization may be produced. Specifically, when a reaction terminator (e.g., water, acetic acid) is added after the reaction, then the excessive acid anhydride not having participated in the esterification reaction is hydrolyzed to give the corresponding organic acid as a side product. This hydrolysis reaction generates much heat whereby the temperature in the reaction device rises. When the addition speed of the reaction terminator is high, then the heat generation suddenly occurs exceeding the cooling capacity of the reaction device. As a result, hydrolysis of the cellulose main chain goes on extremely, and the degree of polymerization of the resulting cellulose acylate lowers. A part of the catalyst bonds to cellulose during the esterification, and most of it leaves from cellulose during the addition of the reaction terminator. However, when the addition speed of the reaction terminator is too high, then the catalyst could not have a sufficient reaction time enough for its leaving from cellulose, and a part of the catalyst remains while still bonding to cellulose. Cellulose acylate with such a strong acid catalyst partly bonding thereto is extremely unstable, and may be readily decomposed by heat given thereto during drying of products, and its degree of polymerization thereby lowers. For these reasons, it is desirable that, after the esterification, the reaction terminator is added to the reactor taking at least 4 minutes, more preferably taking from 4 to 30 minutes, so as to stop the reaction. From the viewpoint of the industrial producibility, the addition time for the reaction terminator is preferably at most 30 minutes. For the reaction terminator, generally used is water or alcohol having the ability of decomposing acid anhydrides. In the invention, however, in order not to deposit a triester that is poorly soluble in various organic solvents, a mixture of water and an organic acid is preferably used as the reaction terminator. When the esterification is attained under the condition as above, then a high molecular cellulose acylate having a weight-average degree of polymerization of at least 500 may be readily produced.

Next described are additives that may be in the low retardation film to be employed in the invention.

The low retardation film to be employed in the invention may contain, as additives, a retardation reducer and additionally an antioxidant, a UV absorbent, and a plasticizer.

(Retardation Reducer)

In case where the low retardation film to be employed in the invention is a low retardation cellulose acylate film, then the retardation reducer preferably contains a compound having a high affinity for the cellulose acylate film.

For the retardation reducer for use in the invention, preferred are compounds of the following formula (A) or (B) as having a large retardation-reducing effect.

Compounds of the formula (A) are described in detail.

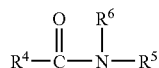

Formula (A)

wherein $R^4$, $R^5$ and $R^6$ each independently represents a substituted or unsubstituted alkyl group.

In formula (A), $R^4$, $R^5$ and $R^6$ each independently represents a substituted or unsubstituted alkyl group. The alkyl group may be linear or branched, and may also be cyclic. Preferably, the alkyl group has from 1 to 20 carbon atoms, more preferably from 1 to 15 carbon atoms, even more preferably from 1 to 12 carbon atoms. The cyclic alkyl group is especially preferably a cyclohexyl group.

The alkyl group in formula (A) may have a substituent. For the substituent, preferred are a halogen atom (e.g., chlorine, bromine, fluorine, iodine), an alkyl group, an alkoxy group, an acyl group, an alkoxycarbonyl group, an acyloxy group, a sulfonylamino group, a hydroxyl group, a cyano group, an amino group and an acylamino group; more preferred are a halogen atom, an alkyl group, an alkoxy group, a sulfonylamino group and an acylamino group; even more preferred are an alkyl group, a sulfonylamino group and an acylamino group.

Preferred examples of the compounds of the formula (A) are mentioned below, to which, however, the invention should not be limited.

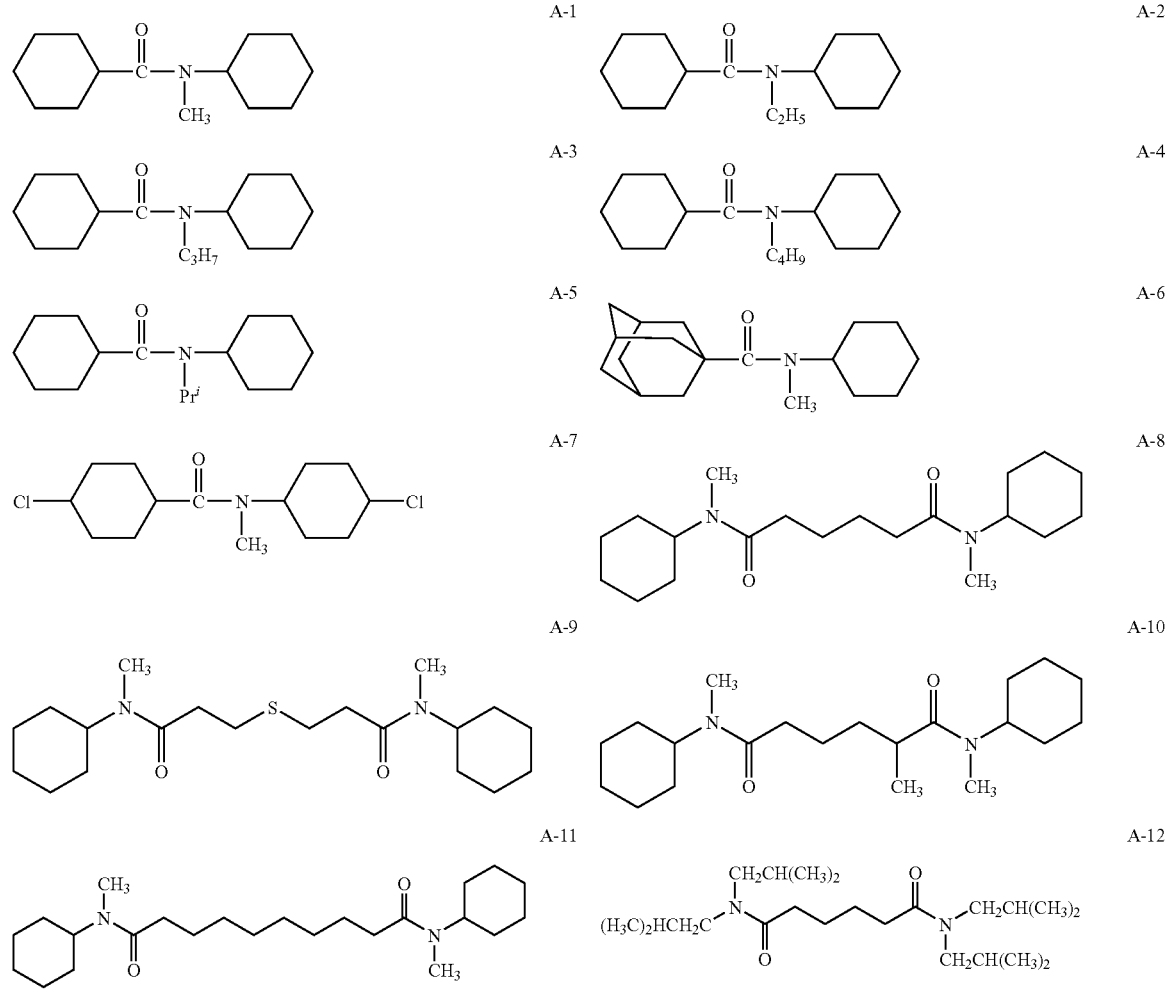

-continued

A-13
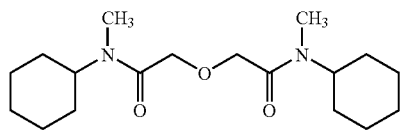

A-14
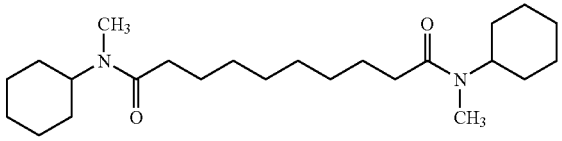

A-15
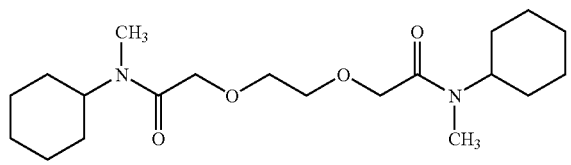

A-16
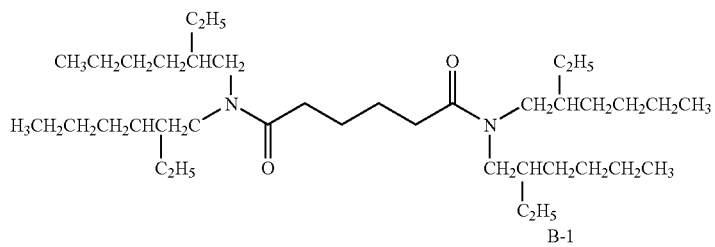

B-1
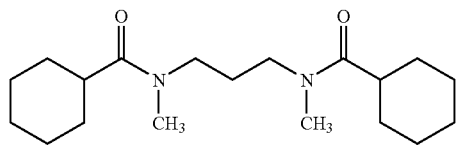

B-2
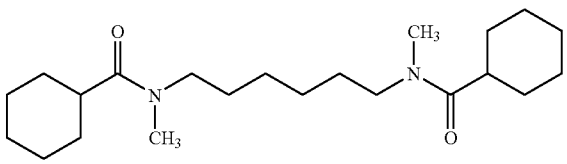

B-3
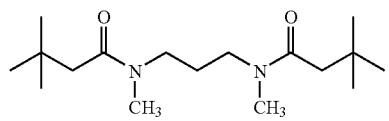

B-4
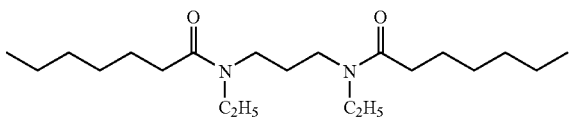

B-5
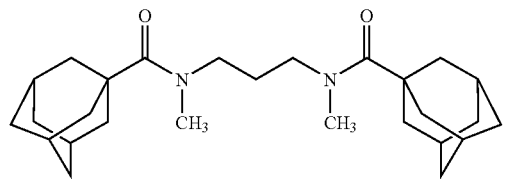

C-1
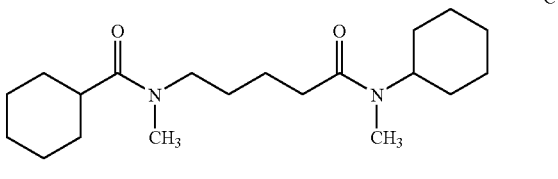

C-2
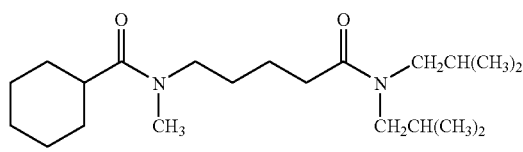

C-3
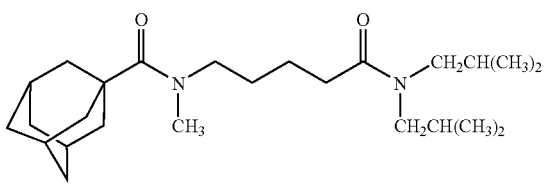

The above-mentioned compounds may all be produced in known methods. For example, the compounds of the formula (A) may be obtained through dehydrating condensation of a carboxylic acid and an amine using a condensing agent (e.g., dicyclohexylcarbodiimide, DCC), or through substitution reaction of a carboxylic acid chloride derivative with an amine derivative.

Next described are compounds of the formula (B):

Formula (B)

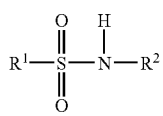

wherein $R^1$ and $R^2$ each independently represents an alkyl group or an aryl group.

Especially preferably, the sum total of the number of carbon atoms of $R^1$ and $R^2$ is at least 10. As the substituent, preferred are a fluorine atom, an alkyl group, an aryl group, an alkoxy group, a sulfone group and a sulfonamido group; and more preferred are an alkyl group, an aryl group, an alkoxy group, a sulfone group and a sulfonamido group. The alkyl group may be linear or branched, and may also be cyclic. Preferably, it has from 1 to 25 carbon atoms, more preferably from 6 to 25 carbon atoms, even more preferably from 6 to 20 carbon atoms (e.g., methyl group, ethyl group, propyl group, isopropyl group, butyl group, isobutyl group, tert-butyl group, amyl group, isoamyl group, tert-amyl group, hexyl group, cyclohexyl group, heptyl group, octyl group, bicyclooctyl group, nonyl group, adamantyl group, decyl group, tert-octyl group, undecyl group, dodecyl group, tridecyl group, tetradecyl group, pentadecyl group, hexadecyl group, heptadecyl group, octadecyl group, nonadecyl group, didecyl group).

The aryl group preferably has from 6 to 30 carbon atoms, more preferably from 6 to 24 carbon atoms (e.g., phenyl group, biphenyl group, terphenyl group, naphthyl group, binaphthyl group, triphenylphenyl group).

Preferred examples of compounds of the formula (B) are mentioned below, to which, however, the invention should not be limited.

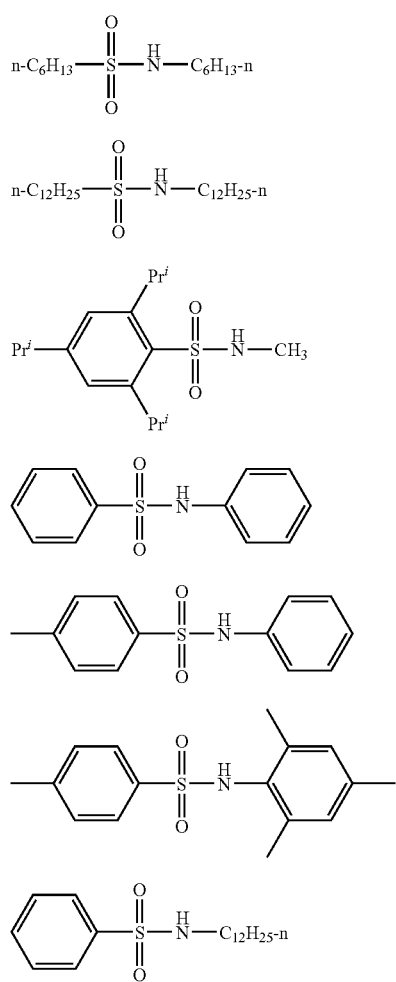

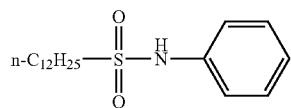

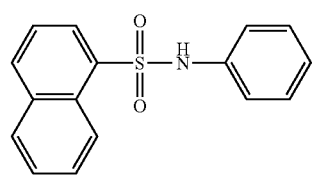

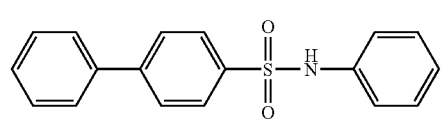

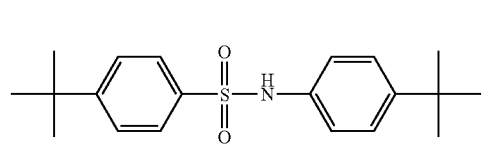

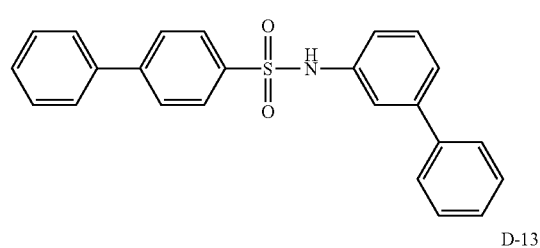

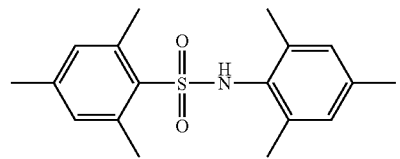

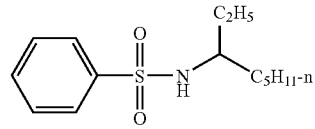

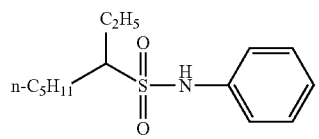

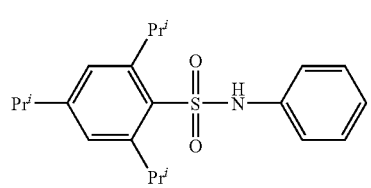

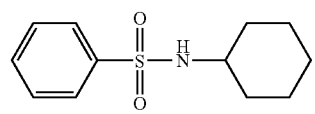

-continued

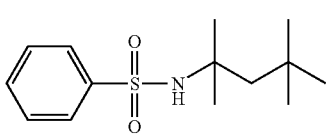
D-18

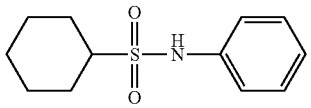
D-19

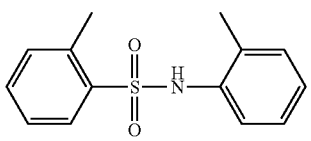
D-20

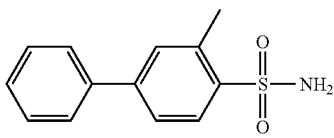
D-21

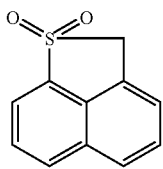
D-25

In the invention, the amount of the retardation reducer to be added is preferably from 1 to 30% by mass of cellulose acylate, more preferably from 2 to 30% by mass, even more preferably from 3 to 25% by mass, most preferably from 5 to 20% by mass.

The retardation reducer for use in the invention may be dissolved in an organic solvent such as alcohol, methylene chloride or dioxolan and then added to a cellulose acetate solution (dope), or it may be directly added to the dope composition.

(UV Absorbent)

A compound having an absorption maximum in a UV region (UV absorbent) is preferably added as a chromatic dispersion controlling agent to the low retardation film for use in the invention, for the purpose of leveling the chromatic dispersion in the film. Preferably, the absorption maximum range of the UV absorbent is from 230 to 380 nm, more preferably from 250 to 360 nm. Having an absorption maximum within the range as above, the effect of the compound for leveling the chromatic dispersion is large and the compound may prevent the film from yellowing.

Any known UV absorbent may be widely used as the UV absorbent to be added to the low retardation cellulose acylate film in the invention.

Preferably, the UV absorbent is added in an amount of from 0.1 to 20 parts by mass relative to 100 parts by mass of cellulose acylate, more preferably from 0.1 to 15 parts by mass, even more preferably from 0.1 to 10 parts by mass. In case where plural types of the UV absorbent are added, then it is desirable that their total amount falls within the above-mentioned range.

Examples of the UV absorbent preferably used in the invention are compounds of the following formulae (III) to (VI):

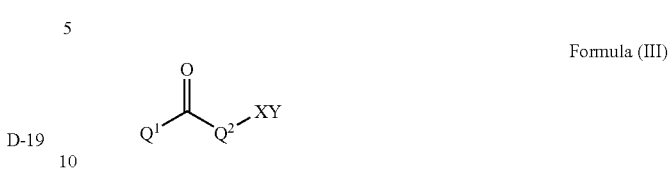
Formula (III)

wherein $Q^1$ and $Q^2$ each independently represents an aromatic ring; X and Y each is independently a group bonding to $Q^2$, representing a hydrogen atom or a substituent.

Preferably, $Q^1$ and $Q^2$ each independently represents a benzene ring or a condensed benzene ring.

The substituent for X and Y is preferably $OR^{300}$, in which $R^{300}$ represents a hydrogen atom or an alkyl group.

X and Y each may bond to any position of the aromatic ring of $Q^2$.

Compounds of the formula (III) are, for example, benzophenone compounds.

Preferred examples of the compounds of the formula (III) are UV absorbent UV-1 mentioned below, 2,4-hydroxybenzophenone, 2,2'-dihydroxy-4-methoxybenzophenone, 2-hydroxy-4-methoxy-5-sulfobenzophenone.

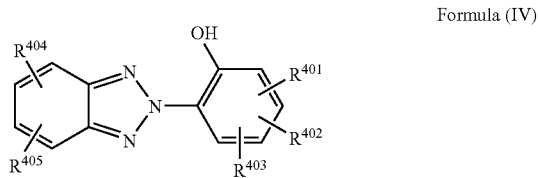
Formula (IV)

wherein $R^{401}$, $R^{402}$, $R^{403}$, $R^{404}$ and $R^{405}$ each independently represents a hydrogen atom, a halogen atom (preferably, fluorine atom or chlorine atom), or a monovalent organic group; at least one of $R^{401}$, $R^{402}$ and $R^{403}$ is an unsubstituted, branched or linear alkyl group having from 10 to 20 carbon atoms in total.

The organic group which $R^{401}$, $R^{402}$, $R^{403}$, $R^{404}$ and $R^{405}$ have is preferably an alkyl group, and additionally a hydroxyl group and an alkoxy group.

Preferred examples of the compounds of the formula (IV) are 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-(3",4",5",6"-tetrahydrophthalimidomethyl)-5'-methylphenyl)benzotriazole.

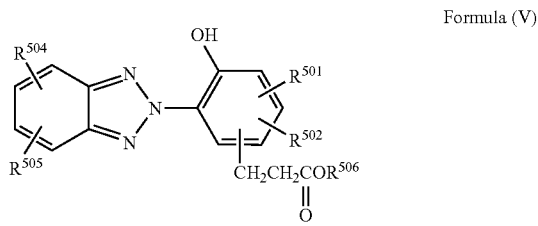
Formula (V)

wherein $R^{501}$, $R^{502}$, $R^{504}$ and $R^{505}$ each independently represents a monovalent organic group; and $R^{506}$ represents a branched alkyl group.

Preferred examples of the compounds of the formula (V) are compounds having the following structural formula (UV-105) or (UV-106):

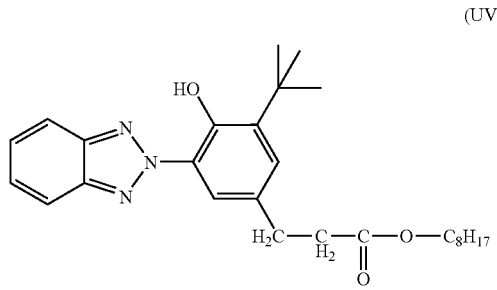
(UV-105)

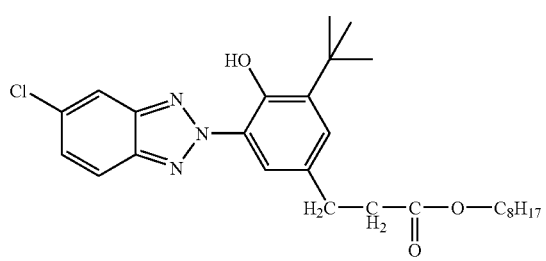
(UV-106)

As in JP-A-2003-315549, compounds of the following formula (VI) are also preferably used herein.

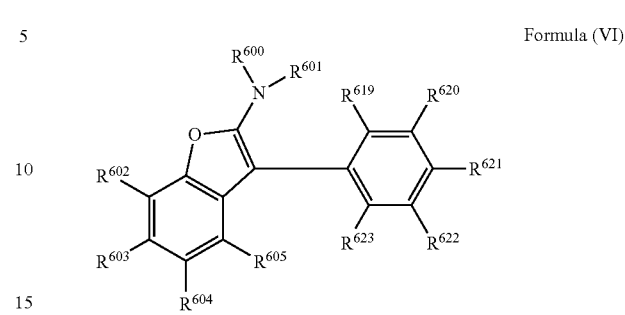
Formula (VI)

wherein $R^{600}$ and $R^{601}$ each independently represents a hydrogen atom, an alkyl group having from 1 to 25 carbon atoms, a phenylalkyl group having from 7 to 9 carbon atoms, a phenyl group unsubstituted or substituted with an alkyl group having from 1 to 4 carbon atoms, a substituted or unsubstituted oxycarbonyl group, or a substituted or unsubstituted aminocarbonyl group; $R^{602}$ to $R^{605}$ and $R^{619}$ to $R^{623}$ each independently represents a hydrogen atom, or a substituted or unsubstituted alkyl group having from 2 to 20 carbon atoms.

Preferred examples of the compounds of the formula (IV) are mentioned below.

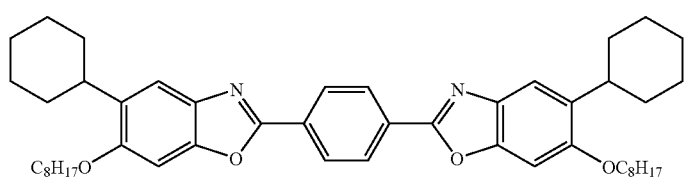
W-21

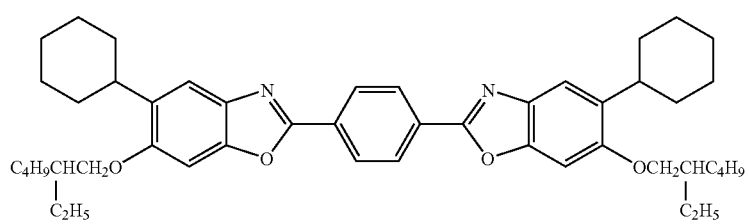
W-22

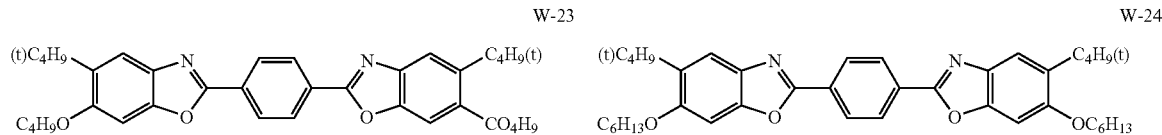
W-23    W-24

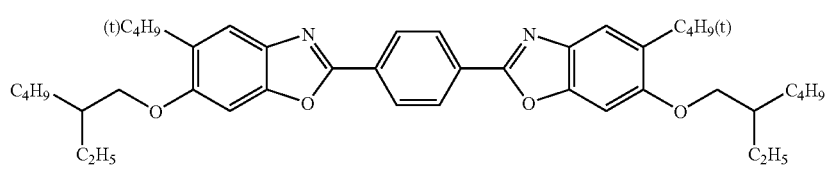
W-25

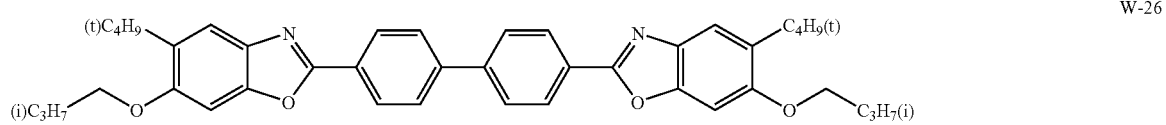
W-26

-continued
W-27
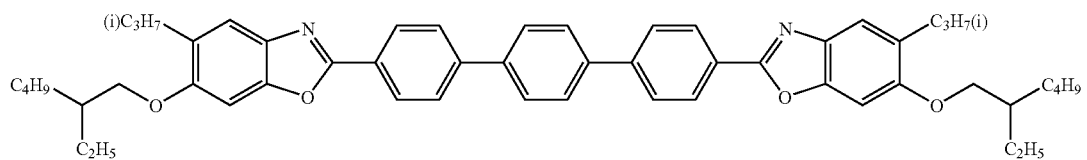
W-28
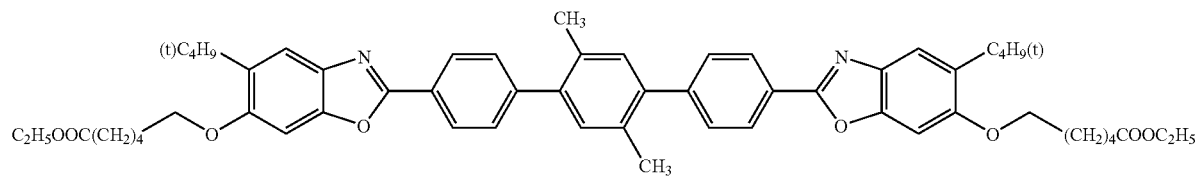
W-29
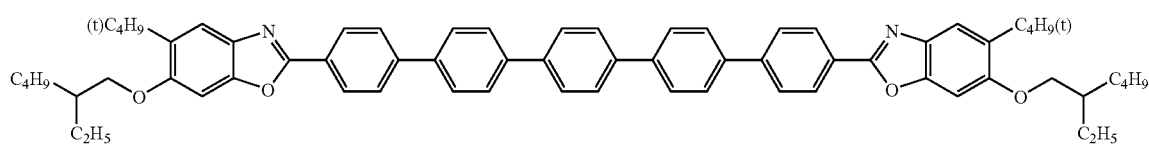
W-30 W-31
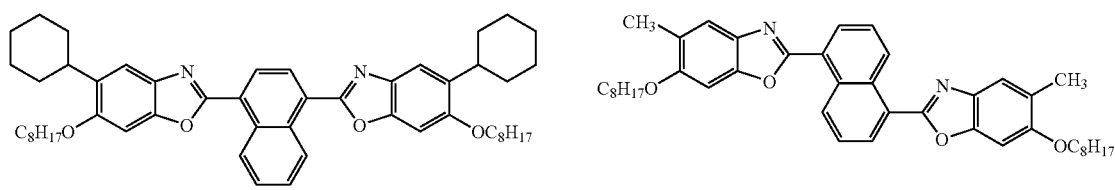
W-32
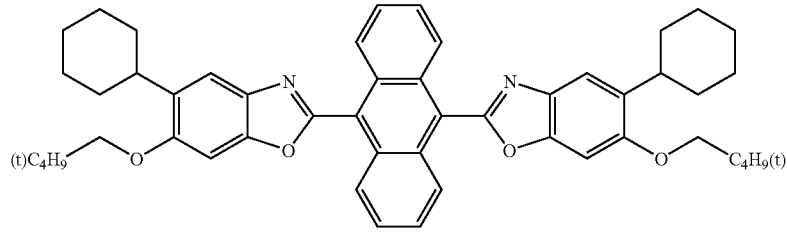
W-33
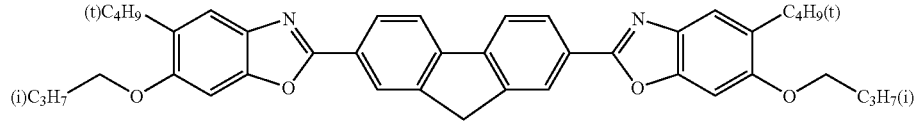
W-34
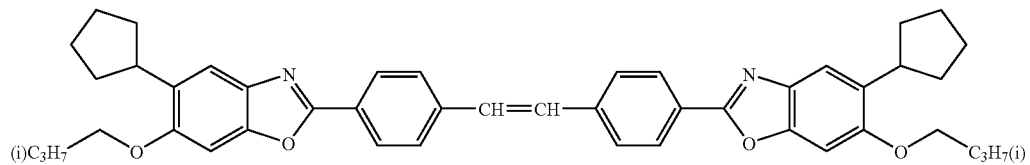
W-35
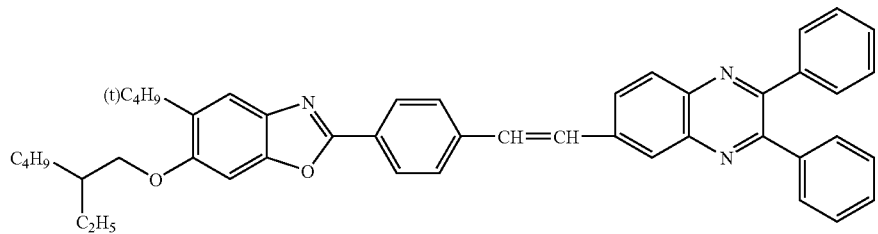

W-36

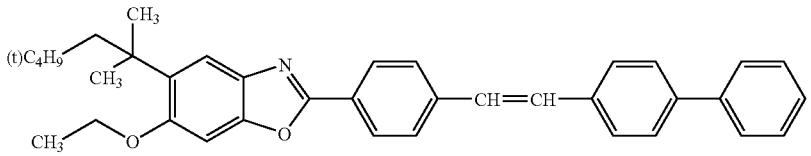

UV absorbents of the following formula (VII) are described in detail.

$$Q^{701}\text{-}Q^{702}\text{-}OH \qquad \text{Formula (VII)}$$

wherein $Q^{701}$ represents a 1,3,5-triazine ring; and $Q^{702}$ represents an aromatic ring.

The compounds of the formula (VII) are more preferably those of the following formula (VII-A):

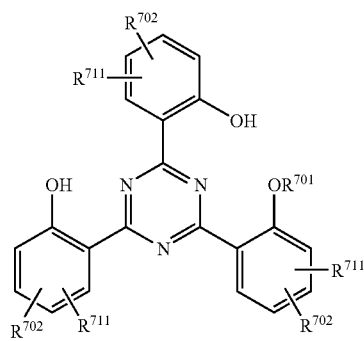

Formula (VII-A)

wherein $R^{701}$ represents any one definition of an alkyl group having from 1 to 18 carbon atoms; a cycloalkyl group having from 5 to 12 carbon atoms; an alkenyl group having from 3 to 18 carbon atoms; a phenyl group; a phenoxy group substituted with a phenyl group or OH or an alkoxy group having from 1 to 18 carbon atoms or a cycloalkoxy group having from 5 to 12 carbon atoms, or an alkenyloxy group having from 3 to 18 carbon atoms or a halogen atom or —COOH or —COOR$^{704}$ or —O—CO—R$^{705}$ or —O—CO—O—R$^{706}$ or —CO—NH$_2$ or —CO—NHR$^{707}$ or —CO—N—(R$^{707}$)(R$^{708}$) or CN or NH$_2$ or NHR$^7$ or —N(R$^{707}$)(R$^{708}$) or —NH—CO—R$^{705}$ or a phenoxy group or an alkyl group having from 1 to 18 carbon atoms; an alkyl group having from 1 to 18 carbon atoms, substituted with a phenyl-C$_{1-4}$ alkoxy group or a bicycloalkoxy group having from 6 to 15 carbon atoms or a bicycloalkylalkoxy group having from 6 to 15 carbon atoms or a bicycloalkenylalkoxy group having from 6 to 15 carbon atoms or a tricycloalkoxy group having from 6 to 15 carbon atoms; a cycloalkyl group having from 5 to 12 carbon atoms, substituted with OH or an alkyl group having from 1 to 4 carbon atoms or an alkenyl group having from 2 to 6 carbon atoms or —O—CO—R$^{705}$; a glycidyl group; —CO—R$^{709}$; —SO$_2$—R$^{710}$; an alkyl group having from 3 to 50 carbon atoms, interrupted by one or more oxygen atoms and/or substituted with OH or a phenoxy group or an alkylphenoxy group having from 7 to 18 carbon atoms; -A; —CH$_2$—CH (XA)—CH$_2$—O—R$^{712}$; —CR$^{713}$R'$^{713}$—(CH$_2$)$_m$—X-A; —CH$_2$—CH (OA)-R$^{714}$; —CH$_2$—CH(OH)—CH$_2$—XA;

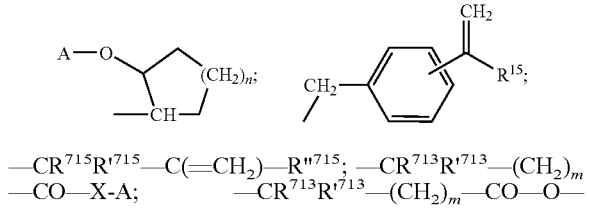

—CR$^{715}$R'$^{715}$—C(=CH$_2$)—R'''$^{715}$; —CR$^{713}$R'$^{713}$—(CH$_2$)$_m$—CO—X-A; —CR$^{713}$R'$^{713}$—(CH$_2$)$_m$—CO—O—CR$^{715}$R'$^{715}$—C(=CH$_2$)—R'''$^{715}$; or —CO—O—CR$^{715}$R'$^{715}$—C(=CH$_2$)—R'''$^{715}$ wherein A represents —CO—CR$^{716}$=CH—R$^{717}$;

$R^{702}$ each represents an alkyl group having from 6 to 18 carbon atoms; an alkenyl group having from 2 to 6 carbon atoms; a phenyl group; a phenylalkyl group having from 7 to 11 carbon atoms; COOR$^{704}$; CN; —NH—CO—R$^{705}$; a halogen atom; a trifluoromethyl group; or —O—R$^{703}$;

$R^{703}$ has the same meaning as $R^{701}$;

$R^{704}$ represents an alkyl group having from 1 to 18 carbon atoms; an alkenyl group having from 3 to 18 carbon atoms; a phenyl group; a phenylalkyl group having from 7 to 11 carbon atoms; a cycloalkyl group having from 5 to 12 carbon atoms; or an alkyl group having from 3 to 50 carbon atoms, optionally interrupted by one or more of —O—, —NH—, —NR$^{707}$— and —S— and optionally substituted with OH or a phenoxy group or an alkylphenoxy group having from 7 to 18 carbon atoms;

$R^{705}$ represents H; an alkyl group having from 1 to 18 carbon atoms; an alkenyl group having from 2 to 18 carbon atoms; a cycloalkyl group having from 5 to 12 carbon atoms; a phenyl group; a phenylalkyl group having from 7 to 11 carbon atoms; a bicycloalkyl group having from 6 to 15 carbon atoms; a bicycloalkenyl group having from 6 to 15 carbon atoms; or a tricycloalkyl group having from 6 to 15 carbon atoms;

$R^{706}$ represents H; an alkyl group having from 1 to 18 carbon atoms; an alkenyl group having from 3 to 18 carbon atoms; a phenyl group; a phenylalkyl group having from 7 to 11 carbon atoms; or a cycloalkyl group having from 5 to 12 carbon atoms;

$R^{707}$ and $R^{708}$ each independently represents an alkyl group having from 1 to 12 carbon atoms; an alkoxyalkyl group having from 3 to 12 carbon atoms; a dialkylaminoalkyl group having from 4 to 16 carbon atoms; or a cycloalkyl group having from 5 to 12 carbon atoms;

$R^{707}$ and $R^{708}$ may bond to each other to form an alkylene group having from 3 to 9 carbon atoms, an oxa-alkylene group having from 3 to 9 carbon atoms, or an aza-alkylene group having from 3 to 9 carbon atoms;

$R^{709}$ represents an alkyl group having from 1 to 18 carbon atoms; an alkenyl group having from 2 to 18 carbon atoms; a phenyl group, a cycloalkyl group having from 5 to 12 carbon atoms; a phenylalkyl group having from 7 to 11 carbon atoms; a bicycloalkyl group having from 6 to 15 carbon atoms, a bicycloalkylalkyl group having from 6 to 15 carbon atoms; a bicycloalkenyl group having from 6 to 15 carbon atoms; or a tricycloalkyl group having from 6 to 15 carbon atoms;

$R^{710}$ represents an alkyl group having from 1 to 12 carbon atoms; a phenyl group; or a naphthyl group; or an alkylphenyl group having from 7 to 14 carbon atoms;

$R^{711}$ each represents H; an alkyl group having from 1 to 18 carbon atoms; an alkenyl group having from 3 to 6 carbon atoms; a phenyl group; a phenylalkyl group having from 7 to 11 carbon atoms; a halogen atom; or an alkoxy group having from 1 to 18 carbon atoms;

$R^{712}$ represents an alkyl group having from 1 to 18 carbon atoms; an alkenyl group having from 3 to 18 carbon atoms; a phenyl group; a phenyl group substituted with from 1 to 3 substituents selected from an alkyl group having from 1 to 8 carbon atoms, an alkoxy group having from 1 to 8 carbon atoms, an alkenoxy group having from 3 to 8 carbon atoms, a halogen atom and a trifluoromethyl group; a phenylalkyl group having from 7 to 11 carbon atoms; a cycloalkyl group having from 5 to 12 carbon atoms; a tricycloalkyl group having from 6 to 15 carbon atoms; a bicycloalkyl group having from 6 to 15 carbon atoms; a bicycloalkylalkyl group having from 6 to 15 carbon atoms; a bicycloalkenylalkyl group having from 6 to 15 carbon atoms; —CO—$R^{705}$; or an alkyl group having from 3 to 50 carbon atoms, optionally interrupted by one or more of —O—, —NH—, —$NR^7$— and —S— and optionally substituted with OH or a phenoxy group or an alkylphenoxy group having from 7 to 18 carbon atoms;

$R^{713}$ and $R'^{713}$ each independently represents H; an alkyl group having from 1 to 18 carbon atoms; or a phenyl group;

$R^{714}$ represents an alkyl group having from 1 to 18 carbon atoms; an alkoxyalkyl group having from 3 to 12 carbon atoms; a phenyl group; or a phenyl-$C_{1-4}$ alkyl group;

$R^{715}$, $R'^{715}$ and $R''^{715}$ each independently represents H or $CH_3$;

$R^{716}$ represents H; —$CH_2$—COO—$R^{704}$; an alkyl group having from 1 to 4 carbon atoms; or CN;

$R^{717}$ represents H; —$COOR^{704}$; an alkyl group having from 1 to 17 carbon atoms; or a phenyl group;

X represents —NH—; —$NR^{707}$—; —O—; —NH—$(CH_2)_p$—NH—; or —$O(CH_2)_q$—NH—;

m indicates an integer of from 0 to 19;

n indicates an integer of from 1 to 8;

p indicates an integer of from 0 to 4;

q indicates an integer of from 2 to 4;

provided that in formula (VII-A), at least one of $R^{701}$, $R^{702}$ and $R^{711}$ contains two or more carbon atoms.

The compounds of the formula (VII-A) are further described.

The alkyl group for $R^{701}$ to $R^{710}$, $R^{712}$ to $R^{714}$, $R^{716}$ and $R^{717}$ is a linear or branched alkyl group, including, for example, a methyl group, an ethyl group, a propyl group, an isopropyl group, an n-butyl group, a sec-butyl group, an isobutyl group, a tert-butyl group, a 2-ethylbutyl group, an n-pentyl group, an isopentyl group, a 1-methylpentyl group, a 1,3-dimethylbutyl group, an n-hexyl group, a 1-methylhexyl group, an n-heptyl group, an isoheptyl group, a 1,1,3,3-tetramethylbutyl group, a 1-methylheptyl group, a 3-methylheptyl group, an n-octyl group, a 2-ethylhexyl group, a 1,1,3-trimethylhexyl group, a 1,1,3,3-tetramethylpentyl group, a nonyl group, a decyl group, an undecyl group, a 1-methylundecyl group, a dodecyl group, a 1,1,3,3,5,5-hexamethylhexyl group, a tridecyl group, a tetradecyl group, a pentadecyl group, a hexadecyl group, a heptadecyl group, and an octadecyl group.

The cycloalkyl group having from 5 to 12 carbon atoms for $R^{701}$, $R^{703}$ to $R^{709}$ and $R^{712}$ includes, for example, a cyclopentyl group, a cyclohexyl group, a cycloheptyl group, a cyclooctyl group, a cyclononyl group, a cyclodecyl group, a cycloundecyl group, and a cyclododecyl group. Preferred are a cyclopentyl group, a cyclohexyl group, a cyclooctyl group, and a cyclododecyl group.

The alkenyl group for $R^{716}$, $R^{719}$, $R^{711}$ and $R^{712}$ includes, for example, an allyl group, an isopropenyl group, a 2-butenyl group, a 3-butenyl group, an isobutenyl group, an n-penta-2,4-dienyl group, a 3-methyl-but-2-enyl group, an n-oct-2-enyl group, an n-dodec-2-enyl group, an iso-dodecenyl group, an n-dodec-2-enyl group, and an n-octadec-4-enyl group.

The number of the substituents in the substituted alkyl, cycloalkyl or phenyl group is 1 or 2 or more, and the group may have the substituent at the bonding carbon atom (at the α-position) or at any other carbon atom; in case where the substituent bonds to the group via a hetero atom thereof (for example, an alkoxy group), the bonding position of the substituent is not the α-position; and the number of the carbon atoms constituting the substituted alkyl group is preferably at least 2, more preferably at least 3. Two or more substituents preferably bond to different carbon atoms.

The alkyl group interrupted by any of —O—, —NH—, —$NR^{707}$— and —S— may be interrupted by one or more of these groups; and in each case, in general, one group is inserted into one bond, therefore not forming a hetero-hetero bond such as O—O, S—S or NH—NH; and in case where the interrupted alkyl group is further substituted, then the substituent is generally not in the α-position relative to the hetero atom. In case where one group has two or more interruptions of —O—, —NH—, —$NR^{707}$— or —S— therein, then these interruptions are generally the same.

The aryl group is generally an aromatic hydrocarbon group, and is, for example, a phenyl group, a biphenylyl group or a naphthyl group, preferably a phenyl group or a biphenylyl group. The aralkyl group is an alkyl group substituted generally with an aryl group, especially with a phenyl group; and therefore, the aralkyl group having from 7 to 20 carbon atoms includes, for example, a benzyl group, an α-methylbenzyl group, a phenylethyl group, a phenylpropyl group, a phenylbutyl group, a phenylpentyl group, and a phenylhexyl group; the phenylalkyl group having from 7 to 11 carbon atoms is preferably a benzyl group, an α-methylbenzyl group, or an α,α-dimethylbenzyl group.

The alkylphenyl group and the alkylphenoxy group are a phenyl group and a phenoxy group, respectively, each substituted with an alkyl group.

The halogen atom for the halogen substituent is a fluorine atom, a chlorine atom, a bromine atom or an iodine atom, more preferably a fluorine atom or a chlorine atom, even more preferably a chlorine atom.

The alkylene group having from 1 to 20 carbon atoms includes, for example, a methylene group, an ethylene group, a propylene group, a butylene group, a pentylene group, and a hexylene group. In this, the alkylene chain may be branched, and this is, for example, an isopropylene group.

The cycloalkenyl group having from 4 to 12 carbon atoms includes, for example, a 2-cyclobuten-2-yl group, a 2-cyclopenten-1-yl group, a 2,4-cyclopentadien-1-yl group, a 2-cyclohexen-1-yl group, a 2-cyclohepten-1-yl group, and a 2-cyclooocten-1-yl group.

The bicycloalkyl group having from 6 to 15 carbon atoms includes, for example, a bornyl group, a norbornyl group, and a [2.2.2]bicyclooctyl group. Preferred are a bornyl group and a norbornyl group; and more preferred are a bornyl group and a norborn-2-yl group.

The bicycloalkoxy group having from 6 to 15 carbon atoms includes, for example, a bornyloxy group, and a norborn-2-yloxy group.

The bicycloalkyl-alkyl group or -alkoxy group having from 6 to 15 carbon atoms is an alkyl or alkoxy group substituted with a bicycloalkyl group, and has from 6 to 15 carbon atoms in total. Their examples are a norbornyl-2-methyl group and a norbornyl-2-methoxy group.

The bicycloalkenyl group having from 6 to 15 carbon atoms includes, for example, a norbornenyl group, and a norborn-dienyl group. Preferred is a norbornenyl group; and more preferred is a norborn-5-enyl group.

The bicycloalkenylalkoxy group having from 6 to 15 carbon atoms is an alkoxy group substituted with a bicycloalkenyl group, and has from 6 to 15 carbon atoms in total. For example, it is a norborn-5-en-2-methoxy group.

The tricycloalkyl group having from 6 to 15 carbon atoms includes, for example, a 1-adamantyl group, and a 2-adamantyl group. Preferred is a 1-adamantyl group.

The tricycloalkoxy group having from 6 to 15 carbon atoms is, for example, an adamantyloxy group. The heteroaryl group having from 3 to 12 carbon atoms is preferably a pyridinyl group, a pyrimidinyl group, a triazinyl group, a pyrrolyl group, a furanyl group, a thiophenyl group or a quinolinyl group.

The compounds of the formula (VII-A) are preferably those where $R^{701}$ is one definition of an alkyl group having from 1 to 18 carbon atoms; a cycloalkyl group having from 5 to 12 carbon atoms; an alkenyl group having from 3 to 12 carbon atoms; a phenyl group; a phenoxy group substituted with a phenyl group or OH or an alkoxy group having from 1 to 18 carbon atoms or a cycloalkoxy group having from 5 to 12 carbon atoms or an alkenyloxy group having from 3 to 18 carbon atoms or a halogen atom or —COOH or COOR$^{704}$ or —O—CO—R$^{705}$ or —O—CO—O—R$^{706}$ or —CO—NH$_2$ or —CO—NHR$^{707}$ or —CO—N(R$^{707}$)(R$^{708}$) or CN or NH$_2$ or NHR$^{707}$ or —N(R$^{707}$)(R$^{708}$) or —NH—CO—R$^{705}$ or a phenoxy group or an alkyl group having from 1 to 18 carbon atoms; an alkyl group having from 1 to 18 carbon atoms, substituted with a phenyl-C$_{1-4}$ alkoxy group or a bornyloxy group or a norborn-2-yloxy group or a norbornyl-2-methoxy group or a norborn-5-en-2-methoxy group or an adamantyloxy group; a cycloalkyl group having from 5 to 12 carbon atoms, substituted with OH or an alkyl group having from 1 to 4 carbon atoms or an alkenyl group having from 2 to 6 carbon atoms and/or —O—CO—R$^{705}$; a glycidyl group; —CO—R$^{709}$ or —SO$_2$—R$^{710}$;

$R^{711}$ is an alkyl group having from 3 to 50 carbon atoms, interrupted by one or more oxygen atoms and/or substituted with OH or a phenoxy group or an alkylphenoxy group having from 7 to 18 carbon atoms; -A; —CH$_2$—CH(XA)-CH$_2$—O—R$^{712}$; —CR$^{713}$R'$^{713}$—(CH$_2$)$_m$—X-A; —CH$_2$—CH(OA)—R$^{714}$; —CH$_2$—CH(OH)—CH$_2$—XA;

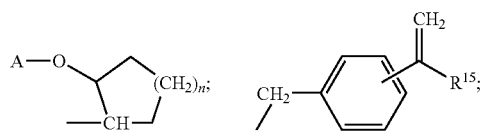

—CR$^{715}$R'$^{715}$—C(=CH$_2$)—R'''$^{715}$; —CR$^{713}$R'$^{713}$—(CH$_2$)$_m$—CO—X-A; —CR$^{713}$R'$^{713}$—(CH$_2$)$_m$—CO—O—CR$^{715}$R'$^{715}$—C(=CH$_2$)—R'''$^{715}$; or —CO—O—CR$^{715}$R'$^{715}$—C(=CH$_2$)—R'''$^{715}$ wherein A is —CO—CR$^{716}$=CH—R$^{717}$;

$R^{702}$ is an alkyl group having from 6 to 18 carbon atoms; an alkenyl group having from 2 to 6 carbon atoms; a phenyl group; —O—R$^{703}$ or —NH—CO—R$^{705}$;

$R^{703}$ has the same meaning as $R^{701}$;

$R^{704}$ is an alkyl group having from 1 to 18 carbon atoms; an alkenyl group having from 3 to 18 carbon atoms; a phenyl group; a phenylalkyl group having from 7 to 11 carbon atoms; a cycloalkyl group having from 5 to 12 carbon atoms; or an alkyl group having from 3 to 50 carbon atoms, optionally interrupted by one or more of —O—, —NH—, —NR$^{707}$— and —S— and optionally substituted with OH or a phenoxy group or an alkylphenoxy group having from 7 to 18 carbon atoms;

$R^{705}$ is H; an alkyl group having from 1 to 18 carbon atoms; an alkenyl group having from 2 to 18 carbon atoms; a cycloalkyl group having from 5 to 12 carbon atoms; a phenyl group; a phenylalkyl group having from 7 to 11 carbon atoms; a norborn-2-yl group; a norborn-5-en-2-yl group; or an adamantyl group;

$R^{706}$ is H; an alkyl group having from 1 to 18 carbon atoms; an alkenyl group having from 3 to 18 carbon atoms; a phenyl group; a phenylalkyl group having from 7 to 11 carbon atoms; or a cycloalkyl group having from 5 to 12 carbon atoms;

$R^{707}$ and $R^{708}$ are independently an alkyl group having from 1 to 12 carbon atoms; an alkoxyalkyl group having from 3 to 12 carbon atoms; a dialkylaminoalkyl group having from 4 to 16 carbon atoms; or a cycloalkyl group having from 5 to 12 carbon atoms;

$R^{707}$ and $R^{708}$ may bond to each other to form an alkylene group having from 3 to 9 carbon atoms, an oxa-alkylene group having from 3 to 9 carbon atoms, or an aza-alkylene group having from 3 to 9 carbon atoms;

$R^{709}$ is an alkyl group having from 1 to 18 carbon atoms; an alkenyl group having from 2 to 18 carbon atoms; a phenyl group, a cycloalkyl group having from 5 to 12 carbon atoms; a phenylalkyl group having from 7 to 11 carbon atoms; a norborn-2-yl group; a norborn-5-en-2-yl group; or an adamantyl group;

$R^{710}$ is an alkyl group having from 1 to 12 carbon atoms; a phenyl group; a naphthyl group; or an alkylphenyl group having from 7 to 14 carbon atoms;

$R^{711}$ each is H; an alkyl group having from 1 to 18 carbon atoms; or a phenylalkyl group having from 7 to 11 carbon atoms;

$R^{712}$ is an alkyl group having from 1 to 18 carbon atoms; an alkenyl group having from 3 to 18 carbon atoms; a phenyl group; a phenyl group substituted with from 1 to 3 substituents selected from an alkyl group having from 1 to 8 carbon atoms, an alkoxy group having from 1 to 8 carbon atoms, an alkenoxy group having from 3 to 8 carbon atoms, a halogen atom and a trifluoromethyl group; a phenylalkyl group having from 7 to 11 carbon atoms; a cycloalkyl group having from 5 to 12 carbon atoms; a 1-adamantyl group; a 2-adamantyl group; a norbornyl group; a norbornane-2-methyl group; or —CO—R$^{705}$;

$R^{712}$ may also be an alkyl group having from 3 to 50 carbon atoms, optionally interrupted by one or more of —O—, —NH—, —NR$^{707}$— and —S— and optionally substituted with OH or a phenoxy group or an alkylphenoxy group having from 7 to 18 carbon atoms;

$R^{713}$ and $R'^{713}$ each is independently H; an alkyl group having from 1 to 18 carbon atoms; or a phenyl group;

$R^{714}$ is an alkyl group having from 1 to 18 carbon atoms; an alkoxyalkyl group having from 3 to 12 carbon atoms; a phenyl group; or a phenyl-$C_{1-4}$ alkyl group;

$R^{715}$, $R'^{715}$ and $R''^{715}$ are independently H or $CH_3$;

$R^{16}$ is H; $—CH_2—COO—R^{704}$; an alkyl group having from 1 to 4 carbon atoms; or CN;

$R^{17}$ is H; $—COOR^{704}$; an alkyl group having from 1 to 17 carbon atoms; or a phenyl group;

X represents $—NH—$; $—NR^{707}—$; $—O—$; $—NH—(CH_2)_p—NH—$; or $—O(CH_2)_q—NH—$;

m is an integer of from 0 to 19;

n is an integer of from 1 to 8;

p is an integer of from 0 to 4;

q is an integer of from 2 to 4.

Like known compounds, the compounds of the formulae (VII) and (VII-A) can be obtained through Friedel-Crafts addition of a halotriazine to a corresponding phenol in known methods, for example, according to the method described in EP 434608 or in a publication of H. Brunetti and C. E. Luthi, Helv. Chim. Acta 55, 1566(1972), or according to a method similar to it.

Preferred examples of the compounds of the formulae (VII) and (VII-A) are mentioned below, to which, however, the invention should not be limited.

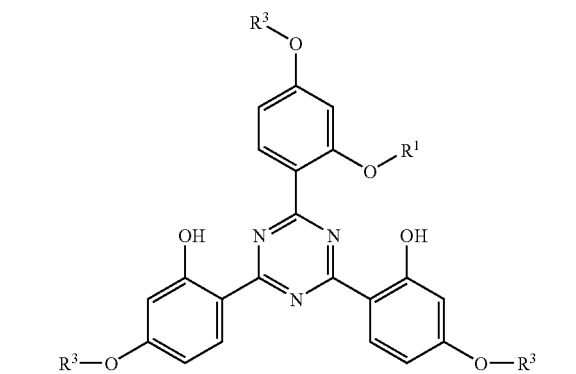

| Compound No | $R^3$ | $R^1$ |
|---|---|---|
| UV-1 | $—CH_2CH(OH)CH_2OC_4H_{9-n}$ | $—CH_3$ |
| UV-2 | $—CH_2CH(OH)CH_2OC_4H_{9-n}$ | $—C_2H_5$ |
| UV-3 | $R^3 = R^1 = —CH_2CH(OH)CH_2OC_4H_{9-n}$ | |
| UV-4 | $—CH(CH_3)—CO—O—C_2H_5$ | $—C_2H_5$ |
| UV-5 | $R^3 = R^1 = —CH(CH_3)—CO—C_2H_5$ | |
| UV-6 | $—C_2H_5$ | $—C_2H_5$ |
| UV-7 | $—CH_2CH(OH)CH_2OC_4H_{9-n}$ | $—CH(CH_3)_2$ |
| UV-8 | $—CH_2CH(OH)CH_2OC_4H_{9-n}$ | $—CH(CH_3)—C_2H_5$ |
| UV-9 | $R^3 = R^1 = —CH_2CH(C_2H_5)—C_4H_{9-n}$ | |
| UV-10 | $—C_8H_{17-n}$ | $—C_8H_{17-n}$ |
| UV-11 | $—C_3H_{7-n}$ | $—CH_3$ |
| UV-12 | $—C_3H_{7-n}$ | $—C_2H_5$ |
| UV-13 | $—C_3H_{7-n}$ | $—C_3H_{7-n}$ |
| UV-14 | $—C_3H_7\text{-iso}$ | $—CH_3$ |
| UV-15 | $—C_3H_7\text{-iso}$ | $—C_2H_5$ |
| UV-16 | $—C_3H_7\text{-iso}$ | $—C_3H_7\text{-iso}$ |
| UV-17 | $—C_4H_{9-n}$ | $—CH_3$ |
| UV-18 | $—C_4H_{9-n}$ | $—C_2H_5$ |
| UV-19 | $—C_4H_{9-n}$ | $—C_4H_{9-n}$ |

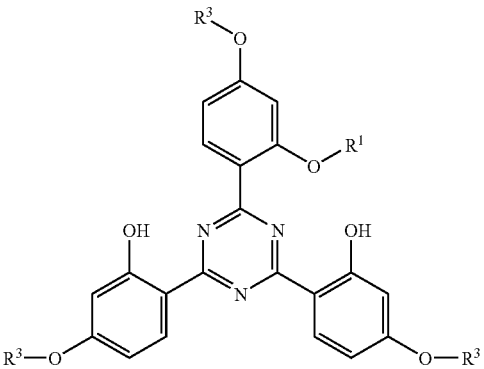

| Compound No | $R^3$ | $R^1$ |
|---|---|---|
| UV-20 | $—CH_2CH(CH_3)_2$ | $—CH_3$ |
| UV-21 | $—CH_2CH(CH_3)_2$ | $—C_2H_5$ |
| UV-22 | $—CH_2CH(CH_3)_2$ | $—CH_2CH(CH_3)_2$ |
| UV-23 | n-hexyl | $—CH_3$ |
| UV-24 | n-hexyl | $—C_2H_5$ |
| UV-25 | n-hexyl | n-hexyl |
| UV-26 | $—C_7H_{15-n}$ | $—CH_3$ |
| UV-27 | $—C_7H_{15-n}$ | $—C_2H_5$ |
| UV-28 | $—C_7H_{15-n}$ | $—C_7H_{15-n}$ |
| UV-29 | $—C_8H_{17-n}$ | $—CH_3$ |
| UV-30 | $—C_8H_{17-n}$ | $—C_2H_5$ |
| UV-31 | $—CH_2CHCH(CH_3)_2$ | $—CH_2CHCH(CH_3)_2$ |
| UV-32 | $—C_5H_{11-n}$ | $—C_5H_{11-n}$ |
| UV-33 | $—C_{12}H_{25-n}$ | $—C_{12}H_{25-n}$ |
| UV-34 | $—C_{16}H_{33-n}$ | $—C_2H_5$ |
| UV-35 | $—CH_2—CO—O—C_2H_5$ | $—CH_2—CO—O—C_2H_5$ |

Apart from the above, for example, oxybenzophenone compounds, benzotriazole compounds, salicylate compounds, cyanoacrylate compounds, nickel complex compounds are also preferred for use herein.

Benzotriazole-type UV absorbents include
2-(2'-hydroxy-5'-methylphenyl)benzotriazole,
2-(2'-hydroxy-3',5'-di-tert-butylphenyl)benzotriazole,
2-(2'-hydroxy-3'-tert-butyl-5'-methylphenyl)benzotriazole,
2-(2'-hydroxy-3',5'-di-tert-butylphenyl)-5-chlorobenzotriazole,
2-(2'-hydroxy-3'-(3",4",5",6"-tetrahydrophthalimidomethyl)-5'-methylphenyl)benzotriazole,
2,2-methylenebis(4-(1,1,3,3-tetramethylbutyl)-6-(2H-benzotriazol-2-yl)phenol),
2-(2'-hydroxy-3'-tert-butyl-5'-methylphenyl)-5-chlorobenzotriazole, 2,4-dihydroxybenzophenone,
2,2'-dihydroxy-4-methoxybenzophenone,
2-hydroxy-4-methoxy-5-sulfobenzophenone,
bis(2-methoxy-4-hydroxy-5-benzoylphenylmethane),
(2,4-bis-(n-octylthio)-6-(4-hydroxy-3,5-di-tert-butylanilino)-1,3,5-triazine,
2-(2'-hydroxy-3',5'-di-tert-butylphenyl)-5-chlorobenzotriazole,
(2-(2'-hydroxy-3',5'-di-tert-amylphenyl)-5-chlorobenzotriazole, 2,6-di-tert-butyl-p-cresol,
pentaerythrityl-tetrakis[3-(3,5-di-tert-butyl-4-hydroxy-phenyl)propionate],
triethylene glycol-bis[3-(3-tert-butyl-5-methyl-4-hydroxyphenyl)propionate],
1,6-hexanediol-bis[3-(3,5-di-tert-butyl-4-hydroxyphenyl)propionate],
2,4-bis(n-octylthio)-6-(4-hydroxy-3,5-di-tert-butylanilino)-1,3,5-triazine, 2,2-thio-diethylenebis[3-(3,5-di-tert-butyl-4-hydroxy-phenyl)propionate],
octadecyl-3-(3,5-di-tert-butyl-4-hydroxyphenyl)propionate,
N,N'-hexamethylenebis(3,5-di-tert-butyl-4-hydroxy-hydrocinnamide),
1,3,5-trimethyl-2,4,6-tris(3,5-di-tert-butyl-4-hydroxy-benzyl)benzene,
tris-(3,5-di-tert-butyl-4-hydroxybenzyl)-isocyanurate.

Especially preferred are
(2,4-bis-(n-octylthio)-6-(4-hydroxy-3,5-di-tert-butyl-anilino)-1,3,5-triazine,
2-(2'-hydroxy-3',5'-di-tert-butylphenyl)-5-chlorobenzotriazole,
(2-(2'-hydroxy-3',5'-di-tert-amylphenyl)-5-chlorobenzotriazole, 2,6-di-tert-butyl-p-cresol,
pentaerythrityl-tetrakis[3-(3,5-di-tert-butyl-4-hydroxy-phenyl)propionate],
triethylene glycol-bis[3-(3-tert-butyl-5-methyl-4-hydroxyphenyl)propionate].

In addition, for example, hydrazine-type metal inactivators such as N,N'-bis[3-(3,5-di-tert-butyl-4-hydroxy-phenyl)propionyl]hydrazine, and phosphorus-containing working stabilizers such as tris(2,4-di-tert-butylphenyl) phosphite may also be used along with the above. The amount of the metal inactivator and the phosphorus-containing working stabilizer is preferably from 1 ppm to 1%, more preferably from 10 to 1000 ppm by mass of cellulose acylate.

In addition, light stabilizers given in a catalogue of "Adekastab", Overview of Additives to Plastics by Asahi Denka are also usable herein. Further, light stabilizers and UV absorbents given in the guidebook for Tinuvin by Ciba Speciality Chemicals are also usable herein. SEESORB, SEENOX, SEETEC in a catalog of Shiprokasei Kaisha are also usable herein. UV absorbents and antioxidants by Johoku Chemical Industry are also usable herein. VIOSORB by Kyodo Pharmaceuticals, and UV absorbents by Yoshitomi Pharmaceuticals are also usable herein.

In the invention, the UV absorbent maybe previously added to a mixture solution of cellulose acylate while the solution is prepared; but it may be added at any stage in a process of previously preparing a cellulose acylate dope and casting it. In the latter case, a dope solution of cellulose acylate dissolved in a solvent and a solution comprising a UV absorbent and a small amount of cellulose acylate dissolved therein are in-line combined and mixed, for which, for example, preferably used is an in-line mixer such as a static mixer (by Toray Engineering), SWJ (Toray's static in-line mixer, Hi-Mixer). A mat agent may be added to the UV absorbent to be added to the system later on, and other additives such as retarder, plasticizer, degradation inhibitor, release promoter may also be added thereto. In case where such an in-line mixer is used, then it is desirable that the system is concentrated and dissolved under high pressure, and the type of the pressure chamber to be used for it is not specifically defined. Any and every pressure chamber is employable for it, resistant to high pressure and allowing heating and stirring therein under pressure. If desired, the pressure chamber may be additionally equipped with other instruments such as a pressure gauge and a thermometer. Pressure may be applied to it by introducing an inert gas such as nitrogen gas thereinto under pressure, or by heating a solvent therein so as to increase the vapor pressure therein. Preferably, the chamber is heated from the outside. For example, a jacket type heater is preferred as its temperature control is easy. When a solvent is added and heated for pressure application, then the heating temperature is preferably from the boiling point of the solvent used but up to a temperature at which the solvent does not boil, for example, preferably falling from 30 to 150° C. The pressure is so controlled that the solvent does not boil at the set temperature under the thus-controlled pressure. After dissolved, the resulting solution is taken out of the chamber while being cooled, or it is discharged out of the chamber via a pump or the like and then cooled with a heat exchanger, and then this is used for film formation. Regarding the cooling temperature, the solution may be cooled to room temperature, but is preferably cooled to a temperature lower by from 5 to 10° C. than the boiling point thereof, and then this is directly cast at that temperature. The latter is more preferred as the dope viscosity may be reduced.

A method for producing the low retardation cellulose acylate film for use in the invention is described in detail hereinunder.

The low retardation cellulose acylate film in the invention may be produced in a solution casting method. In a solution casting method, a solution (dope) prepared by dissolving cellulose acylate in an organic solvent is used for producing films.

The organic solvent preferably contains a solvent selected from ethers having from 3 to 12 carbon atoms, ketones having from 3 to 12 carbon atoms, esters having from 3 to 12 carbon atoms, and halogenohydrocarbons having from 1 to 6 carbon atoms.

The ethers, ketones and esters may have a cyclic structure. In addition, compounds having two or more functional groups (e.g., —O—, —CO— and —COO—) of the ethers, ketones and esters may also be used as the organic solvent. The organic solvent may have any other functional group such as an alcoholic hydroxyl group. When the organic solvent has two or more functional groups, then it is desirable that the number of the carbon atoms constituting the solvent is within the above-mentioned preferred range of the solvent having either one of the functional groups.

Examples of the ethers having from 3 to 12 carbon atoms include diisopropyl ether, dimethoxymethane, dimethoxyethane, 1,4-dioxane, 1,3-dioxolan, tetrahydrofuran, anisole and phenetole.

Examples of the ketones having from 3 to 12 carbon atoms include acetone, methyl ethyl ketone, diethyl ketone, diisobutyl ketone, cyclohexanone and methylcyclohexanone.

Examples of the esters having from 3 to 12 carbon atoms include ethyl formate, propyl formate, pentyl formate, methyl acetate, ethyl acetate and pentyl acetate.

Examples of the organic solvents having two or more functional groups include 2-ethoxyethyl acetate, 2-methoxyethanol and 2-butoxyethanol.

The number of the carbon atoms constituting the halogenohydrocarbon having from 1 to 6 carbon atoms is preferably 1 or 2, more preferably 1. The halogen of the halogenohydrocarbon is preferably chlorine. The ratio in which the hydrogen atom of the halogenohydrocarbon is substituted with halogen is preferably from 25 to 75 mol %, more preferably from 30 to 70 mol %, even more preferably 35 to 65 mol %, most preferably from 40 to 60 mol %. Methylene chloride is the most typical halogenohydrocarbon for use herein.

Two or more organic solvents may be combined for use herein.

The cellulose acylate solution (dope) may be prepared in an ordinary method where it is processed at a temperature not lower than 0° C. (room temperature or high temperature). For preparing the cellulose acylate solution, herein employable are a method and an apparatus for dope preparation in an ordinary solution casting method. In such an ordinary process, a halogenohydrocarbon (especially methylene chloride) is preferably used for the organic solvent.

The amount of cellulose acylate in the cellulose acylate solution (composition) is so controlled that it is in an amount of from 10 to 40% by mass of the solution obtained. More preferably, the amount of cellulose acylate is from 10 to 30% by mass. To the organic solvent (main solvent), optional additives to be mentioned below may be added.

The cellulose acylate solution may be prepared by stirring cellulose acylate and an organic solvent at room temperature (e.g., 0 to 40° C.). A high concentration solution may be stirred under pressure and under heat. Concretely, cellulose acylate and an organic solvent are put into a pressure chamber, sealed up, and heated with stirring under pressure at a temperature not lower than the boiling point of the solvent at atmospheric pressure but up to a temperature at which the solvent does not boil. The heating temperature is preferably 40° C. or higher, more preferably from 60 to 200° C., even more preferably from 80 to 110° C.

The constitutive components may be previously roughly mixed before put into a chamber. They may be put thereinto one after another. The chamber must be so designed that it allows stirring therein. An inert gas such as nitrogen gas may be introduced into the chamber for pressure application thereto. If desired, the solvent in the chamber may be heated so as to increase the vapor pressure therein for pressure application. After the chamber has been sealed up, the constitutive components may be introduced thereinto under pressure.

When it is heated, the chamber is preferably heated from the outside. For example, a jacket-type heater may be used. A plate heater may be disposed outside the chamber, and a liquid may be circulated through a pipe line around it so as to heat the whole of the chamber.

Preferably, a stirring blade is provided inside the chamber, with which the stirring may be attained. Regarding the length thereof, it is desirable that the stirring blade may reach around the wall of the chamber. Also preferably, a scraper is fitted to the tip of the stirring blade, for the purpose of renewing the liquid film on the wall of the chamber.

The chamber may be equipped with instruments such as a pressure gauge and a thermometer. In the chamber, the constitutive components are dissolved in a solvent. The thus-prepared dope is taken out of the chamber after cooled, or after taken out, it is cooled with a heat exchanger or the like.

The cellulose acylate solution may also be prepared according to a cooling dissolution method. In a cooling dissolution method, cellulose acylate may be dissolved in an organic solvent, in which, however, cellulose acylate is difficult to dissolve in an ordinary dissolution method. Even in a solvent in which cellulose acylate can be dissolved in an ordinary dissolution method, the cooling dissolution method is effective in that it may rapidly give a uniform solution.

In a cooling dissolution method, cellulose acylate is first gradually added to an organic solvent with stirring at room temperature. The amount of cellulose acylate is preferably so controlled that it may be in the resulting mixture in an amount of from 10 to 40% by mass. More preferably, the amount of cellulose acylate is from 10 to 30% by mass. Further, additives to be mentioned below may be previously added to the mixture.

Next, the mixture is cooled to −100 to −10° C. (preferably −80 to −10° C., more preferably −50 to −20° C., most preferably −50 to −30° C.). Cooling it may be attained in a dry ice/methanol bath (−75° C.) or in a cooled diethylene glycol solution (−30 to −20° C.). Thus cooled, the mixture of cellulose acylate and organic solvent is solidified.

Preferably, the cooling speed is 4° C./min or higher, more preferably 8° C./min or higher, most preferably 12° C./min or higher. The cooling speed is preferably higher, but the theoretical uppermost limit thereof is about 10000° C./sec, the technical uppermost limit thereof is about 1000° C./sec, and the practicable uppermost limit thereof is about 100° C./sec. The cooling speed is a value obtained by dividing the difference between the temperature at the start of the cooling and the temperature at the end thereof, by the time taken from the start of the cooling to the end having the final cooling temperature.

Then, when the cooled mixture is heated preferably at 0 to 200° C. (more preferably at 0 to 150° C., even more preferably at 0 to 120° C., most preferably at 0 to 50° C.), then cellulose acylate dissolves in the organic solvent. Heating it may be attained merely by leaving the mixture at room temperature, but the mixture may be heated in a warm bath. Preferably, the heating speed is 4° C./min or higher, more preferably 8° C./min or higher, most preferably 12° C./min or higher. The heating speed is preferably higher, but the theoretical uppermost limit thereof is about 10000° C./sec, the technical uppermost limit thereof is about 1000° C./sec, and the practicable uppermost limit thereof is about 100° C./sec. The heating speed is a value obtained by dividing the difference between the temperature at the start of the heating and the temperature at the end thereof, by the time taken from the start of the heating to the end having the final heating temperature.

In the manner as above, a uniform cellulose acylate solution is obtained. When the dissolution is insufficient, then the operation of cooling and heating may be repeated. The matter as to whether the dissolution is sufficient or not may be judged merely by visually observing the outward condition of the solution.

In the cooling dissolution method, a closed container is preferably used for the purpose of preventing the solution from being contaminated with water owing to dew formation during cooling. In the cooling and heating operation, when the cooling is attained under pressure and the heating is attained under reduced pressure, then the dissolution time may be shortened. For such pressure cooling and reduced pressure heating, a pressure container is preferably used.

When cellulose acetate (degree of acetylation: 60.9%, viscosity-average degree of polymerization: 299) is dissolved in methyl acetate according to a cooling dissolution method and when the resulting 20 mas. % solution is analyzed with a differential scanning calorimeter (DSC), then a pseudo-phase transition point between a sol state and a gel state is seen at around 33° C., and the solution is in a uniform gel state at a temperature lower than it. Accordingly, it is desirable that the solution is kept at a temperature not lower than the pseudo-phase transition temperature, preferably at a temperature higher by about 10° C. than the gel phase transition temperature. However, the pseudo-phase transition temperature varies depending on the degree of acetylation and the viscosity-average degree of polymerization of cellulose acetate, the solution concentration and the organic solvent used.

From the thus-prepared cellulose acylate solution (dope), produced is a low retardation cellulose acylate film in a solution casting method. The dope is cast onto a drum or a band, on which the solvent is evaporated away to form a film thereon. Before cast, the concentration of the dope is preferably so controlled that the solid content of the dope could be from 18 to 35%. Preferably, the surface of the drum or the band is mirror-finished. Also preferably, the dope is cast onto the drum or the band having a surface temperature not higher than 10° C.

A mode of drying in the solution casting method is described, for example, in U.S. Pat. No. 2,336,310, U.S. Pat. No. 2,367,603, U.S. Pat. No. 2,492,078, U.S. Pat. No. 2,492,977, U.S. Pat. No. 2,492,978, U.S. Pat. No. 2,607,704, U.S. Pat. No. 2,739,069 and U.S. Pat. No. 2,739,070; BP 640731 and BP 736892; JP-B-45-4554, JP-B-49-5614; JP-A-60-176834, JP-A-60-203430 and JP-A-62-115035. Drying on a band or a drum may be attained by applying thereto a blow of an inert gas such as air or nitrogen.

The obtained film may be peeled off from the drum or the band, and may be dried with hot air having a varying temperature of from 100° C. to 160° C., whereby the residual solvent may be evaporated away. The method is described in JP-B-5-17844. According to the method, the time from the casting to the peeling may be shortened. For carrying out the method, the dope must be gelled at the surface temperature of the drum or the band on which the dope is cast.

The prepared cellulose acylate solution (dope) may be cast in two or more layers for film formation. In this case, it is desirable that the low retardation cellulose acylate film is formed according to a solution casting method. The dope is cast onto a drum or a band, and then the solvent is evaporated away to form a film thereon. Before cast, the dope concentration is preferably so controlled that the solid content of the dope could be from 10 to 40% by mass. Also preferably, the surface of the drum or the band is mirror-finished.

When two or more layers of plural cellulose acylate solutions are formed by casting, then plural cellulose acylate solution may be cast. Through plural casting ports spaced from each other in the machine direction of the support, cellulose acylate-containing solutions are separately cast onto the support and laminated thereon to form a film. For this, for example, methods described in JP-A-61-158414, JP-A-1-122419 and JP-A-11-198285 may be referred to. When cellulose acylate solutions are cast through two casting ports, then a film may also be produced. For this, for example, methods described in JP-B-60-27562; JP-A-61-94724, JP-A-61-947245, JP-A-61-104813, JP-A-61-158413 and JP-A-6-134933 may be referred to. Also employable herein is a casting method described in JP-A-56-162617, in which a high viscosity cellulose acylate solution flow is enveloped with a low viscosity cellulose acylate solution, and the high viscosity and low viscosity cellulose acylate solutions are co-extruded simultaneously to give a low retardation cellulose acylate film.

Two casting ports may be used as follows: A film is formed on a support through the first casting port, and this is peeled off. On the surface of the film having been in contact with the support, a second dope is cast via a second casting port to form a second film thereon. For this, for example, referred to is a method described in JP-B-44-20235.

The same cellulose acylate solution may be cast, or two or more different cellulose acylate solutions may be cast. In order to make plural cellulose acylate layers have different functions, different cellulose acylate solutions corresponding to the intended functions may be extruded out via the respective casting ports. In addition, the cellulose acylate solution in the invention may be co-cast with any other functional layers (e.g., adhesive layer, dye layer, antistatic layer, antihalation layer, UV absorbent layer, polarizing layer).

A conventional single-layer solution must be a high concentration and high viscosity cellulose acylate solution and it must be extruded out in order that the formed film could have a necessary thickness. In this case, the cellulose acylate solution is poorly stable and may often gives solids, therefore causing some problems of unfavorable fish dyes and surface roughness. To solve the problems, plural cellulose acylate solutions may be cast via different casting ports, whereby high viscosity solutions may be co-extruded onto a support. As a result, films of better surface smoothness and better surface profile can be obtained, and in addition, drying load may be reduced since such thick cellulose acylate solutions are used, and the production speed of films may be more increased.

Degradation inhibitors (e.g., antioxidant, peroxide decomposer, radical inhibitor, metal inactivator, acid scavenger, amine) may be added to the low retardation cellulose acylate film. The degradation inhibitors are described, for example, in JP-A-3-199201, JP-A-5-1907073, JP-A-5-194789, JP-A-5-271471, JP-A-6-107854. Preferably, the amount of the degradation inhibitor to be added is from 0.01 to 1% by mass, more preferably from 0.01 to 0.2% by mass of the solution (dope). When the amount thereof is 0.01% by mass or more, then the degradation inhibitor may favorably exhibit a sufficient effect; and when it is 1% by mass or less, then there may hardly occur a problem of bleeding out of the degradation inhibitor onto the film surface. Especially preferred examples of the degradation inhibitor are butylated hydroxytoluene (BHT) and tribenzylamine. (TBA).

The process from casting to drying may be attained in air or in an inert gas atmosphere such as nitrogen gas. The winder to be used in producing the low retardation cellulose acylate film in the invention may be any one generally used in the art. For example, the film may be wound up in various winding methods of, for example, a constant-tension method, a constant-torque method, a taper-tension method or a programmed-tension control method in which the internal stress is kept constant.

(Thermal Shrinkage Treatment)

The low retardation cellulose acylate film in the invention may be produced through thermal shrinkage treatment. Thermal shrinkage treatment reduces the free volume between cellulose molecular chains, therefore increasing the interaction between cellulose acylate and retardation reducer and enhancing the retentiveness of retardation reducer.

Thermal shrinkage treatment may be attained in various methods. One preferred method comprises processing the film kept fixed in any one direction of the cross direction or the machine direction thereof, at a temperature not lower than (the glass transition temperature (Tg) −20)° C. for a predetermined period of time. Preferably, the residual solvent content of the film at the start of thermal shrinkage is at most 30% by mass, more preferably at most 10% by mass, most preferably at most 5% by mass. When the film is subjected to thermal treatment while the residual solvent content thereof is still high, then the film crystallization may go on, therefore bringing about some undesirable changes of brittleness increase and haze increase.

For the heat treatment, a method is especially preferably employed, which comprises drying the peeled film while the cross direction thereof is controlled by the use of a device such as tenter clips, removing the cross-direction control after the residual solvent content has fully lowered, and passing the film through a high temperature zone at Tg or higher while it is under tension only in the machine direction.

Stretching Treatment

The low retardation cellulose acylate film for use in the invention may be stretched for the purpose of unifying the alignment degree of cellulose acylate in both the cross direction and the machine direction.

Both the cross direction and the machine direction are preferred for the stretching direction of the low retardation cellulose acylate film.

A method of cross-direction stretching is described, for example, in JP-A-62-115035, JP-A-4-152125, JP-A-4-284211, JP-A-4-298310, JP-A-11-48271. The low retardation cellulose acylate film is stretched at room temperature or under heat. The heating temperature is preferably not higher than Tg of the low retardation cellulose acylate film. The low retardation cellulose acylate film may be stretched while it is dried, and its stretching is especially effective while the solvent remains therein. For machine-direction stretching, for example, the speed of the conveyor rollers for the low retardation cellulose acylate film is controlled in such a manner that the winding speed of the low retardation cellulose acylate film is to be higher than the peeling speed thereof, whereby the low retardation cellulose acylate film may be stretched. For cross-direction stretching, the low retardation cellulose acylate film is conveyed while kept stretched with a tenter in the cross (width) direction thereof, and it may be stretched in the cross direction by gradually broadening the width of the tenter. After dried, the low retardation cellulose acylate film may be stretched with a stretcher (preferably monoaxially with a long stretcher). The draw ratio by stretching of the low retardation cellulose acylate film is preferably from 1 to 30%, more preferably from 1% to 15%.

Retardation

In this description, Re(λ) and Rth(λ) each indicate an in-plane retardation and a retardation in a thickness direction, respectively, at a wavelength λ. Re(λ) is measured by applying light having a wavelength of λ nm to a film in the normal direction thereof, using KOBRA 21ADH or WR (by Oji Scientific Instruments). When the film to be analyzed is one represented by a monoaxial or biaxial index ellipsoid, then its Rth(λ) may be calculated according to the following method.

Re(λ) is first determined as follows: The in-plane slow axis (judged by KOBRA 21ADH or WR) is taken as an inclination axis (rotation axis) of the film (in case where the film does not have a slow axis, then any in-plane direction of the film may be the rotation axis thereof). Light having a wavelength of λ nm is applied to the film in different inclination directions relative to the normal direction of the film, at intervals of 10 degrees up to 50 degrees on one side from the normal direction, and 6 points in all are analyzed. Based on the thus-measured retardation data, the estimated mean refractive index and the inputted thickness of the film, Rth(λ) is computed by KOBRA 21ADH or WR.

In the above, in case where the film has a direction at a certain inclination angle from the normal direction around the in-plane slow axis as the rotation angle, in which its retardation is zero, then the retardation value of the film is changed to a negative one at an inclination angle larger than that inclination angle, and then Rth(λ) is computed by KOBRA 21ADH or WR.

Rth may also be calculated as follows: The slow axis of the film to be analyzed is taken as an inclination angle (rotation angle) thereof (in case where the film does not have a slow axis, then any in-plane direction of the film may be the rotation axis thereof). The retardation of the film is measured in any inclined two directions. Based on the data and the estimated mean refractive index and the inputted thickness of the film, Rth may be calculated according to the following formulae (A) and (B):

$$Re(\theta) = \left[ nx - \frac{ny \times nz}{\sqrt{\left\{ ny\sin\left(\sin^{-1}\left(\frac{\sin(-\theta)}{nx}\right)\right)\right\}^2 + \left\{ nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}}$$ Formula (A)

In the above, Re(θ) indicates the retardation in the direction inclined by an angle θ from the normal direction of the film.

In formula (1), nx indicates the in-plane refractive index of the film in the slow axis direction; ny indicates the in-plane refractive index of the film in the direction perpendicular to nx; nz indicates the refractive index of the film in the direction perpendicular to nx and ny.

$$Rth = ((nx+ny)/2 - nz) \times d$$ Formula (B)

In case where the film to be analyzed could not be expressed as a monoaxial or biaxial index ellipsoid, or that is, when the film does not have an optic axis, then its Rth (λ) may be calculated as follows:

Re (λ) is first determined. The in-plane slow axis (judged by KOBRA 21ADH or WR) is taken as an inclination axis (rotation axis) of the film. Light having a wavelength of λ nm is applied to the film in different inclination directions relative to the normal direction of the film, at intervals of 10 degrees between −50 degrees and 50 degrees from the normal direction, and 11 points in all are analyzed. Based on the thus-measured retardation data, the estimated mean refractive index and the inputted thickness of the film, Rth(λ) is computed by KOBRA 21ADH or WR.

In the above-mentioned measurement, the data given in *Polymer Handbook* (John Wiley & Sons, Inc.) and catalogues of various optical films may be referred to for the estimated mean refractive index of the film. When the mean refractive index is unknown, it may be measured with an Abbe's refractometer. Values of mean refractive index of some typical optical films are as follows: Cellulose acylate (1.48), cyclo-olefin polymer (1.52), polycarbonate (1.59), polymethyl methacrylate (1.49), polystyrene (1.59). When the estimated value of mean refractive index and the thickness of the film are inputted therein, then KOBRA 21ADH or WR computes nx, ny and nz. The thus-computed data nx, ny and nz give Nz=(nx−nz)/(nx−ny).

Re of the low retardation film in the invention satisfies formulae (1) and (2), at 25° C. and 60% RH and within a wavelength range of from 400 nm to 700 nm.

In formula (1), more preferably Re(λ)≦5 nm, most preferably Re(λ)≦3 nm.

In formula (2), more preferably −10 nm≦Rth(λ)≦10 nm, and most preferably −5 nm≦Rth(λ)≦5 nm.

Further, Rth(446) and Rth(628) of the low retardation film in the invention satisfies a relation of the following formula (17) at 25° C. and 60% RH.

$$-10 \text{ nm} \leq Rth(446) - Rth(628) \leq 10 \text{ nm} \tag{17}$$

In formula (17), Rth(446)−Rth(628) is more preferably, $$-9 \text{ nm} \leq Rth(446) - Rth(628) \leq 9 \text{ nm},$$

most preferably, $$-7 \text{ nm} \leq Rth(446) - Rth(628) \leq 7 \text{ nm}.$$

Within the above-mentioned range, the invention is effective for reducing the viewing angle-dependent contrast change and color tone change in liquid crystal display devices.

Thickness of Low Retardation Cellulose Acylate Film

Preferably, the low retardation cellulose acylate film in the invention is from 10 to 200 μm, more preferably from 20 to 150 μm, even more preferably from 30 to 100 μm.

(Optical Compensatory Film)

The optical compensatory film to be used in the liquid crystal display device of the invention is described.

Preferably, the optical compensatory film for use in the invention has the following two constitutions:

The first preferred constitution of the optical compensatory film of the invention satisfies the relation of the formulae (3) to (8).

In formula (3), more preferably 25 nm<Re (548)<135 nm, and most preferably 30 nm<Re(548)<120 nm.

In formula (4), more preferably 80 nm<Rth(548)<350 nm, and most preferably 100 nm<Rth(548)<300 nm.

In formula (5), more preferably 0.55<Re(446)/Re(548) <0.95, and most preferably 0.6<Re(446)/Re(548)<0.9.

In formula (6), more preferably 1.05<Re(628)/Re(548) <1.75, and most preferably 1.1<Re(628)/Re(548)<1.5.

In formula (7), more preferably 1.05<Rth(446)/Rth(548) <1.75, and most preferably 1.10<Rth(446)/Rth(548)<1.5.

In formula (8), more preferably 0.6<Rth(628)/Rth(548) <0.95, and most preferably 0.7<Rth(628)/Rth(548)<0.90.

The second preferred constitution of the optical compensatory film of the invention satisfies the relation of the formulae (9) to (12) and the relation of the formulae (13) to (16).

$$50 \text{ nm} < Re(548) < 200 \text{ nm} \quad (9)$$

$$30 \text{ nm} < Rth(548) < 150 \text{ nm} \quad (10)$$

$$0.5 < Re(446)/Re(548) < 1 \quad (11)$$

$$1.0 < Re(628)/Re(548) < 2.0 \quad (12)$$

$$0 \text{ nm} \leq Re(548) < 10 \text{ nm} \quad (13)$$

$$100 \text{ nm} < Rth(548) < 300 \text{ nm} \quad (14)$$

$$1.0 < Rth(446)/Rth(548) < 2.0 \quad (15)$$

$$0.5 < Rth(628)/Rth(548) < 1.0 \quad (16)$$

In formula (9), more preferably 70 nm<Re (548)<175 nm, most preferably 90 nm<Re(548)<150 nm.

In formula (10), more preferably 40 nm<Rth(548)<120 nm, most preferably 50 nm<Rth(548)<100 nm.

In formula (11), more preferably 0.55<Re(446)/Re(548) <0.95, most preferably 0.6<Re(446)/Re(548)<0.9.

In formula (12), more preferably 1.05<Re(628)/Re(548) <1.50, most preferably 1.08<Re(628)/Re(548)<1.30.

In formula (13), more preferably 0≦Re(548)<5 nm, most preferably 0≦Re(548)<3 nm.

In formula (14), more preferably 120 nm<Rth(548)<250 nm, most preferably 140 nm<Rth(548)<230 nm.

In formula (15), more preferably 1.03<Rth(446)/Rth(548) <1.50, most preferably 1.05<Rth(446)/Rth(548)<1.3.

In formula (16), more preferably 0.7<Rth(628)/Rth(548) <1.00, most preferably 0.85<Rth(628)/Rth(548)<0.97.

The optical compensatory film in the invention may be a laminate of plural films and/or coating layers. In case where such plural films and/or coating layers are used, then they may have various configurations. For example, preferred are a method of concentrating the optical compensatory film only on one side of a liquid crystal cell; and a method of distributing the optical compensatory film on both sides of a liquid crystal cell.

In case where the optical compensatory film is distributed on both sides of a liquid crystal cell, preferably employed are both a method of disposing the optical compensatory films on both sides of the liquid crystal cell in such a manner that the films could have nearly the same retardation, and a method of disposing the optical compensatory films on both sides of the liquid crystal cell in such a manner that the films could have a different retardation.

Of the polarizing plate, the protective film on the side toward the liquid crystal cell may be so constituted that it serves also as an optical compensatory film.

FIG. 1 shows some preferred constitutions of an optical compensatory film the protective film of a polarizing plate on the side toward a liquid crystal cell, to which, however, the invention should not be limited.

In Constitution 1 in FIG. 1, the laminate of the biaxial film and the retardation film is one example of the optical compensatory film that satisfies the relation of the formulae (3) to (8); and the low retardation film in Constitution 1 and Constitution 2 is the protective film that satisfies the relation of the formulae (1) and (2). In Constitution 2, the laminate of the plate A and the plate C corresponds to the optical compensatory film. In Constitution 3, the optical compensatory film A is one example of the optical compensatory film that satisfies the relation of the formulae (9) to (12), and the optical compensatory film B is one example of the optical compensatory film that satisfies the relation of the formulae (13) to (16).

In Constitution 1, Constitution 2 and Constitution 3, a paste layer, an adhesive layer and an alignment layer may be provided between the constitutive members (layers).

(Constitution 1)

(Retardation Film)

The retardation film in Constitution 1 expresses a slow axis in the machine direction.

For expressing a slow axis in the machine direction, for example, employable is a method of stretching the polymer in the machine direction or a method of aligning the polymerizing liquid crystal compound.

In Constitution 1, it is desirable that the retardation film may have an absorption in the longer wavelength range than the material that constitutes the biaxial film. Having the thus-designed constitution, the chromatic dispersion of the retardation of the optical compensatory film may be controlled in a desired pattern. The absorption maximum range of the material used for the retardation film in Constitution 1 is preferably from 200 nm to 370 nm, more preferably from 220 nm to 350 nm, most preferably from 240 nm to 330 nm. Having the absorption maximum at 370 nm or shorter, the absorption tail of the optical compensatory film may extend to a visible range and the film may be more effectively prevented from yellowing.

Preferably, the retardation film to be used in Constitution 1 contains a non-liquid crystalline polymer or a liquid crystalline compound.

(Retardation of Retardation Film)

Preferably Re of the retardation film in Constitution 1 is from 0 to 300 nm, more preferably from 0 to 200 nm. The absolute value of Rth of the film is preferably from 0 to 400 nm, more preferably from 0 to 200 nm.

(Retardation Film Containing Non-Liquid Crystalline Polymer)

A non-liquid crystalline polymer, and the retardation film containing the non-liquid crystalline polymer are described.

The non-liquid crystalline polymer to form the retardation film for use in the invention preferably has a mass-average molecular weight (Mw) of from 10,000 to 400,000 as measured through gel permeation chromatography (GPC) using polyethylene oxide as the standard sample in a solvent of dimethylformamide. Such a polymer having a mass-average molecular weight of at least 10,000 produces a birefringent layer having a higher birefringence, and the layer is prevented from cracking. On the other hand, a polymer having a mass-average molecular weight of at most 400,000 is effective for preventing the fluctuation of retardation. This is because, in case where the polymer solution is applied to form the above-mentioned retardation film, the viscosity of the solution of a polymer having a mass-average molecular weight of at most 400,000 is not so high, and the polymer solution may be readily applied onto a substrate, and, as a result, a uniform retardation film can be formed. In addition, when a polymer having a mass-average molecular weight of at most 400,000 is used to prepare its solution, the amount of the solvent to be used may be reduced since the solubility of the polymer is high. As a result, the thickness of the coating layer of the polymer may be reduced, therefore enabling precision coating with the polymer solution. More preferably, the mass-average molecular weight (Mw) of the polymer to form the retardation film is from 10,000 to 300,000, even more preferably from 10,000 to 200,000.

For example, different from a liquid crystalline polymer, a non-liquid crystalline polymer may form an optically-monoaxial film with nx>nz and ny>nz owing to the property of itself irrespective of the alignment of the underlying substrate. Accordingly, for example, the support to be used is not limited by an alignment group, and, for example, it may be a non-alignment film, and a step of forming an alignment film by coating and a step of forming it by lamination may be omitted.

The non-liquid crystalline polymer for use herein is preferably at least one polymer selected from a group consisting of polyamide, polyimide, polyester, polyether ketone, polyaryl ether ketone, polyamidimide and polyester imide. The materials of these polymers are not specifically defined, and any known polymer materials may be used either singly or as combined in any desired manner.

Because of the reasons that these polymers have good heat resistance and chemical resistance, and are highly rigid and transparent, they are suitable also to biaxial films to be mentioned hereinunder.

For example, it is desirable that the polyimide has good in-plane alignability and is soluble in organic solvent. Concretely, for example, it includes polycondensation products of a 9,9-bis(aminoaryl)fluorenone and an aromatic tetracarboxylic acid dianhydride as in JP-T-2000-511296, and polymers having at least one repetitive unit of the following formula (46) are usable herein.

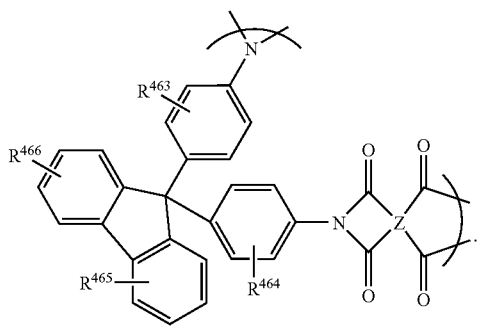

Formula (46)

In formula (46), $R^{463}$ to $R^{466}$ each independently represents a group selected from a hydrogen atom, a halogen atom, a phenyl group, a phenyl group substituted with from 1 to 4 substituents of a halogen atom and an alkyl group having from 1 to 10 carbon atoms, and an alkyl group having from 1 to 10 carbon atoms. Preferably, $R^{463}$ to $R^{466}$ each independently represents a group selected from a halogen atom, a phenyl group, a phenyl group substituted with from 1 to 4 substituents of a halogen atom and an alkyl group having from 1 to 10 carbon atoms, and an alkyl group having from 1 to 10 carbon atoms.

In formula (46), Z represents a tetravalent aromatic group having from 6 to 20 carbon atoms, preferably a pyromellitic group, a polycyclic aromatic group, a derivative of a polycyclic aromatic group or a group of the following formula (47):

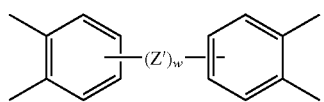

Formula (47)

In formula (47), Z' represents a covalent bond, —C($R^{477}$)$_2$—, —CO—, —O—, —S—, —SO$_2$—, —Si(C$_2$H$_5$)$_2$— or —N$R^{478}$—; and when the compound has two or more Z's, then they may be the same or different. w indicates an integer of from 1 to 10. $R^{477}$ each independently represents a hydrogen atom or —C($R^{479}$)$_3$. $R^{478}$ represents a hydrogen atom, an alkyl group having from 1 to 20 carbon atoms, or an aryl group having from 6 to 20 carbon atoms; and when the compound has two or more $R^{478}$'s, then they may be the same or different. $R^{479}$ each represent a hydrogen atom, a fluorine atom or a chlorine atom, and when the compound has two or more $R^{479}$'s, then they may be the same or different.

The polycyclic aromatic group is, for example, a 4-valent group derived from naphthalene, fluorene, benzofluorene or anthracene. The substituted derivative of the polycyclic aromatic group is, for example, the above-mentioned polycyclic aromatic group substituted with at least one substituent selected from a group consisting of an alkyl group having from 1 to 10 carbon atoms, a fluoroalkyl group having from 1 to 10 carbon atoms and a halogen atom (e.g., fluorine atom, chlorine atom).

Apart from the above, also usable herein are homopolymers having a repetitive unit of the following formula (48) or (49) as in JP-T-8-511812, and polyimides having a repetitive unit of the following formula (410). The polyimides of the formula (410) are a preferred embodiments of the homopolymers of the formula (48).

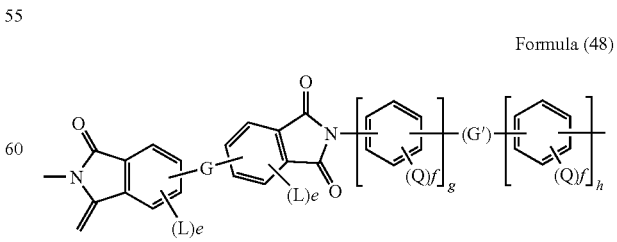

Formula (48)

Formula (49)

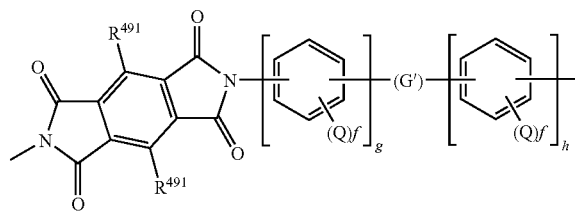

Formula (410)

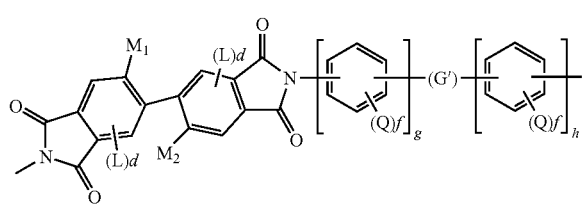

In formulae (48) to (410), G and G' each independently represents a group selected from a group consisting of a covalent bond, —$CH_2$—, —$C(CH_3)_2$—, —$C(CF_3)_2$—, —$C(CX_3)_2$— wherein X represents a halogen atom, —CO—, —O—, —S—, —$SO_2$—, —$Si(CH_2CH_3)_2$— and —$N(CH_3)$—.

In formulae (48) and (410), L represents a substituent. L is preferably a halogen atom, an alkyl group having from 1 to 3 carbon atoms, a halogenoalkyl group having from 1 to 3 carbon atoms, or a substituted or unsubstituted phenyl group; and when the compound has two or more L's, then they may be the same or different. The substituted phenyl group is preferably a phenyl group having a substituent, for example, selected from a group consisting of a halogen atom, an alkyl group having from 1 to 3 carbon atoms and a halogenoalkyl group having from 1 to 3 carbon atoms. The halogen atom is preferably, for example, a fluorine atom, a chlorine atom, a bromine atom or an iodine atom. d indicates an integer of from 0 to 2; and e indicates an integer of from 0 to 3.

In formulae (48) to (410), Q represents a hydrogen atom or a substituent. Q is, for example, an atom or a group selected from a group consisting of a halogen atom, a substituted or unsubstituted alkyl group, a nitro group, a cyano group, a thioalkyl group, an alkoxy group, a substituted or unsubstituted aryl group, and a substituted or unsubstituted alkyl ester group. When the compound has two or more Q's, then they may be the same or different. The halogen atom includes, for example, a fluorine atom, a chlorine atom, a bromine atom and an iodine atom. The substituted alkyl group is, for example, a halogenoalkyl group. The substituted aryl group is, for example, a halogenoaryl group. f indicates an integer of from 0 to 4; g indicates an integer of from 0 to 3; and h indicates an integer of from 1 to 3. Preferably, g and h are more than 1.

In formula (49), $R^{491}$ each represents a group selected from a group consisting of a hydrogen atom, a halogen atom, a substituted or unsubstituted phenyl group, and a substituted or unsubstituted alkyl group. Of those, $R^{491}$ is preferably a halogenoalkyl group.

In formula (410), $M^1$ and $M^2$ each independently represents a substituent, preferably a halogen atom, an alkyl group having from 1 to 3 carbon atoms, a halogenoalkyl group having from 1 to 3 carbon atoms, or a substituted or unsubstituted phenyl group. The halogen atom is, for example, preferably a fluorine atom, a chlorine atom, a bromine atom or an iodine atom. The substituted phenyl group is, for example, a phenyl group having a substituent selected from a group consisting of a halogen atom, an alkyl group having from 1 to 3 carbon atoms, and a halogenoalkyl group having from 1 to 3 carbon atoms.

Examples of the polyimide of the formula (48) are those of the following formula (411), in which n is preferably from 100 to 1000.

Formula (411)

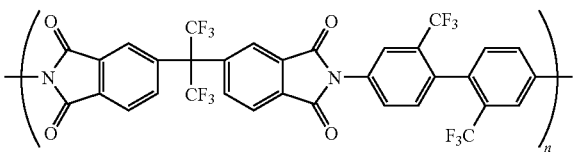

Further, as the polyimide, for example, also preferred are copolymers produced through copolymerization of an acid dianhydride and a diamine except those having the above-mentioned skeleton (repetitive unit).

The acid dianhydride is, for example, an aromatic tetracarboxylic acid dianhydride. The aromatic tetracarboxylic acid dianhydride includes, for example, pyromellitic dianhydride, benzophenone-tetracarboxylic acid dianhydride, naphthalene-tetracarboxylic acid dianhydride, heterocyclic aromatic tetracarboxylic acid dianhydride, 2,2'-substituted biphenyltetracarboxylic acid dianhydride.

The pyromellitic dianhydride includes, for example, pyromellitic dianhydride, 3,6-diphenylpyromellitic dianhydride, 3,6-bis(trifluoromethyl)pyromellitic dianhydride, 3,6-dibromopyromellitic dianhydride, 3,6-dichcloropyromellitic dianhydride. The benzophenonetetracarboxylic acid dianhydride includes, for example, 3,3',4,4'-benzophenonetetracarboxylic acid dianhydride, 2,3,3',4'-benzophenonetetracarboxylic acid dianhydride, 2,2',3,3'-benzophenonetetracarboxylic acid dianhydride. The naphthalenetetracarboxylic acid dianhydride includes, for example, 2,3,6,7-naphthalenetetracarboxylic acid dianhydride, 1,2,5,6-naphthalenetetracarboxylic acid dianhydride, 2,6-dichloronaphthalene-1,4,5,8-tetra-carboxylic acid dianhydride. The heterocyclic aromatic tetracarboxylic acid dianhydride includes, for example, thiophene-2,3,4,5-tetracarboxylic acid dianhydride, pyrazine-2,3,5,6-tetracarboxylic acid dianhydride, pyridine-2,3,5,6-tetracarboxylic acid dianhydride. The 2,2'-substituted biphenyltetracarboxylic acid dianhydride includes, for example, 2,2'-dibromo-4,4',5,5'-biphenyl-tetracarboxylic acid dianhydride, 2,2'-dichloro-4,4',5,5'-biphenyltetracarboxylic acid dianhydride, 2,2'-bis(trifluoromethyl)-4,4',5,5'-biphenyltetracarboxylic acid dianhydride.

Other examples of the aromatic tetracarboxylic acid dianhydride are 3,3',4,4'-biphenyltetracarboxylic acid dianhydride, bis(2,3-dicarboxyphenyl)methane dianhydride, bis(2,5,6-trifluoro-3,4-dicarboxyphenyl)methane dianhydride, 2,2-bis(3,4-dicarboxyphenyl)-1,1,1,3,3,3-hexafluoropropane dianhydride, 4,4'-bis(3,4-dicarboxyphenyl)-2,2-diphenyl-propane dianhydride, bis(3,4-dicarboxyphenyl) ether dianhydride, 4,4'-oxydiphthalic acid dianhydride, bis(3,4-dicarboxyphenyl)sulfonic acid dianhydride, 3,3',4,4'-diphenylsulfone-tetracarboxylic acid dianhydride, 4,4'-[4,4'-isopropylidene-di(p-phenyleneoxy)]bis(phthalic acid anhydride), N,N-(3,4-dicarboxyphenyl)-N-methylamine dianhydride, bis(3,4-dicarboxyphenyl)diethylsilane dianhydride.

Of those, the aromatic tetracarboxylic acid dianhydride is preferably 2,2'-substituted biphenyltetracarboxylic acid dianhydride, more preferably 2,2'-bis(trihalomethyl)-4,4',5,5'-biphenyltetracarboxylic acid dianhydride, even more preferably 2,2'-bis(trifluoromethyl)-4,4',5,5'-biphenyl-tetracarboxylic acid dianhydride.

The diamine is, for example, an aromatic diamine. Its examples are benzenediamine, diaminobenzophenone, naphthalenediamine, heterocyclic aromatic diamine and other aromatic diamines.

The benzenediamine includes, for example, diamines selected from a group of benzenediamines such as o-, m- and p-phenylenediamine, 2,4-diaminotoluene, 1,4-diamino-2-methoxybenzene, 1,4-diamino-2-phenylbenzene and 1,3-diamino-4-chlorobenzene.

Examples of the diaminobenzophenone are 2,2'-diaminobenzophenone and 3,3'-diaminobenzophenone.

Examples of the naphthalenediamine are 1,8-diaminonaphthalene and 1,5-diaminonaphthalene.

Examples of the heterocyclic aromatic diamine are 2,6-diaminopyridine, 2,4-diaminopyridine and 2,4-diamino-S-triazine.

Apart from the above, the aromatic diamine further includes
4,4'-diaminobiphenyl, 4,4'-diaminodiphenylmethane,
4,4'-(9-fluorenylidene)-dianiline,
2,2'-bis(trifluoromethyl)-4,4'-diaminobiphenyl,
3,3'-dichloro-4,4'-diaminodiphenylmethane,
2,2'-dichloro-4,4'-diaminobiphenyl,
2,2',5,5'-tetrachlorobenzidine,
2,2-bis(4-aminophenoxyphenyl)propane,
2,2-bis(4-aminophenyl)propane,
2,2-bis(4-aminophenyl)-1,1,1,3,3,3-hexafluoropropane,
4,4'-diaminodiphenyl ether, 3,4'-diaminodiphenyl ether,
1,3-bis(3-aminophenoxy)benzene,
1,3-bis(4-aminophenoxy)benzene,
1,4-bis(4-aminophenoxy)benzene,
4,4'-bis(4-aminophenoxy)biphenyl,
4,4'-bis(3-aminophenoxy)biphenyl,
2,2-bis[4-(4-aminophenoxy)phenyl]propane,
2,2-bis[4-(4-aminophenoxy)phenyl]-1,1,1,3,3,3-hexafluoropropane,
4,4'-diaminodiphenyl thioether, 4,4'-diaminodiphenyl sulfone.

The polyether ketone includes, for example, polyaryl ether ketones of the following formula (412), as in JP-A-2001-49110.

Formula (412)

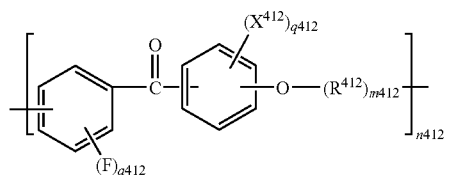

In formula (412), $X^{412}$ represents a substituent. $X^{412}$ is preferably a halogen atom, a lower alkyl group, a halogenoalkyl group, a lower alkoxy group, or a halogenoalkoxy group; and when the compound has plural $X^{412}$'s, then they may be the same or different.

The halogen atom includes, for example, a fluorine atom, a bromine atom, a chlorine atom and an iodine atom. Of those, preferred is a fluorine atom. The lower alkyl group is, for example, preferably a linear or branched lower alkyl group having from 1 to 6 carbon atoms, more preferably a linear or branched alkyl group having from 1 to 4 carbon atoms. Concretely, preferred are a methyl group, an ethyl group, a propyl group, an isopropyl group, a butyl group, an isobutyl group, a sec-butyl group, and a tert-butyl group; and more preferred are a methyl group and an ethyl group. The halogenoalkyl group is, for example, a halide of the above-mentioned lower alkyl group, such as a trifluoromethyl group. The lower alkoxy group is, for example, preferably a linear or branched alkoxy group having from 1 to 6 carbon atoms, more preferably a linear or branched alkoxy group having from 1 to 4 carbon atoms. Concretely, preferred are a methoxy group, an ethoxy group, a propoxy group, an isopropoxy group, a butoxy group, an isobutoxy group, a sec-butoxy group, and a tert-butoxy group; and more preferred are a methoxy group and an ethoxy group. The halogenoalkoxy group is, for example, a halide of the above-mentioned lower alkoxy group such as a trifluoromethoxy group.

In formula (412), q412 and a412 each independently indicates an integer of from 0 to 4. In formula (412), it is desirable that q412=0 and that the oxygen atom of the carbonyl group and the oxygen atom of the ether bond bonding to both ends of the benzene ring are in para-position to each other. In formula (412), $R^{412}$ is preferably a group of the following formula (413), and m412 indicates an integer of 0 or 1.

Formula (413)

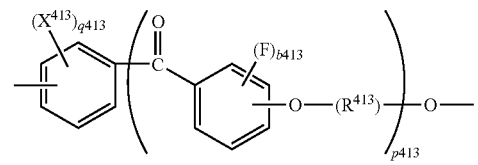

In formula (413), $X^{413}$ represents a substituent and is, for example, the same as $X^{412}$ in formula (412). When formula (413) has plural $X^{413}$'s, then they may be the same or different. q413 indicates an integer of from 0 to 4, and preferably q413=0. p413 is 0 or 1. b413 is a number of the substituted fluorine atom F, indicating an integer of from 0 to 4.

In formula (413), $R^{413}$ represents a divalent aromatic group. The divalent aromatic group is, for example, a o-, m- or p-phenylene group, or a divalent group derived from naphthalene, biphenyl, anthracene, o-, m- or p-terphenyl, phenanthrene, dibenzofuran, biphenyl ether or biphenyl sulfone. In the divalent aromatic group, the hydrogen directly bonding to the aromatic ring may be substituted with any of a halogen atom, a lower alkyl group or a lower alkoxy group. Of those as $R^{413}$, more preferred are aromatic groups selected from the following formulae (9) to (15):

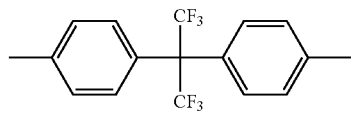

(9)

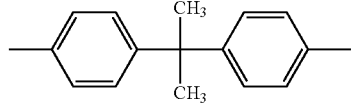

(10)

-continued

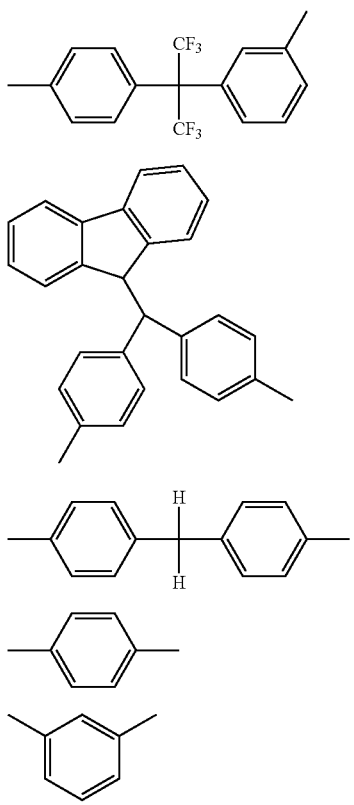

(11)

(12)

(13)

(14)

(15)

In formula (412), $R^{412}$ is more preferably a group of the following formula (21). In formula (21), $R^{413}$ and p413 are the same as those in formula (413), and their preferred ranges are also the same as therein.

Formula (21)

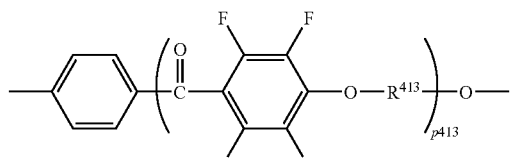

In formula (412), n412 indicates a degree of polymerization of the compound and is preferably from 2 to 5000, more preferably from 5 to 500. The polymerization may comprise repetitive units of the same structure, or may comprise repetitive units of different structures. In the latter case, the polymerization mode of the repetitive units may be block polymerization or random polymerization.

The terminal of the polyaryl ether ketone of the formula (412) is preferably a fluorine atom on the p-tetrafluorobenzoylene group side, and a hydrogen atom on the oxyalkylene group side. Polyaryl ether ketone of the type may be represented, for example, by the following formula (22). In the formula, n412 is a degree of polymerization like in formula (412). $X^{412}$, q412, $R^{412}$ and m412 have the same meanings as in formula (412) and their preferred ranges are also the same as therein.

Formula (22)

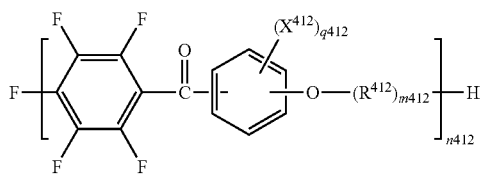

Examples of the polyaryl ether ketone of the formula (22) are those of the following formulae (23) to (26), in which n has a degree of polymerization like in formula (412).

Formula (23)

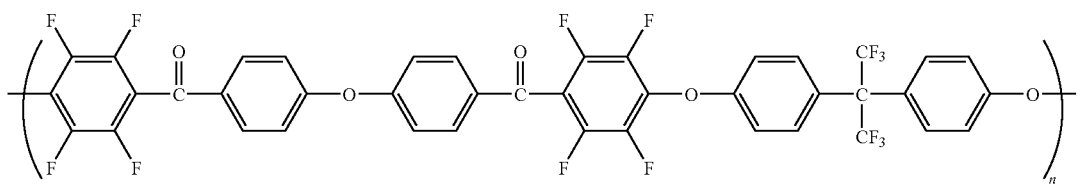

Formula (24)

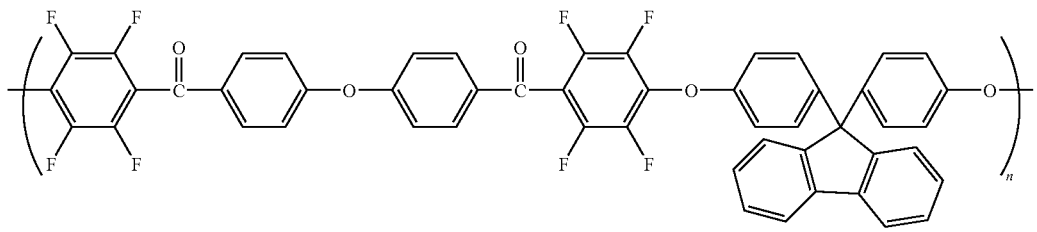

Formula (25)

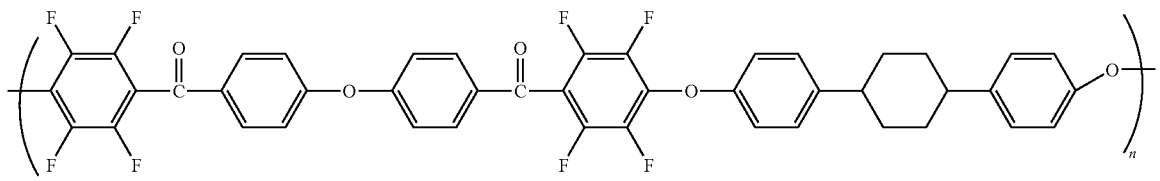

-continued

Formula (26)

Apart from the above, the above-mentioned polyamide and polyester further include those described in JP-T-10-508048, and their repetitive units are represented, for example, by the following formula (27):

Of the repetitive units of the polyamide or polyester of the formula (27), more preferred are those of the following formula (28):

Formula (27)

In formula (27), $Y^{27}$ represents —O— or —NH—. $E^{27}$ is, for example, at least one group selected from a group consisting of a covalent bond, an alkylene group having 2 carbon atoms, an halogenoalkylene group having 2 carbon atoms, $CH_2$, $C(CX^{27}{}_3)_2$ wherein $X^{27}$ represents a halogen or hydrogen atom, CO, O, S, $SO_2$, $Si(R^{27})_2$, and $N(R^{27})$, and they may be the same or different. In $E^{27}$, $R^{27}$ is at least one of an alkyl group having from 1 to 3 carbon atoms and a halogenoalkyl group having from 1 to 3 carbon atoms, and this is in meta- or para-position relative to the carbonyl functional group or $Y^{27}$.

In formula (27), $A^{27}$ and $A'^{27}$ each independently represents a substituent; y271 and t272 each independently indicates an integer of from 0 to 4; z271 and z272 each independently indicates an integer of from 0 to 4; p27 indicates an integer of from 0 to 3; q27 indicates an integer of from 1 to 3; and r27 indicates an integer of from 0 to 3.

$A^{27}$ is, for example, selected from a group consisting of a hydrogen atom, a halogen atom, an alkyl group having from 1 to 3 carbon atoms, a halogenoalkyl group having from 1 to 3 carbon atoms, an alkoxy group of $OR^{27}$ wherein $R^{27}$ is as defined above, an aryl group, a substituted aryl group (e.g., a halogenoaryl group), an alkoxycarbonyl group having from 1 to 9 carbon atoms, an alkylcarbonyloxy group having from 1 to 9 carbon atoms, an aryloxycarbonyl group having from 1 to 12 carbon atoms, an arylcarbonyloxy group having from 1 to 12 carbon atoms or its substituted derivative, an arylcarbamoyl group having from 1 to 12 carbon atoms, and an arylcarbonylamino group having from 1 to 12 carbon atoms or its substituted derivative; and when the compound has plural $A^{27}$'s, then they may be the same or different. $A'^{27}$ is, for example, selected from a group consisting of a halogen atom, an alkyl group having from 1 to 3 carbon atoms, a halogenoalkyl group having from 1 to 3 carbon atoms, a phenyl group, and a substituted phenyl group; and when the compound has plural $A'^{27}$'s, then they may be the same or different. The substituent on the phenyl ring of the substituted phenyl group is, for example, a halogen atom, an alkyl group having from 1 to 3 carbon atoms, a halogenoalkyl group having from 1 to 3 carbon atoms, and their combination.

Formula (28)

In formula (28), $A^{28}$, $A'^{28}$ and $Y^{28}$ have the same meanings as $A^{27}$, $A'^{27}$ and $Y^{27}$, respectively, in formula (27), and their preferred ranges are also the same as therein. v28 indicates an integer of from 0 to 3, preferably an integer of from 0 to 2. v28 and y28 each may be 0 or 1, but the two must not be 0 at the same time.

A retardation film containing a non-liquid crystalline polymer may be produced, for example, as follows: First, the above-mentioned predetermined polymer to form a retardation film is applied onto a substrate to thereby form a precursor layer thereon. The coating method is not specifically defined. For example, herein employable is a method of applying the above-mentioned polymer onto a substrate while heating and melting the polymer thereon; or a method of applying a polymer solution prepared by dissolving the polymer in a solvent, onto a substrate. Of those, preferred is the method of applying a polymer solution onto a substrate, in view of the good workability and the good optical anisotropy controllability in the method.

The thickness of the retardation film to be formed in the polymer-coating method may be controlled. For example, in the method of applying a polymer solution, the amount of the polymer to be applied to a unit area ($cm^2$) of the substrate may be controlled, whereby the thickness of the retardation film to be formed may be controlled.

The thickness of the non-liquid crystalline polymer-containing retardation film in the invention is preferably from 0.1 to 50 μm, more preferably from 1 to 20 μm.

Not specifically defined, the solvent for the polymer solution may be any one capable of dissolving the polymer. For example, it includes halogenohydrocarbons such as chloroform, dichloromethane, carbon tetrachloride, dichloroethane, tetrachloroethane, trichloroethylene, tetrachloroethylene, chlorobenzene, ortho-dichlorobenzene; phenols such as phenol, parachlorophenol; aromatic hydrocarbons such as benzene, toluene, xylene, methoxybenzene, 1,2-dimethoxybenzene; ketones such as acetone, methyl ethyl ketone, methyl isobutyl ketone, cyclohexanone, cyclopentanone, 2-pyrrolidone, N-methyl-2-pyrrolidone; esters such as ethyl acetate, butyl acetate; alcohols such as tert-butyl alcohol, glycerin, ethylene glycol, triethylene glycol, ethylene glycol monomethyl ether, diethylene glycol dimethyl ether, propylene glycol, dipropylene glycol, 2-methyl-2,4-pentanediol; amides such as dimethylformamide, dimethylacetamide; nitriles such as acetonitrile, butyronitrile; ethers such as diethyl ether, dibutyl ether, tetrahydrofuran; and carbon disulfide, ethyl cellosolve, butyl cellosolve. These solvents may be used either singly or as combined.

The viscosity of the polymer solution is preferably one with which the solution is easy to apply. The solution that is easy to apply enables the formation of a uniform retardation film, as so mentioned hereinabove. The viscosity is preferably from 0.1 to 12 Pa·s, more preferably from 1 to 10 Pa·s, even more preferably from 1 to 5 Pa·s. The polymer concentration in the polymer solution is not specifically defined. Taking the mass-average molecular weight of the non-liquid crystalline polymer used into consideration, the polymer concentration is preferably so controlled that the viscosity of the solution could fall within the above-mentioned range. Concretely, it is desirable that the polymer concentration is from 5 to 50 parts by mass relative to 100 parts by mass of the solvent, more preferably from 10 to 40 parts by mass.

If desired, the polymer solution may contain various additives added thereto, for example, stabilizer, plasticizer, metal, etc. In addition, the polymer solution may contain any other resin not too much detracting from the alignability of the polymer therein. The additional resin includes, for example, various all-purpose resins, engineering plastics, thermoplastic resins, thermosetting resins.

The all-purpose resins are, for example, polyethylene (PE), polypropylene (PP), polystyrene (PS), polymethyl methacrylate (PMMA), acrylonitrile-butadiene-styrene resin (ABS resin), and acrylonitrile-styrene resin (AS resin). The engineering plastics are, for example, polyacetate (POM), polycarbonate (PC), polyamide (PA: nylon), polyethylene terephthalate (PET) and polybutylene terephthalate (PBT). The thermoplastic resins are, for example, polyphenylene sulfide (PPS), polyether sulfone (PES), polyketone (PK), polyimide (PI), polycyclohexanedimethanol terephthalate (PCT), polyarylate (PAR), and liquid crystalline polymer (LCP). The thermosetting resins are, for example, epoxy resin, phenolnovolak resin.

In case where such other resin is incorporated into the polymer solution in that manner, then its amount may be preferably from 0 to 50% by mass, more preferably from 0 to 30% by mass of the polymer.

The coating treatment may be attained in any suitable method of, for example, a spin-coating method, a roll-coating method, a flow coating method, a printing method, a dipping method, a casting method, a bar-coating method or a gravure-printing method. In coating, optionally employable is a superimposing method of polymer layers.

In coating with the polymer, if desired, stress may be imparted to the substrate in one direction, or air may be applied thereto in one direction.

Next, the precursor layer is solidified to thereby form a retardation film on the substrate. For solidifying it, employable is a method of spontaneously drying (air-drying) the coating layer or heating it preferably at 25 to 180° C., more preferably at 80 to 170° C., even more preferably at 60 to 150° C. The drying or heating time may be determined depending on the drying or heating temperature, the presence or absence of solvent in the precursor layer, and the type of the solvent. Preferably, the time may be from 0.5 to 30 minutes, more preferably from 1 to 20 minutes, even more preferably from 1 to 15 minutes.

The method of producing the retardation film in the invention may additionally comprise a step of stretching the laminate of the substrate and the retardation film. The method of stretching the laminate is not specifically defined. Any known method of, for example, stretching it with fixing the edges of the film is employable. Preferred is tenter cross-stretching, or biaxial stretching in which the stretching draw ratio in the machine direction is smaller than stretching draw ratio in the cross direction. The biaxial stretching may be any of simultaneous biaxial stretching in a complete tenter system, or a successive biaxial stretching according to a roll tenter method. The stretching draw ratio varies depending on the stretching method employed. For example, the laminate is stretched by from 1 to 200%. The heating temperature in stretching may be suitably determined depending on Tg of the substrate used and the type of the additives used. Preferably, it is from 80 to 250° C., more preferably from 120 to 220° C., even more preferably from 140 to 200° C. Especially preferably, the heating temperature is around or above Tg of the substrate used.

Next, the retardation film thus directly formed on a substrate is preferably processed in the next step of adhering a low retardation polymer film to it and peeling away only the substrate. In that manner, the retardation film produced in the above is transferred to such a low retardation polymer film and the substrate is peeled away from it, therefore producing an optical laminate of the invention that comprises the retardation film and the low retardation polymer film.

Not specifically defined, the substrate may be formed of any suitable material. For example, the substrate includes a polymer film having a low glass transition point (Tg), a polymer film having a high modulus of elasticity, a substrate of which the linear expansion is equal to or higher than that of the film material, a substrate having a high thermal conductivity, a substrate having a high aspect ratio, and a thin substrate. The substrate may be made stretchable, for which, for example, employable is a method of drying the substrate without fixing it to thereby make the substrate stretchable in all directions; a method of drying the substrate with fixing it in at least one direction to thereby make the substrate stretchable in any other direction than that at least one direction; a method of utilizing linear expansion of a metal belt; a method of controlling the shrinkage by tenter fixation during film transportation; a method of previously expanding the substrate and then drying it to thereby increase the degree of shrinkage of the substrate; a method of stretching the substrate before the drying step for cure shrinkage of the substrate; and a method of stretching the substrate during or after the drying step. However, these methods are not limitative.

The thickness of the substrate may be suitably determined depending on the object of using it. In view of the strength of the substrate and the reduction in the thickness thereof, the thickness is preferably from 5 to 500 μm, more preferably from 10 to 200 μm, even more preferably from 15 to 150 μm.

(Retardation Film Containing Liquid Crystalline Compound)

The polymerizing liquid crystal layer preferably used as the retardation film of Constitution 1 is described in detail.

The polymerizing liquid crystal layer in the invention is preferably formed by aligning a liquid crystalline compound by the use of an alignment film and fixing the aligned state thereof. For fixing the aligned state of the liquid crystalline compound, the compound preferably has a polymerizing group.

(Rod-Shaped Liquid crystalline Compound)

A rod-shaped liquid crystalline compound may be used in the polymerizing liquid crystal layer in the invention, and this is described.

Preferred examples of the rod-shaped liquid crystalline compound are azomethines, azoxy compounds, cyanobiphenyls, cyanophenyl esters, benzoates, phenyl cyclohexanecarboxylates, cyanophenylcyclohexanes, cyano-substituted phenylpyrimidines, alkoxy-substituted phenylpyrimidines, phenyldioxanes, tolans and alkenylcyclohexylbenzonitriles. Not only low molecular liquid crystalline compounds but also high molecular liquid crystalline compounds are usable herein. Low molecular, polymerizing group-having rod-shaped liquid crystalline compounds that are especially preferably used in the invention are those of the following formula (I):

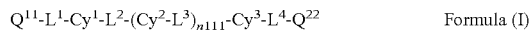

$$Q^{11}\text{-}L^1\text{-}Cy^1\text{-}L^2\text{-}(Cy^2\text{-}L^3)_{n111}\text{-}Cy^3\text{-}L^4\text{-}Q^{22}$$ Formula (I)

In formula (I), $Q^{11}$ and $Q^{22}$ each independently represents a polymerizing group; $L^1$ and $L^4$ each independently represents a divalent linking group; $L^2$ and $L^3$ each independently represents a single bond or a divalent linking group; $Cy^1$, $Cy^2$ and $Cy^3$ each independently represents a divalent cyclic group; n111 indicates 0, 1 or 2.

In $Q^{11}$ and $Q^{22}$, the polymerization of the polymerizing group is preferably addition polymerization (including ring-cleavage polymerization) or polycondensation. In other words, the polymerizing group is preferably a functional group reactable for addition polymerization or polycondensation. Examples of the polymerizing group are mentioned below.

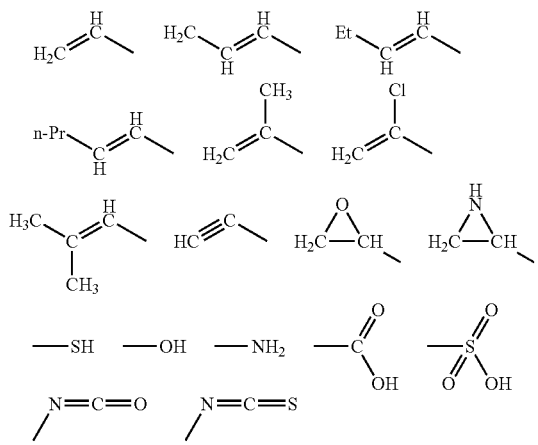

$L^1$ and $L^4$ each independently represents a divalent linking group. Preferably, $L^1$ and $L^4$ each is independently a divalent linking group selected from a group of —O—, —S—, —CO—, —NR$^{222}$—, a divalent acyclic group, a divalent cyclic group and their combination. R$^{222}$ represents an alkyl group having from 1 to 7 carbon atoms, or a hydrogen atom.

Examples of the divalent linking group of the combination are shown below. In these, the left side bonds to Q ($Q^{11}$ or $Q^{22}$) and the right side bonds to Cy ($Cy^1$ or $Cy^3$).

L-1: —CO—O-divalent acyclic group-O—
L-2: —CO—O-divalent acyclic group-O—CO—
L-3: —CO—O-divalent acyclic group-O—CO—O—
L-4: —CO—O-divalent acyclic group-O-divalent cyclic group-
L-5: —CO—O-divalent acyclic group-O-divalent cyclic group-CO—O—
L-6: —CO—O-divalent acyclic group-O-divalent cyclic group-O—CO—
L-7: —CO—O-divalent acyclic group-O-divalent cyclic group-divalent acyclic group-
L-8: —CO—O-divalent acyclic group-O-divalent cyclic group-divalent acyclic group-CO—O—
L-9: —CO—O-divalent acyclic group-O-divalent cyclic group-divalent acyclic group-O—CO—
L-10: —CO—O-divalent acyclic group-O—CO-divalent cyclic group-
L-11: —CO—O-divalent acyclic group-O—CO-divalent cyclic group-CO—O—
L-12: —CO—O-divalent acyclic group-O—CO-divalent cyclic group-O—CO—
L-13: —CO—O-divalent acyclic group-O—CO-divalent cyclic group-divalent acyclic group-
L-14: —CO—O-divalent acyclic group-O—CO-divalent cyclic group-divalent acyclic group-CO—O—
L-15: —CO—O-divalent acyclic group-O—CO-divalent cyclic group-divalent acyclic group-O—CO—
L-16: —CO—O-divalent acyclic group-O—CO—O-divalent cyclic group-
L-17: —CO—O-divalent acyclic group-O—CO—O-divalent cyclic group-CO—O—
L-18: —CO—O-divalent acyclic group-O—CO—O-divalent cyclic group-O—CO—
L-19: —CO—O-divalent acyclic group-O—CO—O-divalent cyclic group-divalent acyclic group-
L-20: —CO—O-divalent acyclic group-O—CO—O-divalent cyclic group-divalent acyclic group-CO—O—
L-21: —CO—O-divalent acyclic group-O—CO—O-divalent cyclic group-divalent acyclic group-O—CO—

The divalent acyclic group means an alkylene group, a substituted alkylene group, an alkenylene group, a substituted alkenylene group, an alkynylene group, a substituted alkynylene group. Preferred are an alkylene group, a substituted alkylene group, an alkenylene group, a substituted alkenylene group; and more preferred are an alkylene group and an alkenylene group.

The alkylene group may be branched. Preferably, the alkylene group has from 1 to 12 carbon atoms, more preferably from 2 to 10 carbon atoms, most preferably from 2 to 8 carbon atoms.

The alkylene moiety of the substituted alkylene group has the same meaning as that of the above-mentioned alkylene group. Examples of the substituent include a halogen atom.

The alkenylene group may be branched. Preferably, the alkenylene group has from 2 to 12 carbon atoms, more preferably from 2 to 10 carbon atoms, most preferably from 2 to 8 carbon atoms.

The alkenylene moiety of the substituted alkenylene group has the same meaning as that of the above-mentioned alkenylene group. Examples of the substituent include a halogen atom.

The alkynylene group may be branched. Preferably, the alkynylene group has from 2 to 12 carbon atoms, more preferably from 2 to 10 carbon atoms, most preferably from 2 to 8 carbon atoms.

The alkynylene moiety of the substituted alkynylene group has the same meaning as that of the above-mentioned alkynylene group. Examples of the substituent include a halogen atom.

Examples of the divalent acyclic group are an ethylene group, a trimethylene group, a propylene group, a butamethylene group, a 1-methyl-butamethylene group, a pentamethylene group, a hexamethylene group, an octamethylene group, a 2-butenylene group, a 2-butynylene group.

The definition and the examples of the divalent cyclic group are the same as the definition and the examples of $Cy^1$, $Cy^2$ and $Cy^3$ mentioned below.

$R^{222}$ is preferably an alkyl group having from 1 to 4 carbon atoms, or a hydrogen atom, more preferably a methyl group, an ethyl group or a hydrogen atom, most preferably a hydrogen atom.

$L^2$ and $L^3$ each independently represents a single bond or a divalent linking group. Preferably, $L^2$ and $L^3$ each is independently a divalent linking group selected from —O—, —S—, —CO—, —NR$^{222}$—, a divalent acyclic group, a divalent cyclic group or their combination, or a single bond. $R^{222}$ represents an alkyl group having from 1 to 7 carbon atoms, or a hydrogen atom, preferably an alkyl group having from 1 to 4 carbon atoms, or a hydrogen atom, more preferably a methyl group, an ethyl group or a hydrogen atom, most preferably a hydrogen atom. The definition of the divalent acyclic group and that of the divalent cyclic group are the same as those mentioned hereinabove for $L^1$ and $L^4$.

In formula (I), n111 is 0, 1 or 2. When n is 2, then two $L^3$'s may be the same or different, two $Cy^2$'s may be the same or different. n111 is preferably 1 or 2, more preferably 1.

In formula (I), $Cy^1$, $Cy^2$ and $Cy^3$ each independently represents a divalent cyclic group.

The ring in the cyclic group is preferably a 5-membered ring, a 6-membered ring or a 7-membered ring, more preferably a 5-membered ring or a 6-membered ring, most preferably a 6-membered ring.

The ring in the cyclic group may be a condensed ring. In this, however, a monocyclic ring is preferred to a condensed ring.

The ring in the cyclic ring may be any of an aromatic ring, an aliphatic ring and a heterocyclic ring. Examples of the aromatic ring include a benzene ring and a naphthalene ring. Examples of the aliphatic ring include a cyclohexane ring. Examples of the heterocyclic ring include a pyridine ring and a pyrimidine ring.

The cyclic group having a benzene ring is preferably a 1,4-phenylene group. The cyclic group having a naphthalene ring is preferably a naphthalene-1,5-diyl group or a naphthalene-2,6-diyl group. The cyclic group having a cyclohexane ring is preferably a 1,4-cyclohexylene group. The cyclic group having a pyridine ring is preferably a pyridine-2,5-diyl group. The cyclic group having a pyrimidine ring is preferably a pyrimidine-2,5-diyl group.

The cyclic group may have a substituent. Examples of the substituent include a halogen atom, a cyano group, a nitro group, an alkyl group having from 1 to 5 carbon toms, a halogenoalkyl group having from 1 to 5 carbon atoms, an alkoxy group having from 1 to 5 carbon atoms, an alkylthio group having from 1 to 5 carbon atoms, an acyloxy group having from 2 to 6 carbon atoms, an alkoxycarbonyl group having from 2 to 6 carbon atoms, a carbamoyl group, an alkyl-substituted carbamoyl group having from 2 to 6 carbon atoms, and an acylamino group having from 2 to 6 carbon atoms.

Examples of the polymerizing liquid crystalline compounds of the formula (I) are mentioned below, to which, however, the invention should not be limited.

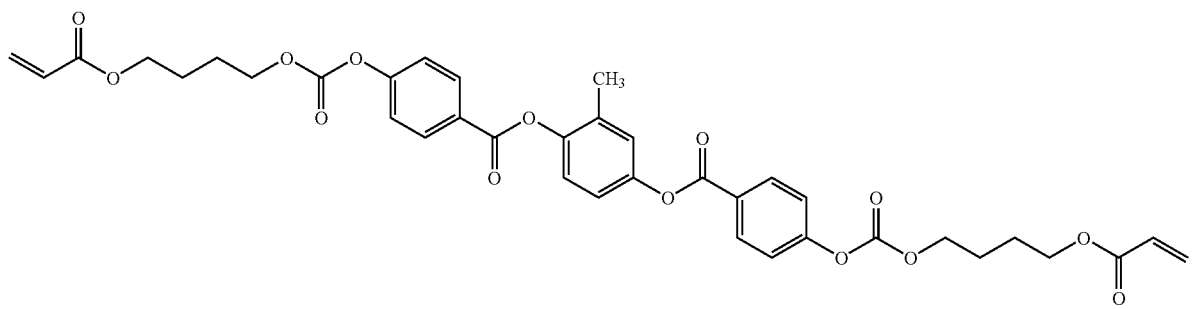

I-1)

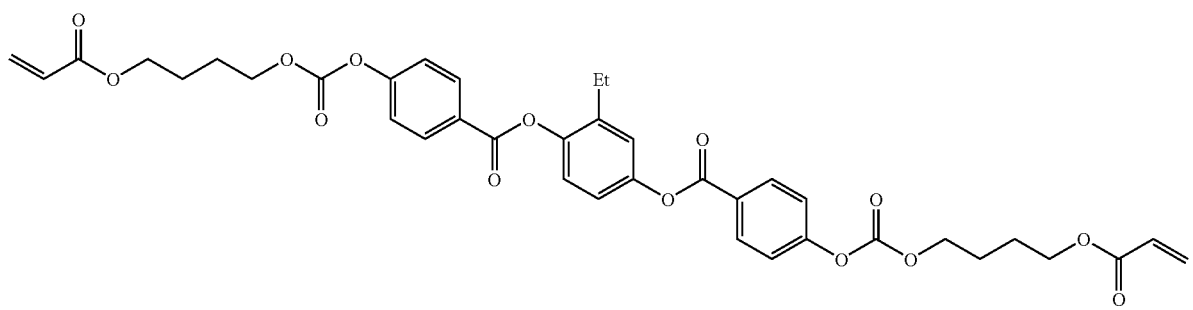

I-2)

-continued
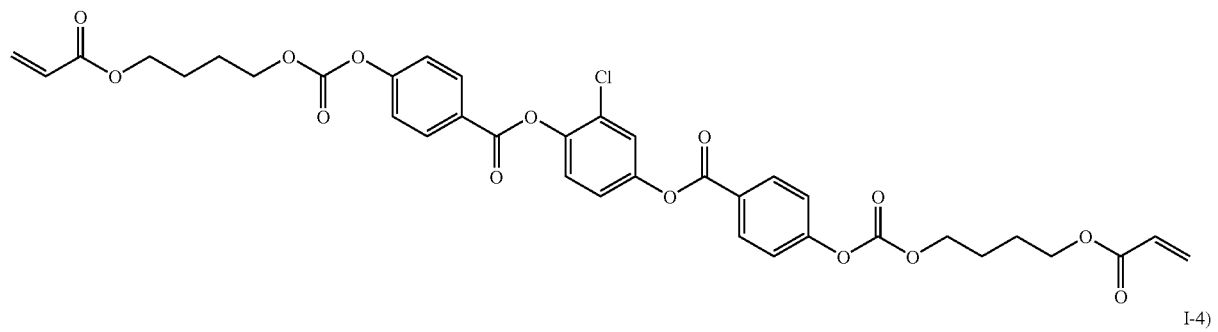
I-3)
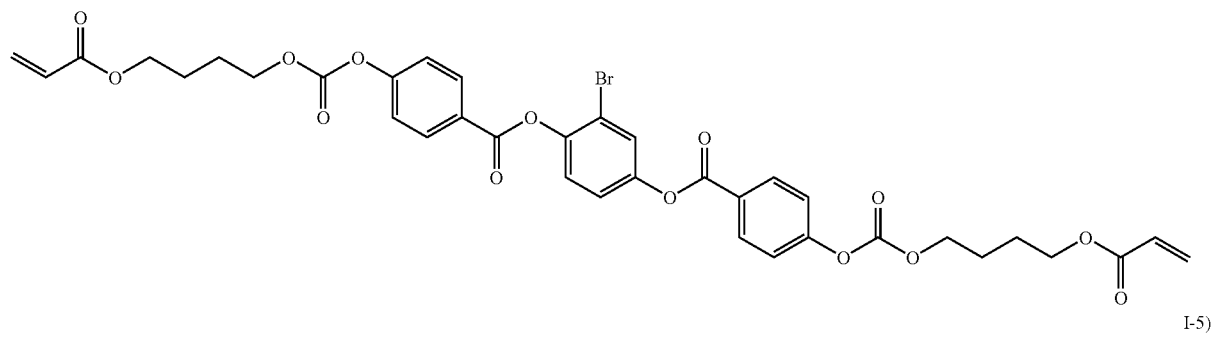
I-4)
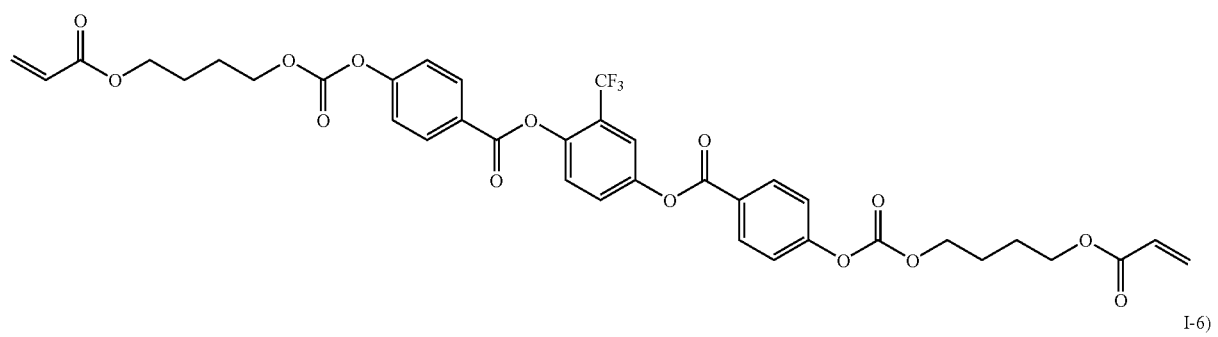
I-5)
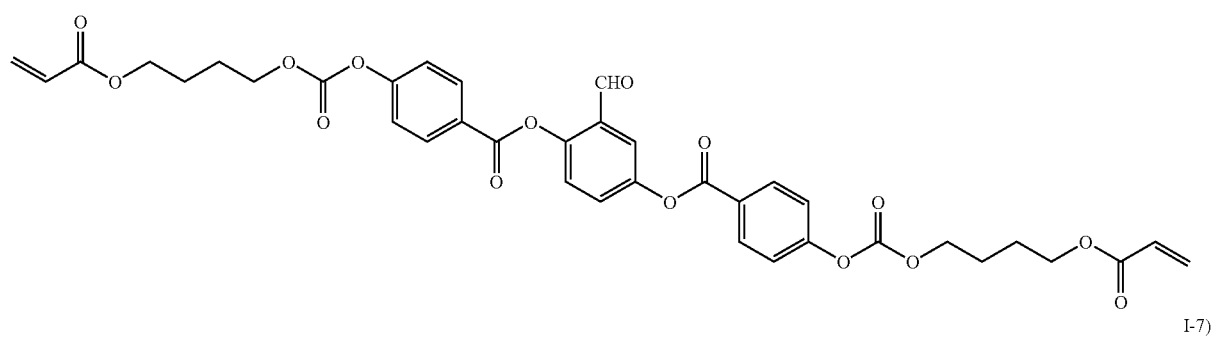
I-6)
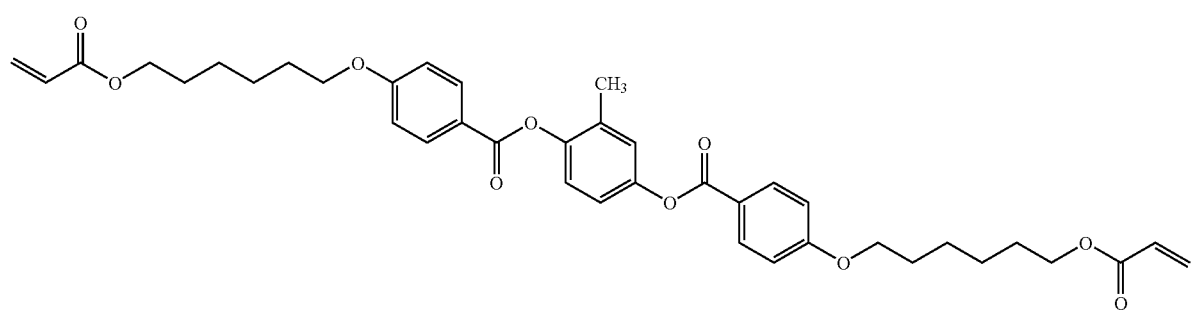
I-7)

-continued
I-8)
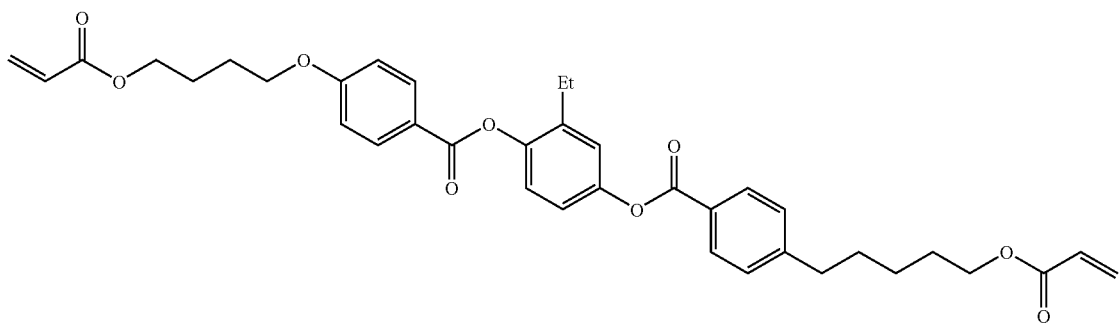
I-9)
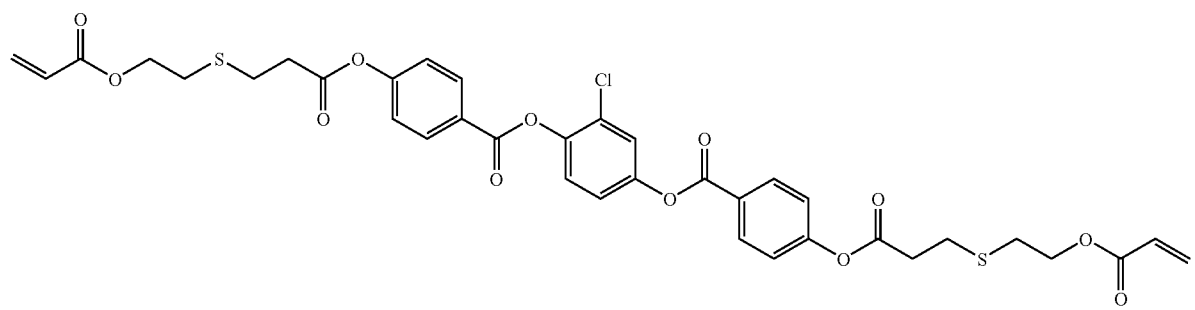
I-10)
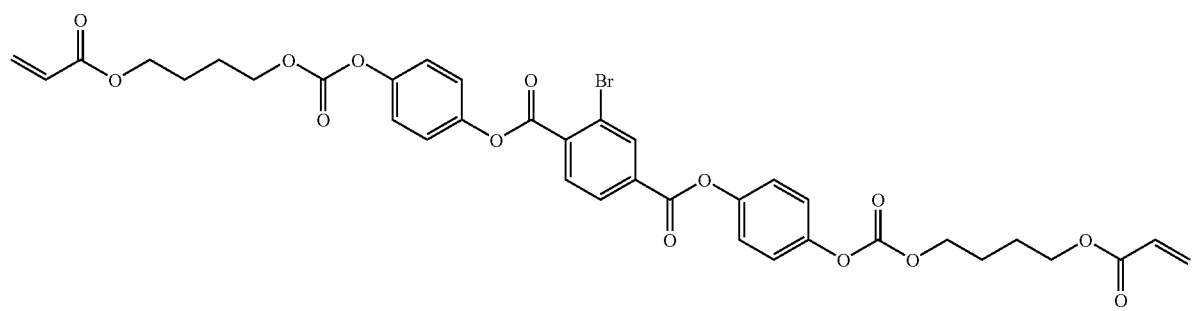
I-11)
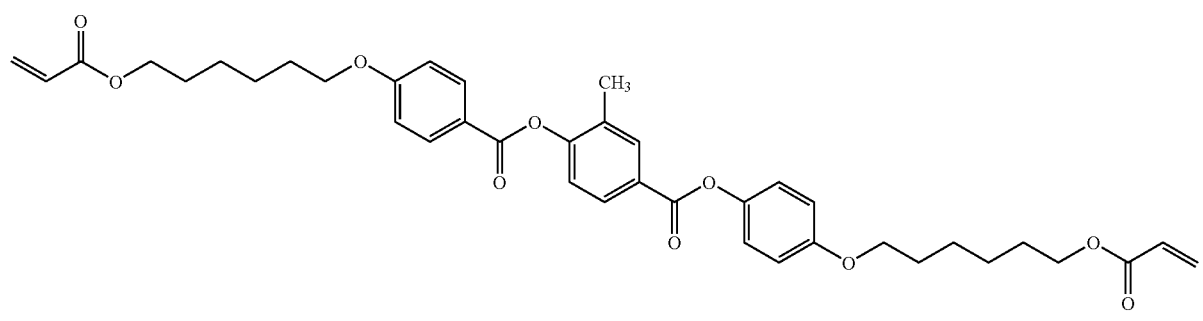
I-12)
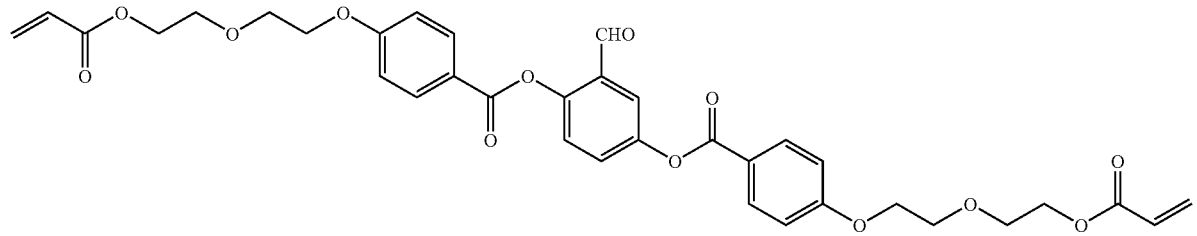

-continued
I-13)
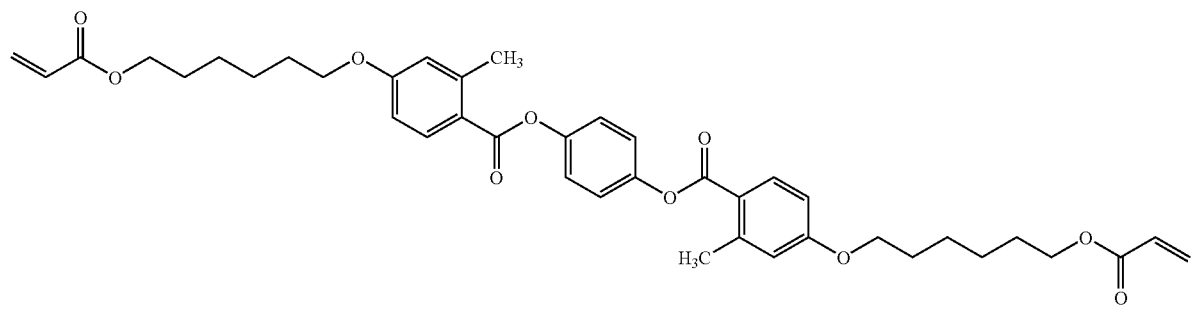
I-14)
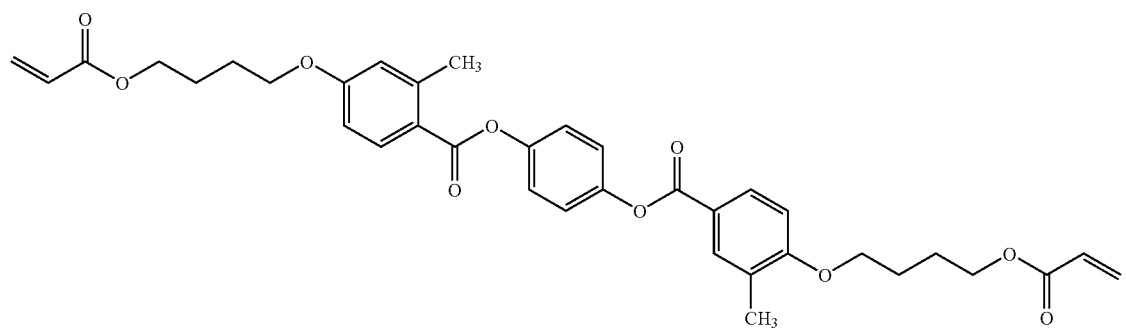
I-15)
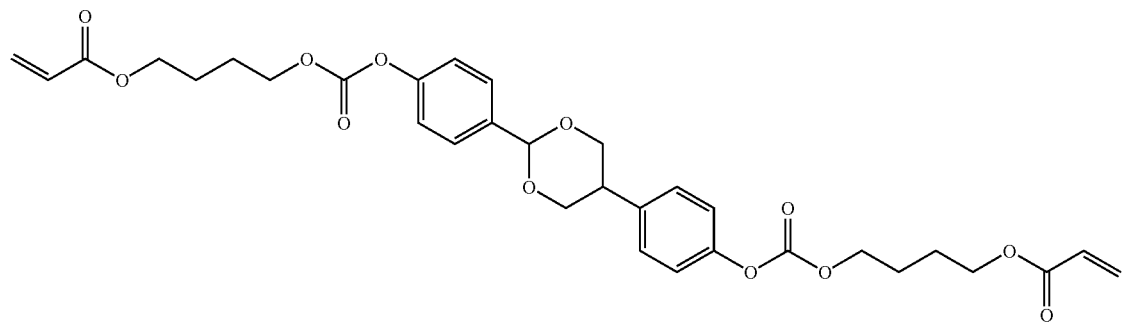
I-16)
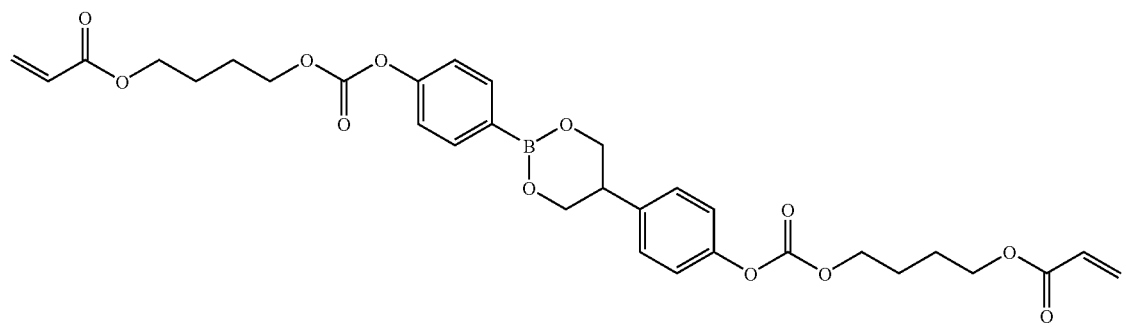

-continued
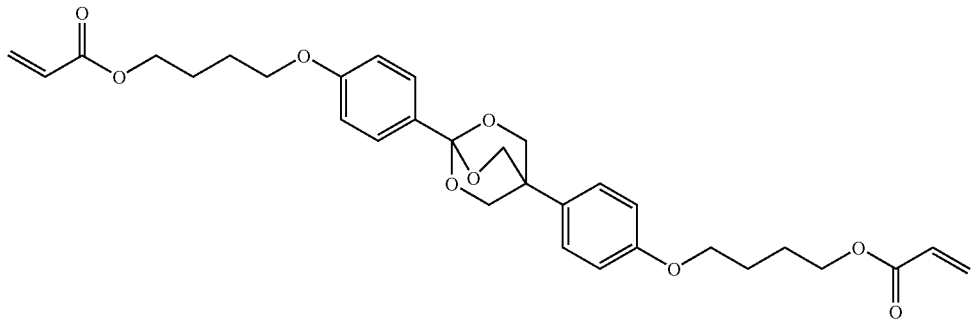
I-17)
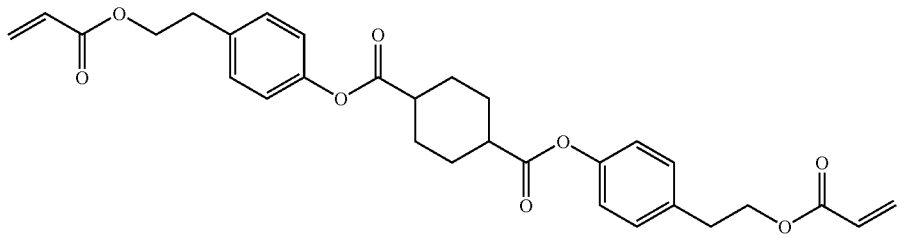
I-18)
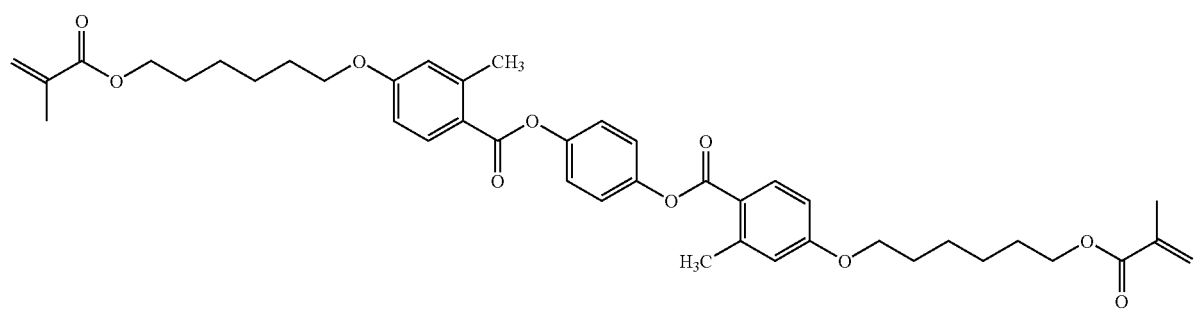
I-19)
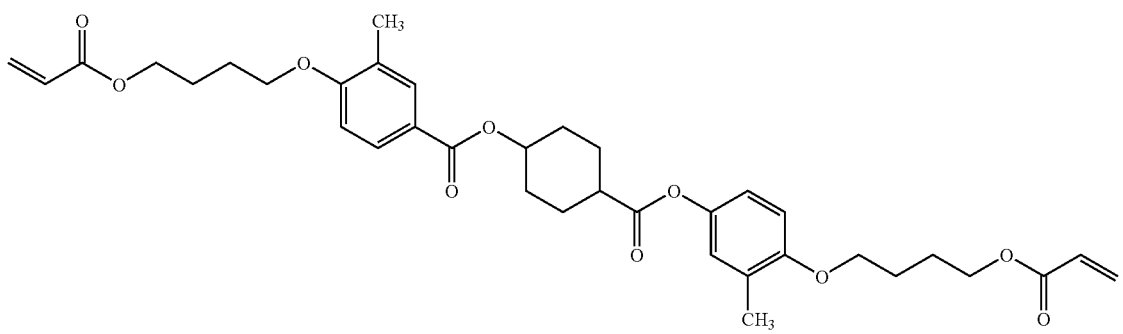
I-20)
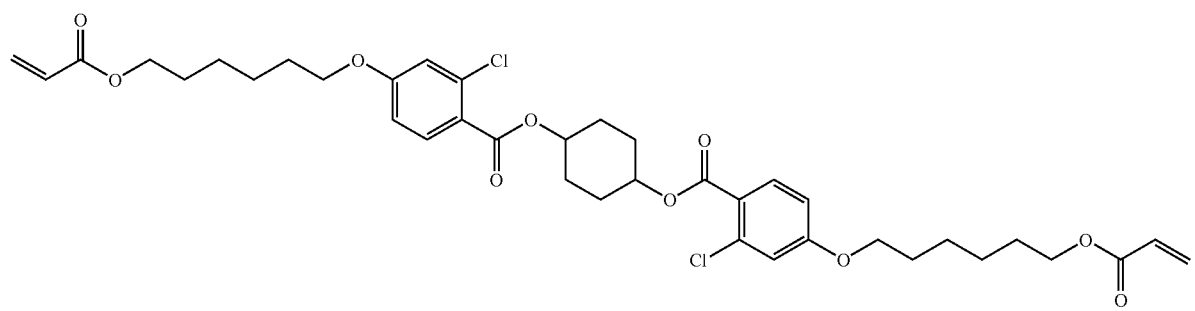
I-21)

-continued

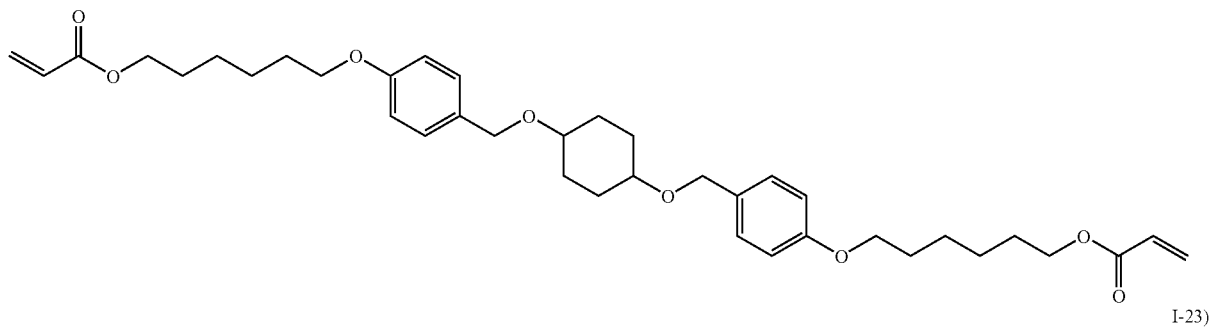

I-22)

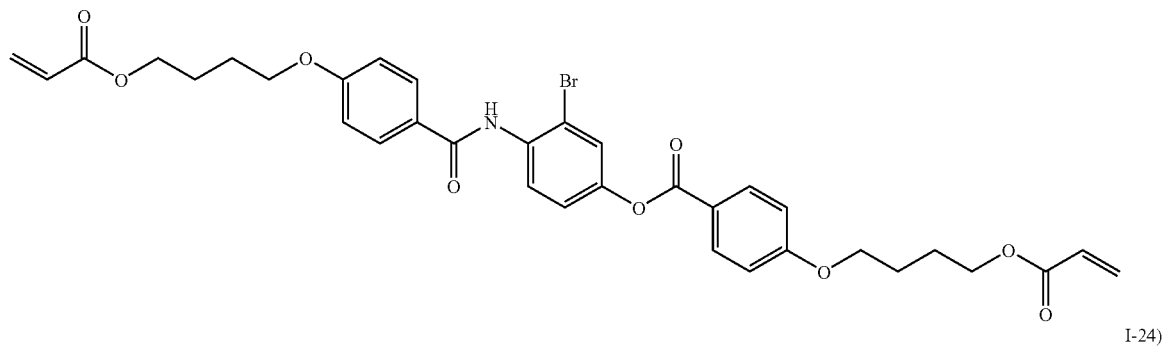

I-23)

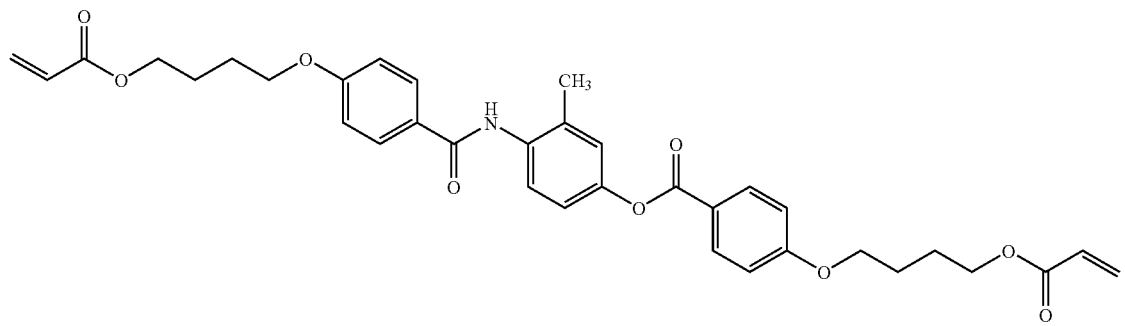

I-24)

The polymerizing liquid crystal layer may be formed by applying a coating liquid that contains a liquid crystalline compound and optionally a polymerization initiator, a mean tilt angle-controlling agent and optional additives (e.g., plasticizer, monomer, surfactant, alignment temperature-lowering agent, chiral agent), onto an alignment film.

(Polymerization Initiator)

The aligned liquid crystalline compound may be fixed while it keeps its aligned state. The fixation is preferably attained by polymerization. The polymerization includes thermal polymerization using a thermal polymerization initiator and an optical polymerization using an optical polymerization initiator. Optical polymerization is preferred.

Examples of the optical polymerization initiator include α-carbonyl compounds (as in U.S. Pat. No. 2,367,661, U.S. Pat. No. 2,367,670), acyloin ethers (as in U.S. Pat. No. 2,448,828), α-hydrocarbon-substituted aromatic acyloin compounds (as in U.S. Pat. No. 2,722,512), polycyclic quinone compounds (as in U.S. Pat. No. 3,046,127, U.S. Pat. No. 2,951,758), combination of triarylimidazole dimer and p-aminophenyl ketone (as in U.S. Pat. No. 3,549,367), acridine and phenazine compounds (as in JP-A-60-105667, U.S. Pat. No. 4,239,850), and oxadiazole compounds (as in U.S. Pat. No. 4,212,970).

The amount of the optical polymerization initiator to be used is preferably from 0.01 to 20% by mass of the solid content of the coating solution, more preferably from 0.5 to 5% by mass.

UV light is preferably used for light irradiation for polymerization of the liquid crystalline compound.

The irradiation energy is preferably from 20 mJ/cm$^2$ to 50 J/cm$^2$, more preferably from 20 to 5000 mJ/cm$^2$, even more preferably from 100 to 800 mJ/cm$^2$. For promoting the optical polymerization, the light irradiation may be effected under heat.

(Mean Tilt Angle-Controlling Agent)

In the retardation film in the invention, the mean tilt angle of the liquid crystalline compound may be controlled by a specific surface-active compound.

Compounds capable of lowering the mean tilt angle are lower fatty acid esters of cellulose, fluorine-containing surfactants, and 1,3,5-triazine ring-having compounds.

(Lower Fatty Acid Esters of Cellulose)

"Lower Fatty Acid" in the lower fatty acid esters of cellulose means a fatty acid having at most 6 carbon atoms. Preferably, the fatty acid has from 2 to 5 carbon atoms, more preferably from 2 to 4 carbon atoms. The fatty acid may have a substituent (e.g., hydroxyl group) bonding thereto. Two or more fatty acids may form an ester with cellulose. Examples of the lower fatty acid esters of cellulose include cellulose acetate, cellulose propionate, cellulose butyrate, cellulose hydroxypropionate, cellulose acetate propionate and cellulose acetate butyrate. Cellulose acetate butyrate is especially preferred. The degree of butyrylation of cellulose acetate butyrate is preferably at least 30%, more preferably from 30 to 80%. The degree of acetylation of cellulose acetate butyrate is preferably at most 30%, more preferably from 1 to 30%. The amount of the lower fatty acid ester of cellulose to be used is from 0.01 to 1% by mass of the liquid crystalline compound. The amount is more preferably from 0.1 to 1% by mass, even more preferably from 0.3 to 0.9% by mass of the liquid crystalline compound.

The 1,3,5-triazine ring-having compounds are preferably those of the following formula (III-I):

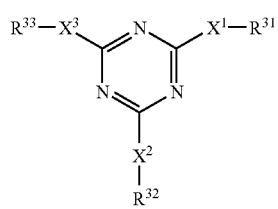

Formula (III-I)

In formula (III-I), $X^1$, $X^2$ and $X^3$ each independently represents a single bond, —$NR^{333}$— wherein $R^{333}$ represents an alkyl group having from 1 to 30 carbon atoms, or a hydrogen atom, —O— or —S—; $R^{31}$, $R^{32}$ and $R^{33}$ each independently represents an alkyl group, an alkenyl group, an aryl group or a heterocyclic group.

Compounds of the formula (III-I) are more preferably melamine compounds. The melamine compounds are those of the formula (III-I) where $X^1$, $X^2$ and $X^3$ are —$NR^{333}$—, or $X^1$, $X^2$ and $X^3$ are single bonds, and $R^{31}$, $R^{32}$ and $R^{33}$ each is independently a heterocyclic group having a free atomic valence at the nitrogen atom. The melamine compounds are further described with reference to formula (III-I). $R^{333}$ in —$NR^{333}$— is especially preferably a hydrogen atom. Particularly preferable $R^{31}$, $R^{32}$ and $R^{33}$ each is independently an aryl group.

The alkyl group is preferably an acyclic alkyl group rather than a cyclic alkyl group. It is preferably a linear alkyl group rather than a branched acyclic alkyl group. Preferably, the alkyl group has from 1 to 30 carbon atoms, more preferably from 2 to 30 carbon atoms, even more preferably from 4 to 30 carbon atoms, most preferably from 6 to 30 carbon atoms. The alkyl group may have a substituent. Examples of the substituent include a halogen atom, an alkoxy group (e.g., methoxy group, ethoxy group, epoxyethyloxy group) and an acyloxy group (e.g., acryloyloxy group, methacryloyloxy group). The alkenyl group is preferably an acyclic alkenyl group rather than a cyclic alkenyl group. It is preferably a linear alkenyl group rather than a branched acyclic alkenyl group. Preferably, the alkenyl group has from 2 to 30 carbon atoms, more preferably from 3 to 30 carbon atoms, even more preferably from 4 to 30 carbon atoms, most preferably from 6 to 30 carbon atoms. The alkenyl group may have a substituent. Examples of the substituent include a halogen atom, an alkoxy group (e.g., methoxy group, ethoxy group, epoxyethyloxy group) and an acyloxy group (e.g., acryloyloxy group, methacryloyloxy group).

The aryl group is preferably a phenyl group or a naphthyl group, more preferably a phenyl group. The aryl group may have a substituent. Examples of the substituent include a halogen atom, a hydroxyl group, a cyano group, a nitro group, a carboxyl group, an alkyl group, an alkenyl group, an aryl group, an alkoxy group, an alkenyloxy group, an aryloxy group, an acyloxy group, an alkoxycarbonyl group, an alkenyloxycarbonyl group, an aryloxycarbonyl group, a sulfamoyl group, an alkyl-substituted sulfamoyl group, an alkenyl-substituted sulfamoyl group, an aryl-substituted sulfamoyl group, a sulfonamido group, a carbamoyl group, an alkyl-substituted carbamoyl group, an alkenyl-substituted carbamoyl group, an aryl-substituted carbamoyl group, an amido group, an alkylthio group, an alkenylthio group, an arylthio group and an acyl group. The alkyl group has the same definition as that of the above-mentioned alkyl group. The alkyl moiety of the alkoxy group, the acyloxy group, the alkoxycarbonyl group, the alkyl-substituted sulfamoyl group, the sulfonamido group, the alkyl-substituted carbamoyl group, the amido group, the alkylthio group and the acyl group is also the same as that of the above-mentioned alkyl group. The alkenyl group has the same definition as that of the above-mentioned alkenyl group. The alkenyl moiety of the alkenyloxy group, the acyloxy group, the alkenyloxycarbonyl group, the alkenyl-substituted sulfamoyl group, the sulfonamido group, the alkenyl-substituted carbamoyl group, the amido group, the alkenylthio group and the acyl group is also the same as that of the above-mentioned alkenyl group. Examples of the aryl group include a phenyl group, an α-naphthyl group, a β-naphthyl group, a 4-methoxyphenyl group, a 3,4-diethoxyphenyl group, a 4-octyloxyphenyl group and a 4-dodecyloxyphenyl group. Examples of the aryl moiety of the aryloxy group, the acyloxy group, the aryloxycarbonyl group, the aryl-substituted sulfamoyl group, the sulfonamido group, the aryl-substituted carbamoyl group, the amido group, the arylthio group and the acyl group are the same as those of the above-mentioned aryl group.

In case where $X^1$, $X^2$ or $X^3$ is —$NR^{333}$—, —O— or —S—, the heterocyclic group is preferably aromatic. The aromatic heterocyclic ring is generally an unsaturated heterocyclic ring, preferably a heterocyclic ring having a largest number of double bonds. The hetero ring is preferably a 5-membered ring, a 6-membered ring or a 7-membered ring, more preferably a 5-membered ring or a 6-membered ring, most preferably a 6-membered ring. The hetero atom in the hetero ring is preferably N, S or O, more preferably N. The aromatic hetero ring is especially preferably a pyridine ring (its heterocyclic group is a 2-pyridyl group or a 4-pyridyl group). The heterocyclic group may have a substituent. Examples of the substituent of the heterocyclic group may be the same as those of the above-mentioned aryl moiety. In case where $X^1$, $X^2$ or $X^3$ is a single bond, the heterocyclic group is preferably one having a free atomic valence at the nitrogen atom thereof. The heterocyclic group having a free atomic valence at the nitrogen atom thereof is preferably a 5-membered ring, a 6-membered ring or a 7-membered ring, more preferably a 5-membered ring or a 6-membered ring, most preferably a 5-membered ring. The heterocyclic group may have plural nitrogen atoms. The heterocyclic group may have any other hetero atom (e.g., O, S) than a nitrogen atom. The heterocyclic group may have a substituent. Examples of the substituent of the heterocyclic group may be the same as those of the above-mentioned aryl moiety. Examples of the heterocyclic group having a free atomic valence at the nitrogen atom thereof are mentioned below.

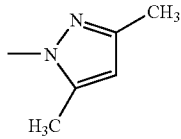
(Hc-1)

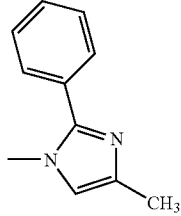
(Hc-2)

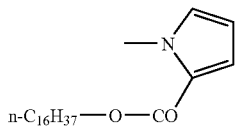
(Hc-3)

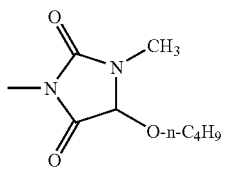
(Hc-4)

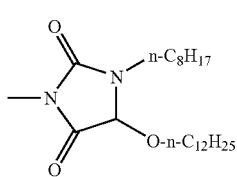
(Hc-5)

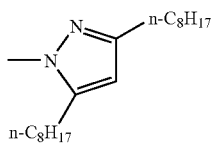
(Hc-6)

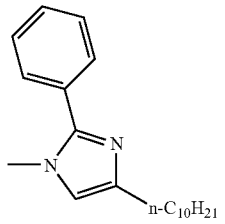
(Hc-7)

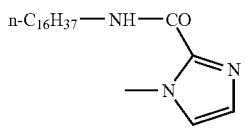
(Hc-8)

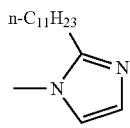
(Hc-9)

-continued

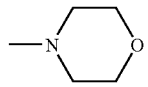
(Hc-10)

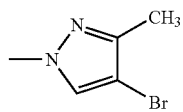
(Hc-11)

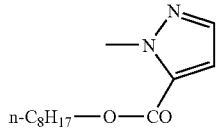
(Hc-12)

Preferably, at least one of $R^{31}$, $R^{32}$ and $R^{33}$ contains an alkylene or alkenylene moiety having from 9 to 30 carbon atoms. Preferably, the alkylene or alkenylene moiety having from 9 to 30 carbon atoms is linear. Preferably, the alkylene or alkenylene moiety is in the substituent of the aryl group. Preferably, at least one of $R^{31}$, $R^{32}$ and $R^{33}$ contains a polymerizing group as the substituent thereof. 1,3,5-triazine ring-having compounds for use herein preferably have at least two polymerizing groups each. Preferably, the polymerizing group is at the terminal of $R^{31}$, $R^{32}$ or $R^{33}$. When a polymerizing group is introduced into a 1,3,5-triazine ring-having compound, then the 1,3,5-triazine ring-having compound may be introduced into the retardation film while the compound is polymerized with a liquid crystalline compound, for example, a discotic liquid crystalline molecule. $R^{31}$, $R^{32}$ or $R^{33}$ having a polymerizing group as the substituent thereof is represented by the following formula (Rp):

$$-L^5-(-P)_{n333}$$ Formula (Rp)

In formula (Rp), $L^5$ represents an (n333+1)-valent linking group; P represents a polymerizing group; and n333 indicates an integer of from 1 to 5. In formula (Rp), the (n333+1)-valent linking group ($L^5$) is preferably a linking group of a combination of at lest two groups selected from an alkylene group, an alkenylene group, an (n333+1)-valent aromatic group, a divalent heterocyclic residue, —CO—, —$NR^{334}$— wherein $R^{334}$ represents an alkyl group having from 1 to 30 carbon atoms, or a hydrogen atom, —O—, —S— and —$SO_2$—. Preferably, the alkylene group has from 1 to 12 carbon atoms. Preferably, the alkenylene group has from 2 to 12 carbon atoms. Preferably, the aromatic group has from 6 to 10 carbon atoms. Examples of $L^5$ in formula (Rp) are mentioned below. In these, the left side bonds to $X^1$, $x^2$ or $X^3$ in formula (III-I) (but when $X^1$, $x^2$ or $X^3$ is a single bond, then it bonds directly to the 1,3,5-triazine ring); and the right side bonds to the polymerizing group (P) (in $L^{53}$ to $L^{59}$, this bonds to n's polymerizing groups). AL represents an alkylene group or an alkenylene group; Hc represents a divalent heterocyclic residue; AR represents an aromatic group. The alkylene group, the alkenylene group, the heterocyclic residue and the aromatic group may have a substituent (e.g., alkyl group, halogen atom).

$L^{51}$: -AL-O—CO—
$L^{52}$: -AL-O—
$L^{53}$: -AR(—O-AL-O—CO—)n
$L^{54}$: -AR(—O-AL-O—)n
$L^{55}$: -AR(—O—CO-AL-O—CO—)n
$L^{56}$: -AR(—CO—O-AL-O—CO—)n
$L^{57}$: -AR(—O—CO-AR—O-AL-O—CO—)n

L⁵⁸: -AR(—NR—SO₂-AL-O—CO—)n
L⁵⁹: -AR(—SO₂—NR-AL-O—CO—) n

Preferably, the polymerizing group (P) in formula (Rp) has any of the following structures:

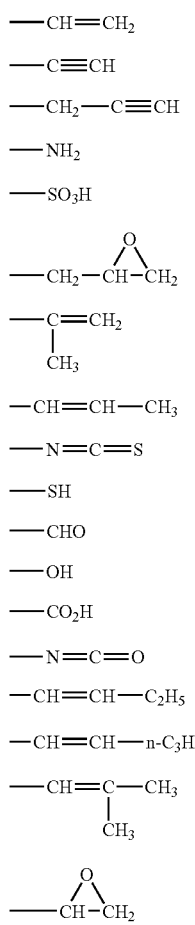

(P1) —CH=CH₂
(P2) —C≡CH
(P3) —CH₂—C≡CH
(P4) —NH₂
(P5) —SO₃H
(P6) —CH₂—CH(—O—)CH₂
(P7) —C(CH₃)=CH₂
(P8) —CH=CH—CH₃
(P9) —N=C=S
(P10) —SH
(P11) —CHO
(P12) —OH
(P13) —CO₂H
(P14) —N=C=O
(P15) —CH=CH—C₂H₅
(P16) —CH=CH—n-C₃H₇
(P17) —CH=C(CH₃)—CH₃
(P18) —CH(—O—)CH₂

The polymerizing group (P) is preferably an unsaturated polymerizing group (P1, P2, P3, P7, P8, P15, P16, P17) or an epoxy group (P6, P18), more preferably an unsaturated polymerizing group, most preferably an ethylenic unsaturated polymerizing group (P1, P7, P8, P15, P16, P17). In formula (Rp), n indicates an integer of from 4 to 12. Concretely, the number is determined depending on the type of the liquid crystalline compound to be combined.

Examples (except melamine compounds) of the 1,3,5-triazine ring-having compound are shown below.

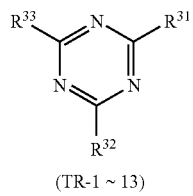

(TR-1 ~ 13)

TR-1: R³¹, R³², R³³: —(CH₂)₉—O—CO—CH=CH₂
TR-2: R³, R³², R³³: —(CH₂)₄—CH=CH—(CH₂)₄—O—CO—CH=CH₂
TR-3: R³¹, R³²: —(CH₂)₉—O—CO—CH=CH₂; R³³: —(CH₂)₁₂—CH₃
TR-4: R³¹, R³²: —(CH₂)₄—CH=CH—(CH₂)₄—O—CO—CH=CH₂; R³³: —(CH₂)₁₂—CH₃
TR-5: R³¹: —(CH₂)₉—O—CO—CH=CH₂; R³², R³³: —(CH₂)₁₂—CH₃
TR-6: R³¹: —(CH₂)₄—CH=CH—(CH₂)₄—O—CO—CH=CH₂; R³², R³³: —(CH₂)₁₂—CH₃
TR-7: R³¹, R³²: —(CH₂)₄—O—CO—CH=CH₂; R³³: —(CH₂)₁₂—CH₃
TR-8: R³¹: —(CH₂)₄—O—CO—CH=CH₂; R³², R³³: —(CH₂)₁₂—CH₃
TR-9: R³¹, R³², R³³: —(CH₂)₉—O-EpEt
TR-10: R³¹, R³², R³³: —(CH₂)₄—CH=CH—(CH₂)₄—O-EpEt
TR-11: R³¹, R³²: —(CH₂)₉—O-EpEt; R³³: —(CH₂)₁₂—CH₃
TR-12: R³¹, R³², R³³: —(CH₂)₉—O—CH=CH₂
TR-13: R³¹, R³²: —(CH₂)₉—O—CH=CH₂; R³³:—(CH₂)₁₂—CH₃

EpEt represents an epoxyethyl group (the same shall apply hereinunder).

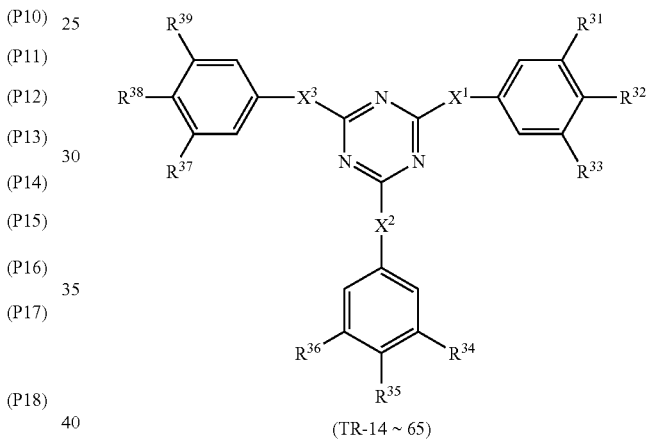

(TR-14 ~ 65)

TR-14: X¹, X², X³: —O—; R³², R³⁵, R³⁸: —O—(CH₂)₉—O—CO—CH=CH₂
TR-15: X¹, X², X³: —O—; R³¹, R³², R³⁴, R³⁵, R³⁷38 : —O—3(CH₂)₉—O—CH=CH₂
TR-16: X¹, X², X³: —O—; R³², R³⁵, R³⁸: —O—(CH₂)₄—CH=CH—(CH₂)₄—O—CO—CH=CH₂
TR-17: X¹, X², X³: —O—; R³¹, R³², R³⁴, R³⁵, R³⁷, R³⁸: —O—(CH₂)₄—CH=CH—(CH₂)₄—O—CO—CH=CH₂
TR-18: X¹, X², X³: —O—; R³¹, R³³, R³⁴, R³⁶, R³⁷, R³⁹: —O—(CH₂)₉—O—CO—CH=CH₂
TR-19: X¹, X², X³: —O—; R³¹, R³², R³³, R³⁴, R³⁵, R³⁶, R³⁷, R³⁸, R³⁹: —O—(CH₂)₉—O—CO—CH=CH₂
TR-20: X¹, X²: —O—; X³: —NH—; R³², R³⁵, R³⁸: —O—(CH₂)₉—O—CO—CH=CH₂
TR-21: X¹, X²: —O—; X³:—NH—; R³², R³⁵: —O—(CH₂)₄—O—CO—CH=CH₂; R³⁸:—O—(CH₂)₁₂—CH₃
TR-22: X¹, X²: —O—; X³:—NH—; R³², R³⁵: —O—(CH₂)₄—O—CO—CH=CH₂; R³⁷, R³⁸: —O—(CH₂)₁₂—CH₃
TR-23: X¹, X²: —O—; X³:—NH—; R³², R³⁵: —O—(CH₂)₄—O—CO—CH=CH₂; R³⁸: —O—CO—(CH₂)₁₁—CH₃
TR-24: X¹: —O—; X², X³: —NH—; R³¹, R³³: —O—(CH₂)₁₂—CH₃; R³⁵, R³⁸: —O—(CH₂)₉—O—CO—CH=CH₂

TR-25: $X^1$: —O—; $X^2$, $X^3$: —NH—; $R^{31}$, $R^{32}$: —O—$(CH_2)_6$—O—CO—CH=$CH_2$; $R^{35}$, $R^{38}$: —O—$(CH_2)_{11}$—$CH_3$

TR-26: $X^1$, —O—; $X^2$, $X^3$: —NH—; $R^{31}$, $R^{32}$, $R^{33}$: —O—$(CH_2)_6$—O—CO—CH=$CH_2$; $R^{35}$, $R^{38}$: —O—$(CH_2)_{11}$—$CH_3$

TR-27: $X^1$, $X^2$: —NH—; $X^3$: —S—; $R^{32}$, $R^{35}$: —O—$(CH_2)_9$—O—CO—CH=$CH_2$; $R^{38}$: —O—CO—$(CH_2)_{11}$—$CH_3$

TR-28: $X^1$, $X^2$: —NH—; $X^3$: —S—; $R^{31}$, $R^{32}$, $R^{34}$, $R^{35}$: —O—$(CH_2)_9$—O—CO—CH=$CH_2$; $R^{38}$: —O—CO—$(CH_2)_{11}$—$CH_3$

TR-29: $X^1$, $X^2$: —NH—; $X^3$: —S—; $R^{32}$, $R^{35}$: —O—$(CH_2)_4$—CH=CH—$(CH_2)_4$—O—CO—CH=$CH_2$; $R^{38}$: —O—CO—$(CH_2)_{11}$—$CH_3$

TR-30: $X^1$, $X^2$: —NH—; $X^3$: —S—; $R^{31}$, $R^{32}$, $R^{34}$, $R^{35}$: —O—$(CH_2)_4$—CH=CH—$(CH_2)_4$—O—CO—CH=$CH_2$; $R^{38}$: —O—CO—$(CH_2)_{11}$—$CH_3$

TR-31: $X^1$, $X^2$: —NH—; $X^3$: —S—; $R^{31}$, $R^{33}$, $R^{34}$, $R^{36}$: —O—$(CH_2)_9$—O—CO—CH=$CH_2$; $R^{38}$: —O—CO—$(CH_2)_{11}$—$CH_3$

TR-32: $X^1$, $X^2$: —NH—; $X^3$: —S—; $R^{31}$, $R^{32}$, $R^{33}$, $R^{34}$, $R^{35}$, $R^{36}$: —O—$(CH_2)_9$—O—CO—CH=$CH_2$; $R^{38}$: —O—CO—$(CH_2)_{11}$—$CH_3$

TR-33: $X^1$, $X^2$: —O—; $X^3$: —S—; $R^{32}$, $R^{35}$, $R^{38}$: —O—$(CH_2)_9$—O—CO—CH=$CH_2$

TR-34: $X^1$, $X^2$: —O—; $X^3$: —S—; $R^{32}$, $R^{35}$: —O—$(CH2)_4$—O—CO—CH=$CH_2$; $R^{38}$: —O—$(CH_2)_{12}$—$CH_3$

TR-35: $X^1$, $X^2$: —O—; $X^3$: —S—; $R^{32}$, $R^{35}$: —O—$(CH_2)_4$—O—CO—CH=$CH_2$; $R^{37}$, $R^{38}$: —O—$(CH_2)_{12}$—$CH_3$

TR-36: $X^1$, $X^2$: —O—; $X^3$: —S—; $R^{32}$, $R^{35}$: —O—$(CH_2)_4$—O—CO—CH=$CH_2$; $R^{38}$: —O—CO—$(CH_2)_{11}$—$CH_3$

TR-37: $X^1$: —O—; $X^2$, $X^3$: —S—; $R^{31}$, $R^{33}$: —O—$(CH_2)_{12}$—$CH_3$; $R^{35}$, $R^{38}$: —O—$(CH_2)_9$—O—CO—CH=$CH_2$

TR-38: $X^1$: —O—; $X^2$, $X^3$: —S—; $R^{31}$, $R^{32}$: —O—$(CH_2)_6$—O—CO—CH=$CH_2$; $R^{35}$, $R^{38}$: —O—$(CH_2)_{11}$—$CH_3$

TR-39: $X^1$: —O—; $X^2$, $X^3$: —S—; $R^{31}$, $R^{32}$, $R^{33}$: —O—$(CH_2)_6$—O—CO—CH=$CH_2$; $R^{35}$, $R^{38}$: —O—$(CH_2)_{11}$—$CH_3$

TR-40: $X^1$, $X^2$, $X^3$, —S—; $R^{32}$, $R^{35}$, $R^{38}$: —O—$(CH_2)_9$—O—CO—CH=$CH_2$

TR-41: $X^1$, $X^2$, $X^3$: —S—; $R^{31}$, $R^{32}$, $R^{34}$, $R^{35}$, $R^{37}$, $R^{38}$: —O—$(CH_2)_9$—O—CO—CH=$CH_2$

TR-42: $X^1$, $X^2$, $X^3$: —S—; $R^{32}$, $R^{35}$, $R^{38}$: —O—$(CH_2)_4$—CH=CH—$(CH_2)_4$—O—CO—CH=$CH_2$

TR-43: $X^1$, $X^2$, $X^3$: —S—; $R^{31}$, $R^{32}$, $R^{34}$, $R^{35}$, $R^{37}$, $R^{38}$: —O—$(CH_2)_4$—CH=CH—$(CH_2)_4$—O—CO—CH

TR-44: $X^1$, $X^2$, $X^3$: —S—; $R^{31}$, $R^{33}$, $R^{34}$, $R^{36}$, $R^{37}$, $R^{39}$: —O—$(CH_2)_9$—O—CO—CH=$CH_2$

TR-45: $X^1$, $X^2$, $X^3$: —S—; $R^{31}$, $R^{32}$, $R^{33}$, $R^{34}$, $R^{35}$, $R^{36}$, $R^{37}$, $R^{38}$, $R^{39}$: —O—$(CH_2)_9$—O—CO—CH=$CH_2$

TR-46: $X^1$, $X^2$: —S—; $X^3$: —NH—; $R^{32}$, $R^{35}$, $R^{38}$: —O—$(CH_2)_9$—O—CO—CH=$CH_2$

TR-47: $X^1$, $X^2$: —S—; $X^3$: —NH—; $R^{32}$, $R^{35}$: —O—$(CH_2)_4$—O—CO—CH=$CH_2$; $R^{38}$: —O—$(CH_2)_{12}$—$CH_3$

TR-48: $X^1$, $X^2$: —S—; $X^3$: —NH—; $R^{32}$, $R^{35}$: —O—$(CH_2)_4$—O—CO—CH=$CH_2$; $R^{37}$, $R^{38}$: —O—$(CH_2)_{12}$—$CH_3$

TR-49: $X^1$, $X^2$: —S—; $X^3$: —NH—; $R^3$, $R^{35}$: —O—$(CH_2)_4$—O—CO—CH=$CH_2$; $R^{38}$: —O—CO—$(CH_2)_{11}$—$CH_3$

TR-50: $X^1$: —O—; $X^2$: —NH—; $X^3$: —S—; $R^{31}$, $R^{35}$: —O—$(CH_2)_{12}$—$CH_3$; $R^{35}$: —O—$(CH_2)_9$—O—CO—CH=$CH_2$; $R^{38}$: —O—$(CH_2)_{12}$—$CH_3$

TR-51: $X^1$: —O—; $X^2$: —NH—; $X^3$: —S—; $R^{31}$, $R^{32}$: —O—$(CH_2)_6$—O—CO—CH=$CH_2$; $R^{35}$:—O—$(CH_2)_{11}$—$CH_3$; $R^{38}$: —O—$(CH_2)_{12}$—$CH_3$

TR-52: $X^1$: —O—; $X^2$: —NH—; $X^3$: —S—; $R^{31}$, $R^{32}$, $R^{33}$: —O—$(CH_2)_6$—O—CO—CH=$CH_2$; $R^{35}$: —O—$(CH_2)_{11}$—$CH_3$ $R^{38}$: —O—$(CH_2)_{12}$—$CH_3$

TR-53: $X^1$, $X^2$, $X^3$: —O—; $R^{32}$, $R^{35}$, $R^{38}$: —O—$(CH_2)_9$—O-EpEt

TR-54: $X^1$, $X^2$, $X^3$: —O—; $R^{31}$, $R^{32}$, $R^{34}$, $R^{35}$, $R^{37}$, $R^{38}$: —O—$(CH_2)_9$—O-EpEt

TR-55: $X^1$, $X^2$, $X^3$: —O—; $R^{32}$, $R^{35}$, $R^{38}$: —O—$(CH_2)_4$—CH=CH—$(CH_2)_4$—O-EpEt

TR-56: $X^1$, $X^2$, $X^3$: —O—; $R^{31}$, $R^{32}$, $R^{34}$, $R^{35}$, $R^{37}$, $R^{38}$: —O—$(CH_2)_4$—CH=CH—$(CH_2)_4$—O-EpEt

TR-57: $X^1$, $X^2$, $X^3$: —O—; $R^{31}$, $R^{33}$, $R^{34}$, $R^{36}$, $R^{37}$, $R^{39}$: —O—$(CH_2)_9$—O-EpEt

TR-58: $X^1$, $X^2$, $X^3$: —O—; $R^{32}$, $R^{35}$, $R^{38}$: —O—$(CH_2)_9$—O—CH=$CH_2$

TR-59: $X^1$, $X^2$: —O—; $X^3$: —NH—; $R^{32}$, $R^{35}$, $R^{38}$: —O—$(CH_2)_9$—O-EpEt

TR-60: $X^1$, $X^2$:—O—; $X^3$: —NH—; $R^{32}$, $R^{35}$: —O—$(CH_2)_4$—O-EpEt; $R^{38}$: —O—$(CH_2)_{12}$—$CH_3$

TR-61: $X^1$, $X^2$:—O—; $X^3$: —NH—; $R^{32}$, $R^{35}$: —O—$(CH_2)_4$—O-EpEt; $R^{37}$, $R^{38}$: —O—$(CH_2)_{12}$—$CH_3$

TR-62: $X^1$, $X^2$:—O—; $X^3$: —NH—; $R^3$, $R^{35}$: —O—$(CH_2)_4$—O-EpEt; $R^{38}$: —O—CO—$(CH_2)_{11}$—$CH_3$

TR-63: $X^1$, —O—; $X^2$, $X^3$: —NH—; $R^{31}$, $R^{33}$: —O—$(CH_2)_{12}$—$CH_3$; $R^{35}$, $R^{38}$: —O—$(CH_2)_9$—O-EpEt

TR-64: $X^1$, —O—; $X^2$, $X^3$: —NH—; $R^{31}$, $R^{32}$: —O—$(CH_2)_6$—O-EpEt; $R^{35}$, $R^{38}$: —O—$(CH_2)_{11}$—$CH_3$

TR-65: $X^1$, $X^2$: —O—; $X^3$: —NH—; $R^{32}$, $R^{35}$, $R^{38}$: —O—$(CH_2)_9$—O—CH=$CH_2$

The 1,3,5-triazine ring-having compounds are preferably melamine compounds of the following formula (IV-I):

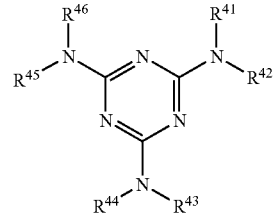

Formula (IV-I)

In formula (IV-1), $R^{41}$, $R^{43}$ and $R^{45}$ each independently represents an alkyl group having from 1 to 30 carbon atoms, or a hydrogen atom; $R^{42}$, $R^{44}$ and $R^{46}$ each independently represents an alkyl group, an alkenyl group, an aryl group or a heterocyclic group; or $R^{41}$ and $R^{42}$, $R^{43}$ and $R^{44}$, or $R^{45}$ and $R^{46}$ bond to each other to form a hetero ring. Preferable $R^{41}$, $R^{43}$ and $R^{45}$ each is independently an alkyl group having from 1 to 20 carbon atoms, or a hydrogen atom, more preferably an alkyl group having from 1 to 10 carbon atoms, or a hydrogen atom, even more preferably an alkyl group having from 1 to 6 carbon a toms, or a hydrogen atom, most preferably a hydrogen atom. Preferable $R^{42}$, $R^{44}$ and $R^{46}$ each is independently an aryl group. The definition and the substituent of the alkyl group, the alkenyl group, the aryl group and the heterocyclic group may be the same as the definition and the substituent of the corresponding groups in formula (III-I) mentioned hereinabove. The hetero ring to be formed by $R^{41}$ and $R^{42}$, $R^{43}$ and $R^{44}$, or $R^{45}$ and $R^{46}$ bonding to each other may be the same as the heterocyclic group having a free atomic valence at the nitrogen atom thereof in formula (III-I) mentioned hereinabove.

Preferably, at least one of $R^{42}$, $R^{44}$ and $R^{46}$ contains an alkylene or alkenylene moiety having from 9 to 30 carbon atoms. The alkylene or alkenylene moiety having from 9 to 30 carbon atoms is preferably linear. The alkylene or alkenylene moiety is preferably in the substituent of the aryl group. Preferably, at least one of $R^{42}$, $R^{44}$ and $R^{46}$ has a polymerizing group as the substituent thereof. Preferably, the melamine compound has at least two polymerizing groups. Preferably, the polymerizing group is at the terminal of $R^{42}$, $R^{44}$ and $R^{46}$. When a polymerizing group is introduced into the melamine compound, then the melamine compound may be introduced into an optically anisotropic layer while the compound is polymerized with a discotic liquid crystalline molecule. $R^{42}$, $R^{44}$ and $R^{46}$ having a polymerizing group as the substituent thereof maybe the same as those of the formula (Rp) mentioned hereinabove.

Examples of the melamine compound are shown below.

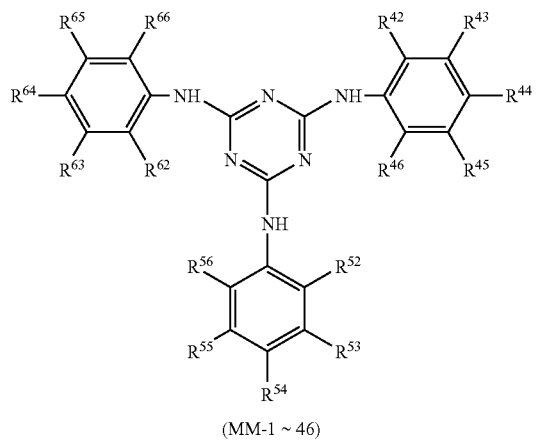

(MM-1 ~ 46)

MM-1: $R^{43}$, $R^{44}$, $R^{53}$, $R^{54}$, $R^{63}$, $R^{64}$: —O—$(CH_2)_9$—$CH_3$
MM-2: $R^{43}$, $R^{44}$, $R^{53}$, $R^{54}$, $R^{63}$, $R^{64}$: —O—$(CH_2)_{11}$—$CH_3$
MM-3: $R^{43}$, $R^{44}$, $R^{53}$, $R^{54}$, $R^{63}$, $R^{64}$: —O—$(CH_2)_{15}$—$CH_3$
MM-4: $R^{44}$, $R^{54}$, $R^{64}$: —O—$(CH_2)_9$—$CH_3$
MM-5: $R^{44}$, $R^{54}$, $R^{64}$: —O—$(CH_2)_{15}$—$CH_3$
MM-6: $R^{43}$, $R^{53}$, $R^{63}$: —O—$CH_3$; $R^{44}$, $R^{54}$, $R^{64}$: —O—$(CH_2)_{17}$—$CH_3$
MM-7: $R^{44}$, $R^{54}$, $R^{64}$: —CO—O—$(CH_2)_{11}$—$CH_3$
MM-8: $R^{44}$, $R^{54}$, $R^{64}$: —$SO_2$—NH—$(CH_2)_{17}$—$CH_3$
MM-9: $R^{43}$, $R^{53}$, $R^{63}$: —O—CO—$(CH_2)_{15}$—$CH_3$
MM-10: $R^{42}$, $R^{52}$, $R^{62}$: —O—$(CH_2)_{17}$—$CH_3$
MM-11: $R^{42}$, $R^{52}$, $R^{62}$: —O—$CH_3$; $R^{43}$, $R^{53}$, $R^{63}$: —CO—O—$(CH_2)_{11}$—$CH_3$
MM-12: $R^{42}$, $R^{52}$, $R^{62}$: —Cl; $R^{43}$, $R^{53}$, $R^{63}$: —CO—O—$(CH_2)_{11}$—$CH_3$
MM-13: $R^{42}$, $R^{52}$, $R^{62}$: —O—$(CH_2)_{11}$—$CH_3$; $R^{45}$, $R^{55}$, $R^{65}$: —$SO_2$—NH-iso-$C_3H_7$
MM-14: $R^{42}$, $R^{52}$, $R^{62}$: —Cl; $R^{45}$, $R^{55}$, $R^{65}$: —$SO_2$—NH—$(CH_2)_{15}$—$CH_3$
MM-15: $R^{42}$, $R^{46}$, $R^{52}$, $R^{56}$, $R^{62}$, $R^{66}$: —Cl; $R^{45}$, $R^{55}$, $R^{65}$: —$SO_2$—NH—$(CH_2)_{19}$—$CH_3$
MM-16: $R^{43}$, $R^{54}$: —O—$(CH_2)_9$—$CH_3$; $R^{44}$, $R^{53}$, $R^{63}$, $R^{64}$: —O—$(CH_2)_{11}$—$CH_3$
MM-17: $R^{44}$: —O—$(CH_2)_{11}$—$CH_3$; $R^{54}$: —O—$(CH_2)_{15}$—$CH_3$; $R^{64}$: —O—$(CH_2)_{17}$—$CH_3$
MM-18: $R^{42}$, $R^{45}$, $R^{52}$, $R^{55}$, $R^{62}$, $R^{65}$: —O—$CH_3$; $R^{44}$, $R^{54}$, $R^{64}$: —NH—CO—$(CH_2)_{14}$—$CH_3$
MM-19: $R^{42}$, $R^{45}$, $R_{52}$, $R^{55}$, $R^{62}$, $R^{65}$: —O—$(CH_2)_3$—$CH_3$; $R^{44}$, $R^{54}$, $R^{64}$: —O—$(CH_2)_{15}$—$CH_3$
MM-20: $R^{42}$, $R^{52}$, $R^{62}$: —NH—$SO_2$—$(CH_2)_{15}$—$CH_3$; $R^{44}$, $R^{45}$, $R^{54}$, $R^{55}$, $R^{64}$, $R^{65}$: —Cl
MM-21: $R^{42}$, $R^{43}$, $R^{52}$, $R^{53}$, $R^{62}$, $R^{63}$: —F; $R^{44}$, $R^{54}$, $R^{64}$: —CO—NH—$(CH_2)_{15}$—$CH_3$; $R^{45}$, $R^{46}$, $R^{55}$, $R^{56}$, $R^{65}$, $R^{66}$: —Cl
MM-22: $R^{42}$, $R^{52}$, $R^{62}$: —Cl; $R^{44}$, $R^{54}$, $R^{64}$: —$CH_3$; $R^{45}$, $R^{55}$, $R^{65}$: —NH—CO—$(CH_2)_{12}$—$CH_3$
MM-23: $R^{42}$, $R^{52}$, $R^{62}$: —OH; $R^{44}$, $R^{54}$, $R^{64}$: —$CH_3$; $R^{45}$, $R^{55}$, $R^{65}$: —O—$(CH_2)_{15}$—$CH_3$
MM-24: $R^{42}$, $R^{45}$, $R^{52}$, $R^{55}$, $R^{62}$, $R^{65}$, —O—$CH_3$; $R^{44}$, $R^{54}$, $R^{64}$: —$(CH_2)_{11}$—$CH_3$
MM-25: $R^{42}$, $R^{52}$, $R^{62}$: —NH—$SO_2$—$CH_3$; $R^{45}$, $R^{55}$, $R^{65}$: —CO—O—$(CH_2)_{11}$—$CH_3$
MM-26: $R^{42}$, $R^{52}$, $R^{62}$: —S—$(CH_2)_{11}$—$CH_3$; $R^{45}$, $R^{55}$, $R^{65}$: —$SO_2$—$NH_2$
MM-27: $R^{43}$, $R^{44}$, $R^{53}$, $R^{54}$, $R^{63}$, $R^{64}$: —O—$(CH_2)_{12}$—O—CO—CH=$CH_2$
MM-28: $R^{43}$, $R^{44}$, $R^{53}$, $R^{54}$, $R^{63}$, $R^{64}$: —O—$(CH_2)_8$—O—CO—CH=$CH_2$
MM-29: $R^{43}$, $R^{44}$, $R^{53}$, $R^{54}$, $R^{63}$, $R^{64}$: —O—CO—$(CH_2)_7$—O—CO—CH=$CH_2$
MM-30: $R^{44}$, $R^{54}$, $R^{64}$: —CO—O—$(CH_2)_{12}$—O—CO—C$(CH_3)$=$CH_2$
MM-31 $R^{43}$, $R^{44}$, $R^{53}$, $R^{54}$, $R^{63}$, $R^{64}$: —O—CO-p-Ph-O—$(CH_2)_4$—O—CO—CH=$CH_2$
MM-32: $R^{42}$, $R^{44}$, $R^{52}$, $R^{54}$, $R^{62}$, $R^{64}$: —NH—$SO_2$—$(CH_2)_8$—O—CO—CH=$CH_2$; $R^{45}$, $R^{55}$, $R^{65}$: —Cl
MM-33: $R^{42}$, $R^{52}$, $R^{62}$: —NH—$SO_2$—$CH_3$; $R^{45}$, $R^{55}$, $R^{65}$: —CO—O—$(CH_2)_{12}$—O—CO—CH=$CH_2$
MM-34: $R^{44}$, $R^{54}$, $R^{64}$: —O—$(CH_2)_9$—O—CO—CH=$CH_2$
MM-35 $R^{43}$, $R^{44}$, $R^{53}$, $R^{54}$, $R^{63}$, $R^{64}$: —O—$(CH_2)_9$—O—CO—CH=$CH_2$
MM-36: $R^{44}$, $R^{54}$, $R^{64}$: —O—$(CH_2)_4$—CH=CH—$(CH_2)_4$—O—CO—CH=$CH_2$
MM-37: $R^{43}$, $R^{44}$, $R^{53}$, $R^{54}$, $R^{63}$, $R^{64}$: —O—$(CH_2)_4$—CH=CH—$(CH_2)_4$—O—CO—CH=$CH_2$
MM-38: $R^{43}$, $R^{45}$, $R^{53}$, $R^{55}$, $R^{63}$, $R^{65}$: —O—$(CH_2)_9$—O—CO—CH=$CH_2$
MM-39: $R^{43}$, $R^{44}$, $R^{45}$, $R^{53}$, $R^{54}$, $R^{55}$, $R^{63}$, $R^{64}$, $R^{65}$: —O—$(CH_2)_9$—O—CO—CH=$CH_2$
MM-40: $R^{44}$, $R^{54}$: —O—$(CH_2)_4$—O—CO—CH=$CH_2$; $R^{64}$: —O—$(CH_2)_9$—O—CO—CH=$CH_2$
MM-41: $R^{44}$, $R^{54}$: —O—$(CH_2)_4$—O—CO—CH=$CH_2$; $R^{64}$: —O—$(CH_2)_{12}$—$CH_3$
MM-42: $R^{44}$, $R^{54}$: —O—$(CH_2)_4$—O—CO—CH=$CH_2$; $R^{63}$, $R^{64}$: —O—$(CH_2)_{12}$—$CH_3$
MM-43: $R^{44}$, $R^{54}$: —O—$(CH_2)_4$—O—CO—CH=$CH_2$; $R^{63}$, $R^{64}$: —O—CO—$(CH_2)_{11}$—$CH_3$
MM-44: $R^{43}$, $R^{45}$: —O—$(CH_2)_{12}$—$CH_3$; $R^{54}$, $R^{64}$: —O—$(CH_2)_9$—O—CO—CH=$CH_2$
MM-45: $R^{43}$, $R^{44}$: —O—$(CH_2)_6$—O—CO—CH=$CH_2$; $R^{54}$, $R^{64}$: —O—$(CH_2)_{11}$—$CH_3$
MM-46: $R^{43}$, $R^{44}$, $R^{45}$: —O—$(CH_2)_6$—O—CO—CH=$CH_2$; $R^{54}$, $R^{64}$: —O—$(CH_2)_{11}$—$CH_3$ p-Ph means p-phenylene (the same shall apply hereinunder).

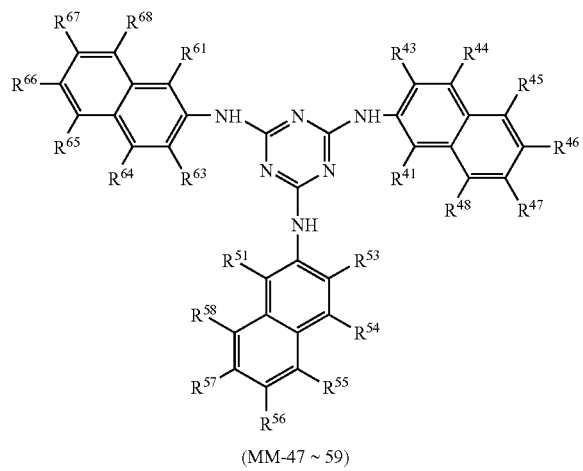

(MM-47 ~ 59)

MM-47: $R^{46}, R^{56}, R^{66}$: —$SO_2$—NH—$(CH_2)_{15}$—$CH_3$; $R^{48}$, $R^{58}, R^{68}$: —O—$(CH_2)_{11}$—$CH_3$
MM-48: $R^{45}, R^{55}, R^{65}$: —$SO_2$—NH—$(CH_2)_{17}$—$CH_3$
MM-49: $R^{46}, R^{56}, R^{66}$: —$SO_2$—NH—$(CH_2)_{15}$—$CH_3$
MM-50: $R^{45}, R^{55}, R^{65}$: —O—$(CH_2)_{17}$—$CH_3$; $R^{47}, R^{57}, R^{67}$: —$SO_2$—NH—$CH_3$
MM-51: $R^{43}, R^{53}, R^{63}$: —O—$(CH_2)_{15}$—$CH_3$
MM-52: $R^{41}, R^{51}, R^{61}$: —O—$(CH_2)_{17}$—$CH_3$
MM-53: $R^{46}, R^{56}, R^{66}$: —$SO_2$—NH-Ph; $R^{48}, R^{58}, R^{68}$: —O—$(CH_2)_{11}$—$CH_3$
MM-54: $R^{45}, R^{55}, R^{65}$: —O—$(CH_2)_{21}$—$CH_3$; $R^{47}, R^{57}, R^{67}$: —$SO_2$—NH-Ph
MM-55: $R^{41}, R^{51}, R^{61}$: -p-Ph-$(CH_2)_{11}$—$CH_3$
MM-56: $R^{46}, R^{48}, R^{56}, R^{58}, R^{66}, R^{68}$: —$SO_2$—NH—$(CH_2)_7$—$CH_3$
MM-57: $R^{46}, R^{56}, R^{66}$: —$SO_2$—NH—$(CH_2)_{10}$—O—CO—CH=$CH_2$; $R^{48}, R^{58}, R^{68}$: —O—$(CH_2)_{12}$—$CH_3$
MM-58: $R^{45}, R^{55}, R^{65}$: —O—$(CH_2)_{12}$—O—CO—CH=$CH_2$; $R^{47}, R^{57}, R^{67}$: —$SO_2$—NH-Ph
MM-59: $R^{43}, R^{53}, R^{63}$: —O—$(CH_2)_{16}$—O—CO—CH=$CH_2$

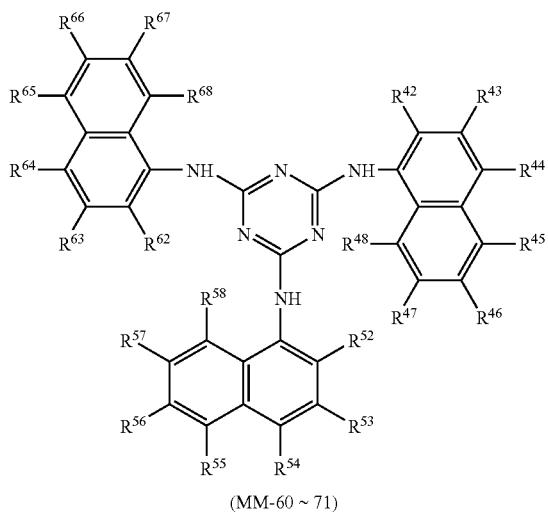

(MM-60 ~ 71)

MM-60: $R^{45}, R^{55}, R^{65}$: —NH—CO—$(CH_2)_{14}$—$CH_3$
MM-61: $R^{42}, R^{52}, R^{62}$: —O—$(CH_2)_{17}$—$CH_3$

MM-62: $R^{44}, R^{54}, R^{64}$: —O—$(CH_2)_{15}$—$CH_3$
MM-63: $R^{45}, R^{55}, R^{65}$: —$SO_2$—NH—$(CH_2)_{15}$—$CH_3$
MM-64: $R^{43}, R^{53}, R^{63}$: —CO—NH—$(CH_2)_{17}$—$CH_3$; $R^{44}, R^{54}, R^{64}$: —OH
MM-65: $R^{45}, R^{55}, R^{65}$: —O—$(CH_2)_{15}$—CH; $R^{46}, R^{56}, R^{66}$: —$SO_2$—NH—$(CH_2)_{11}$—$CH_3$
MM-66: $R^{47}, R^{57}, R^{67}$: —O—$(CH_2)_{21}$—$CH_3$
MM-67: $R^{44}, R^{54}, R^{64}$: —O-p-Ph-$(CH_2)_{11}$—$CH_3$
MM-68: $R^{46}, R^{56}, R^{66}$: —$SO_2$—NH—$(CH_2)_{15}$—$CH_3$
MM-69: $R^{43}, R^{53}, R^{63}$: —CO—NH—$(CH_2)_{17}$—$CH_3$; $R^{44}, R^{54}, R^{64}$: —O—$(CH_2)_{12}$—O—CO—CH=$CH_2$
MM-70: $R^{45}, R^{55}, R^{65}$: —O—$(CH_2)_8$—O—CO—CH=$CH_2$; $R^{46}, R^{56}, R^{66}$: —$SO_2$—NH—$(CH_2)_{11}$—$CH_3$
MM-71: $R^{43}, R^{46}, R^{53}, R^{56}, R^{63}, R^{66}$: —$SO_2$—NH—$(CH_2)_8$—O—CO—CH=$CH_2$

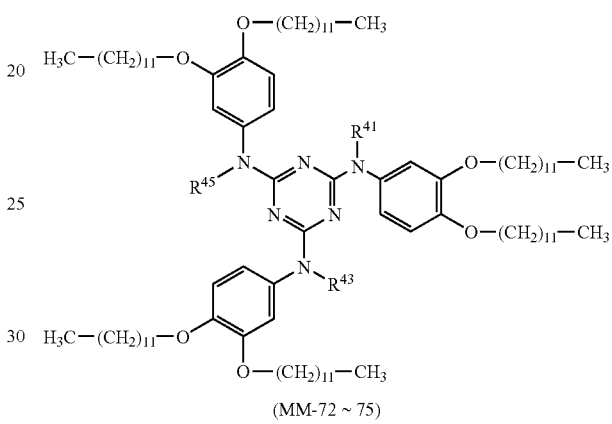

(MM-72 ~ 75)

MM-72: $R^{41}, R^{43}, R^{45}$: —$CH_3$
MM-73: $R^{41}, R^{43}, R^{45}$: —$C_2H_5$
MM-74: $R^{41}, R^{43}$: —$C_2H_5$; $R^{45}$: —$CH_3$
MM-75: $R^{41}, R^{43}, R^{45}$: —$(CH_2)_3$—$CH_3$ $R^{46}$—NH—[triazine]—NH—$R^{42}$
                    |
                    NH
                    |
                    $R^{44}$ (MM-76 ~ 88)

MM-76: $R^{42}, R^{44}, R^{46}$: —$(CH_2)_9$—O—CO—CH=$CH_2$
MM-77: $R^{42}, R^{44}, R^{44}$: —$(CH_2)_4$—CH=CH—$(CH_2)_4$—O—CO—CH=$CH_2$
MM-78: $R^{42}, R^{44}$: —$(CH_2)_9$—O—CO—CH=$CH_2$; $R^{46}$: —$(CH_2)_{12}$—$CH_3$
MM-79: $R^{42}, R^{44}$: —$(CH_2)_4$—CH=CH—$(CH_2)_4$—O—CO—CH=$CH_2$; $R^{46}$: —$(CH_2)_{12}$—$CH_3$
MM-80: $R^{42}$: —$(CH_2)_9$—O—CO—CH=$CH_2$; $R^{44}, R^{46}$: —$(CH_2)_{12}$—$CH_3$
MM-81: $R^{42}$: —$(CH_2)_4$—CH=CH—$(CH_2)_4$—O—CO—CH=$CH_2$; $R^{44}, R^{46}$: —$(CH_2)_{12}$—$CH_3$
MM-82: $R^{42}, R^{44}$: —$(CH_2)_4$—O—CO—CH=$CH_2$; $R^{46}$: —$(CH_2)_{12}$—$CH_3$
MM-83: $R^{42}$: —$(CH_2)_4$—O—CO—CH=$CH_2$; $R^{44}, R^{46}$: —$(CH_2)_{12}$—$CH_3$
MM-84: $R^{42}, R^{44}, R^{46}$: —$(CH_2)_9$—O-EpEt

MM-85: $R^{42}$, $R^{44}$, $R^{46}$: —$(CH_2)_4$—CH=CH—$(CH_2)_4$—O-EpEt

MM-86: $R^{42}$, $R^{44}$: —$(CH_2)_9$—O-EpEt; $R^{46}$: —$(CH_2)_{12}$—$CH_3$

MM-87: $R^{42}$, $R^{44}$, $R^{46}$: —$(CH_2)_9$—O—CH=$CH_2$

MM-88: $R^{42}$, $R^{44}$: —$(CH_2)_9$—O—CH=$CH_2$; $R_{46}$: —$(CH_2)_{12}$—$CH_3$

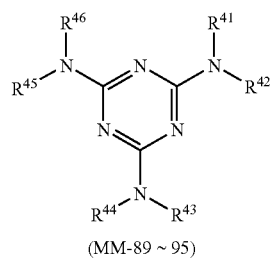

(MM-89 ~ 95)

MM-89: $R^{41}$, $R^{42}$, $R^{43}$, $R^{44}$, $R^{45}$, $R^{46}$: —$(CH_2)_9$—$CH_3$

MM-90: $R^{41}$, $R^{43}$, $R^{45}$: —$CH_3$; $R^{42}$, $R^{44}$, $R^{46}$: —$(CH_2)_{17}$—$CH_3$

MM-91: $R^{41}$, $R^{42}$, $R^{43}$, $R^{44}$: —$(CH_2)_7$—$CH_3$; $R^{45}$, $R^{46}$: —$(CH_2)_5$—$CH_3$

MM-92: $R^{41}$, $R^{42}$, $R^{43}$, $R^{44}$, $R^{45}$, $R^{46}$: -CyHx

MM-93: $R^{41}$, $R^{42}$, $R^{43}$, $R^{44}$, $R^{45}$, $R^{46}$: —$(CR_2)_2$—O—$C_2H_5$

MM-94: $R^{41}$, $R^{43}$, $R^{45}$: —$CH_3$; $R^{42}$, $R^{44}$, $R^{46}$: —$(CR_2)_{12}$—O—CO—CH=$CH_2$

MM-95: $R^{41}$, $R^{42}$, $R^{43}$, $R^{44}$, $R^{45}$, $R^{46}$: —$(CH_2)_8$—O—CO—CH=$CH_2$

CyHx means cyclohexyl.

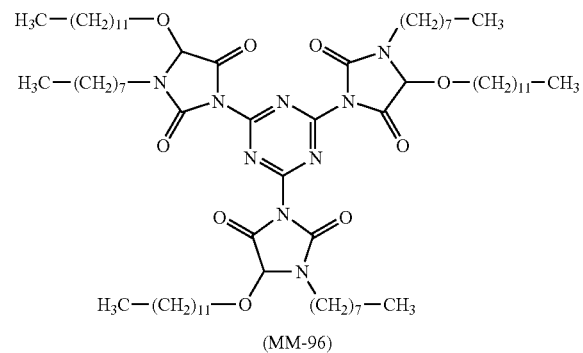

(MM-96)

Melamine polymer may be used as the melamine compound. Melamine polymer for use herein is preferably produced through polymerization of a melamine compound of the following formula (V-I) and a carbonyl compound.

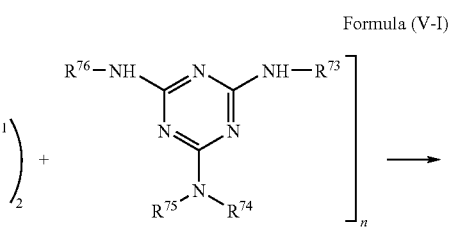

Formula (V-I)

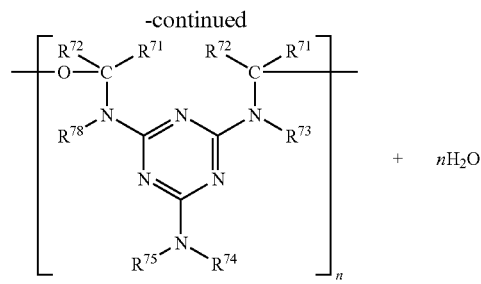

-continued

In formula (V-I), $R^{71}$, $R^{72}$, $R^{73}$, $R^{74}$, $R^{75}$ and $R^{76}$ independently represents a hydrogen atom, an alkyl group, an alkenyl group, an aryl group or a heterocyclic group. The definition and the substituent of the alkyl group, the alkenyl group, the aryl group and the heterocyclic group may be the same as those of the corresponding groups in formula (III-I) mentioned hereinabove. The polymerization of a melamine compound and a carbonyl compound is the same as that for producing ordinary melamine resin (e.g., melamine-formaldehyde resin). Commercially-available melamine polymer (melamine resin) may also be used herein. Preferably, the molecular weight of the melamine polymer for use herein is from 2,000 to 400,000.

At least one of $R^{71}$, $R^{72}$, $R^{73}$, $R^{74}$, $R^{75}$ and $R^{76}$ preferably contains an alkylene or alkenylene moiety having from 9 to 30 carbon atoms. Preferably, the alkylene or alkenylene moiety having from 9 to 30 carbon atoms is linear. Preferably, the alkylene or alkenylene moiety is in the substituent of the aryl group. Preferably, at least one of $R^{71}$, $R^{72}$, $R^{73}$, $R^{74}$, $R^{75}$ and $R^{76}$ has a polymerizing group as the substituent thereof. Preferably, the polymerizing group is in the terminal of $R^{71}$, $R^{72}$, $R^{73}$, $R^{74}$, $R^{75}$ and $R^{76}$. When a polymerizing group is introduced into the melamine polymer, then the melamine polymer may be introduced into the retardation film (optically anisotropic layer) while the polymer is polymerized with a discotic liquid crystalline molecule. $R^{71}$, $R^{72}$, $R^{73}$, $R^{74}$, $R^{75}$ and $R^{76}$ having a polymerizing group as the substituent thereof may be the same as those of the formula (Rp) mentioned hereinabove. The polymerizing group may be introduced into either one of the carbonyl compound ($R^{71}$, $R^{72}$) or the melamine compound ($R^{73}$, $R^{74}$, $R^{75}$ and $R^{76}$). When the melamine compound has a polymerizing group, then the carbonyl compound is preferably one having a simple chemical structure such as formaldehyde. When the carbonyl compound has a polymerizing group, then the melamine compound is preferably one having a simple chemical structure such as (unsubstituted) melamine.

Examples of the polymerizing group-having carbonyl compound are shown below.

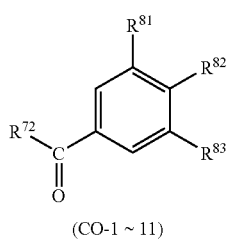

(CO-1 ~ 11)

CO-1: $R^{72}$: —H; $R^{82}$: —O—$(CH_2)_9$—O—CO—CH=$CH_2$
CO-2: $R^{72}$: —H; $R^{81}$, $R^{82}$: —O—$(CH_2)_9$—O—CO—CH=$CH_2$
CO-3: $R^{72}$: —H; $R^{82}$: —O—$(CH_2)_4$—CH=CH—$(CH_2)_4$—O—CO—CH=$CH_2$
CO-4: $R^{72}$: —H; $R^{81}$, $R^{82}$: —O—$(CH_2)_4$—C=CH—$(CH_2)_4$—O—CO—CH=$CH_2$
CO-5: $R^{72}$: —H; $R^{81}$, $R^{83}$: —O—$(CH_2)_9$—O—CO—CH=$CH_2$
CO-6: $R^{72}$: —H; $R^{81}$, $R^{82}$, $R^{83}$: —O—$(CH_2)_9$—O—CO—CH=$CH_2$
CO-7: $R^{72}$: —$CH_3$; $R^{82}$: O—$(CH_2)_9$—O—CO—CH=$CH_2$
CO-8: $R^{72}$: —$(CH_2)_{11}$—$CH_3$; $R^{82}$: —O—$(CH_2)_4$—O—CO—CH=$CH_2$
CO-9: $R^{72}$: —$(CH_2)_9$—O—CO—CH=$CH_2$; $R^{82}$: —O—$(CH_2)_4$—O—CO—CH=$CH_2$
CO-10: $R^{72}$: —$(CH_2)_9$—O—CO-EpEt; $R^{82}$: —O—$(CH_2)_4$—O—CO—CH=$CH_2$
CO-11: $R^{72}$: —$(CH_2)_4$—O—CO—CH=$CH_2$; $R^{81}$, $R^{83}$: —O—$(CH_2)_{12}$—$CH_3$

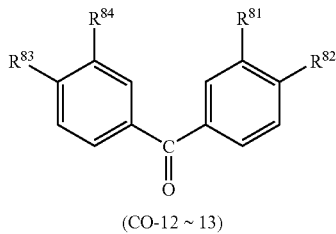

(CO-12 ~ 13)

CO-12: $R^{81}$, $R^{82}$, $R^{83}$, $R^{84}$: —O—$(CH_2)_6$—O—CO—CH=$CH_2$
CO-13: $R^{82}$, $R^{83}$: —O—$(CH_2)_9$—O—CO—CH=$CH_2$

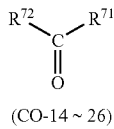

(CO-14 ~ 26)

CO-14: $R^{71}$: —$(CH_2)_9$—O—CO—CH=$CH_2$; $R^{72}$: —H
CO-15: $R^{71}$: —$(CH_2)_4$—CH=CH—$(CH_2)_4$—O—CO—CH=$CH_2$; $R^{72}$: —H
CO-16: $R^{71}$: —$(CH_2)_9$—O—CO—CH=$CH_2$; $R^{72}$: —$CH_3$
CO-17: $R^{71}$: —$(CH_2)_4$—CH=CH—$(CH_2)_4$—O—CO—CH=$CH_2$; $R^{72}$: —$CH_3$
CO-18: $R^{71}$: —$(CH_2)_9$—O—CO—CH=$CH_2$; $R^{72}$: -Ph
CO-19: $R^{71}$: —$(CH_2)_4$—CH=CH—$(CH_2)_4$—O—CO—CH=$CH_2$; $R^{72}$: -Ph
CO-20: $R^{71}$: —$(CH_2)_4$—O—CO—CH=$CH_2$; $R^{72}$: —$(CH_2)_9$—O—CO—CH=$CH_2$
CO-21: $R^{71}$: —$(CH_2)_4$—O—CO—CH=$CH_2$; $R^{72}$: —$(CH_2)_{12}$—$CH_3$
CO-22: $R^{71}$: —$(CH_2)_9$—O-EpEt; $R^{72}$: —H
CO-23: $R^{71}$: —$(CH_2)_4$—CH=CH—$(CH_2)_4$—O-EpEt; $R^{72}$: —H
CO-24: $R^{71}$, $R^{72}$: —$(CH_2)_9$—O-EpEt
CO-25: $R^{71}$, $R^{72}$: —$(CH_2)_9$—O—CO—CH=$CH_2$
CO-26: $R^{71}$, $R^{72}$: —$(CH_2)_4$—CH=CH—$(CH_2)_4$—O—CO—CH=$CH_2$

Ph means a phenyl group (the same shall apply hereinunder).

Examples of melamine polymers having a polymerizing group on the side of a melamine compound are shown below.

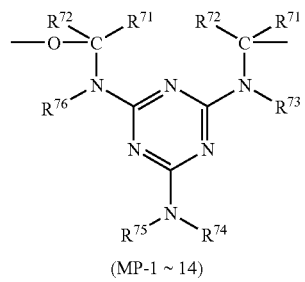

(MP-1 ~ 14)

MP-1: $R^{73}$, $R^{75}$, $R^{76}$: —$CH_2$—NH—CO—CH=$CH_2$; $R^{74}$: —$CH_2$—NH—CO—$(CH_2)_8$—$CH_3$
MP-2: $R^{71}$: —$CH_3$; $R^{73}$, $R^{75}$, $R^{76}$: —$CH_2$—NH—CO—CH=$CH_2$; $R^{74}$: —$CH_2$—NH—CO—$(CH_2)_8$—$CH_3$
MP-3: $R^{71}$, $R^{72}$: —$CH_3$; $R^{73}$, $R^{75}$, $R^{76}$: —$CH_2$—NH—CO—CH=$CH_2$; $R^{74}$: —$CH_2$—NH—CO—$(CH_2)_8$—$CH_3$
MP-4: $R^{71}$: -Ph; $R^{73}$, $R^{75}$, $R^{76}$: —$CH_2$—NH—CO—CH=$CH_2$; $R^{74}$: —$CH_2$—NH—CO—$(CH_2)_8$—$CH_3$
MP-5: $R^{73}$, $R^{76}$: —$CH_2$—NH—CO—CH=$CH_2$; $R^{74}$: —$CH_2$—NH—CO—$(CH_2)_7$—CH=CH—$(CH_2)_7$—$CH_3$; $R^{75}$: —$CH_2$—O—$CH_3$
MP-6: $R^{73}$, $R^{76}$: —$CH_2$—NH—CO—CH=$CH_2$; $R^{74}$: —$CH_2$—NH—CO—$(CH_2)_7$—CH=CH—$(CH_2)_7$—$CH_3$; $R^{75}$: —$CH_2$—OH
MP-7: $R^{73}$, $R^{76}$: —$CH_2$—NH—CO—$C_2H_5$; $R^{74}$: —$CH_2$—NH—CO—$(CH_2)_{16}$—$CH_3$; $R^{75}$: —$CH_2$—O—$CH_3$
MP-8: $R^{73}$, $R^{76}$: —$CH_2$—NH—CO—$C_2H_5$; $R^{74}$: —$CH_2$—NH—CO—$(CH_2)_{16}$—$CH_3$; $R^{75}$: —$CH_2$—OH
MP-9: $R^{73}$, $R^{76}$: —$CH_2$—O—CO—CH=$CH_2$; $R^{74}$: —$CH_2$—O—CO—$(CH_2)_7$—CH=CH—$(CH_2)_7$—$CH_3$; $R^{75}$: —$CH_2$—O—$CH_3$
MP-10: $R^{73}$, $R^{76}$: —$CH_2$—O—CO—CH=$CH^2$; $R^{74}$: —$CH_2$—O—CO—$(CH_2)^7$—CH=CH—$(CH_2)_7$—$CH_3$; $R^{75}$: —$CH_2$—OH
MP-11: $R^{73}$, $R^{76}$: —$CH_2$—O—CO—$(CH_2)_7$—CH=CH—$(CH_2)_7$—$CH_3$; $R^{74}$: —$CH_2$—NH—CO—$(CH_2)_7$—CH=CH—$(CH_2)_7$—$CH_3$; $R^{75}$: —$CH_2$—O—$CH_3$
MP-12: $R^{73}$, $R^{76}$: —$CH_2$—O—CO—$(CH_2)_7$—CH=CH—$(CH_2)_7$—$CH_3$; $R^{74}$: —$CH_2$—NH—CO—$(CH_2)_7$—CH=CH—$(CH_2)_7$—$CH_3$; $R^{75}$: —$CH_2$—OH
MP-13: $R^{73}$, $R^{74}$, $R^{75}$, $R^{76}$: —$CH_2$—O—$(CH_2)_{11}$—O—CO—CH=$CH_2$
MP-14: $R^{73}$, $R^{75}$, $R^{76}$: —$CH_2$—NH—CO—CH=$CH_2$; $R^{74}$: —$CH_2$—O—$(CH_2)_{16}$—$CH_3$ (Fluorine-Containing Surfactant)

Adding a fluorine-containing surfactant to the polymerizing liquid crystal layer in the invention stabilizes and uniformly aligns the liquid crystalline compound in the layer.

The fluorine-containing surfactant for use in the invention comprises a fluorine atom-containing hydrophobic group, a nonionic, anionic, cationic or ampholytic hydrophilic group and an optional linking group. A fluorine-containing surfactant comprising one hydrophobic group and one hydrophilic group usable herein is represented by the following formula (II):

Rf-$L^{23}$-Hy

In the formula, Rf represents a monovalent hydrocarbon residue substituted with a fluorine atom; $L^{23}$ represents a single bond or a divalent linking group; and Hy represents a hydrophilic group. Rf in formula (II) functions as a hydrophobic group. The hydrocarbon residue is preferably an alkyl group or an aryl group. Preferably, the alkyl group has from 3 to 30 carbon atoms, and the aryl group has from 6 to 30 carbon atoms. A part or all of the hydrogen atoms constituting the hydrocarbon residue are substituted with a fluorine atom. Preferably, at least 50%, more preferably at least 60%, even more preferably at least 70%, most preferably at least 80% of the hydrogen atoms constituting the hydrocarbon residue are substituted with a fluorine atom. The remaining hydrogen atoms may be substituted with any other halogen atom (e.g., chlorine atom, bromine atom). Examples of Rf are shown below.

$Rf^1$: n-$C_8F_{17}$—
$Rf^2$: n-$C_6F_{13}$—
$Rf^3$: Cl—$(CF_2$—$CFCl)_3$—$CF_2$—
$Rf^4$: H—$(CF_2)_8$—
$Rf^5$: H—$(CF_2)_{10}$—
$Rf^6$: n-$C_9F_{19}$—
$Rf^7$: pentafluorophenyl
$Rf^8$: n-$C_7F_{15}$—
$Rf^9$: Cl—$(CF_2$—$CFCl)_2$—$CF_2$—
$Rf^{10}$: H—$(CF_2)_4$—
$Rf^{11}$: H—$(CF_2)_6$—
$Rf^{12}$: Cl—$(CF_2)_6$—
$Rf^{13}$: $C_3F_7$—

In formula (II), the divalent linking group is preferably selected from a group consisting of an alkylene group, an arylene group, a divalent heterocyclic residue, —CO—, —$NR^{222}$— wherein $R^{222}$ represents an alkyl group having from 1 to 5 carbon atoms, or a hydrogen atom, —O—, —$SO_2$— and their combination. Examples of $L^{23}$ in formula (II) are mentioned below. In these, the left side bonds to the hydrophobic group (Rf) and the right side bonds to the hydrophilic group (Hy). AL represents an alkylene group; AR represents an arylene group; Hc represents a heterocyclic residue. The alkylene group, the arylene group and the heterocyclic residue may have a substituent (e.g., alkyl group).

$L^{30}$: single bond
$L^{31}$: —$SO_2$—NR
$L^{32}$: -AL-O—
$L^{33}$: —CO—NR—
$L^{34}$: -AR-O—
$L^{35}$: —$SO_2$—NR-AL-CO—O—
$L^{36}$: —CO—O—
$L^{37}$: —$SO_2$—NR-AL-O—
$L^{38}$: —$SO_2$—NR-AL-
$L^{39}$: —CO—NR-AL-
$L^{40}$: -$AL^1$-O-$AL^2$-
$L^{41}$: —Hc-AL-
$L^{42}$: —$SO_2$—NR-$AL^1$-O-$AL^2$-
$L^{43}$: -AR—
$L^{44}$: —O-AR—$SO_2$—NR-AL-
$L^{45}$: —O-AR—$SO_2$—NR—
$L^{46}$: —O-AR—O—

Hy in formula (II) is any of a nonionic hydrophilic group, an anionic hydrophilic group, a cationic hydrophilic group or their combination (ampholytic hydrophilic group). Especially preferred is a nonionic hydrophilic group. Examples of Hy in formula (II) are shown below.

$Hy^1$: —$(CH_2CH_2O)$n-H (n is an integer of from 5 to 30.)
$Hy^2$: —$(CH_2CH_2O)$n-$R^1$ (n is an integer of from 5 to 30; $R^1$ is an alkyl group having from 1 to 6 carbon atoms.)
$Hy^3$: —$(CH_2CHOHCH_2)$n-H (n is an integer of from 5 to 30.)
$Hy^4$: —COOM (M is a hydrogen atom or an alkali metal atom, or indicates a dissociated state.)
$Hy^5$: —$SO_3$M (M is a hydrogen atom or an alkali metal atom, or indicates a dissociated state.)
$Hy^6$: —$(CH_2CH_2O)$n-$CH_2CH_2CH_2$—$SO_3$M (n is an integer of from 5 to 30; M is a hydrogen atom or an alkali metal atom.)
$Hy^7$: —$OPO(OH)_2$
$Hy^8$: —$N^+(CH_3)_3$.$X^-$ (X is a halogen atom.)
$Hy^9$: —$COONH^4$ Of those, preferred is a nonionic hydrophilic group ($Hy^1$, $Hy^2$, $Hy^3$); and most preferred is a hydrophilic group ($Hy^1$) of polyethylene oxide. Examples of the fluorine-containing surfactant of the formula (II) are shown below with reference to the above-mentioned examples of Rf, $L^{23}$ and Hy.

FS-1: $Rf^1$-$L^{31}$ (R=$C_3H_7$)-$Hy^1$ (n=6)
FS-2: $Rf^1$-$L^{31}$ (R=$C_3H_7$)-$Hy^1$ (n=11)
FS-3: $Rf^1$-$L^{31}$ (R=$C_3H_7$)-$Hy^1$ (n=16)
FS-4: $Rf^1$-$L^{31}$ (R=$C_3H_7$)-$Hy^1$ (n=21)
FS-5: $Rf^1$-$L^{31}$ (R=$C_2H_5$)-$Hy^1$ (n=6)
FS-6: $Rf^1$-$L^{31}$ (R=$C_2H_5$)-$Hy^1$ (n=11)
FS-7: $Rf^1$-$L^{31}$ (R=$C_2H_5$)-$Hy^1$ (n=16)
FS-8: $Rf^1$-$L^{31}$ (R=$C_2H_7$)-$Hy^1$ (n=21)
FS-9: $Rf^2$-$L^{31}$ (R=$C_3H_7$)-$Hy^1$ (n=6)
FS-10: $Rf^2$-$L^{31}$ (R=$C^3H^7$)-$Hy^1$ (n=11)
FS-11: $Rf^2$-$L^{31}$ (R=$C_3H_7$)-$Hy^1$ (n=16)
FS-12: $Rf^2$-$L^{31}$ (R=$C_3H_7$)-$Hy^1$ (n=21)
FS-13: $Rf^3$-$L^{32}$ (AL=$CH_2$)-$Hy^1$ (n=5)
FS-14: $Rf^3$-$L^{32}$ (AL=$CH_2$)-$Hy^1$ (n=10)
FS-15: $Rf^3$-$L^{32}$ (AL=$CH_2$)-$Hy^1$ (n=15)
FS-16: $Rf^3$-$L^{32}$ (AL=$CH_2$)-$Hy^1$ (n=20)
FS-17: $Rf^4$-$L^{33}$ (R=$C_3H_7$)-$Hy^1$ (n=7)
FS-18: $Rf^4$-$L^{33}$ (R=$C_3H_7$)-$Hy^1$ (n=13)
FS-19: $Rf^4$-$L^{33}$ (R=$C^3H^7$)-$Hy^1$ (n=19)
FS-20: $Rf^4$-$L^{33}$ (R=$C_3H_7$)-$Hy^1$ (n=25)
FS-21: $Rf^5$-$L^{32}$ (AL=$CH_2$)-$Hy^1$ (n=11)
FS-22: $Rf^5$-$L^{32}$ (AL=$CH_2$)-$Hy^1$ (n=15)
FS-23: $Rf^5$-$L^{32}$ (AL=$CH_2$)-$Hy^1$ (n=20)
FS-24: $Rf^5$-$L^{32}$ (AL=$CH_2$)-$Hy^1$ (n=30)
FS-25: $Rf^6$-$L^{31}$ (AR=p-phenylene)-$Hy^1$ (n=11)
FS-26: $Rf^6$-$L^{34}$ (AR=p-phenylene)-$Hy^1$ (n=17)
FS-27: $Rf^6$-$L^{34}$ (AR=AR=p-phenylene)-$Hy^1$ (n=23)
FS-28: $Rf^6$-$L^{34}$ (AR=p-phenylene)-$Hy^1$ (n=29)
FS-29: $Rf^1$-$L^{35}$ (R=$C_3H_7$, AL=$CH_2$)-$Hy^1$ (n=20)
FS-30: $Rf^1$-$L^{35}$ (R=$C_3H_7$, AL=$CH_2$)-$Hy^1$ (n=30)
FS-31: $Rf^1$-$L^{35}$ (R=$C_3H_7$, AL=$CH_2$)-$Hy^1$ (n=40)
FS-32: $Rf^1$-$L^{36}$-$Hy^1$ (n=5)
FS-33: $Rf^1$-$L^{36}$-$Hy^1$ (n=10)
FS-34: $Rf^1$-$L^{36}$-$Hy^1$ (n=15)
FS-35: $Rf^1$-$L^{36}$-$Hy^1$ (n=20)
FS-36: $Rf^7$-$L^{36}$-$Hy^1$ (n=8)
FS-37: $Rf^7$-$L^{36}$-$Hy^1$ (n=13)
FS-38: $Rf^7$-$L^{36}$-$Hy^1$ (n=18)
FS-39: $Rf^7$-$L^{36}$-$Hy^1$ (n=2 5)
FS-40: $Rf^1$-$L^{30}$-$Hy^1$ (n=6)
FS-41: $Rf^1$-$L^{30}$-$Hy^1$ (n=11)
FS-42: $Rf^1$-$L^{30}$-$Hy^1$ (n=16)
FS-43: $Rf^1$-$L^{30}$-$Hy^1$ (n=21)
FS-44: $Rf^1$-$L^{31}$ (R=$C_3H_7$)-$Hy^2$ (n=7, $R^1$=$C_2H_5$)
FS-45: $Rf^1$-$L^{31}$ (R=$C_3H_7$)-$Hy^2$ (n=13, $R^1$=$C_2H_5$)
FS-46: $Rf^1$-$L^{31}$ (R=$C_3H_7$)-$Hy^2$ (n=20, $R^1$=$C_2H_5$)
FS-47: $Rf^1$-$L^{31}$ (R=$C_3H_7$)-$Hy^2$ (n=28, $R^1$=$C_2H_5$)
FS-48: $Rf^8$-$L^{32}$ (AL=CH2)-$Hy^1$ (n=5)
FS-49: $Rf^8$-$L^{32}$ (AL=$CH_2$)-$Hy^1$ (n=10)
FS-50: $Rf^8$-$L^{32}$ (AL=$CH_2$)-$Hy^1$ (n=15)
FS-51: $Rf^8$-$L^{32}$ (AL=$CH_2$)-$Hy^1$ (n=20)
FS 52: $Rf^1$-$L^{37}$ (R=$C_3H_7$, AL=$CH_2CH_2$)-$Hy^3$ (n=5)
FS-53: $Rf^1$-$L^{37}$ (R=$C_3H_7$, AL=$CH_2CH2$)-$Hy^3$ (n=7)
FS-54: $Rf^1$-$L^{37}$ (R=$C_3H_7$, AL=$CH_2CH2$)-$Hy^3$ (n=9)
FS-55: $Rf^1$-$L^{37}$ (R=$C_3H_7$, AL=$CH_2CH_2$)-$Hy^3$ (n=12)
FS-56: $Rf^9$-$L^{30}$-$Hy^4$ (M=H)

FS-57: $Rf^3$-$L^{30}$-$Hy^4$ (M=H)
FS-58: $Rf^1$-$L^{38}$ (R=$C_3H_7$, AL=$CH_2$)-$Hy^4$ (M=K)
FS-59: $Rf^4$-$L^{39}$ (R=$C_3H_7$, AL=$CH_2$)-$Hy^4$ (M=Na)
FS-60: $Rf^1$-$L^{30}$-$Hy^5$ (M=K)
FS-61: $Rf^{10}$-$L^{40}$ ($AL^1$=$CH_2$, $AL^2$=$CH_2CH_2$)-$Hy^5$ (M=Na)
FS-62 $Rf^{11}$-$L^{40}$ ($AL^1$=$CH_2$, $AL^2$=$CH_2CH_2$)-$Hy^5$ (M=Na)
FS-63: $Rf^5$-$L^{40}$ ($AL^1$=$CH_2$, $AL^2$=$CH_2CH_2$)-$Hy^5$ (M=Na)
FS-64: $Rf^1$-$L^{38}$ (R=$C_3H_7$, AL=$CH_2CH_2CH_2$)-$Hy^5$ (M=Na)
FS-65: $Rf^1$-$L^{31}$ (R=$C_3H_7$)-$Hy^6$ (n=5, M=Na)
FS-66: $Rf^1$-$L^{31}$ (R=$C_3H_7$)-$Hy^6$ (n=10, M=Na)
FS-67: $Rf^1$-$L^{31}$ (R=$C_3H_7$)-$Hy^6$ (n=15, M=Na)
FS-68: $Rf^1$-$L^{31}$ (R=$C_3H_7$)-$Hy^6$ (n=20, M=Na)
FS-69: $Rf^1$-$L^{31}$ (R=$C_2H_5$, AL=$CH_2CH_2$)-$Hy^7$
FS-70: $Rf^1$-$L^{31}$ (R=H, AL=$CH_2CH_2CH_2$)-$Hy^8$ (X=I)
FS-71: $Rf^{11}$-$L^{41}$ (the following Hc, AL=$CH_2CH_2CH_2$)-$Hy^6$
(M indicates a dissociated state.)
Hc in FS-71:

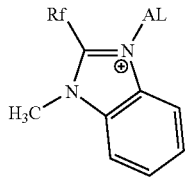

FS-72: $Rf^1$-$L^{42}$ (R=$C_3H_7$, $AL^1$=$CH_2CH_2$, $AL^2$=$CH_2CH_2CH_2$)-$Hy^6$ (M=Na)
FS-73: $Rf^{12}$-$L^0$-$Hy^5$ (M=Na)
FS-74: $Rf^{13}$-$L^{43}$ (AR=o-phenylene)-$Hy^6$ (M=K)
FS-75: $Rf^{13}$-$L^{43}$ (AR=m-phenylene)-$Hy^6$ (M=K)
FS-76: $Rf^{13}$-$L^{43}$ (AR=p-phenylene)-$Hy^6$ (M=K)
FS-77: $Rf^6$-$L^{44}$ (R=$C_2H_5$, AL=$CH_2CH_2$)-$Hy^5$ (M=H)
FS-78: $Rf^6$-$L^{45}$ (AR=p-phenylene, R=$C_2H_5$)-$Hy^1$ (n=9)
FS-79: $Rf^6$-$L^{45}$ (AR=p-phenylene, R=$C_2H_5$)-$Hy^1$ (n=14)
FS-80: $Rf^6$-$L^{45}$ (AR=p-phenylene, R=$C_2H_5$)-$Hy^1$ (n=19)
FS-81: $Rf^6$-$L^{45}$ (AR=p-phenylene, R=$C_2H_5$)-$Hy^1$ (n=28)
FS-82: $Rf^6$-$L^{46}$ (AR=p-phenylene)-$Hy^1$ (n=5)
FS-83: $Rf^6$-$L^{46}$ (AR=p-phenylene)-$Hy^1$ (n=10)
FS-84: $Rf^6$-$L^{46}$ (AR=p-phenylene)-$Hy^1$ (n=15)
FS-85: $Rf^6$-$L^{46}$ (AR=p-phenylene)-$Hy^1$ (n=20)

Fluorine-containing surfactants having two or more, fluorine atom-containing hydrophobic groups or hydrophilic groups may be used herein. Examples of those fluorine-containing surfactants having two or more hydrophobic groups or hydrophilic groups are mentioned below.

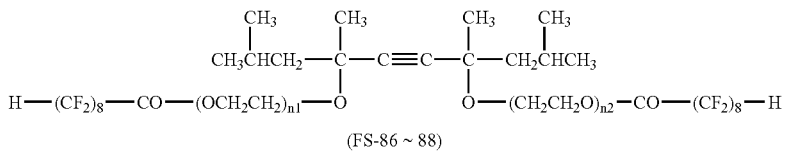

(FS-86 ~ 88)

FS-86: n1+n2=12
FS-87: n1+n2=18
FS-88: n1+n2=24

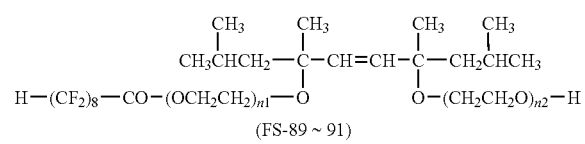

(FS-89 ~ 91)

FS-89: n1+n2=20
FS-90: n1+n2=30
FS-91: n1+n2=40

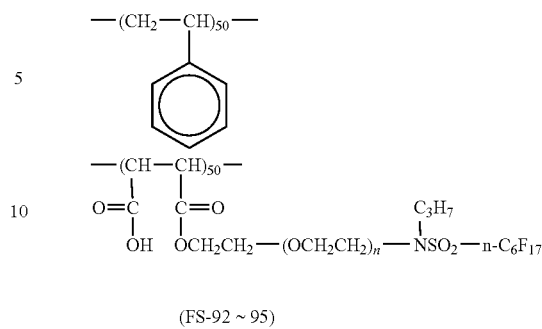

(FS-92 ~ 95)

FS-92: n=5
FS-93: n=10
FS-94: n=15
FS-95: n=20

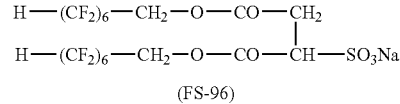

(FS-96)

Two or more different types of fluorine-containing surfactants may be used herein, as combined. Surfactants are described in various references (e.g., Hiroshi Horiguchi, New Surfactants, Sankyo publishing (1975); M. J. Schick, Nonionic Surfactants, Marcell Dekker Inc., New York, (1967); JP-A-7-13293). The amount of the fluorine-containing surfactant to be used herein is from 2 to 30% by mass of the liquid crystalline compound. Preferably, the amount is from 3 to 25% by mass, more preferably from 5 to 10% by mass of the liquid crystalline compound.

Two or more different types of 1,3,5-triazine ring-having compounds (including melamine compounds and melamine polymers) may be used herein, as combined. The amount of the 1,3,5-triazine ring-having compound to be used herein is from 0.01 to 20% by mass of the liquid crystalline compound. The amount is preferably from 0.1 to 15% by mass, more preferably from 0.5 to 10% by mass of the liquid crystalline compound.

The polymerizing liquid crystal layer is formed on the biaxial film or the alignment film in the invention. The solvent to be used in preparing the coating solution for the layer is preferably an organic solvent. Examples of the organic solvent include amides (e.g., dimethylformamide), sulfoxides (e.g., dimethyl sulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone), ethers (e.g., tetrahydrofuran, 1,2-dimethoxyethane). Preferred are alkyl halides and ketones. Two or more different types of organic solvents may be used, as combined. The coating solution may be applied in any known coating method (e.g., curtain-coating method, extrusion-coating method, roll-coating method, spin-coating method, dipping method, printing method, spraying method, slide-coating method). Preferably, the optically anisotropic layer is formed in continuous coating. A curtain-coating method, a roll-coating method and a slide-coating method are suitable to continuous coating.

The thickness of the polymerizing liquid crystal layer is preferably from 0.5 to 100 μm, more preferably from 0.5 to 30 μm.

(Alignment Film)

The alignment film functions to determine the alignment direction of liquid crystalline compounds.

The alignment film may be provided by rubbing treatment of an organic compound (preferably polymer), oblique deposition of an inorganic compound, formation of a layer having microgrooves, or accumulation of an organic compound (e.g., ω-tricosanoic acid, dioctadecylmethylammonium chloride, methyl stearate) by a Langmuir-Blodgett process (LB film). Further known are alignment films capable of having an alignment function generated through application of an electric field or a magnetic field thereto or through irradiation thereof with light.

The alignment film is preferably formed through rubbing of polymer. Preferably, the rubbing treatment is effected in the direction substantially perpendicular to the slow axis of a biaxial film. Accordingly, the slow axis of the biaxial film may be made perpendicular to the slow axis of the retardation film.

When the slow axis of the biaxial film is made perpendicular to the slow axis of the retardation film, then it may produce an effect in that Re of the biaxial film may cancel out Re of the retardation film and therefore the chromatic dispersion of Re of the optical compensatory sheet can be readily controlled.

The polymer is preferably polyvinyl alcohol. A modified polyvinyl alcohol with a hydrophobic group bonding thereto is more preferred. The hydrophobic group has an affinity for the liquid crystalline compound in the retardation film. Therefore, introducing such a hydrophobic group into polyvinyl alcohol enables uniform alignment of the liquid crystalline compound. The hydrophobic group is bonded to the terminal of the main chain of polyvinyl alcohol or to the side branch thereof.

The hydrophobic group is preferably an aliphatic group (more preferably an alkyl group or an alkenyl group) or an aromatic group having at least 6 carbon atoms.

In case where the hydrophobic group is bonded to the terminal of the main chain of polyvinyl alcohol, then a linking group is preferably introduced between the hydrophobic group and the terminal of the main chain. Examples of the linking group include —S—, —C(CN)$R^{444}$—, —$NR^{555}$—, —CS— and their combination. $R^{444}$ and $R^{555}$ each independently represents a hydrogen atom, or an alkyl group having from 1 to 6 carbon atoms, preferably an alkyl group having from 1 to 6 carbon atoms.

In case where the hydrophobic group is introduced into the side branch of polyvinyl alcohol, then a part of the acetyl group (—CO—$CH_3$) of the vinyl acetate unit of polyvinyl alcohol may be substituted with an acyl group (—CO—$R^{666}$) having at least 7 carbon atoms. $R^{666}$ represents an aliphatic or aromatic group having at least 6 carbon atoms.

Commercially-available polyvinyl alcohol (e.g., MP103, MP203, R1130 by Kuraray) may be used herein.

Preferably, the degree of saponification of the (modified) polyvinyl alcohol to be used in the alignment film is at least 80%. Preferably, the degree of polymerization of the (modified) polyvinyl alcohol is at least 200.

The rubbing treatment may be attained by rubbing the surface of an alignment film a few times with paper or cloth in a predetermined direction. Preferably used is a cloth where fibers having a uniform length and a uniform thickness are uniformly implanted.

After the liquid crystalline compound in the polymerizing liquid crystal layer has been aligned by the alignment film and even after the alignment film is removed, the liquid crystalline compound may keep the aligned state thereof. Accordingly, the alignment film is indispensable for aligning the liquid crystalline compound in producing an optical compensatory sheet, but it is not indispensable in the produced optical compensatory film.

In case where the alignment is disposed between the biaxial film and the polymerizing liquid crystal layer, then an adhesive layer (undercoat layer) may be disposed between the transparent support and the alignment film.

In the retardation film in the invention, the mean tilt angle of the liquid crystalline compound may be controlled by a modified polyvinyl alcohol-containing alignment layer, as in JP-A-2000-155216.

(Biaxial Film)

The thickness of the biaxial film in the invention is preferably from 10 to 200 μm, more preferably from 20 to 150 μm, most preferably from 30 to 100 μm.

The biaxial film in the invention is preferably a stretched polymer film. The polymer is preferably a norbornene-based polymer, polycarbonate or cellulose acylate. Of those, a norbornene-based film and a cellulose acylate film are especially preferred as the main chain of the polymer has an aliphatic structure and the main chain-related chromatic dispersion is small.

As the norbornene-based polymer, preferred are those described in JP-A-2004-020823, JP-A-2004-309979, JP-A-2005-008698.

The cellulose acylate film preferably used as the biaxial film in the invention (this is referred to as "biaxial cellulose acylate film") is described in detail.

Cellulose Acylate

The substitution degree in the cellulose acylate of the biaxial cellulose acylate film in the invention means the ratio of acylation of the three hydroxyl groups existing in the constitutive unit (glucose with β1→4 glycoside bond) of cellulose. The substitution degree (acylation) may be calculated in the same manner as that for the above-mentioned low retardation film.

Preferably, the cellulose acylate in the invention has a degree of acylation of from 2.00 to 2.90, more preferably from 2.2 to 2.8. The ratio of the degree of 6-acylation to the degree of whole acylation is preferably at least 0.25, more preferably at least 0.3.

Another preferred cellulose acylate in the invention is a mixed fatty acid ester having an acetyl group and a $C_{3-4}$ acyl group and having a degree of acylation of from 2 to 2.9. More preferably, the degree of acylation of the ester is from 2.2 to 2.85, most preferably from 2.4 to 2.8. Preferably, the degree of acetylation of the ester is less than 2.5, more preferably less than 1.9. Preferably, the ratio of the degree of 6-acylation to the degree of whole acylation of the ester is at least 0.25, more preferably at least 0.3.

As the cellulose acylate in the invention, also preferred is a mixed ester having an acetyl group and an acyl group of the following formula (B):

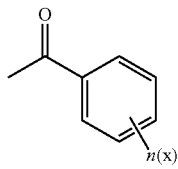

Formula (B)

Formula (B) is described. In formula (B), X represents a substituent. Examples of the substituent include a halogen atom, a cyano group, an alkyl group, an alkoxy group, an aryl group, an aryloxy group, an acyl group, a carbonamido group, a sulfonamido group, an ureido group, an aralkyl group, a nitro group, an alkoxycarbonyl group, an aryloxycarbonyl group, an aralkyloxycarbonyl group, a carbamoyl group, a sulfamoyl group, an acyloxy group, an alkenyl group, an alkynyl group, an alkylsulfonyl group, an arylsulfonyl group, an alkyloxysulfonyl group, an aryloxysulfonyl group, an alkylsulfonyloxy group, —S—R, —NH—CO—OR, —PH—R, —P(—R)$_2$, —PH—O—R, —P(—R)(—O—R), —P(—O—R)$_2$, —PH(=O)—R—P(=O) (—R)$_2$, —PH(=O)—O—R, —P(=O)(—R)(—O—R), —P(=O)(—O—R)$_2$, —O—PH(=O)—R, —O—P(=O)(—R)$_2$—OP—H(=O)—O—R, —O—P(=O)(—R)(—O—R), —O—P(=O)(—O—R)$_2$, —NH—PH(=O)—R, —NH—P(=O)(—R)(—O—R), —NH—P(=O)(—O—R)$_2$, —SiH$_2$—R, —SiH(—R)$_2$, —Si(—R)$_3$, —O—SiH$_2$—R, —O—SiH(—R)$_2$ and —O—Si(—R)$_3$. In these, R represents an aliphatic group, an aromatic group or a heterocyclic group.

In formula (B), n means the number of the substituents, indicating an integer of from 0 to 5. Preferably, the number of the substituents (n) is from 1 to 5, more preferably from 1 to 4, even more preferably from 1 to 3, most preferably 1 or 2. The substituents are preferably a halogen atom, a cyano group, an alkyl group, an alkoxy group, an aryl group, an aryloxy group, an acyl group, a carbonamido group, a sulfonamido group and an ureido group, more preferably a halogen atom, a cyano group, an alkyl group, an alkoxy group, an aryloxy group, an acyl group and a carbonamido group, even more preferably a halogen atom, a cyano group, an alkyl group, an alkoxy group and an aryloxy group, most preferably a halogen atom, an alkyl group and an alkoxy group.

The halogen atom includes a fluorine atom, a chlorine atom, a bromine atom and an iodine atom. The alkyl group may have a cyclic structure or may be branched. Preferably, the number of the carbon atoms constituting the alkyl group is from 1 to 20, more preferably from 1 to 12, even more preferably from 1 to 6, most preferably from 1 to 4. Examples of the alkyl group include a methyl group, an ethyl group, a propyl group, an isopropyl group, a butyl group, a tert-butyl group, a hexyl group, a cyclohexyl group, an octyl group and a 2-ethylhexyl group. The alkoxy group may have a cyclic structure or may be branched. The number of the carbon atoms constituting the alkoxy group is preferably from 1 to 20, more preferably from 1 to 12, even more preferably from 1 to 6, most preferably from 1 to 4. The alkoxy group may be substituted with another alkoxy group. Examples of the alkoxy group include a methoxy group, an ethoxy group, a 2-methoxyethoxy group, a 2-methoxy-2-ethoxyethoxy group, a butyloxy group, a hexyloxy group and an octyloxy group.

The number of the carbon atoms constituting the aryl group is preferably from 6 to 20, more preferably from 6 to 12. Examples of the aryl group include a phenyl group and a naphthyl group. The number of the carbon atoms constituting the aryloxy group is preferably from 6 to 20, more preferably from 6 to 12. Examples of the aryl group include a phenoxy group and a naphthoxy group. The number of the carbon atoms constituting the acyl group is preferably from 1 to 20, more preferably from 1 to 12. Examples of the acyl group include a formyl group, an acetyl group and a benzoyl group. The number of the carbon atoms constituting the carbonamido group is preferably from 1 to 20, more preferably from 1 to 12. Examples of the carbonamido group include an acetamido group and a benzamido group. The number of the carbon atoms constituting the sulfonamido group is preferably from 1 to 20, more preferably from 1 to 12. Examples of the sulfonamido group include a methanesulfonamido group, a benzenesulfonamido group and a p-toluenesulfonamido group. The number of the carbon atoms constituting the ureido group is preferably from 1 to 20, more preferably from 1 to 12. Examples of the ureido group include an (unsubstituted) ureido group.

The number of the carbon atoms constituting the aralkyl group is preferably from 7 to 20, more preferably from 7 to 12. Examples of the aralkyl group include a benzyl group, a phenethyl group and a naphthylmethyl group. The number of the carbon atoms constituting the alkoxycarbonyl group is preferably from 2 to 20, more preferably from 2 to 12. Examples of the alkoxycarbonyl group include a methoxycarbonyl group. The number of the carbon atoms constituting the aryloxycarbonyl group is preferably from 7 to 20, more preferably from 7 to 12. Examples of the aryloxycarbonyl group include a phenoxycarbonyl group. The number of the carbon atoms constituting the aralkyloxycarbonyl group is preferably from 8 to 20, more preferably from 8 to 12. Examples of the aralkyloxycarbonyl group include a benzyloxycarbonyl group. The number of the carbon atoms constituting the carbamoyl group is preferably from 1 to 20, more preferably from 1 to 12. Examples of the carbamoyl group include an (unsubstituted) carbamoyl group and an N-methylcarbamoyl group. The number of the carbon atoms constituting the sulfamoyl group is preferably at most 20, more preferably at most 12. Examples of the sulfamoyl group include an (unsubstituted) sulfamoyl group and an N-methylsulfamoyl group. The number of the carbon atoms constituting the acyloxy group is preferably from 1 to 20, more preferably from 2 to 12. Examples of the acyloxy group include an acetoxy group and a benzoyloxy group.

The number of the carbon atoms constituting the alkenyl group is preferably from 2 to 20, more preferably from 2 to 12. Examples of the alkenyl group include a vinyl group, an allyl group and an isopropenyl group. The number of the carbon atoms constituting the alkynyl group is preferably from 2 to 20, more preferably from 2 to 12. Examples of the alkynyl group include an ethynyl group. The number of the carbon atoms constituting the alkylsulfonyl group is preferably from 1 to 20, more preferably from 1 to 12. The number of the carbon atoms constituting the arylsulfonyl group is preferably from 6 to 20, more preferably from 6 to 12. The number of the carbon atoms constituting the alkyloxysulfonyl group is preferably from 1 to 20, more preferably from 1 to 12. The number of the carbon atoms constituting the aryloxysulfonyl group is preferably from 6 to 20, more preferably from 6 to 12. The number of the carbon atoms constituting the alkylsulfonyloxy group is preferably from 1 to 20, more preferably from 1 to 12.

In formula (B), the number (n) of the substituent X in the aromatic ring is 0 or from 1 to 5, preferably from 1 to 3, more preferably 1 or 2.

In case where the number of the substituent in the aromatic ring is 2 or more, then the substituents may be the same or different, or may bond to each other to form a condensed polycyclic compound (e.g., naphthalene group, indene group, indane group, phenanthrene group, quinoline group, isoquinoline group, chromene group, chroman group, phthalazine group, acridine group, indole group, indoline group). Examples of the aromatic acyl group of the formula (B) are mentioned below.

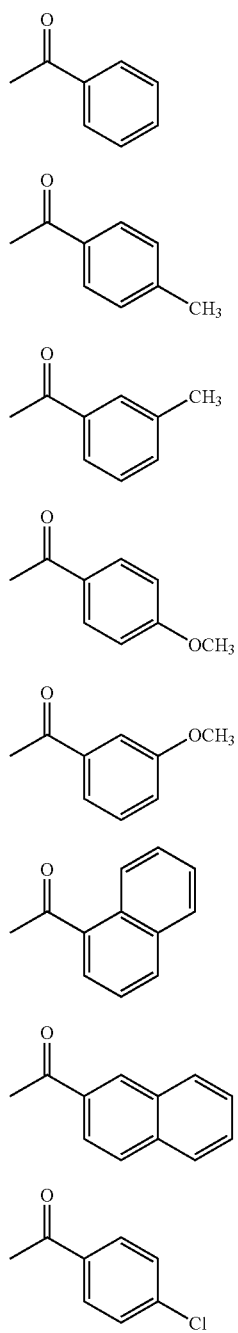
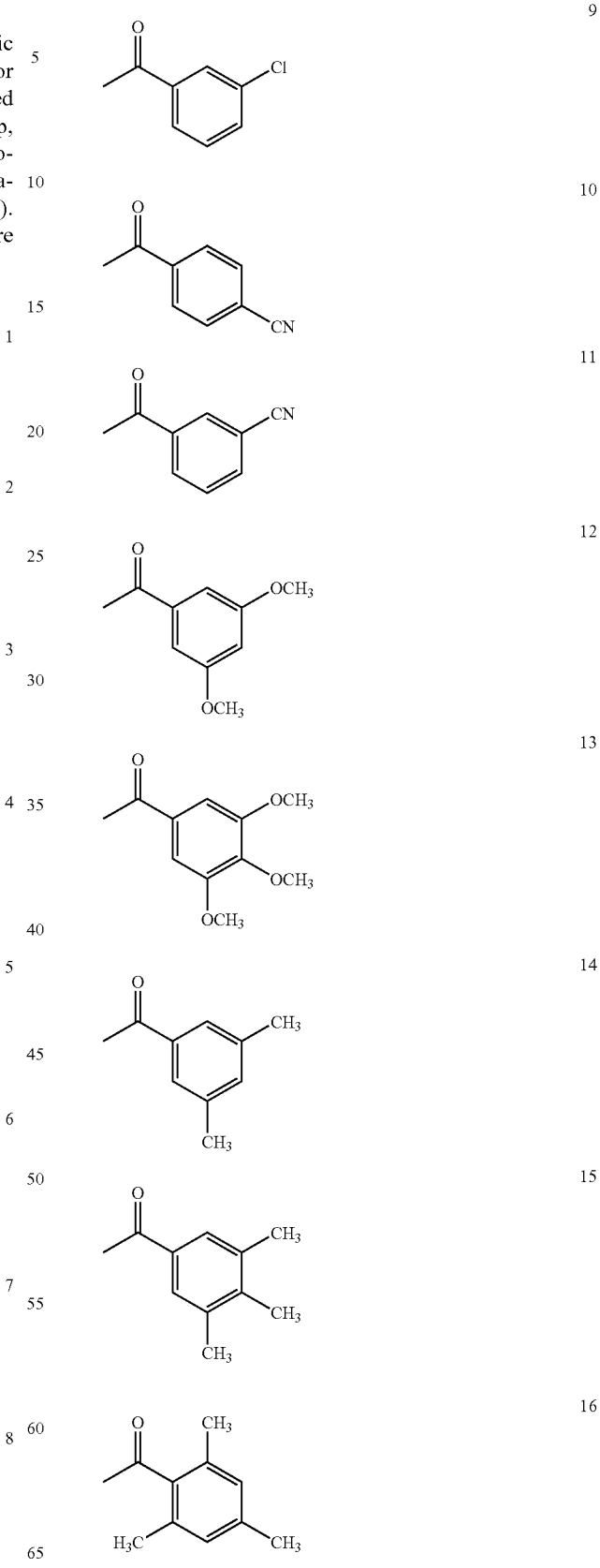

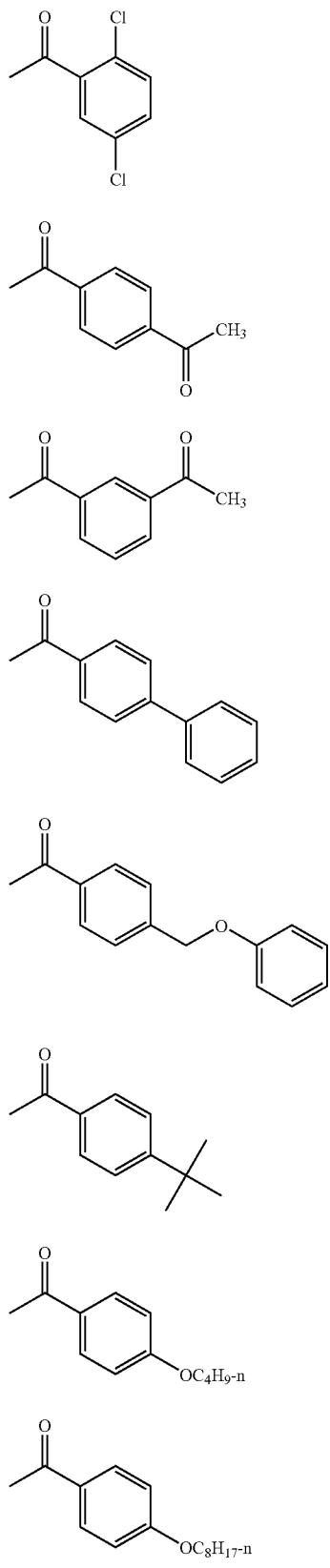
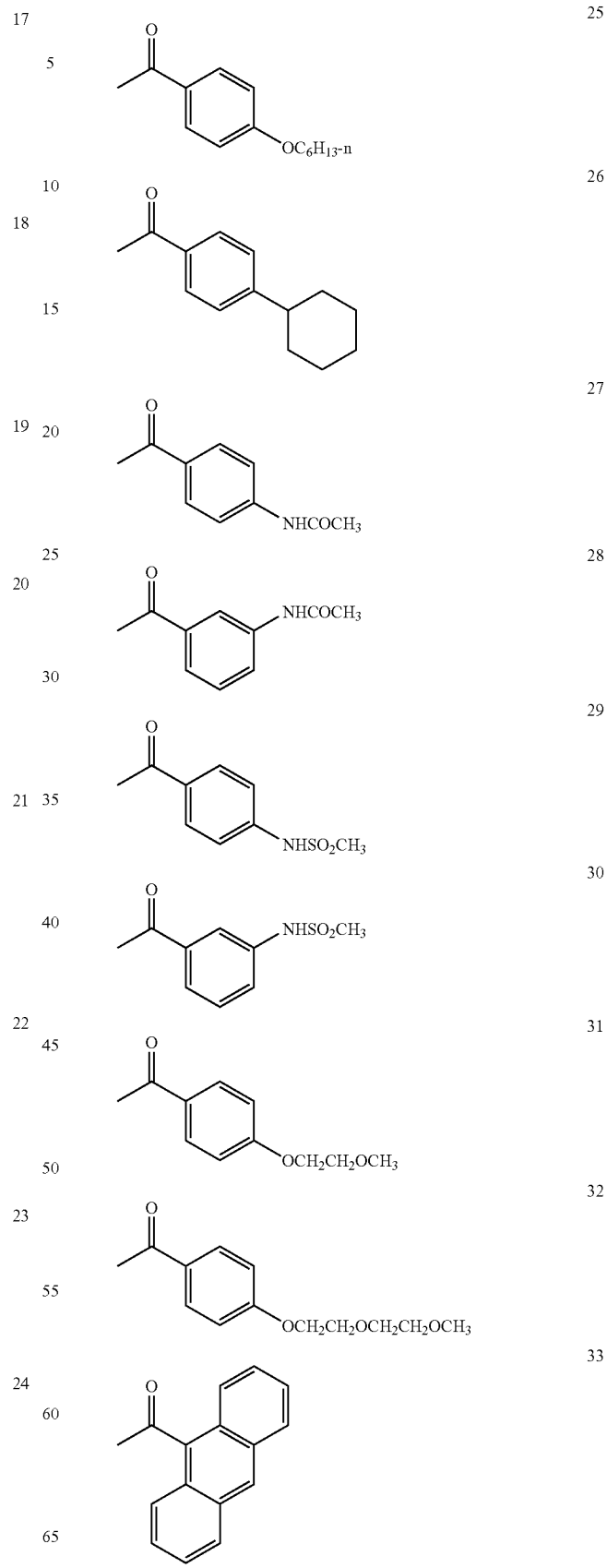

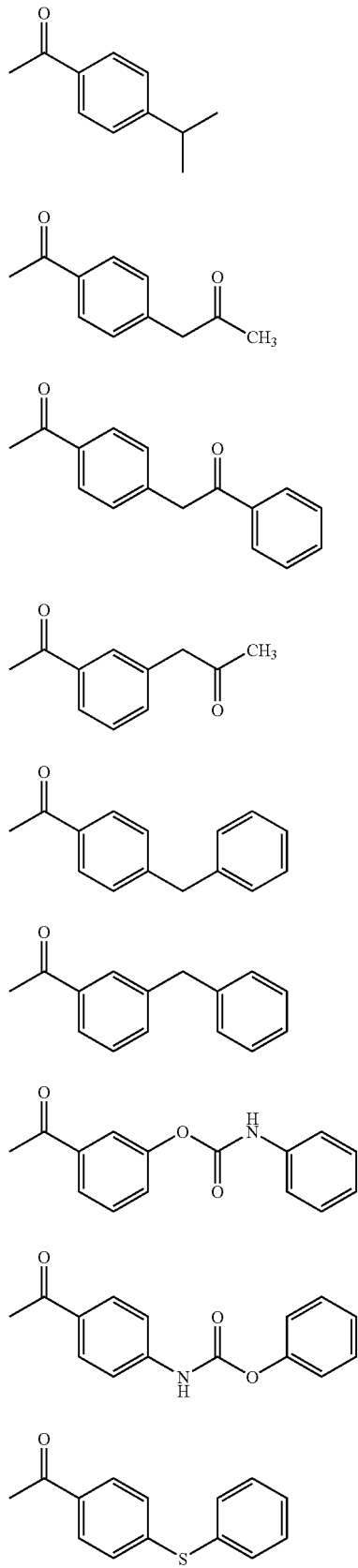
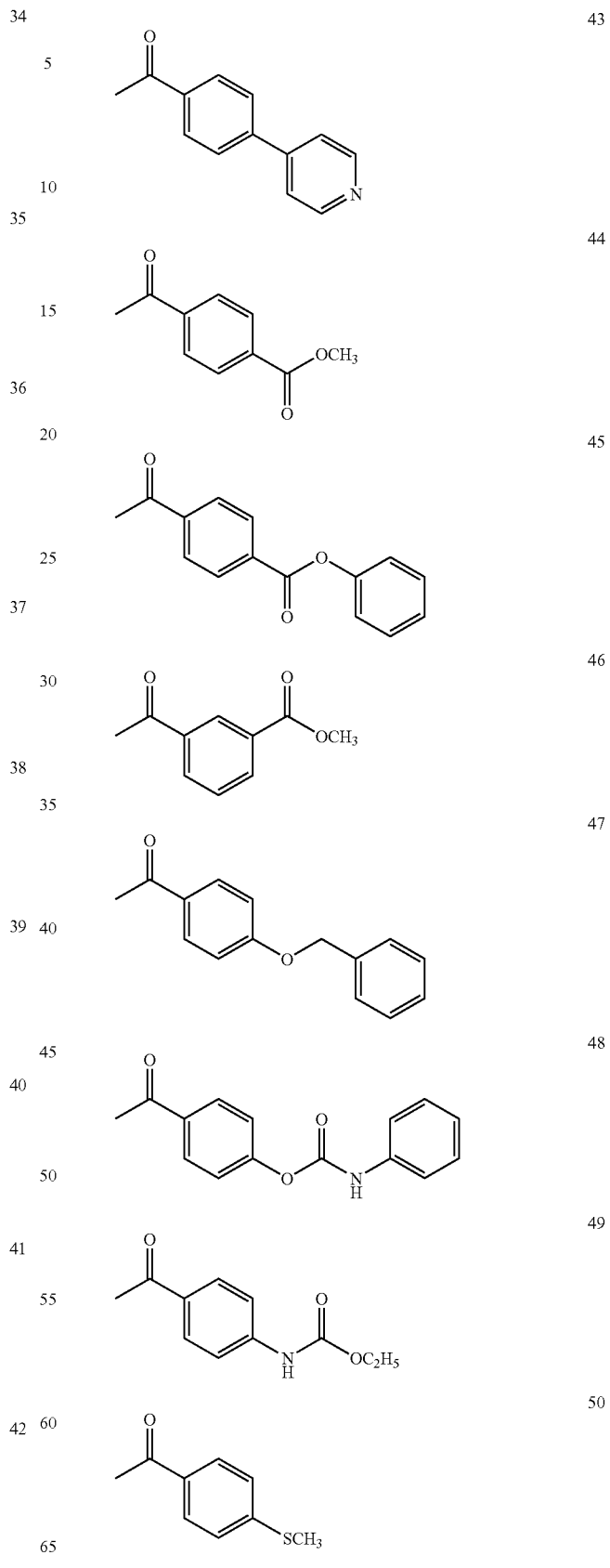

-continued

51

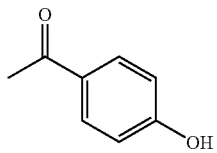

The total substitution degree for acyl group in the mixed ester having an acetyl group and an acyl group of the formula (B) is preferably from 2.0 to 2.90, more preferably from 2.2 to 2.70. The substitution degree for the substituent of the formula (B) is preferably from 0.1 to 1.0, more preferably from 0.3 to 0.9.

The substitution degree for the substituent of the formula (B) preferably satisfies the following, in which the substitution degree at the 2-, 3- and 6-position is represented by $DS_B2$, $DS_B3$ and $DS_B6$, respectively:

$$DS_B6/(DS_B2+DS_B3+DS_B6) \geq 0.60,$$

more preferably $$DS_B6/(DS_B2+DS_B3+DS_B6) \geq 0.70,$$

most preferably $$DS_B6/(DS_B2+DS_B3+DS_B6) \geq 0.80.$$

The cellulose acylate of the biaxial cellulose acylate film in the invention may be produced in the same manner as the cellulose acylate of the above-mentioned low retardation film.

In particular, for obtaining a cellulose-mixed acylate, employable is a method of reacting cellulose with two carboxylic acid anhydrides as an acylating agent, as mixed or in a mode of successive addition; a method of using a mixed acid anhydride of two carboxylic acids (e.g., acetic acid/propionic acid mixed acid anhydride); a method of producing a mixed acid anhydride (e.g., acetic acid/propionic acid mixed anhydride) from a carboxylic acid and an acid anhydride of a different carboxylic acid (e.g., acetic acid and propionic acid anhydride) in the reaction system, and reacting it with cellulose; or a method of once producing a cellulose acylate having a substitution degree of less than 3 and then further acylating the remaining hydroxyl group therein with an acid anhydride or an acid halide.

Preferably, the cellulose acylate of the biaxial cellulose acylate film in the invention has a mass-average degree of polymerization of from 100 to 800, more preferably from 200 to 550. Preferably, the cellulose acylate have a number-average molecular weight of from 70000 to 230000, more preferably from 75000 to 230000, most preferably from 78000 to 120000.

Preferably, the cellulose body for use in the invention has a narrow molecular weight distribution, Mw/Mn in gel permeation chromatography (Mw indicates a mass-average molecular weight, and Mn indicates a number-average molecular weight). Concretely, the value of Mw/Mn is preferably from 1.0 to 5.0, more preferably from 1.5 to 3.5, most preferably from 2.0 to 3.0.

The ratio (Mw/Mn) of the weight-average molecular weight (Mw) to the number-average molecular weight (Mn) is preferably from 2.0 to 5.0, more preferably from 2.0 to 4.0.

Preferably, the biaxial cellulose acylate film in the invention contains a retarder. The retarder for use in the invention is described in detail hereinunder.

Preferably, the retarder in the invention has a molar extinction coefficient within a wavelength range of from 360 nm to 750 nm of at most 1000, as it does not cause any unnecessary coloration of the film. More preferably, the molar extinction coefficient within a wavelength range of from 330 nm to 750 nm is at most 1000.

The molar extinction coefficient may be measured with a commercially-available spectrophotometer (e.g., Shimadzu's UV3400).

The Compounds represented by the following formula (1) are preferable as a retarder for the biaxial cellulose acylate film in the invention $$Ar^1-L^1-Ar^2 \qquad \text{Formula (1)}$$

wherein $Ar^1$ and $Ar^2$ each independently represents an aromatic group.

In the specification, the aromatic group includes an aryl group (aromatic hydrocarbon group), a substituted aryl group, an aromatic heteroring group and a substituted aromatic heteroring group.

An aryl group and a substituted aryl group are preferred to an aromatic heteroring group and a substituted aromatic heteroring group. A heteroring in the aromatic heteroring group is generally unsaturated. The aromatic heteroring is preferably a 5-membered ring, a 6-membered ring or a 7-membered ring, more preferably a 5-membered ring or a 6-membered ring. The aromatic heteroring generally has the largest number of double bonds. As for the hetero atom, a nitrogen atom, an oxygen atom or a sulfur atom is preferred, and a nitrogen atom or a sulfur atom is more preferred.

Preferable examples of the aromatic ring in the aromatic group include a benzene ring, a furan ring, a thiophene ring, a pyrrole ring, an oxazole ring, a thiazole ring, an imidazole ring, a triazole ring, a pyridine ring, a pyrimidine ring and a pyrazine ring. A benzene ring is particularly preferred.

Examples of the substituent of the substituted aryl group and substituted aromatic heteroring group include a halogen atom (F, Cl, Br, I), a hydroxyl group, a carboxyl group, a cyano group, an amino group, an alkylamino group (for example, a methylamino group, an ethylamino group, a butylamino group, a dimethylamino group), a nitro group, a sulfo group, a carbamoyl group, an alkylcarbamoyl group (for example, an N-methylcarbamoyl group, an N-ethylcarbamoyl group, an N,N-dimethylcarbamoyl group), a sulfamoyl group, an alkylsulfamoyl group (for example, an N-methylsulfamoyl group, an N-ethylsulfamoyl group, an N,N-dimethylsulfamoyl group), an ureide group, an alkylureide group (for example, an N-methylureide group, an N,N-dimethylureide group, an N,N,N'-trimethylureide group), an alkyl group (for example, a methyl group, an ethyl group, a propyl group, a butyl group, a pentyl group, a heptyl group, an octyl group, an isopropyl group, a s-butyl group, a tert-amyl group, a cyclohexyl group, a cyclopentyl group), an alkenyl group (for example, a vinyl group, an aryl group, a hexenyl group), an alkynyl group (for example, an ethynyl group, a butynyl group), an acyl group (for example, a formyl group, an acetyl group, a butyryl group, a hexanoyl group, a lauryl group), an acyloxy group (for example, an acetoxy group, a butylyloxy group, a hexanoyloxy group, a lauryloxy group), an alkoxy group (for example, a methoxy group, an ethoxy group, a propoxy group, a butoxy group, a pentyloxy group, a heptyloxy group, an octyloxy group), an aryloxy group (for example, a phenoxy group), an alkoxycarbonyl group (for example, a methoxycarbonyl group, an ethoxycarbonyl group, a propoxycarbonyl group, a butoxycarbonyl group, a pentyloxycarbonyl group, a heptyloxycarbonyl group), an aryloxycarbonyl group (for example, a phenoxycarbonyl group), an alkoxycarbonylamino group (for example, a butoxycarbonylamino group, a hexyloxycarbonylamino group), an alkylthio group (for example, a methylthio group, an ethylthio group, a propylthio group, a butylthio group, a pentylthio group, a heptylthio group, an octylthio group), an arylthio group (for example, phenylthiogroup), an alkylsulfonyl group (for example, a methylsulfonyl group, an ethylsulfonyl group, a propylsulfonyl group, a butylsulfonyl group, a pentylsulfonyl group, a heptylsulfonyl group, an octylsulfonyl group), an amide group (for example, an acetamide group, a butylamide group, a hexylamide group, a laurylamide group) and non-aromatic heterocyclic groups (for example, a morphoryl group, a pyrazinyl group).

Preferable examples of the substituent of the substituted aryl group and substituted aromatic heteroring group include a halogen atom, a cyano group, a carboxyl group, a hydroxyl group, an amino group, an alkyl-substituted amino group, an acyl group, an acyloxy group, an amide group, an alkoxycarbonyl group, an alkoxy group, an alkylthio group and an alkyl group.

An alkyl moiety in the alkylamino group, the alkoxycarbonyl group, the alkoxy group and the alkylthio group and the alkyl group may further have a substituent. Examples of the substituent in the alkyl moiety and the alkyl group include a halogen atom, a hydroxyl, carboxyl, cyano, amino and alkylamino groups, a nitro, sulfo, carbamoyl and alkylcarbamoyl groups, a sulfamoyl and alkylsulfamoyl groups, an ureide and alkylureide groups, an alkenyl group, an alkynyl group, an acyl group, an acyloxy group, an acylamino group, an alkoxy group, an aryloxy group, an alkoxycarbonyl group, an ayrloxycarbonyl group, an alkoxycarbonylamino group, an alkylthio group, an arylthio group, an alkylsulfonyl group, an amide group and non-aromatic heterocyclic groups. As the substituent in the alkyl moiety and the alkyl group, a halogen atom, a hydroxyl, an amino and alkylamino groups, an acyl group, an acyloxy group, an acylamino group, an alkoxycarbonyl group and an alkoxy group are preferred.

In the formula (1), $L^1$ represents a divalent linking group selected from an alkylene group, an alkenylene group, an alkynylene group, —O—, —CO— and groups composed of combinations thereof.

The alkylene group may have a cyclic structure. As a cyclic alkylene group, cicrohexylene is preferred, and 1,4-cyclohexylene is particularly preferred. As a chain alkylene group, a straight-chain alkylene group is preferred to a branched alkylene group.

The number of carbon atoms of an alkylene group is preferably 1-20, more preferably 1-15, further preferably 1-10, furthermore preferably 1-8, most preferably 1-6.

The alkenylene group and the alkynylene group preferably have a chain structure compared with a cyclic structure, more preferably a straight chain structure compared with a branched chain structure.

The number of carbon atoms of the alkenylene group and the alkynylene group is preferably 2-10, more preferably 2-8, further preferably 2-6, furthermore preferably 2-4, most preferably 2 (that is, vinylene or ethynylene). The number of carbon atoms of the arylene group is preferably 6-20, more preferably 6-16, further preferably 6-12.

In the molecular structure of the formula (1), an angle formed by $Ar^1$ and $Ar^2$ across $L^1$ is preferably 140 degrees or more.

As the rod-shaped compound, compounds represented by formula (2) below are more preferred.

$Ar^1$-$L^2$-X-$L^3$-$Ar^2$:                Formula (2)

wherein $Ar^1$ and $Ar^2$ each independently represents an aromatic group. The definition and example for the aromatic group are the same as those for $Ar^1$ and $Ar^2$ of the formula (1).

In the formula (2), $L^2$ and $L^3$ each independently represents a divalent linking group selected from an alkylene group, —O—, —CO— and groups composed of combinations thereof.

The alkylene group preferably has a chain structure compared with a cyclic structure, and more preferably has a straight chain structure compared with a branched chain structure.

The number of carbon atoms of the alkylene group is preferably 1-10, more preferably 1-8, further preferably 1-6, furthermore preferably 1-4, most preferably 1 or 2 (that is, methylene or ethylene).

Particularly preferably, $L^2$ and $L^3$ are —O—CO— or —CO—O—.

In the formula (2), X is 1,4-cyclohexylene, vinylene or ethynylene.

Specific examples of compounds represented by the formula (1) or (2) are shown below. The compounds which can be used in the invention are not limited to these compounds.

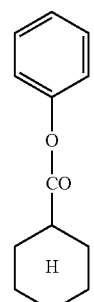

(1)

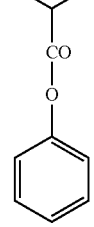

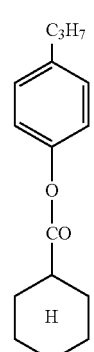

(2)

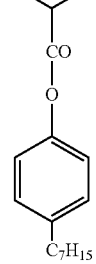

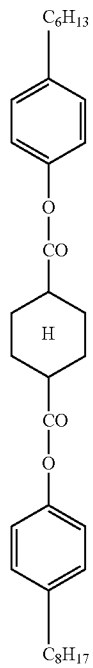
(3)
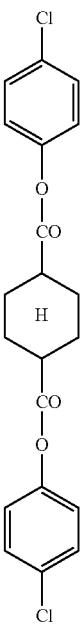
(5)
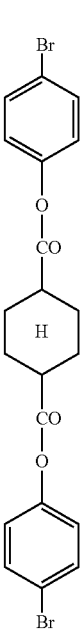
(4)
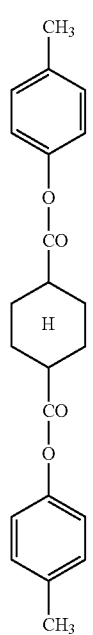
(6)
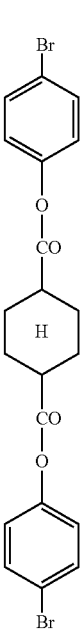

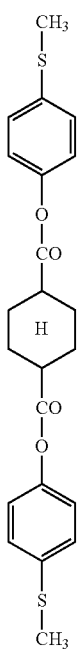
(7)
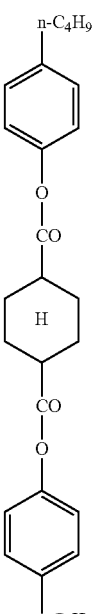
(9)
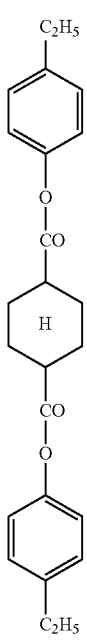
(8)
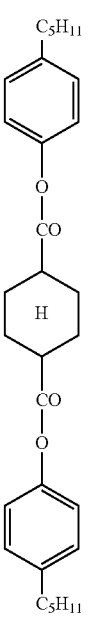
(10)

-continued
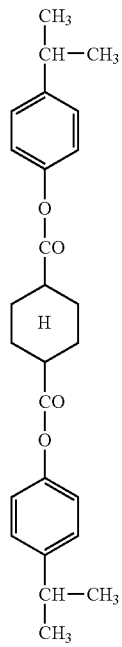
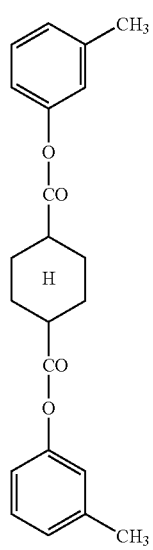
-continued
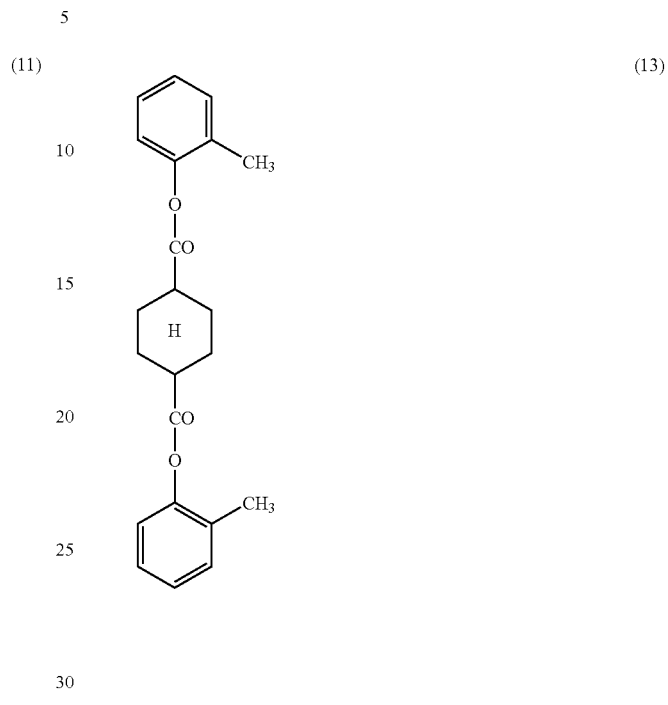
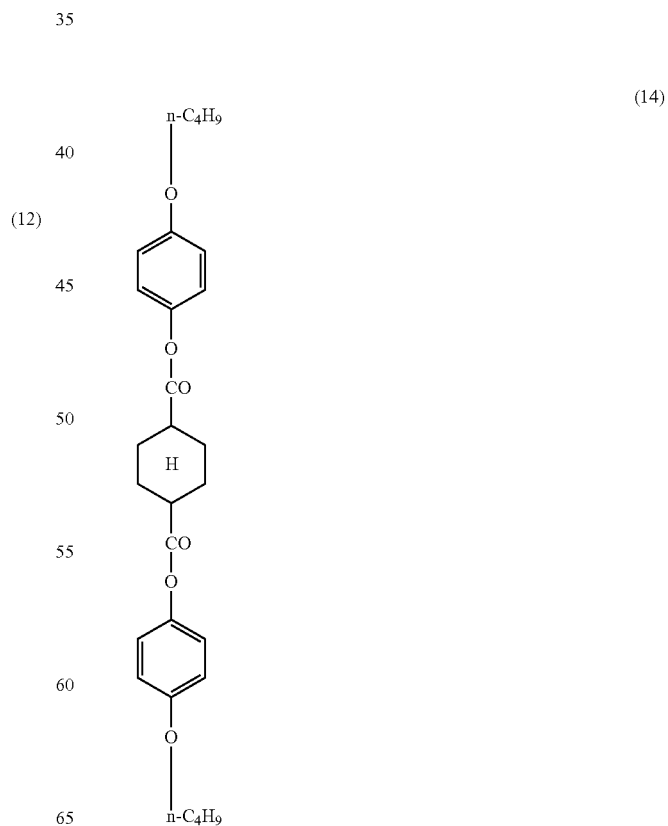

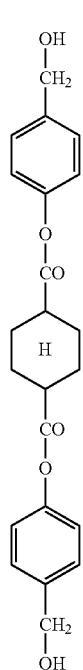
(15)
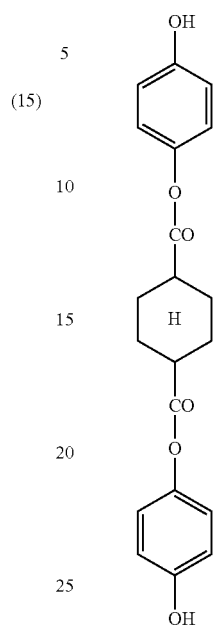
(16)
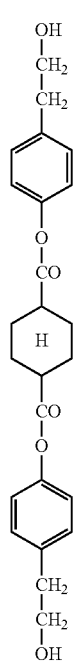
(17)
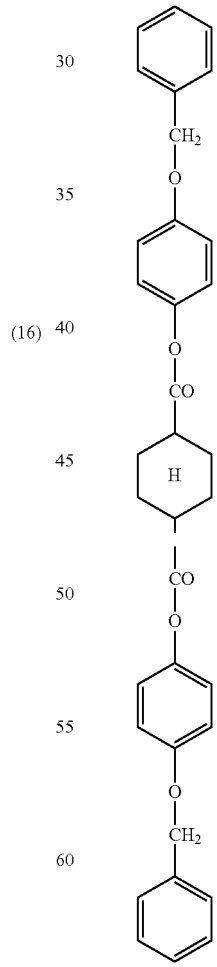
(18)

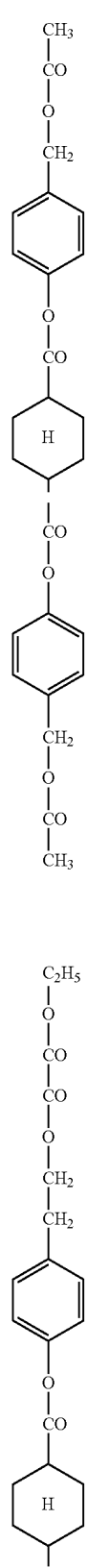
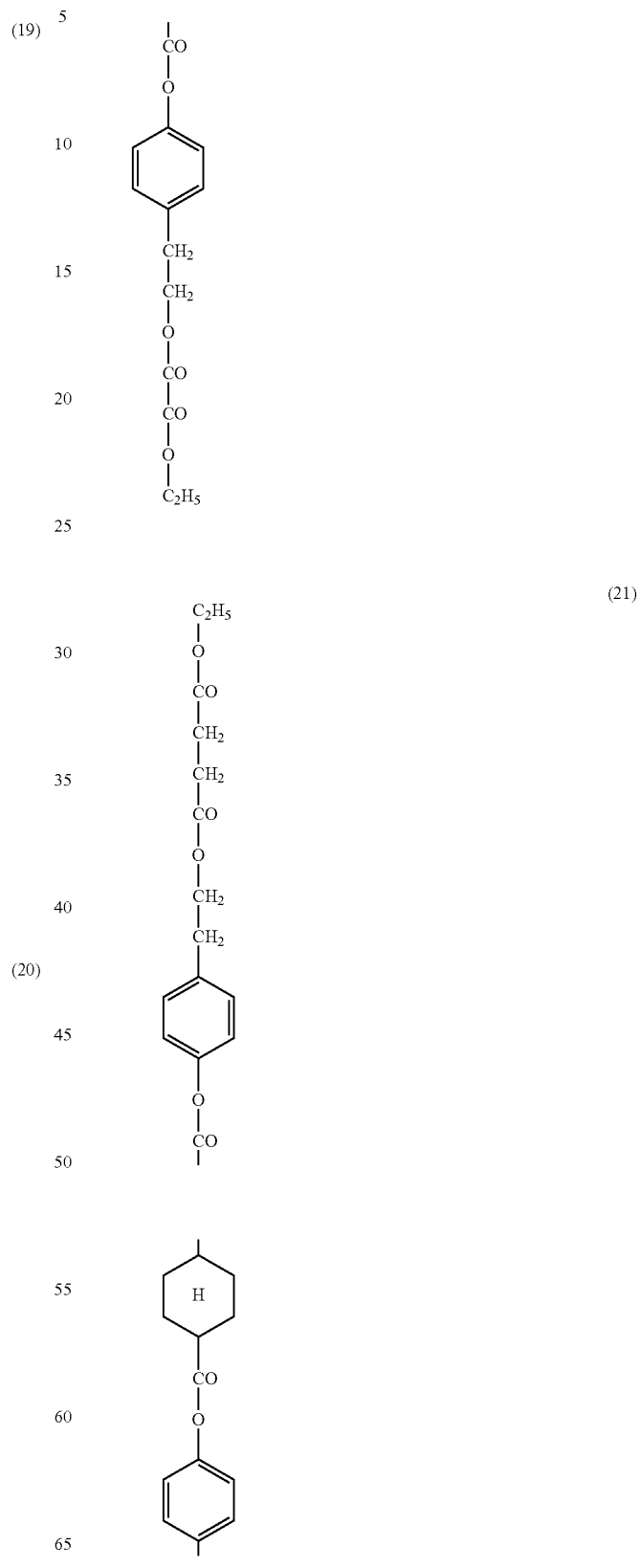

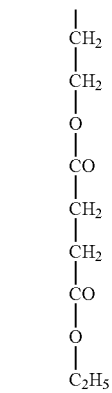
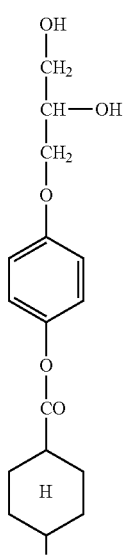
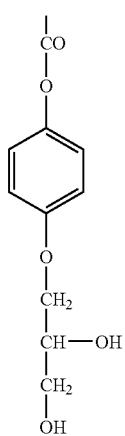
(22)
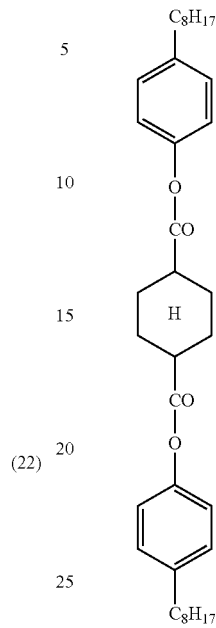
(23)
(24)
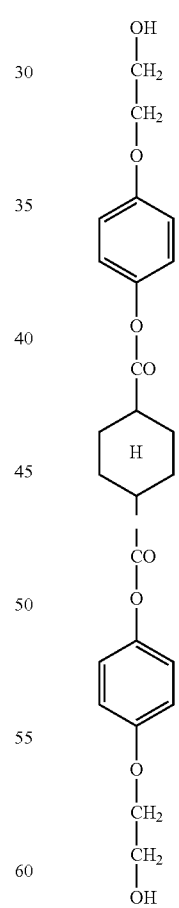

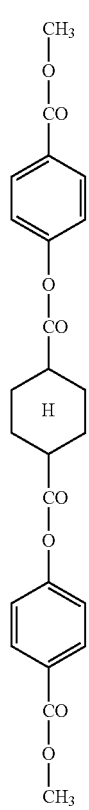
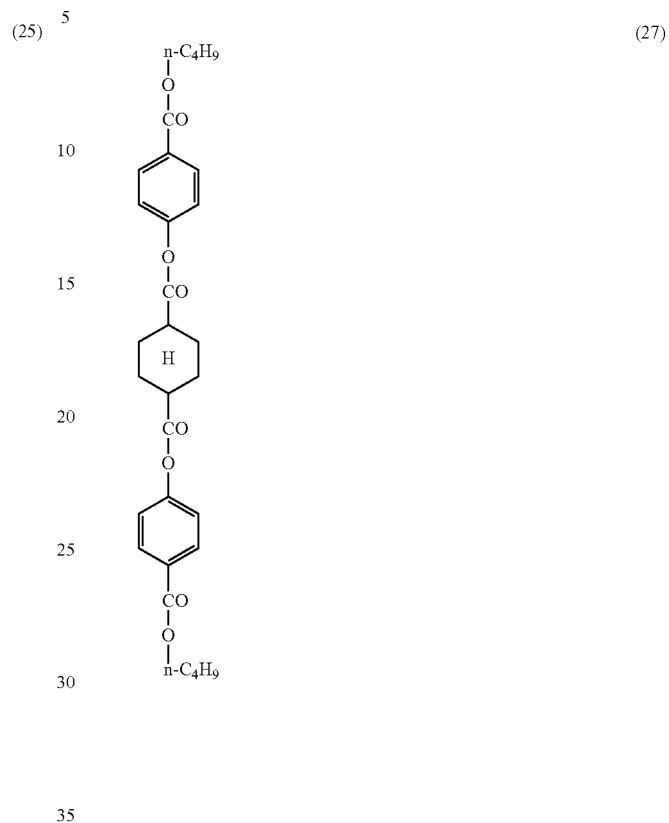
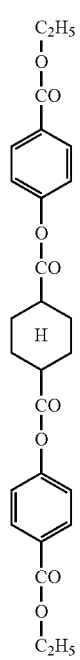
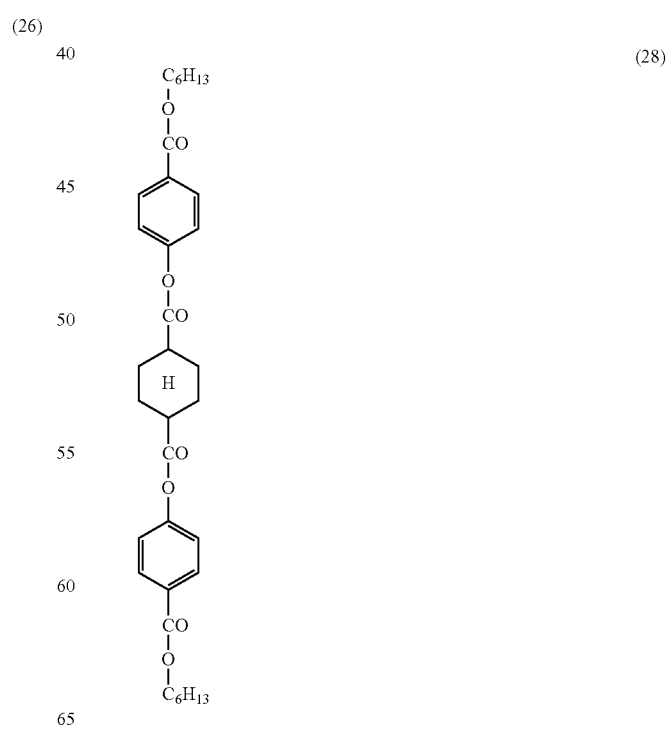

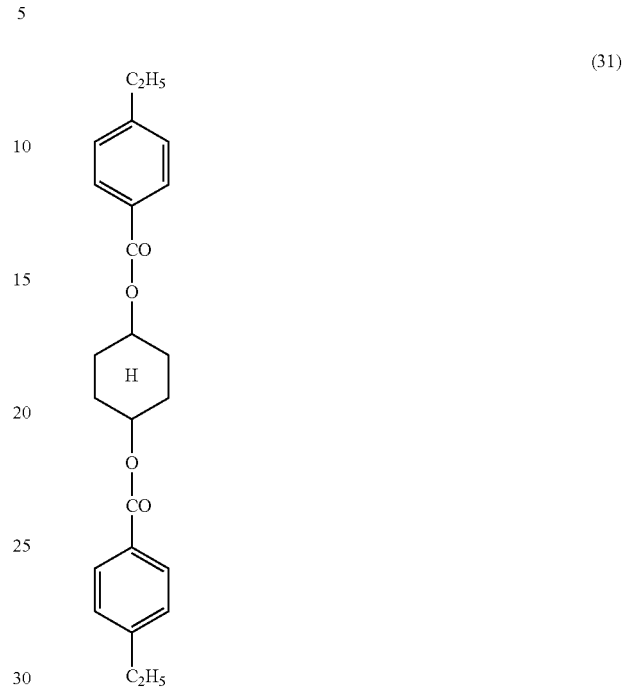
(29)
(30)
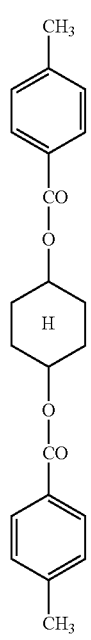
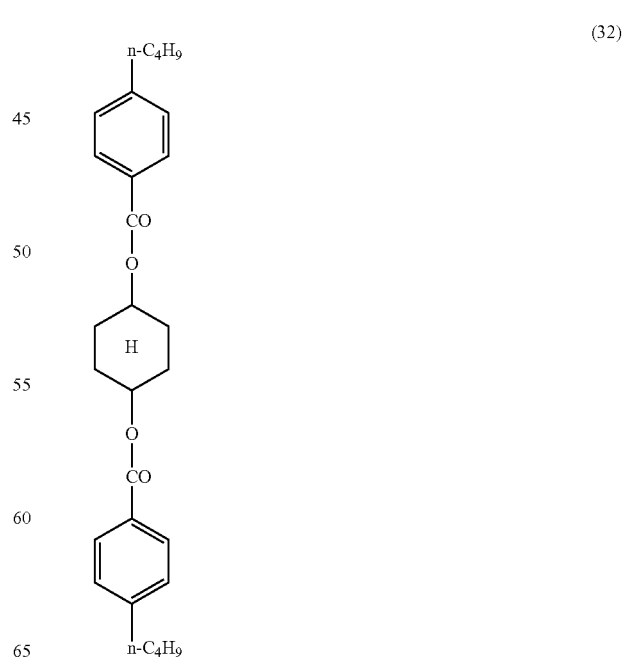
(31)
(32)

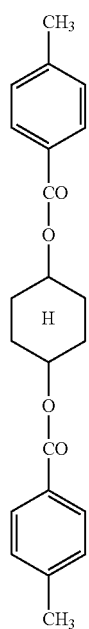
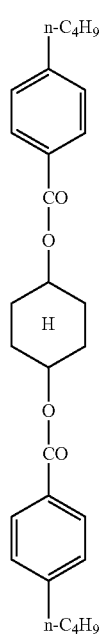
(33)
(34)
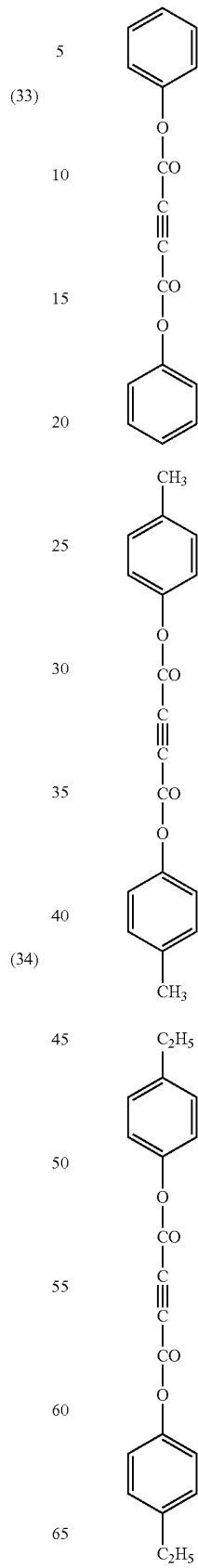
(35)
(36)
(37)
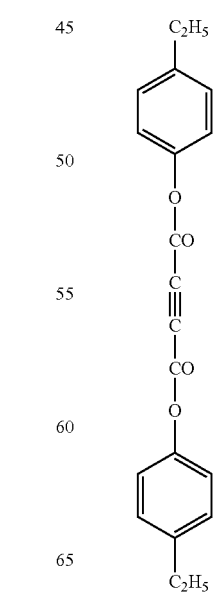

(38)
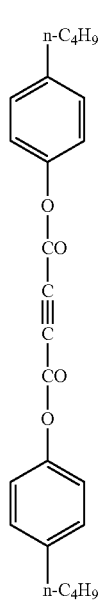
(40)
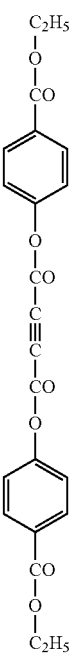
(39)
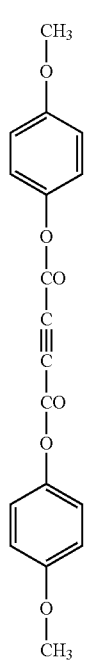
(41)
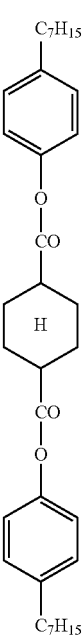

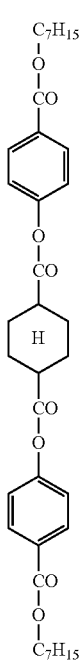
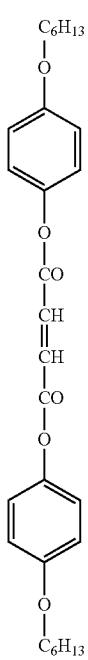
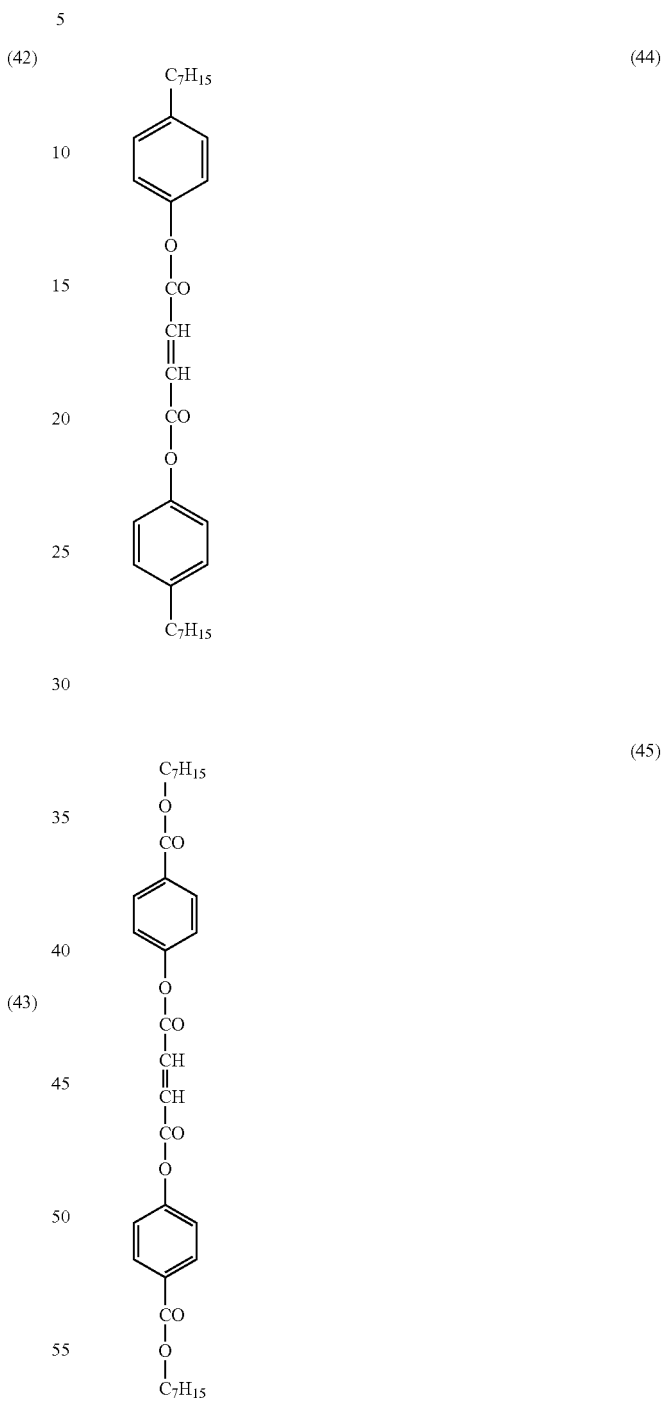
Specific examples (1)-(34), (41) and (42) have 2 asymmetric carbon atoms at 1-and 4-sites of the cyclohexane ring. However, since specific examples (1), (4)-(34), (41) and (42) have a symmetric molecular structure of meso form, there are no optical isomers (optical activity), and only geometric isomers (trans form and cis form) exist. The trans form (1-trans) and cis form (1-cis) of the specific example (1) are shown below.

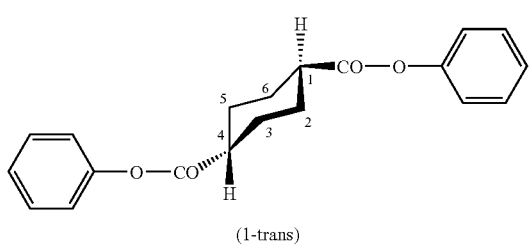

(1-trans)

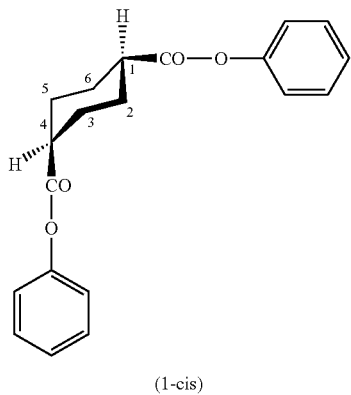

(1-cis)

As described above, the rod-shaped compound preferably has a linear molecular structure. Therefore, a trans form is preferred to a cis form.

Specific examples (2) and (3) have optical isomers in addition to geometric isomers (4 kinds of isomers in total). As for the geometric isomers, similarly, the trans form is preferred to the cis form. There are no particular relative merits between the optical isomers, and any of D-, L- and racemic forms may be used.

As for specific examples (43)-(45), there are the trans form and cis form with respect to the vinylene bond at the center. According to the same reason as described above, the trans form is preferred to the cis form.

Other preferred compounds are shown below:

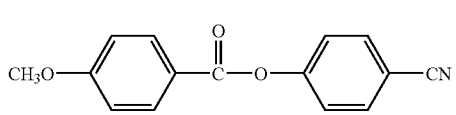 (46)

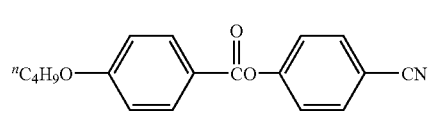 (47)

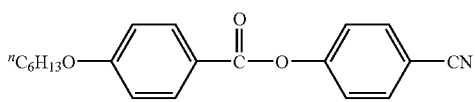 (48)

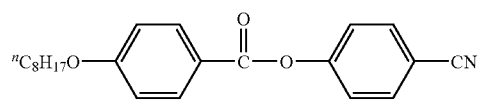 (49)

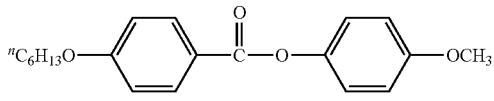 (50)

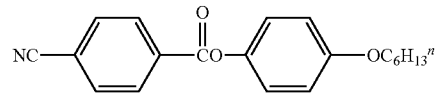 (51)

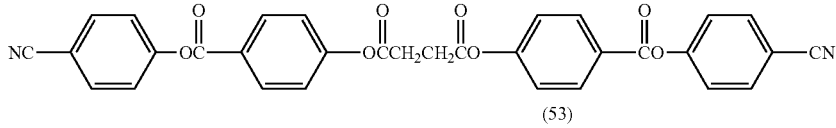 (52)

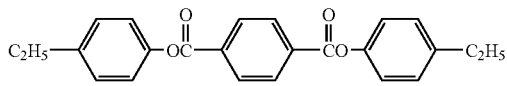 (53)

 (54)

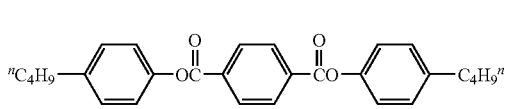 (55)

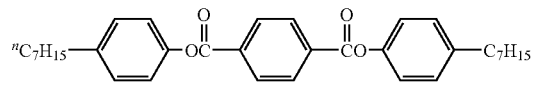 (56)

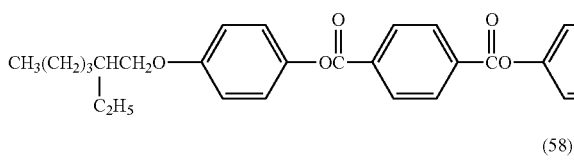 (57)

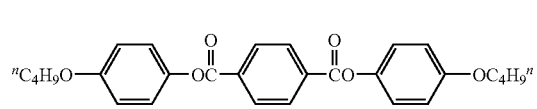

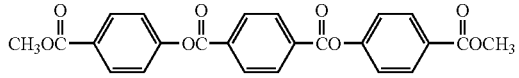 (58)

 (59)

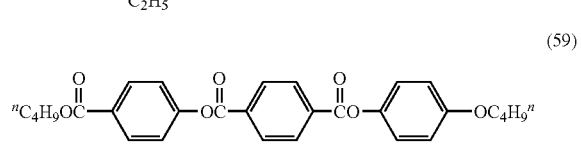

-continued

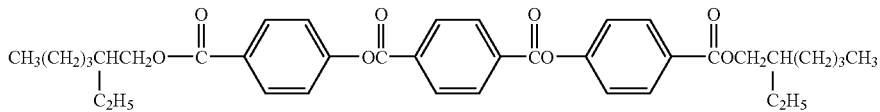 (60)

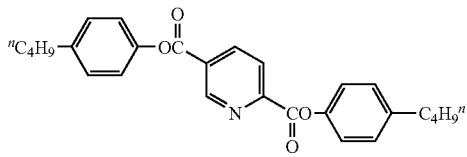 (61)

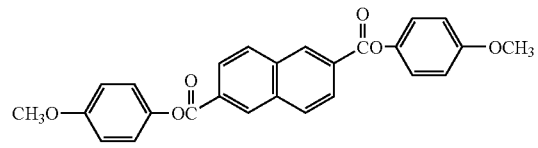 (62)

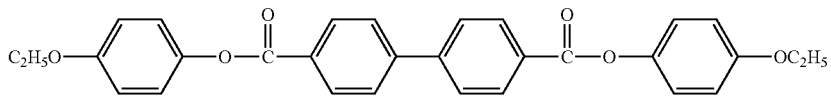 (63)

Two or more different types of rod-shaped compounds, of which the maximum absorption wavelength (λmax) in the UV absorption spectrum of its solution is shorter than 250 nm, may be used, as combined.

The rod-shaped compounds may be produced according to methods described in references. The references are, for example, Mol. Cryst. Liq. Cryst., Vol.53, p. 229 (1979); ibid., Vol. 89, p. 93 (1982); ibid., Vol. 145, p. 11 (1987); ibid., Vol. 170, p. 43 (1989); J. Am. Chem. Soc., Vol. 113, p. 1349 (1991); ibid., Vol. 118, p. 5346 (1996); ibid., Vol. 92, p. 1582 (1970); J. Org. Chem., Vol.40, p. 420 (1975); Tetrahedron, Vol. 48, No. 16, p. 3437 (1992).

The amount of the retarder to be added in the invention is preferably from 1 to 30% by mass, more preferably from 2 to 25% bymass relative to 100 parts bymass of the cellulose acylate.

For adding the retarder, herein employable is a method of dissolving it in an organic solvent such as alcohol, methylene chloride or dioxolan and then adding it to a cellulose acylate solution (dope), or a method of directly adding it to a dope composition.

Production of Stretched Cellulose Acylate Film

The biaxial cellulose acylate film in the invention may be produced in a solution casting method. In a solution casting method, film is produced from a solution (dope) prepared by dissolving cellulose acylate in an organic solvent.

Preferably, the organic solvent contains a solvent selected from ethers having from 3 to 12 carbon atoms, ketones having from 3 to 12 carbon atoms, esters having from 3 to 12 carbon atoms, and a halogenohydrocarbons having from 1 to 6 carbon atoms.

The ethers, ketones and esters may have a cyclic structure. In addition, compounds having two or more functional groups (e.g., —O—, —CO— and —COO—) of the ethers, ketones and esters may also be used as the organic solvent. The organic solvent may have any other functional group such as an alcoholic hydroxyl group. When the organic solvent has two or more functional groups, then it is desirable that the number of the carbon atoms constituting the solvent is within the above-mentioned preferred range of the solvent having either one of the functional groups.

Examples of the ethers having from 3 to 12 carbon atoms include diisopropyl ether, dimethoxymethane, dimethoxyethane, 1,4-dioxane, 1,3-dioxolan, tetrahydrofuran, anisole and phenetole.

Examples of the ketones having from 3 to 12 carbon atoms include acetone, methyl ethyl ketone, diethyl ketone, diisobutyl ketone, cyclohexanone and methylcyclohexanone.

Examples of the esters having from 3 to 12 carbon atoms include ethyl formate, propyl formate, pentyl formate, methyl acetate, ethyl acetate and pentyl acetate.

Examples of the organic solvents having two or more functional groups include 2-ethoxyethyl acetate, 2-methoxyethanol and 2-butoxyethanol.

The number of the carbon atoms constituting the halogenohydrocarbon is preferably 1 or 2, more preferably 1. The halogen of the halogenohydrocarbon is preferably chlorine. The ratio in which the hydrogen atom of the halogenohydrocarbon is substituted with halogen is preferably from 25 to 75 mol %, more preferably from 30 to 70 mol %, even more preferably 35 to 65 mol %, most preferably from40 to 60 mol %. Methylene chloride is the most typical halogenohydrocarbon for use herein.

Two or more organic solvents may be combined for use herein.

The cellulose acylate solution may be prepared in an ordinary method where it is processed at a temperature not lower than 0° C. (room temperature or high temperature). For preparing the cellulose acylate solution, herein employable are a method and an apparatus for dope preparation in an ordinary solution casting process. In such an ordinary process, a halogenohydrocarbon (especially methylene chloride) is preferably used for the organic solvent.

The amount of cellulose acylate in the cellulose acylate solution is so controlled that it is in an amount of from 10 to 40% by mass of the solution obtained. More preferably, the amount of cellulose acylate is from 10 to 30% by mass. To the organic solvent (main solvent), optional additives to be mentioned below may be added.

The solution may be prepared by stirring cellulose acylate and an organic solvent at room temperature (e.g., 0 to 40° C.). A high concentration solution may be stirred under pressure and under heat. Concretely, cellulose acylate and an organic solvent are put into a pressure chamber, sealed up, and heated with stirring under pressure at a temperature not lower than the boiling point of the solvent at atmospheric pressure but up to a temperature at which the solvent does not boil. The heating temperature is preferably 40° C. or higher, more preferably from 60 to 200° C., even more preferably from 80 to 110° C.

The constitutive components may be previously roughly mixed before put into a chamber. They may be put thereinto one after another. The chamber must be so designed that it allows stirring therein. An inert gas such as nitrogen gas may be introduced into the chamber for pressure application thereto. If desired, the solvent in the chamber may be heated so as to increase the vapor pressure therein for pressure application. After the chamber has been sealed up, the constitutive components may be introduced thereinto under pressure.

When it is heated, the chamber is preferably heated from the outside. For example, a jacket-type heater may be used. A plate heater may be disposed outside the chamber, and a liquid may be circulated through a pipe line around it so as to heat the whole of the chamber.

Preferably, a stirring blade is provided inside the chamber, with which the stirring may be attained. Regarding the length thereof, it is desirable that the stirring blade may reach around the wall of the chamber. Also preferably, a scraper is fitted to the tip of the stirring blade, for the purpose of renewing the liquid film on the wall of the chamber.

The chamber may be equipped with instruments such as a pressure gauge and a thermometer. In the chamber, the constitutive components are dissolved in a solvent. The thus-prepared dope is taken out of the chamber after cooled, or after taken out, it is cooled with a heat exchanger or the like.

The cellulose acylate solution may also be prepared according to a cooling dissolution method. In a cooling dissolution method, cellulose acylate may be dissolved in an organic solvent, in which, however, cellulose acylate is difficult to dissolve in an ordinary dissolution method. Even in a solvent in which cellulose acylate can be dissolved in an ordinary dissolution method, the cooling dissolution method is effective in that it may rapidly give a uniform solution.

In a cooling dissolution method, cellulose acylate is first gradually added to an organic solvent with stirring at room temperature. The amount of cellulose acylate is preferably so controlled that it may be in the resulting mixture in an amount of from 10 to 40% by mass. More preferably, the amount of cellulose acylate is from 10 to 30% by mass. Further, additives to be mentioned below may be previously added to the mixture.

Next, the mixture is cooled to −100 to −10° C. (preferably −80 to −10° C., more preferably −50 to −20° C., most preferably −50 to −30° C.). Cooling it may be attained in a dry ice/methanol bath (−75° C.) or in a cooled diethylene glycol solution (−30 to −20° C). Thus cooled, the mixture of cellulose acylate and organic solvent is solidified.

Preferably, the cooling speed is 4° C./min or higher, more preferably 8° C./min or higher, most preferably 12° C./min or higher. The cooling speed is preferably higher, but the theoretical uppermost limit thereof is about 10000° C./sec, the technical uppermost limit thereof is about 1000° C./sec, and the practicable uppermost limit thereof is about 100° C./sec. The cooling speed is a value obtained by dividing the difference between the temperature at the start of the cooling and the temperature at the end thereof, by the time taken from the start of the cooling to the end having the final cooling temperature.

Then, when the cooled mixture is heated preferably at 0 to 200° C. (more preferably at 0 to 150° C., even more preferably at 0 to 120° C., most preferably at 0 to 50° C.), then cellulose acylate dissolves in the organic solvent. Heating it may be attained merely by leaving the mixture at room temperature, but the mixture may be heated in a warm bath. Preferably, the heating speed is 4° C/min or higher, more preferably 8° C./min or higher, most preferably 12° C./min or higher. The heating speed is preferably higher, but the theoretical uppermost limit thereof is about 10000° C./sec, the technical uppermost limit thereof is about 1000° C./sec, and the practicable uppermost limit thereof is about 100° C./sec. The heating speed is a value obtained by dividing the difference between the temperature at the start of the heating and the temperature at the end thereof, by the time taken from the start of the heating to the end having the final heating temperature.

In the manner as above, a uniform solution is obtained. When the dissolution is insufficient, then the operation of cooling and heating may be repeated. The matter as to whether the dissolution is sufficient or not may be judged merely by visually observing the outward condition of the solution.

In the cooling dissolution method, a closed container is preferably used for the purpose of preventing the solution from being contaminated with water owing to dew formation during cooling. In the cooling and heating operation, when the cooling is attained under pressure and the heating is attained under reduced pressure, then the dissolution time may be shortened. For such pressure cooling and reduced pressure heating, a pressure container is preferably used.

When cellulose acetate (degree of acetylation: 60.9%, viscosity-average degree of polymerization: 299) is dissolved in methyl acetate according to a cooling dissolution method and when the resulting 20 mas. % solution is analyzed with a differential scanning calorimeter (DSC), then a pseudo-phase transition point between a sol state and a gel state is seen at around 33° C., and the solution is in a uniform gel state at a temperature lower than it. Accordingly, it is desirable that the solution is kept at a temperature not lower than the pseudo-phase transition temperature, preferably at a temperature higher by about 10° C. than the gel phase transition temperature. However, the pseudo-phase transition temperature varies depending on the degree of acetylation and the viscosity-average degree of polymerization of cellulose acetate, the solution concentration and the organic solvent used.

From the thus-prepared cellulose acylate solution (dope), produced is a cellulose acylate film in a solution casting method. Preferably a retarder is added to the dope. The dope is cast onto a drum or a band, on which the solvent is evaporated away to form a film thereon. Before cast, the concentration of the dope is preferably so controlled that the solid content of the dope could be from 18 to 35%. Preferably, the surface of the drum or the band is mirror-finished. Also preferably, the dope is cast onto the drum or the band having a surface temperature not higher than 10° C.

A mode of drying in the solution casting method is described, for example, in U.S. Pat. No. 2,336,310, U.S. Pat. No. 2,367,603, U.S. Pat. No. 2,492,078, U.S. Pat. No. 2,492,977, U.S. Pat. No. 2,492,978, U.S. Pat. No. 2,607,704, U.S. Pat. No. 2,739,069 and U.S. Pat. No. 2,739,070; BP 640731 and BP 736892; JP-B-45-4554, JP-B-49-5614; JP-A-60-176834, JP-A-60-203430 and JP-A-62-115035. Drying on a band or a drum may be attained by applying thereto a blow of an inert gas such as air or nitrogen.

The obtained film may be peeled off from the drum or the band, and may be dried with hot air having a varying temperature of from 100° C. to 160° C., whereby the residual solvent may be evaporated away. The method is described in JP-B-5-17844. According to the method, the time from the casting to the peeling may be shortened. For carrying out the method, the dope must be gelled at the surface temperature of the drum or the band on which the dope is cast.

The prepared cellulose acylate solution (dope) may be cast in two or more layers for film formation. In this case, it is desirable that the cellulose acylate film is formed according to a solution casting method. The dope is cast onto a drum or a band, and then the solvent is evaporated away to form a film thereon. Before cast, the dope concentration is preferably so controlled that the solid content of the dope could be from 10 to 40% by mass. Also preferably, the surface of the drum or the band is mirror-finished.

When two or more layers of plural cellulose acylate solutions are formed by casting, then plural cellulose acylate solution may be cast. Through plural casting ports spaced from each other in the machine direction of the support, cellulose acylate-containing solutions are separately cast onto the support and laminated thereon to form a film. For this, for example, methods described in JP-A-61-158414, JP-A-1-122419 and JP-A-11-198285 may be referred to. When cellulose acylate solutions are cast through two casting ports, then a film may also be produced. For this, for example, methods described in JP-B-60-27562; JP-A-61-94724, JP-A-61-947245, JP-A-61-104813, JP-A-61-158413 and JP-A-6-134933 may be referred to. Also employable herein is a casting method described in JP-A-56-162617, in which a high viscosity cellulose acylate solution flow is enveloped with a low viscosity cellulose acylate solution, and the high viscosity and low viscosity cellulose acylate solutions are co-extruded simultaneously to give a cellulose acylate film.

Two casting ports may be used as follows: A film is formed on a support through the first casting port, and this is peeled off. On the surface of the film having been in contact with the support, a second dope is cast via a second casting port to form a second film thereon. For this, for example, referred to is a method described in JP-B-44-20235.

The same cellulose acylate solution may be cast, or two or more different cellulose acylate solutions may be cast. In order to make plural cellulose acylate layers have different functions, different cellulose acylate solutions corresponding to the intended functions may be extruded out via the respective casting ports. In addition, the cellulose acylate solution in the invention may be co-cast with any other functional layers (e.g., adhesive layer, dye layer, antistatic layer, antihalation layer, UV absorbent layer, polarizing layer).

A conventional single-layer solution must be a high concentration and high viscosity cellulose acylate solution and it must be extruded out in order that the formed film could have a necessary thickness. In this case, the cellulose acylate solution is poorly stable and may often gives solids, therefore causing some problems of unfavorable fish dyes and surface roughness. To solve the problems, plural cellulose acylate solutions may be cast via different casting ports, whereby high viscosity solutions may be co-extruded onto a support. As a result, films of better surface smoothness and better surface profile can be obtained, and in addition, drying load may be reduced since such thick cellulose acylate solutions are used, and the production speed of films may be more increased.

Degradation inhibitors (e.g., antioxidant, peroxide decomposer, radical inhibitor, metal inactivator, acid scavenger, amine) may be added to the cellulose acylate film. The degradation inhibitors are described, for example, in JP-A-3-199201, JP-A-5-1907073, JP-A-5-194789. JP-A-5-271471, JP-A-6-107854. Preferably, the amount of the degradation inhibitor to be added is from 0.01 to 1% by mass, more preferably from 0.01 to 0.2% by mass of the solution (dope). When the amount thereof is 0.01% by mass or more, then the degradation inhibitor may favorably exhibit a sufficient effect; and when it is 1% by mass or less, then there may hardly occur a problem of bleeding out of the degradation inhibitor onto the film surface. Especially preferred examples of the degradation inhibitor are butylated hydroxytoluene (BHT) and tribenzylamine (TBA).

The process from casting to drying may be attained in air or in an inert gas atmosphere such as nitrogen gas. The winder to be used in producing the cellulose acylate film in the invention may be any one generally used in the art. For example, the film may be wound up in various winding methods of, for example, a constant-tension method, a constant-torque method, a taper-tension method or a programmed-tension control method in which the internal stress is kept constant.

Stretching Treatment

The biaxial cellulose acylate film in the invention is preferably stretched. Preferably, the cellulose acylate film is stretched in the cross direction thereof.

A method of cross-direction stretching is described, for example, in JP-A-62-115035, JP-A-4-152125, JP-A-4-284211, JP-A-4-298310, JP-A-11-48271.

The film may be stretched at room temperature or under heat. The film may be stretched while it is dried, and its stretching is especially effective while the solvent remains therein. For cross-direction stretching, the film is conveyed while kept stretched with a tenter in the cross direction thereof, and it may be stretched by gradually broadening the width of the tenter. After dried, the film may be stretched with a stretcher (preferably monoaxially with a long stretcher).

The draw ratio by stretching of the film (the ratio of the stretched film to the unstretched film) is preferably from 1% to 200%, more preferably from 5% to 150%. Preferably the film is stretched by from 1% to 200%, more preferably from 5% to 150% in the cross direction. The stretching speed is preferably from 1%/min to 100%/min, more preferably from 5%/min to 80%/min, most preferably from 10%/min to 60%/min.

It is desirable that the stretched cellulose acylate film in the invention is, after stretched to the maximum draw ratio, further processed in a step of keeping it at a lower draw ratio than the maximum draw ratio for a predetermined period of time (relaxation step). The draw ratio in the relaxation step is preferably from 50% to 99% of the maximum draw ratio, more preferably from 70% to 97%, most preferably from 90% to 95%. Preferably, the time for the relaxation step is from 1 second to 120 seconds, more preferably from 5 seconds to 100 seconds.

When the draw ratio and the time in the relaxation step are made to fall within the range as above, then the degree of alignment of the retarder is increased and a cellulose acylate film having a high retardation, of which the retardation fluctuation in the in-plane direction and in the thickness direction is small, is thereby obtained.

Saponification Treatment

The biaxial cellulose acylate film in the invention may be alkali-saponified and its adhesiveness to a material of the polarizing plate such as polyvinyl alcohol may be thereby enhanced, and the thus-saponified film is preferably used as a protective film.

Constitution 2

The members to be used in Constitution 2 of the liquid crystal display device of the invention are described.

(Plate A)

For the plate A in the invention, for example, preferred is a modified polycarbonate film as in WO 2003/032060.

For the plate A in the invention, also preferred is a norbornene-based film as in JP-A-2003-255102.

(Plate C)

For the plate C in the invention, preferably used is a biaxially-stretched polymer film as in WO 2003/032060 or a polymerizing liquid crystal layer as in JP-A-2004-326089.

Constitution 3

The members to be used in Constitution 3 of the liquid crystal display device of the invention are described.

(Optical Compensatory Film A)

The optical compensatory film A in the invention satisfies the relation of the formulae (9) to (12). For example, a modified polycarbonate film as in WO 2003/032060 or a norbornene-based film as in JP-A-2003-255102 may be stretched, and it may be preferably used for the optical compensatory film A in the invention.

The optical compensatory film A in the invention may serve also as a polarizer-protective film.

Norbornene resin preferably used for the optical compensatory film A in the invention is described in detail.

Thermoplastic norbornene resin preferably used for the optical compensatory film A in the invention (this may be referred to as "resin in the invention") is a copolymer that comprises a structural unit a of the following formula (1) and a structural unit b of the following formula (2) and optionally contains any other structural unit.

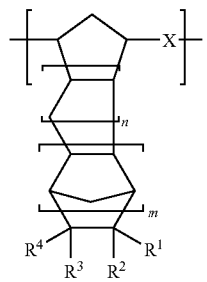

Formula (1)

wherein X and $R^1$ to $R^4$ have the same meanings as above; at least one of $R^1$ to $R^4$ is a group of the following formula (1-1) and/or (1-2); n is 0 or 1; m is 0 or an integer of 1 or more, preferably from 0 to 3, more preferably from 0 to 2, even more preferably 0.

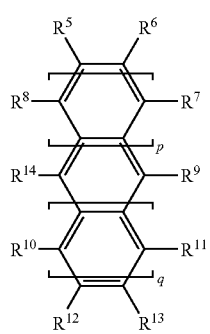

Formula (1-1)

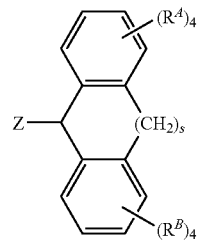

Formula (1-2)

In formula (1-1) and formula (1-2), $R^5$ to $R^{14}$, Z, $R^A$, $R^B$, p and q have the same meanings as above; s is 0 or an integer of 1 or more, preferably from 0 to 3, more preferably from 0 to 2, even more preferably 0.

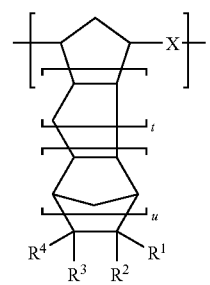

Formula (2)

In the formula, X and $R^1$ to $R^4$ have the same meanings as above; t is 0 or 1; u is 0 or an integer of 1 or more, preferably from 0 to 3, more preferably from 0 to 2, even more preferably 1. However, in formula (2), $R^1$ to $R^4$ are not a group of the formula (1-1) or formula (1-2).

In formulae (1), (1-1), (1-2) and (2), $R^1$ to $R^{14}$, Z, $R^A$ and $R^B$ each represent a hydrogen atom; a halogen atom; a substituted or unsubstituted hydrocarbon group having from 1 to 30 carbon atoms, optionally having a linking group containing a oxygen, nitrogen, sulfur or silicon atom; or a polar group. These atoms and groups are described. The halogen atom includes a fluorine atom, a chlorine atom and a bromine atom. The hydrocarbon group having from 1 to 30 carbon atoms includes, for example, an alkyl group such as a methyl group, an ethyl group, a propyl group; a cycloalkyl group such as a cyclopentyl group, a cyclohexyl group; an alkenyl group such as a vinyl group, an allyl group, a propenyl group; and an aromatic group such as a phenyl group, a biphenyl group, a naphthyl group, an anthracenyl group. The hydrocarbon group may be substituted, and the substituent includes, for example, a halogen atom such as a fluorine, chlorine or bromine atom, and a phenylsulfonyl group.

The substituted or unsubstituted hydrocarbon group may directly bond to the cyclic structure, or may bond thereto via a linking group (linkage). The linking group includes, for example, a divalent hydrocarbon group having from 1 to 10 carbon atoms (e.g., alkylene group of —$(CH_2)_m$— wherein m is an integer of from 1 to 10); a linking group containing an oxygen, nitrogen, sulfur or silicon atom (e.g., carbonyl group (—CO—), carbonyloxy group (—COO—), oxycarbonyl group (—OCO—), sulfonyl group (—$SO_2$—), ether bond (—O—), thioether bond (—S—), imino group (—NH—), amido bond (—NHCO—, —CONH—), siloxane bond (—OSi(R₂)— wherein R is an alkyl group such as methyl or ethyl); or a combination of two or more of these.

The polar group includes, for example, a hydroxyl group, an alkoxy group having from 1 to 10 carbon atoms, an acyloxy group, an alkoxycarbonyl group, an aryloxycarbonyl group, a cyano group, an amido group, an imido ring-containing group, a triorganosiloxy group, a triorganosilyl group, an amino group, an acyl group, an alkoxysilyl group, a sulfonyl-containing group, and a carboxyl group. More concretely, the alkoxy group includes, for example, a methoxy group, an ethoxy group; the acyloxy group includes, for example, an alkylcarbonyloxy group such as an acetoxy group, a propionyloxy group, and an arylcarbonyloxy group such as a benzoyloxy group; the alkoxycarbonyl group includes, for example, a methoxycarbonyl group, an ethoxycarbonyl group; the aryloxycarbonyl group includes, for example, a phenoxycarbonyl group, a naphthyloxycarbonyl group, a fluorenyloxycarbonyl group, a biphenylyloxycarbonyl group; the triorganosiloxy group includes, for example, a trimethylsiloxy group, a triethylsiloxy group; the triorganosilyl group includes, for example, a trimethylsilyl group, a triethylsilyl group; the amino group includes, for example, a primary amino group; the alkoxysilyl group includes, for example, a trimethoxysilyl group, a triethoxysilyl group.

The thermoplastic norbornene resin for use in the optical compensatory film A in the invention is a copolymer that comprises, as the indispensable structural units thereof, a structural unit a of the formula (1) and a structural unit b of the formula (2), and the copolymer may be obtained through ring-cleavage copolymerization of a monomer mixture that comprises at least one monomer of the following formula (3) (hereinafter this is referred to as "specific monomer A") and at least one monomer of the following formula (4) (hereinafter this is referred to as "specific monomer B").

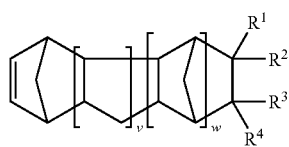

Formula (3)

wherein $R^1$ to $R^4$ have the same meanings as in formula (1); at least one of $R^1$ to $R^4$ is a group of the formula (1-1) and/or (1-2); v is 0 or 1; w is 0 or an integer of 1 or more, preferably from 0 to 3, more preferably from 0 to 2, even more preferably 0.

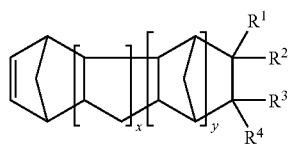

Formula (4)

wherein $R^1$ to $R^4$ have the same meanings as in formula (1), but excepting the group of the formula (1-1) or (1-2); x is 0 or 1; y is 0 or an integer of 1 or more, preferably from 0 to 3, more preferably from 0 to 2, even more preferably 1.

The content of the structural unit a in the resin of the invention is from 5 to 95% by weight, preferably from 10 to 90% by weight, more preferably from 20 to 80% by weight. When the content of the structural unit a is smaller than 5% by weight, then an optical film exhibiting positive wavelength dependency could not be obtained. When the content of the structural unit a is more than 95% by weight, then an optical film exhibiting positive wavelength dependency could not be obtained either. More concrete examples of the thermoplastic norbornene resin for use in the invention are the following polymers (1) to (3).

(1) Ring-cleaved copolymer of specific monomer A and specific monomer B.
(2) Ring-cleaved copolymer of specific monomer A and specific monomer B and some other copolymerizing monomer.
(3) Hydrogenated product of the ring-cleaved copolymer (1) or (2).

<Specific Monomer A>

Examples of the specific monomer A are mentioned below, to which, however, the invention should not be limited.

5-Benzoyloxy-5-methylbicyclo[2.2.1]hept-2-ene,
5-benzoyloxybicyclo[2.2.1]hept-2-ene,
5-(1-naphthylcarbonyloxy)-5-methylbicyclo[2.2.1]hept-2-ene,
5-(1-naphthylcarbonyloxy)bicyclo[2.2.1]hept-2-ene,
5-(2-naphthylcarbonyloxy)-5-methylbicyclo[2.2.1]hept-2-ene,
5-(2-naphthylcarbonyloxy)bicyclo[2.2.1]hept-2-ene,
5-(4-biphenylcarbonyloxy)-5-methylbicyclo[2.2.1]hept-2-ene,
5-(4-biphenylcarbonyloxy)bicyclo[2.2.1]hept-2-ene,
5-(2-biphenylcarbonyloxy)-5-methylbicyclo[2.2.1]hept-2-ene,
5-(2-biphenylcarbonyloxy)bicyclo[2.2.1]hept-2-ene,
5-(3-biphenylcarbonyloxy)-5-methylbicyclo[2.2.1]hept-2-ene,
5-(3-biphenylcarbonyloxy)bicyclo[2.2.1]hept-2-ene,
5-(9-fluorenecarbonyloxy)-5-methylbicyclo[2.2.1]hept-2-ene,
5-(9-fluorenecarbonyloxy)bicyclo[2.2.1]hept-2-ene,
5-(2-fluorenecarbonyloxy)bicyclo[2.2.1]hept-2-ene,
5-(2-fluorenecarbonyloxy)-5-methylbicyclo[2.2.1]hept-2-ene,
5-(9-anthracenecarbonyloxy)-5-methylbicyclo[2.2.1]hept-2-ene,
5-(9-anthracenecarbonyloxy)bicyclo[2.2.1]hept-2-ene,
8-benzoyloxy-8-methyltetracyclo[4.4.0.1$^{2,5}$.1$^{7,10}$]-3-dodecene,
8-benzoyloxytetracyclo[4.4.0.1$^{2,5}$.1$^{7,10}$]-3-dodecene,
8-(1-naphthylcarbonyloxy)-8-methyltetracyclo-[4.4.0.1$^{2,5}$.1$^{7,10}$]-3-dodecene,
8-(1-naphthylcarbonyloxy)tetracyclo[4.4.0.1$^{2,5}$.1$^{7,10}$]-3-dodecene, 8-(2-naphthylcarbonyloxy)-8-methyltetracyclo-[4.4.0.1$^{2,5}$.1$^{7,10}$]-3-dodecene,
8-(2-naphthylcarbonyloxy)tetracyclo[4.4.0.1$^{2,5}$.1$^{7,10}$]-3-dodecene, 8-(4-biphenylcarbonyloxy)-8-methyltetracyclo-[4.4.0.1$^{2,5}$.1$^{7,10}$]-3-dodecene,
8-(4-biphenylcarbonyloxy)tetracyclo[4.4.0.1$^{2,5}$.1$^{7,10}$]-3-dodecene, 8-(3-biphenylcarbonyloxy)-8-methyltetracyclo-[4.4.0.1$^{2,5}$.1$^{7,10}$]-3-dodecene,
8-(3-biphenylcarbonyloxy)tetracyclo[4.4.0.1$^{2,5}$.1$^{7,10}$]-3-dodecene, 8-(2-biphenylcarbonyloxy)-8-methyltetracyclo-[4.4.01$^{2,5}$.1$^{7,10}$]-3-dodecene,
8-(2-biphenylcarbonyloxy)tetracyclo[4.4.0.1$^{2,5}$.1$^{7,10}$]-3-dodecene,
8-(9-fluorenecarbonyloxy)-8-methyltetracyclo-[4.4.0.1$^{2,5}$.1$^{7,10}$]-3-dodecene,
8-(9-fluorenecarbonyloxy)tetracyclo[4.4.0.1$^{2,5}$.1$^{7,10}$]-3-dodecene, 8-(2-fluorenecarbonyloxy)-8-methyltetracyclo-[4.4.0.1$^{2,5}$.1$^{7,1}$]-3-dodecene,
8-(2-fluorenecarbonyloxy)tetracyclo[4.4.0.1$^{2,5}$.1$^{7,10}$]-3-dodecene,
8-(9-anthracenecarbonyloxy)-8-methyltetracyclo-[4.4.0.1$^{2,5}$.1$^{7,10}$]-3-dodecene,
8-(9-anthracenecarbonyloxy)tetracyclo[4.4.0.1$^{2,5}$.1$^{7,10}$]-3-dodecene.

One or more of these may be used herein, either singly or as combined.

<Specific Monomer B>

Examples of the specific monomer B are mentioned below, to which, however, the invention should not be limited.

Bicyclo[2.2.1]hept-2-ene,
5-methylbicyclo[2.2.1]hept-2-ene,
5-ethylbicyclo[2.2.1]hept-2-ene,
5-isopropylbicyclo[2.2.1]hept-2-ene,
5-n-butylbicyclo[2.2.1]hept-2-ene,
5-n-hexylbicyclo[2.2.1]hept-2-ene,
5-cyclohexylbicyclo[2.2.1]hept-2-ene,
5-n-octylbicyclo[2.2.1]hept-2-ene,
5-n-decylbicyclo[2.2.1]hept-2-ene,
5-(1-naphthyl)bicyclo[2.2.1]hept-2-ene,
5-(2-naphthyl)-5-methylbicyclo[2.2.1]hept-2-ene,
5-(4-biphenyl)bicyclo[2.2.1]hept-2-ene,
5-(4-biphenyl)-5-methylbicyclo[2.2.1]hept-2-ene,
5-methoxycarbonylbicyclo[2.2.1]hept-2-ene,
5-methyl-5-methoxycarbonylbicyclo[2.2.1]hept-2-ene,
5-phenoxycarbonylbicyclo[2.2.1]hept-2-ene,
5-methyl-5-phenoxycarbonylbicyclo[2.2.1]hept-2-ene,
5-cyanobicyclo[2.2.1]hept-2-ene,
5-ethylidenebicyclo[2.2.1]hept-2-ene,
5-phenylbicyclo[2.2.1]hept-2-ene,
5-fluorobicyclo[2.2.1]hept-2-ene,
5-fluoromethylbicyclo[2.2.1]hept-2-ene,
5-trifluoromethylbicyclo[2.2.1]hept-2-ene,
5-pentafluoroethylbicyclo[2.2.1]hept-2-ene,
5,5-difluorobicyclo[2.2.1]hept-2-ene,
5,6-difluorobicyclo[2.2.1]hept-2-ene,
5,5-bis(trifluoromethyl)bicyclo[2.2.1]hept-2-ene,
5,6-bis(trifluoromethyl)bicyclo[2.2.1]hept-2-ene,
5-methyl-5-trifluoromethylbicyclo[2.2.1]hept-2-ene,
5,5,6-trifluorobicyclo[2.2.1]hept-2-ene,
5,5,6-tris(fluoromethyl)bicyclo[2.2.1]hept-2-ene,
5,5,6,6-tetrafluorobicyclo[2.2.1]hept-2-ene,
5,5,6,6-tetrakis(trifluoromethyl)bicyclo[2.2.1]hept-2-ene,
5,5-difluoro-6,6-bis(trifluoromethyl)bicyclo[2.2.1]hept-2-ene,
5,6-difluoro-5,6-bis(trifluoromethyl)bicyclo[2.2.1]hept-2-ene,
5,5,6-trifluoro-5-trifluoromethylbicyclo[2.2.1]hept-2-ene,
5-fluoro-5-pentafluoroethyl-6,6-bis(trifluoromethyl)bi-cyclo[2.2.1]hept-2-ene,
5,6-difluoro-5-heptafluoro-iso-propyl-6-trifluoromethyl-bi-cyclo[2.2.1]hept-2-ene,
5-chloro-5,6,6-trifluorobicyclo[2.2.1]hept-2-ene,
5,6-dichloro-5,6-bis(trifluoromethyl)bicyclo[2.2.1]hept-2-ene,
5,5,6-trifluoro-6-trifluoromethoxybicyclo[2.2.1]hept-2-ene,
5,5,6-trifluoro-6-heptafluoropropoxybicyclo[2.2.1]hept-2-ene,
5-(4-phenylphenyl)bicyclo[2.2.1]hept-2-ene,
5-aminomethylbicyclo[2.2.1]hept-2-ene,
5-trimethoxysilylbicyclo[2.2.1]hept-2-ene,
5-triethoxysilylbicyclo[2.2.1]hept-2-ene,
5-tripropoxysilylbicyclo[2.2.1]hept-2-ene,
5-tributoxysilylbicyclo[2.2.1]hept-2-ene,
5-chloromethylbicyclo[2.2.1]hept-2-ene,
tricyclo[5.2.1.0$^{2,6}$]-8-decene,
tricyclo[4.4.0.1$^{2,5}$]-3-undecene,
tetracyclo[4.4.0.1$^{2,5}$.1$^{7,10}$]-3-dodecene,
8-methoxycarbonyltetracyclo[4.4.0.1$^{2,5}$.1$^{7,10}$]-3-dodecene,
8-ethoxycarbonyltetracyclo[4.4.0.1$^{2,5}$.1$^{7,10}$]-3-dodecene,
8-n-propoxycarbonyltetracyclo[4.4.0.1$^{2,5}$.1$^{7,10}$]-3-dodecene,
8-isopropoxycarbonyltetracyclo[4.4.0.1$^{2,5}$.1$^{7,10}$]-3-dodecene,
8-n-butoxycarbonyltetracyclo[4.4.0.1$^{2,5}$.1$^{7,10}$]-3-dodecene,
8-phenoxycarbonyltetracyclo[4.4.0.1$^{2,5}$.1$^{7,10}$]-3-dodecene,
8-methyl-8-methoxycarbonyltetracyclo[4.4.0.1$^{2,5}$.1$^{7,10}$]-3-dodecene,
8-methyl-8-ethoxycarbonyltetracyclo[4.4.0.1$^{2,5}$.1$^{7,10}$]-3-dodecene,
8-methyl-8-n-propoxycarbonyltetracyclo[4.4.0.1$^{2,5}$.1$^{7,10}$]-3-dodecene,
8-methyl-8-isopropoxycarbonyltetracyclo[4.4.0.1$^{2,5}$.1$^{7,10}$]-3-dodecene,
8-methyl-8-n-butoxycarbonyltetracyclo[4.4.0.1$^{2,5}$.1$^{7,10}$]-3-dodecene,
8-methyl-8-phenoxycarbonyltetracyclo[4.4.0.1$^{2,5}$.1$^{7,10}$]-3-dodecene,
8-ethylidenetetracyclo[4.4.0.1$^{2,5}$.1$^{7,10}$]-3-dodecene,
8-phenyltetracyclo[4.4.0.1$^{2,5}$.1$^{7,10}$]-3-dodecene,
8-methyl-8-phenyltetracyclo[4.4.0.1$^{2,5}$.1$^{7,10}$]-3-dodecene,
8-fluorotetracyclo[4.4.0.1$^{2,5}$.1$^{7,10}$]-3-dodecene,
8-fluoromethyltetracyclo[4.4.0.1$^{2,5}$.1$^{7,10}$]-3-dodecene,
8-difluoromethyltetracyclo[4.4.0.1$^{2,5}$.1$^{7,10}$]-3-dodecene,
8-trifluoromethyltetracyclo[4.4.0.1$^{2,5}$.1$^{7,10}$]-3-dodecene,
8-pentafluoroethyltetracyclo[4.4.0.1$^{2,5}$.1$^{7,10}$]-3-dodecene,
8,8-difluorotetracyclo[4.4.0.1$^{2,5}$.1$^{7,10}$]-3-dodecene,
8,9-difluorotetracyclo[4.4.0.1$^{2,5}$.1$^{7,10}$]-3-dodecene,
8,8-bis(trifluoromethyl)tetracyclo[4.4.0.1$^{2,5}$.1$^{7,10}$]-3-dodecene, 8,9-bis(trifluoromethyl)tetracyclo[4.4.0.1$^{2,5}$.1$^{7,10}$]-3-dodecene,
8-methyl-8-trifluoromethyltetracyclo[4.4.0.1$^{2,5}$.1$^{7,10}$]-3-dodecene,
8,8,9-trifluorotetracyclo[4.4.0.1$^{2,5}$.1$^{7,10}$]-3-dodecene,
8,8,9-tris(trifluoromethyl)tetracyclo[4.4.0.1$^{2,5}$.1$^{7,10}$]-3-dodecene,
8,8,9,9-terafluorotetracyclo[4.4.0.1$^{2,5}$.1$^{7,10}$]-3-dodecene,
8,8,9,9-tetrakis(trifluoromethyl)tetracyclo-[4.4.0.1$^{2,5}$.1$^{7,10}$]-3-dodecene,
8,8-difluoro-9,9-bis(trifluoromethyl)tetracyclo-[4.4.0.1$^{2,5}$.1$^{7,10}$]-3-dodecene,
8,9-difluoro-8,9-bis(trifluoromethyl)tetracyclo-[4.4.0.1$^{2,5}$.1$^{7,10}$]-3-dodecene,
8,8,9-trifluoro-9-trifluoromethyltetracyclo-[4.4.0.1$^{2,5}$.1$^{7,10}$]-3-dodecene,
8,8,9-trifluoro-9-trifluoromethoxytetracyclo-[4.4.0.1$^{2,5}$.1$^{7,10}$]-3-dodecene,
8,8,9-trifluoro-9-pentafluoropropoxytetracyclo-[4.4.0.1$^{2,5}$.1$^{7,10}$]-3-dodecene,
8-fluoro-8-pentafluoroethyl-9,9-bis(trifluoromethyl)-tetracyclo[4.4.0.1$^{2,5}$.1$^{7,10}$]-3-dodecene,
8,9-difluoro-8-heptafluoro-iso-propyl-9-trifluoromethyl-tetracyclo[4.4.0.1$^{2,5}$.1$^{7,10}$]-3-dodecene,
8-chloro-8,9,9-trifluorotetracyclo[4.4.0.1$^{2,5}$.1$^{7,10}$]-3-dodecene,
8,9-dichloro-8,9-bis(trifluoromethyl)tetracyclo-[4.4.0.1$^{2,5}$.1$^{7,10}$]-3-dodecene,
8-(2,2,2-trifluoroethoxycarbonyl)tetracyclo-[4.4.0.1$^{2,5}$.1$^{7,10}$]-3-dodecene, 8-methyl-8-(2,2,2-trifluoroethoxycarbonyl)tetracyclo-[4.4.0.1$^{2,5}$.1$^{7,10}$]-3-dodecene,
pentacyclo[6.5.1.1$^{3,6}$.0$^{2,7}$.0$^{9,13}$]-4-pentadecene,
pentacyclo[7.4.0.1$^{2,5}$.1$^{9,12}$.0$^{8,13}$]-3-pentadecene,
pentacyclo[8.4.0.1$^{2,5}$.1$^{9,12}$.0$^{8,13}$]-3-hexadecene,
heptacyclo[8.7.0.1$^{3,6}$.1$^{10,17}$.1$^{12,15}$.0$^{2,7}$.0$^{11,16}$]-4-eicosene,
heptacyclo[8.8.0.1$^{4,7}$.1$^{11,18}$.1$^{13,16}$.0$^{3,8}$.0$^{12,17}$]-5-heneicosene One or more of these may be used herein either singly or as combined. Of those monomers B, the specific monomer B of the formula (4) where x=0 and y=1 are preferred in point of the balance of the heat resistance and the toughness of the polymer to be obtained. Specifically, when the specific monomer B where x is at least 2 and y is 1 is used, then the glass transition temperature (Tg) of the polymer obtained may be high and the heat resistance thereof may be high, and the polymer may be therefore good; but on the other hand, the toughness of the polymer maybe low, and the polymer may be therefore problematic in that, when it is formed into films, then the resulting films may be cracked or broken while they are worked or used.

The specific monomer B having at least one polar group in the molecule is preferably used in the invention. Specifically, the specific monomer B of the formula (4) where any three of $R^1$ to $R^4$ are a hydrogen atm or a hydrocarbon group having from 1 to 10 carbon atoms and the remaining one is a polar group except hydrocarbon is preferred as it may increase the adhesiveness and the stickiness of the polymer obtained to other materials. Preferably, the polar group is represented by the following formula (5):

—(CH$_2$)zCOOR$^{15}$     (5)

[wherein z is generally an integer of from 0 to 5, preferably from 0 to 2, more preferably 0; $R^{15}$ represents a monovalent organic group]. The specific monomer B having the preferred polar group is favorable in that the glass transition temperature and the water absorbability of the obtained polymer are easy to control.

In formula (5), the monovalent organic group for $R^{15}$ includes, for example, an alkyl group such as a methyl group, an ethyl group, a propyl group; an aryl group such as a phenyl group, a naphthyl group, an anthracenyl group, a biphenylyl group; and other monovalent groups having an aromatic ring, for example, diphenylsulfone or fluorenone such as tetrahydrofluorenone, or having a hetero ring such as furan or imido ring. In formula (5), z is generally from 0 to 5 as so mentioned above. However, when z is smaller, then the glass transition temperature of the obtained polymer may be higher. Therefore, z is preferably smaller. In particular, when z is 0, then the specific monomer B is favorable as its production is easy.

In formula (4), it is desirable that an alkyl bonds to the carbon atom to which the polar group of the formula (5) bonds, as the obtained polymer may have a good balance of its heat resistance and water absorbability. Preferably, the alkyl group has from 1 to 5 carbon atoms, more preferably 1 or 2, even more preferably 1. Of the above-mentioned examples of the specific monomer B, 8-methyl-8-methoxycarbonyltetracyclo-[4.4.0.1$^{2,5}$.1$^{7,10}$]-3-dodecene is preferred in this point, as the obtained polymer may have a high glass transition temperature and favorable water absorbability in that it is almost free from any negative influences such as deformation by water absorption and its adhesiveness and stickiness to other materials is bettered.

Not specifically defined, the content of the polar group in the polymer maybe determined depending on the desired function of the polymer. In general, the polar group-having structural unit is in a ratio of at least 1 mol %, preferably at least 5 mol %, more preferably at least 10 mol % of all the structural units constituting the polymer. All the structural units may have a polar group. The content of the polar group may be controlled by suitably determining and selecting the copolymerization ratio of the specific monomer A and the specific monomer B (or "other copolymerizing monomer" described below) and the type of the copolymerizing monomer.

<Other Copolymerizing Monomer>

The other copolymerizing monomer capable of being copolymerized with the specific monomer A and the specific monomer B includes, for example, cyclo-olefins such as cyclobutene, cyclopentene, cycloheptene, cyclooctene, tricyclo[5.2.1.0$^{2,6}$]-3-decene, dicyclopentadiene. The number of the carbon atoms constituting the cyclo-olefin is preferably from 4 to 20, more preferably from 5 to 12. In addition, the specific monomer A and the specific monomer B (and any other copolymerizing monomer) may be polymerized in the presence of an unsaturated hydrocarbon polymer having an olefinic unsaturated bond in the main chain thereof, such as polybutadiene, polyisoprene, styrene-butadiene copolymer, styrene-non-conjugated diene copolymer, polynorbornene. The copolymer obtained in this case is useful as a material for resin having high impact resistance.

<Polymerization Condition>

The condition for ring-cleavage polymerization of one or more specific monomer A, specific monomer B and/or other copolymerizing monomer is described.

Catalyst:

The ring-cleavage polymerization is effected in the presence of a metathesis catalyst. The metathesis catalyst is a combination comprising (a) at least one selected from W, Mo and Re compounds and (b) at least one selected from compounds of Group IA element of the Deming's Periodic Table (e.g., Li, Na, K), Group IIA element (e.g., Mg, Ca), Group IIB element (e.g., Zn, Cd, Hg), Group IIIB element (e.g., B, Al), Group IVA element (e.g., Ti, Zr) or Group IVB element (e.g., Si, Sn, Pb), having at least one of the element-carbon bond or the element-hydrogen bond. For increasing the catalytic activity thereof, the catalyst may contain an additive (c) mentioned below.

Examples of W, Mo or Re compounds suitable for the component (a) are WCl$_6$, MoCl$_5$, and ReOCl$_3$ as in JP-A-1-240517. Examples of the component (b) are n-C$_4$H$_9$Li, (C$_2$H$_5$)$_3$Al, (C$_2$H$_5$)$_2$AlCl, (C$_2$H$_5$)$_{1.5}$AlCl$_{1.5}$, (C$_2$H$_5$)AlCl$_2$, methylalumoxane, LiH, as in JP-A-1-240517. Preferred examples of the component (c) are alcohols, aldehydes, ketones, amines, and also those in JP-A-1-240517.

The amount of the metathesis catalyst to be used may be controlled as follows: In a molar ratio of the component (a) to the specific monomers A and B (hereinafter the specific monomers A and B may be simply referred to as a generic term "specific monomer"), the component (a)/specific monomer is to fall generally from 1/500 to 1/50,000, preferably from 1/1,000 to 1/10,000. The ratio of the component (a) to the component (b) may be as follows, in terms of the metal atom ratio thereof: (a)/(b) is from 1/1 to 1/50, preferably from 1/2 to 1/30. The ratio by mol of the component (c) to the component (a) may be as follows: (c)/(a) is from 0.005/1 to 15/1, preferably from 0.05/1 to 7/1.

Molecular Weight-Controlling Agent:

The molecular weight of the polymer may be controlled by the polymerization temperature, the type of the catalyst and the type of the solvent, but in the invention, it is desirable to add a molecular weight-controlling agent to the reaction system for controlling the polymer to be produced. Preferred examples of the molecular weight-controlling agent are α-olefins such as ethylene, propene, 1-butene, 1-pentene, 1-hexane, 1-heptene, 1-octene, 1-nonene, 1-decene, and styrene. Of those, preferred are 1-butene and 1-hexane. One or more such molecular weight-controlling agents may be used either singly or as combined. The amount of the molecular weight-controlling agent to be used may be from 0.005 to 0.6 mols, preferably from 0.02 to 0.5 mols per mol of the specific monomer to be subjected to polymerization.

Solvent for Ring-Cleavage Polymerization:

The solvent to be used in the polymerization includes, for example, alkanes such as pentane, hexane, heptane, octane, nonane, decane; cycloalkanes such as cyclohexane, cycloheptane, cyclooctane, decalin, norbornane; aromatic hydrocarbons such as benzene, toluene, xylene, ethylbenzene, cumene; halogenoalkanes such as chlorobutane, bromohexane, methylene chloride, dichloroethane, hexamethylene dibromide, chlorobenzene, chloroform, tetrachloroethylene; aryl compounds; saturated carboxylates such as ethyl acetate, n-butyl acetate, iso-butyl acetate, methyl propionate; ethers such as dibutyl ether, tetrahydrofuran, dimethoxyethane. One or more of these may be used either singly or as combined. Of those, aromatic hydrocarbons are preferred. Regarding the amount of the solvent to be used, the ratio of solvent/specific monomer (by weight) may be generally from 1/1 to 10/1, more preferably from 1/1 to 5/1.

Hydrogenation of Polymer:

The polymer obtained in the manner as above may be directly used for the resin in the invention, but may be hydrogenated at the olefinic unsaturated bond remaining therein. The hydrogenation may be effected in any ordinary manner, for example, by adding a hydrogenation catalyst to the polymer solution followed by applying hydrogen gas thereto under normal pressure to 300 atmospheres, preferably under 3 to 200 atmospheres, at 0 to 200° C., preferably at 20 to 180° C.

The hydrogenation catalyst may be any one generally used for hydrogenation of olefinic compounds. For the hydrogenation catalyst, known are heterogeneous catalysts and homogeneous catalysts. The heterogeneous catalysts are, for example, solid catalysts that carry a noble metal such as palladium, platinum, nickel, rhodium or ruthenium on a carrier of carbon, silica, alumina or titania. The homogenous catalysts include, for example, nickel naphthenate/triethylaluminium, nickel acetylacetonate/triethylaluminium, cobalt octenoate/n-butyllithium, titanocene dichloride/diethylaluminium monochloride, rhodium acetate, chlorotris(triphenylphosphine)rhodium, dichlorotris(triphenylphosphine)ruthenium, chlorohydrocarbonyltris(triphenylphosphine)ruthenium, dichlorocarbonyltris(triphenylphosphine)ruthenium. Regarding its form, the catalyst may be powdery or granular. The hydrogenation catalyst is used in a ratio of polymer/hydrogenation catalyst (by weight) of from $1/1 \times 10^{-6}$ to $1/2$.

The hydrogenated polymer obtained through hydrogenation has excellent heat stability, and its properties are hardly worsened under heat in film formation or in film stretching or in use of the products. The degree of hydrogenation of the olefinic unsaturated bond in the polymer may be generally at least 50%, preferably at least 70%, more preferably at least 90%, even more preferably at least 98%.

It is necessary that the aromatic ring in the structural unit a derived from the specific monomer A is not substantially hydrogenated even by the above-mentioned hydrogenation treatment. The hydrogenation of the type may be attained under the condition of ordinary hydrogenation of olefinic compounds as above, but as the case may be, it may require some condition control, for which, for example, the hydrogen gas pressure and the reaction temperature will have to be set low within the above-mentioned range, or the type and the amount of the hydrogenation catalyst will have to be specifically defined or controlled. In addition, when the additional copolymerizing monomer contains an aromatic ring-having substituent and when the structural unit derived from the monomer in the obtained polymer contains an aromatic ring, then it is desirable that the hydrogenation condition is specifically so controlled that the unsaturated bond of the aromatic ring is not substantially hydrogenated by the hydrogenation treatment.

(Optical Compensatory Film B)

The optical compensatory film B in the invention satisfies the relation of the above-mentioned formulae (13) to (16). For the optical compensatory film B, usable is an optically anisotropic layer with cholesteric liquid crystal fixed therein. The cholesteric liquid crystal is described, for example, in JP-A-3-67219, JP-A-3-140921, JP-A-5-61039, JP-A-6-186534, JP-A-9-133810.

An optically anisotropic layer with a horizontally-aligned discotic liquid crystal compound fixed therein as in JP-A-11-352328 is also favorably used for the optical compensatory film B in the invention.

The optical compensatory film B is preferably provided on the protective film that satisfies the relation of the above-mentioned formulae (1) and (2). The optical compensatory film may be directly provided on the protective film, or any other functional layer such as alignment layer or adhesive layer may be disposed between the protective film and the optical compensatory film.

The cholesteric liquid crystal layer for the optical compensatory film B in the invention is described in detail.

The liquid crystal monomer molecule (polymerizing liquid crystal molecule) to be used in the cholesteric liquid crystal layer may be a mixture of a liquid crystalline monomer and a chiral compound. For example, for the polymerizing liquid crystalline material, a mixture of compounds included in the following chemical formula (11) or compounds of the following chemical formulae (1) to (10) may be used. In the liquid crystalline monomer of the formula (11), x is preferably from 2 to 5 (integer).

As the chiral agent, for example, those of the following chemical formulae (12) to (14) may be used. In the chiral agent of the formulae (12) and (13), x is preferably from 2 to 12 (integer); and in the chiral agent of the formula (14), x is preferably from 2 to 5 (integer).

(1)

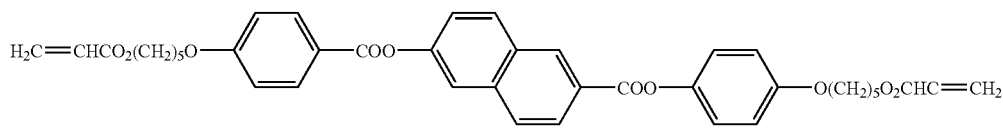

-continued
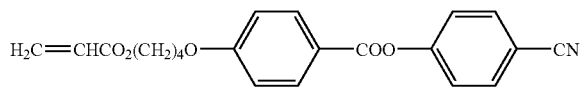
(2)
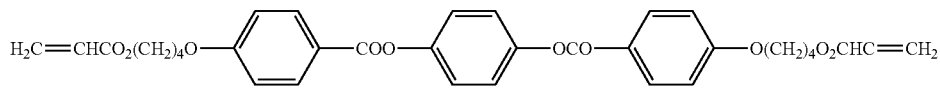
(3)
(4)
(5)
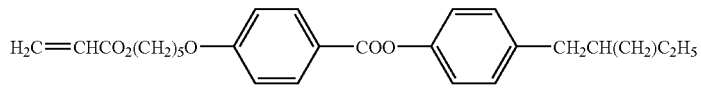
(6)
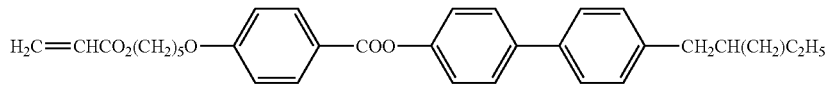
(7)
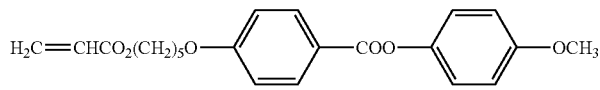
(8)
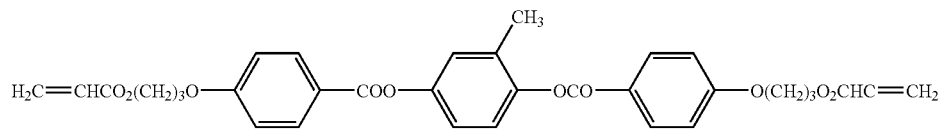
(9)
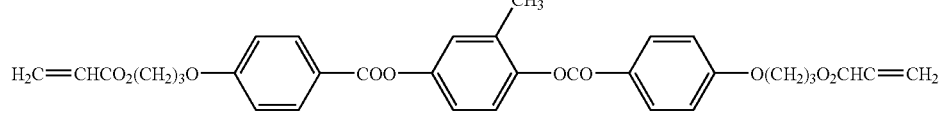
(10)
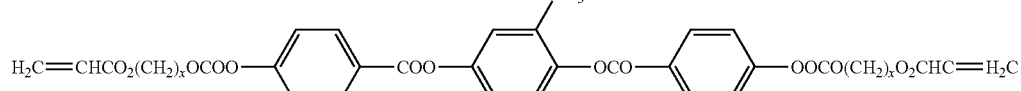
(11)
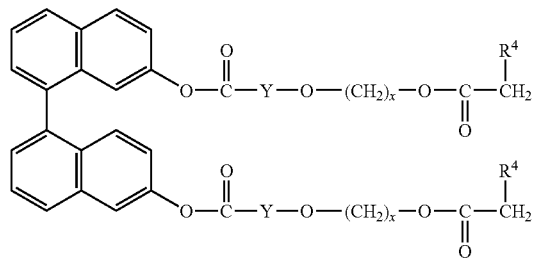
(12)
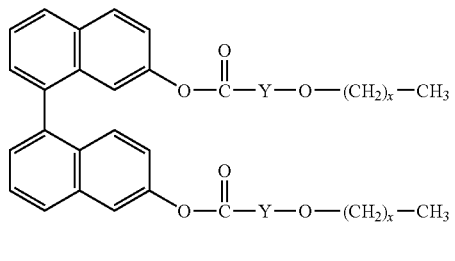
(13)

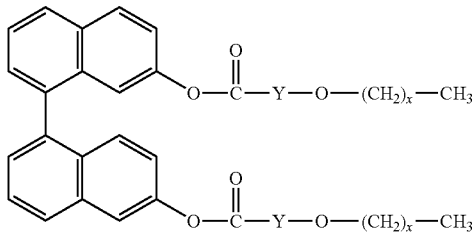

(14)

<Production of Polarizing Plate>

(Polarizer)

A polarizer used in a polarizing plate in the invention is described below.

In the invention, the polarizer is preferably composed of a polyvinyl alcohol (PVA) and a dichroic molecule, and may be a polyvinylene polarizer prepared by subjecting a PVA or polyvinyl chloride to dehydration or dechlorination and by aligning the generated polyene structure as described in JP-A-11-248937.

The PVA is preferably a polymer material obtained by saponifying a polyvinyl acetate, and may contain a component capable of copolymerizing with vinyl acetate, such as an unsaturated carboxylic acid, an unsaturated sulfonic acid, an olefin, or a vinyl ether. Further, modified PVAs having an acetoacetyl group, sulfonic acid group, carboxyl group, oxyalkylene group, etc. may be used in the invention.

The saponification degree of the PVA is not particularly limited, and is preferably 80 to 100 mol %, particularly preferably 90 to 100 mol %, from the viewpoint of solubility, etc. The polymerization degree of the PVA is not particularly limited, preferably 1,000 to 10,000, particularly preferably 1,500 to 5,000.

It is preferred that the syndiotacticity of the PVA is 55% or more in view of improving the durability as described in Japanese Patent No. 2978219. It is also preferred that the syndiotacticity is 45 to 52.5% as described in Japanese Patent No. 3317494.

It is preferred that the PVA is formed into a film and then a dichroic molecule is introduced to prepare the polarizer. Generally the PVA film is preferably produced by casting a liquid prepared by dissolving a PVA-based resin in water or an organic solvent. The polyvinyl alcohol-based resin concentration of the liquid is generally 5 to 20% by mass, and a 10 to 200-μm-thick PVA film may be formed by casting the liquid. The PVA film can be produced with reference to Japanese Patent No. 3342516, JP-A-09-328593, JP-A-2001-302817, JP-A-2002-144401, etc.

The crystallinity degree of the PVA film is not particularly limited. The average crystallinity degree (Xc) may be 50 to 75% by mass as described in Japanese Patent No. 3251073, and the crystallinity degree may be 38% or less to reduce the in-plane hue unevenness as described in JP-A-2002-236214.

The PVA film preferably has a small birefringence (Δn), and the birefringence is preferably $1.0 \times 10^{-3}$ or less as described in Japanese Patent No. 3342516. The birefringence of the PVA film may be 0.002 to 0.01 to obtain a high polarization degree while preventing breakage of the PVA film in the stretching step as described in JP-A-2002-228835. Further, the value of (nx+ny)/2−nz may be 0.0003 to 0.01 as described in JP-A-2002-060505. The Re(1090) of the PVA film is preferably 0 to 100 nm, further preferably 0 to 50 nm.

Further, the Rth(1090) of the PVA film is preferably 0 to 500 nm, further preferably 0 to 300 nm.

Additionally, a PVA film having a bonding 1,2-glycol amount of 1.5 mol % or less described in Japanese Patent No. 3021494, a PVA film having 500 or less optically foreign substances of 5 μm or more in size per 100 cm² described in JP-A-2001-316492, a PVA film having a hot water breaking temperature of 1.5° C. or lower in the TD direction described in JP-A-2002-030163, and a PVA film prepared from a solution containing 1 to 100 parts by mass of 3 to 6-polyvalent alcohol such as glycerin or 15% by mass or more of a plasticizer described in JP-A-06-289225 can be preferably used for the polarizing plate in the invention.

The film thickness of the unstretched PVA film is not particularly limited, preferably 1 μm to 1 mm, particularly preferably 20 to 200 μm from the viewpoint of the film stability and uniform stretching. Such a thin PVA film that 10 N or less of stress is generated in the stretching in water at a ratio of 4 to 6 times may be used as described in JP-A-2002-236212.

The dichroic molecule may be a higher iodine ion such as $I_3^-$ or $I_5^-$, or a dichroic dye. The higher iodine ion is particularly preferably used in the invention. The higher iodine ion can be generated such that the PVA is soaked in a liquid prepared by dissolving iodine in an aqueous potassium iodide solution and/or an aqueous boric acid solution to adsorb the iodine to the PVA as described in *Henkoban no Oyo*, Ryo Nagata, CMC and *Kogyo Zairyo*, Vol. 28, No. 7, Page 39 to 45.

In the case of using the dichroic dye as the dichroic molecule, the dichroic dye is preferably an azo dye, particularly preferably a bisazo or trisazo dye. The dichroic dye is preferably water-soluble, and thus a hydrophilic substituent such as a sulfonic acid group, an amino group, or a hydroxyl group is preferably introduced to a dichroic molecule, to generate a free acid, an alkaline metal salt, an ammonium salt, or an amine salt.

Specific examples of the dichroic dyes include benzidine dyes such as C.I. Direct Red 37, Congo Red (C.I. Direct Red 28), C.I. Direct Violet 12, C.I. Direct Blue 90, C.I. Direct Blue 22, C.I. Direct Blue 1, C.I. Direct Blue 151, and C.I. Direct Green 1; diphenylurea dyes such as C.I. Direct Yellow 44, C.I. Direct Red 23, and C.I. Direct Red 79; stilbene dyes such as C.I. Direct Yellow 12; dinaphtylamine dyes such as C.I. Direct Red 31; J acid dyes such as C.I. Direct Red 81, C.I. Direct Violet 9, and C.I. Direct Blue 78.

In addition, the dichroic dyes preferably used in the invention include C.I. Direct Yellow 8, C.I. Direct Yellow 28, C.I. Direct Yellow 86, C.I. Direct Yellow 87, C.I. Direct Yellow 142, C.I. Direct Orange 26, C.I. Direct Orange 39, C.I. Direct Orange 72, C.I. Direct Orange 106, C.I. Direct Orange 107, C.I. Direct Red2, C.I. Direct Red39, C.I. Direct Red83, C.I. Direct Red 89, C.I. Direct Red 240, C.I. Direct Red 242, C.I.

Direct Red247, C.I. Direct Violet 48, C.I. Direct Violet 51, C.I. Direct Violet 98, C.I. Direct Blue 15, C.I. Direct Blue 67, C.I. Direct Blue 71, C.I. Direct Blue 98, C.I. Direct Blue 168, C.I. Direct Blue 202, C.I. Direct Blue 236, C.I. Direct Blue 249, C.I. Direct Blue 270, C.I. Direct Green 59, C.I. Direct Green 85, C.I. Direct Brown 44, C.I. Direct Brown 106, C.I. Direct Brown 195, C.I. Direct Brown 210, C.I. Direct Brown 223, C.I. Direct Brown 224, C.I. Direct Black 1, C.I. Direct Black 17, C.I. Direct Black 19, C.I. Direct Black 54, and dyes described in JP-A-62-70802, JP-A-1-161202, JP-A-1-172906, JP-A-1-172907, JP-A-1-183602, JP-A-1-248105, JP-A-1-265205, and JP-A-7-261024. Two or more dichroic dyes may be used in combination to obtain various hues. In the case of using the dichroic dye, the adsorption thickness may be 4 μm or more as described in JP-A-2002-082222.

The ratio of the dichroic molecule to the film matrix of the polyvinyl alcohol-based polymer is generally controlled within a range of 0.01 to 5% by mass. Too low dichroic molecule content results in reduction of polarization degree, and excessively high dichroic molecule content results in reduction of the single-plate transmittance.

The thickness of the polarizer is preferably 5 to 40 μm, more preferably 10 to 30 μm. Further, it is preferred that the thickness ratio of the polarizer to the protective film satisfies the condition of $0.01 \leq A$ (Polarizer thickness)/B (Protective film thickness)$\leq 0.16$ as described in JP-A-2002-174727.

Further, the crossing angle between the slow axis of the protective film and the absorption axis of the polarizer may be any one, and it is preferred that the axes are parallel or the crossing angle is an azimuthal angle of $45 \pm 20°$.

<Production of Polarizing Plate>

Processes for producing the polarizing plate in the invention are described below.

In the invention, the polarizing plate is preferably produced by a method having a swelling step, dyeing step, hardening step, stretching step, drying step, protective film attaching step, and attached film drying step. The order of the dyeing, hardening, and stretching steps may be changed, and some steps may be combined and simultaneously carried out. It is preferred that the film is water-washed after the hardening step as described in Japanese Patent No. 3331615.

In the invention, the swelling, dyeing, hardening, stretching, drying, protective film attaching, and attached film drying steps are particularly preferably carried out in this order. On-line surface evaluation may be carried out in or after the steps.

Though the swelling step is preferably carried out using only water, a polarizing plate matrix may be swelled by an aqueous boric acid solution, thereby controlling the swelling degree to improve the optical performance stability and prevent wrinkling of the matrix in the production line as described in JP-A-10-153709.

The temperature and time of the swelling may be any one, and are preferably 10 to 60° C. and 5 to 2,000 seconds.

The dyeing step may be carried out using a method described in JP-A-2002-86554. The dyeing may be achieved by soaking, application or spraying of an iodine or dye solution, etc. Further, the dyeing may be carried out while controlling the iodine concentration, dyeing bath temperature, and stretch ratio in the bath and while stirring the solution in the bath as described in JP-A-2002-290025.

In the case of using the higher iodine ion as the dichroic molecule, in the dyeing step, a solution prepared by dissolving iodine in an aqueous potassium iodide solution is preferably used to obtain a high-contrast polarizing plate. It is preferred that, in the aqueous iodine-potassium iodide solution, the iodine concentration is 0.05 to 20 g/l, the potassium iodide concentration is 3 to 200 g/l, and the mass ratio of iodine and potassium iodide is 1 to 2,000. The dyeing time is preferably 10 to 1,200 seconds, and the solution temperature is preferably 10 to 60° C. It is more preferred that the iodine concentration is 0.5 to 2 g/l, the potassium iodide concentration is 30 to 120 g/l, the mass ratio of iodine and potassium iodide is 30 to 120, the dyeing time is 30 to 600 seconds, and the solution temperature is 20 to 50° C.

A boron compound such as boric acid or borax may be added to the dyeing solution as described in Japanese Patent No. 3145747.

In the hardening step, the intermediate film is preferably soaked in a crosslinking agent solution or coated with the solution, thereby adding a crosslinking agent to the film. The hardening step may be carried out in several batches as described in JP-A-11-52130.

The crosslinking agent may be an agent described in United States Reissue Pat. No. 232897. Also a boron compound such as boric acid or borax may be used as the crosslinking agent. The crosslinking agent is most preferably a boric acid compound though it may be a polyvalent aldehyde for increasing the dimension stability as described in Japanese Patent No. 3357109. In the case of using boric acid as the crosslinking agent in the hardening step, a metal ion may be added to an aqueous boric acid-potassium iodide solution. A compound containing the metal ion is preferably zinc chloride, and zinc salts including zinc halides such as zinc iodide, zinc sulfate, and zinc acetate may be used instead of zinc chloride as described in JP-A-2000-35512.

In the invention, the PVA film is preferably hardened by soaking the film in an aqueous boric acid-potassium iodide solution containing zinc chloride. It is preferred that the boric acid concentration is 1 to 100 g/l, the potassium iodide concentration is 1 to 120 g/l, the zinc chloride concentration is 0.01 to 10 g/l, the hardening time is 10 to 1,200 seconds, and the solution temperature is 10 to 60° C. It is more preferred that the boric acid concentration is 10 to 80 g/l, the potassium iodide concentration is 5 to 100 g/l, the zinc chloride concentration is 0.02 to 8 g/l, the hardening time is 30 to 600 seconds, and the solution temperature is 20 to 50° C.

In the stretching step, a vertical monoaxial stretching method described in U.S. Pat. No. 2,454,515, etc. and a tentering method described in JP-A-2002-86554 can be preferably used. The stretch ratio is preferably 2 to 12 times, more preferably 3 to 10 times. It is preferred that the stretch ratio, the film thickness, and the polarizer thickness satisfies the condition of (Thickness of protective film-attached polarizer/Thickness of film)×(Total stretch ratio)>0.17 as described in JP-A-2002-040256, and that the width of the polarizer taken from final bath and the width of the polarizer at the time of attaching the protective film satisfies the condition of $0.80 \leq$ (Width of polarizer at attaching protective film/Width of polarizer taken from final bath)$\leq 0.95$, as described in JP-A-2002-040247.

In the drying step, a known method described in JP-A-2002-86554 may be used, and the drying temperature is preferably 30 to 100° C., and the drying time is preferably 30 seconds to 60 minutes. It is also preferred that a heat treatment for controlling an in-water discoloring temperature at 50° C. or higher is carried out as described in Japanese Patent No.3148513, and that an aging treatment under controlled temperature and humidity is carried out as described in JP-A-07-325215 and JP-A-07-325218.

In the protective film attaching step, 2 protective films are bonded to both sides of the polarizer after the drying step. It is preferred that an adhesive liquid is applied immediately before the bonding, and the polarizer is sandwiched between and bonded to the protective films by a couple of rollers. It is preferred that the water content of the polarizer is controlled at the time of the bonding, to prevent concavity and convexity like grooves in a record due to the stretching as described in JP-A-2001-296426 and JP-A-2002-86554. In the invention, the water content is preferably 0.1 to 30%.

The adhesive for bonding the polarizer and the protective films is not particularly limited, and examples thereof include PVA-based resins (including PVAs modified with an acetoacetyl group, a sulfonic acid group, a carboxyl group, an oxyalkylene group, etc.) and aqueous boron compound solutions. The adhesive is preferably the PVA-based resin. The thickness of the dried adhesive layer is preferably 0.01 to 5 μm, particularly preferably 0.05 to 3 μm.

It is preferred that, to increase the adhesive strength between the polarizer and the protective films, the protective films are surface-treated to be hydrophilic, and then bonded to the polarizer. The surface treatment is not particularly restricted and may be a known treatment such as a saponification treatment using an alkali solution or a corona treatment. Further, a highly adhesive layer such as a gelatin undercoat layer may be formed after the surface treatment. It is preferred that the contact angle of the protective film surface against water is 50° or less as described in JP-A-2002-267839.

The conditions of drying after the bonding may be those described in JP-A-2002-86554, and the drying temperature is preferably 30 to 100° C. and the drying time is preferably 30 seconds to 60 minutes. Further, it is preferred that an aging treatment under controlled temperature and humidity is carried out as described in JP-A-07-325220.

Each element content of the polarizer is preferably such that the iodine content is 0.1 to 3.0 g/m$^2$, the boron content is 0.1 to 5.0 g/m$^2$, the potassium content is 0.1 to 2.00 g/m$^2$, and the zinc content is 0 to 2.00 g/m$^2$. The potassium content may be 0.2% by mass or less as described in JP-A-2001-166143, and the zinc content may be 0.04% to 0.5% by mass as described in JP-A-2000-035512.

An organic titanium compound and/or an organic zirconium compound may be added to the film in any of the dyeing, stretching, and hardening steps, to increase the dimension stability of the polarizing plate, as described in Japanese Patent No. 3323255. Further, a dichroic dye may be added to control the hue of the polarizing plate.

<Properties of Polarizing Plate>

(1) Transmittance and Polarization Degree

In the invention, the single-plate transmittance of the polarizing plate is preferably 42.5% to 49.5%, more preferably 42.8% to 49.0%. The polarization degree defined by the following Equation 4 is preferably 99.900% to 99.999%, more preferably 99.940% to 99.995%. The parallel transmittance is preferably 36% to 42%, and the perpendicular transmittance is preferably 0.001% to 0.05%.

Polarization degree (%)=√{(Pa−Pe)/(Pa+Pe)}    Equation 1

Pa: Parallel transmittance
Pe: Perpendicular transmittance

The transmittance is defined by the following equation in accordance with JIS Z8701.

$$T = K \int S(\lambda) y(\lambda) \tau(\lambda) d\lambda$$

In the equation, K, S(λ), y(λ), and τ(λ) are as follows.

$$K = \frac{100}{\int S(\lambda) y(\lambda) d\lambda} \quad \text{Equation 3}$$

S(λ): Spectral distribution of standard light for color display
y(λ): Color matching function in XYZ system
τ(λ): Spectral transmittance The dichroic ratio defined by the following Equation 5 is preferably 48 to 1215, more preferably 53 to 525.

$$\text{Dichroic ratio } (Rd) = \frac{\log\left[\frac{\text{Single-plate transmittance}}{100}\left(1 - \frac{\text{Polarization degree}}{100}\right)\right]}{\log\left[\frac{\text{Single-plate transmittance}}{100}\left(1 + \frac{\text{Polarization degree}}{100}\right)\right]} \quad \text{Equation 5}$$

The iodine concentration and the single-plate transmittance may be in ranges described in JP-A-2002-258051, Paragraph 0017.

The wavelength dependency of the parallel transmittance may be lower as described in JP-A-2001-083328 and JP-A-2002-022950. In the case of placing the polarizing plate in the crossed nicols state, the optical property may be in a range described in JP-A-2001-091736, Paragraph 0007, and the relation between the parallel transmittance and the perpendicular transmittance may be in a range described in JP-A-2002-174728, Paragraph 0006.

As described in JP-A-2002-221618, in a light wavelength range of 420 to 700 nm, the standard deviation of parallel transmittance of every 10 nm may be 3 or less, and the minimum values of (Parallel transmittance/Perpendicular transmittance) of every 10 nm may be 300 or more.

Also it is preferred that the parallel transmittance and the perpendicular transmittance of the polarizing plate at a wavelength of 440 nm, those at a wavelength of 550 nm, and those at a wavelength of 610 nm are within ranges described in JP-A-2002-258042, Paragraph 0012 or JP-A-2002-258043, Paragraph 0012.

(2) Hue

The hue of the polarizing plate in the invention is preferably evaluated by using a lightness index L* and chromaticness indexes a* and b* of the L*a*b* colorimetric system with a CIE uniform color space.

Definitions of L*, a*, and b* are described in *Shikisai Kogaku*, Tokyo Denki University Press, etc.

The a* of one polarizing plate is preferably −2.5 to 0.2, more preferably −2.0 to 0. The b* of one polarizing plate is preferably 1.5 to 5, more preferably 2 to 4.5. The a* of a parallel transmitted light in two polarizing plates is preferably −4.0 to 0, more preferably −3.5 to −0.5. The b* of a parallel transmitted light in two polarizing plates is preferably 2.0 to 8, more preferably 2.5 to 7. The a* of a perpendicular transmitted light in two polarizing plates is preferably −0.5 to 1.0, more preferably 0 to 2. The b* of a perpendicular transmitted light in two polarizing plates is preferably −2.0 to 2, more preferably −1.5 to 0.5.

The hue may be evaluated by chromaticity coordinates (x, y) calculated from the above X, Y, and Z. For example, it is preferred that the parallel transmitted light chromaticity ($x_p$, $y_p$) and the perpendicular transmitted light chromaticity ($x_c$, $y_c$) of two polarizing plates are within ranges described in JP-A-2002-214436, Paragraph 0017, JP-A-2001-166136, Paragraph 0007, or JP-A-2002-169024, Paragraph 0005 to 0008, and that the relation between the hue and absorbance is within a range described in JP-A-2001-311827, Paragraph 0005 to 0006.

(3) Viewing Angle Properties

It is preferred that, when the polarizing plate is disposed in the crossed nicols state and a light having a wavelength of 550 nm is injected thereinto, the transmittance ratio and the xy chromaticity differences between a vertically light injection and a light injected from an angle of 45° against the polarizing axis at an angle of 40° against the normal line are within ranges described in JP-A-2001-166135 or JP-A-2001-166137. It is preferred that the ratio $T_{60}/T_0$, in which $T_0$ is a light transmittance of a polarizing plate stack placed in the crossed nicols state in the vertically direction and $T_{60}$ is a light transmittance in the direction at an angle of 60° against the normal line of the stack, is 10,000 or less as described in JP-A-10-068817. It is preferred also that, in a case where a natural light is injected to the polarizing plate from the normal line direction or at an elevation angle of 80° or less, the transmittance difference of transmitted lights is 6% or less in 20 nm within a transmission spectrum wavelength range of 520 to 640 nm as described in JP-A-2002-139625. Further, it is preferred that the brightness difference of the transmitted lights between regions 1 cm away from each other is 30% or less as described in JP-A-08-248201.

(4) Durability (4-1) Temperature and Humidity Durability

When the light transmittance and polarization degree are measured before and after the polarizing plate is left under a temperature of 60° C. and a relative humidity of 95% for 500 hours, the change of the light transmittance and polarization degree are preferably 3% or less based on the absolute values. The change of the light transmittance is particularly preferably 2% or less, and the change of the polarization degree is particularly preferably 1.0% or less, based on the absolute values. Further, it is preferred that the polarizing plate has a polarization degree of 95% or more and a single transmittance of 38% or more after the polarizing plate is left under a temperature of 80° C. and a relative humidity of 90% for 500 hours as described in JP-A-07-077608.

(4-2) Dry Durability

When the light transmittance and polarization degree are measured before and after the polarizing plate is left under a dry condition at 80° C. for 500 hours, the change of the light transmittance and polarization degree are preferably 3% or less based on the absolute values. The change of the light transmittance is particularly preferably 2% or less, and the change of the polarization degree is particularly preferably 1.0% or less, furthermore preferably 0.1% or less, based on the absolute values.

(4-3) Other Durability

Further, it is preferred that the shrinkage ratio of the polarizing plate by leaving the polarizing plate at 80° C. for 2 hours is 0.5% or less as described in JP-A-06-167611. Also it is preferred that, when a stack is prepared by disposing the polarizing plates on the both sides of a glass plate in the crossed nicols state and left at 69° C. for 750 hours, x and y values of the stack are within ranges described in JP-A-10-068818 after the leaving. Furthermore, it is preferred that, when the polarizing plate is left at 80° C. under a relative humidity of 90% for 200 hours, the change of spectral intensity ratio between 105 $cm^{-1}$ and 157 $cm^{-1}$ obtained by Raman spectroscopy is within a range described in JP-A-08-094834 or JP-A-09-197127.

(5) Alignment Degree

More excellent polarization performance is achieved as the alignment degree of the PVA is increased. The alignment degree calculated as order parameter values by polarized Raman scattering or polarized FT-IR, etc. is preferably 0.2 to 1.0. Also it is preferred that difference between an alignment coefficient of a high-molecular segment in the entire amorphous region of the polarizer and an alignment coefficient of occupying molecules (0.75 or more) is at least 0.15 as described in JP-A-59-133509. Further, it is preferred that the alignment coefficient of the amorphous region in the polarizer is 0.65 to 0.85 or that the alignment degree of the higher iodine ion such as $I_3^-$ and $I_5^-$ is 0.8 to 1.0 as an order parameter value as described in JP-A-04-204907.

(6) Other Properties

It is preferred that the shrinkage force per unit width in the absorption axis direction is 4.0 N/cm or less when the polarizing plate is heated at 80° C. for 30 minutes as described in JP-A-2002-006133, that the dimension changes of the polarizing plate in the absorption axis direction and the polarizing axis direction are both within ±0.6% when the polarizing plate is heated at 70° C. for 120 hours as described in JP-A-2002-236213, and that the water content of the polarizing plate is 3% by mass or less as described in JP-A-2002-090546. Further, it is preferred that the surface roughness in a direction vertically to the stretching axis is 0.04 μm or less based on the center line average roughness as described in JP-A-2000-249832, that the refractive index no in the transmission axis direction is 1.6 or more as described in JP-A-10-268294, and that the relation between the polarizing plate thickness and the protective film thickness is within a range described in JP-A-10-111411, Paragraph 0004.

<Liquid Crystal Display Device>

The liquid crystal display device of the invention is described below.

FIG. 2 is a schematic view showing an example of the liquid crystal display device according to the invention. In FIG. 2, a liquid crystal display device 10 has a liquid crystal cell containing a liquid crystal layer 7, and an upper electrode substrate 5 and a lower electrode substrate 8 disposed thereon, and has an upper polarizing plate 1 and a lower polarizing plate 12 disposed on the both sides of the liquid crystal cells. A color filter may be disposed between the liquid crystal cell and the polarizing films. When the liquid crystal display device 10 is a transmission type device, a backlight using a light source such as a cold or hot cathode fluorescent tube, a light emitting diode, a field emission device, or an electroluminescent device is disposed on the back side.

The upper and lower polarizing plates 1 and 12 are each composed of a polarizer sandwiched between two protective films. In the liquid crystal display device 10 of the invention, a transparent protective film, a polarizer, and a cellulose acylate film are preferably stacked in this order from the outside of the device (from the side farther from the liquid crystal cell). The liquid crystal display device 10 may be a direct view type, projection type, or optical modulation type display. The invention is particularly efficiently applied to active matrix liquid crystal display devices using 3- or 2-terminal semiconductor elements such as TFT and MIM. The invention may be efficiently applied also to passive matrix liquid crystal display devices as represented by STN mode, which is so-called time division operation.

(VA Mode)

The liquid crystal display device of the invention preferably has a VA mode liquid crystal cell.

In the case of the VA mode, a liquid crystal having Δn of about 0.0813 and Δε of negative value −4.6 is enclosed between the upper and lower substrates. The alignment of the liquid crystal can be controlled by rubbing, and the director representing the alignment direction of the liquid crystal molecules, the tilt angle, is preferably about 89°. In the FIG. 2, the thickness d of the liquid crystal layer 7 is 3.5 μm. The brightness at the white display depends on the product Δnd of the thickness d and the refractive index anisotropy Δn. Thus the thickness of the liquid crystal layer is controlled in a range of 0.2 to 0.5 μm to obtain a maximum brightness.

The absorption axis 2 of the upper polarizing plate 1 in the liquid crystal cell is approximately perpendicular to the absorption axis 13 of the lower polarizing plate 12. A transparent electrode (not shown) is formed on the inner surface of the alignment film disposed on each of the upper and lower electrode substrates 5 and 8. In the non-driving state where a driving voltage is not applied to the electrodes, the liquid crystal molecules in the liquid crystal layer 7 are aligned approximately perpendicular to the substrate, so that the polarization state of a light that passes through the liquid crystal panel is hardly changed. Thus, the liquid crystal display device shows ideal black display in the non-driving state. On the other hand, in the driving state, the liquid crystal molecules are aligned approximately parallel to the substrate, so that the polarization state of the light that passes through the liquid crystal panel is changed by the tilted liquid crystal molecules. Thus, the liquid crystal display device shows white display in the driving state. In FIG. 2, the signs 6 and 9 represent the alignment control directions.

An electric field is applied to the upper and lower substrates, whereby the used liquid crystal material has a negative dielectric anisotropy and is such that the liquid crystal molecules are aligned perpendicularly to the electric field direction. In a case where an electrode is placed on one substrate, and an electric field is applied in the longitudinal direction parallel to the substrate, the liquid crystal material having a positive dielectric anisotropy is used.

In the VA mode liquid crystal display device, A chiral agent, which is commonly used for TN mode liquid crystal display devices, is not often used because it deteriorates the dynamic response characteristic. A chiral agent may be added to reduce alignment defects in some cases.

The VA mode is characterized by high-speed response and high contrast. However, the contrast is lowered in the oblique direction though it is high at the front. The liquid crystal molecules are aligned perpendicular to the substrate surface at the time of black level. When the display is observed at the front, the transmittance is low and the contrast is high because the liquid crystal molecules have little birefringence. However, when the display is observed from an oblique direction, the liquid crystal molecules show a birefringence. The angle between the absorption axes of the upper and lower polarizing plates is more than 90° from an oblique direction, though it is 90° at the front. By the two factors, light leakage is caused and the contrast is reduced in the oblique direction. An optical compensatory sheet is added to solve the problem.

Further, the liquid crystal molecules are tilted at the time of white level, and in the tilted direction and the opposite direction, the birefringences of the liquid crystal molecules are different from the oblique direction, resulting in different brightness and color hue. To solve the problem, one pixel of the liquid crystal display device is divided into a plurality of domains to form a multidomain structure.

[Multidomain]

For example, in the VA mode, when an electric field is applied to the liquid crystal molecules, the molecules are tilted in different domains in one pixel, thereby averaging the viewing angle properties. The alignment of the one pixel may be divided by forming a slit in the electrode, or by forming a projection to change the electric field direction or make an electric field density deviation. To obtain constant viewing angles in all the directions, the number of the domains has to be increased. Approximately constant viewing angles can be obtained by dividing into 4 or 8 domains. When the pixel is divided into 8 domains, the polarizing plate absorption axis can be preferably controlled at a desired angle.

In the boundary of the domains, the liquid crystal molecules are hardly likely to respond. Thus, in the normally black display, the black level of display is maintained, thereby resulting in brightness reduction. The boundary area can be reduced by adding a chiral agent to the liquid crystal material.

EXAMPLES

The invention is described in more detail with reference to the following Examples, in which the material used, its amount and the ratio, the details of the treatment and the treatment process may be suitably modified or changed not overstepping the spirit and the scope of the invention. Accordingly, the invention should not be limitatively interpreted by the Examples mentioned below.

Reference Example 1

(Formation of Low Retardation Film A-1)

<Preparation of Cellulose Acetate Solution>

The following composition was put into a mixing tank and stirred to dissolve the ingredients to prepare a cellulose acetate solution A.

Composition of Cellulose Acylate Solution A:

| | |
|---|---|
| Cellulose acetate having a degree of acetylation of 2.94 and a mean of polymerization of 310 | 100 parts by mass |
| Retardation reducer A-12 | 12.0 parts by mass |
| Methylene chloride (first solvent) | 402.0 parts by mass |
| Methanol (second solvent) | 60.0 parts by mass |

<Preparation of Mat Agent Solution>

The following composition was put into a disperser and stirred to dissolve the ingredients to prepare a mat agent solution.

Composition of Mat Agent Solution:

| | |
|---|---|
| Silica particles having a mean particle size of 20 nm (AEROSIL R972, by Nippon Aerosil) | 2.0 parts by mass |
| Methylene chloride (first solvent) | 75.0 parts by mass |
| Methanol (second solvent) | 12.7 parts by mass |
| Cellulose acylate solution A | 10.3 parts by mass |

<Preparation of UV Absorbent Solution>

The following composition was put into a mixing tank and stirred under heat to dissolve the ingredients to prepare a UV absorbent solution.

Composition of UV Absorbent Solution:

| | |
|---|---|
| UV absorbent UV-1 | 2.0 parts by mass |
| UV absorbent UV-19 | 2.0 parts by mass |
| Methylene chloride (first solvent) | 58.4 parts by mass |
| Methanol (second solvent) | 8.7 parts by mass |
| Cellulose acylate solution A | 12.8 parts by mass |

94.6 parts by mass of the cellulose acylate solution A, 1.3 parts by mass of the mat agent solution and 4.1 parts by mass of the UV absorbent solution were, after filtered, mixed, and then, using a band caster, this was cast into a width of 1500 mm. Having a residual solvent content of 40% by mass, the film was peeled from the band. Held by tenter clips, this was stretched at 100° C. in the cross direction to a draw ratio of 8%, and then dried to have a residual solvent content of 5% by mass (drying 1). Then, while kept stretched, it was held as such at 100° C. for 30 seconds. The film was released from the tenter clips, and both edges of the film were trimmed by 5% each of the width thereof. While kept free (not held) in the cross direction thereof, the film was passed through a drying zone at 140° C., taking 30 minutes (drying 2), and then wound up into a roll.

The residual solvent content of the thus-obtained cellulose acylate film was 0.1% by mass, and the thickness thereof was 80 μm.

(Formation of Cellulose Acylate Films 102 to 105)

Cellulose acylate films 102 to 105 were formed in the same manner as above, for which, however, the type of the cellulose acylate and the type and the amount of the additives were changed to those in Table 1. In Table 1, additives A-12 and D-5 correspond to Compounds A-12 and D-5, respectively, exemplified herein above for the retardation reducer for use in the invention.

UV Absorbent UV-101:

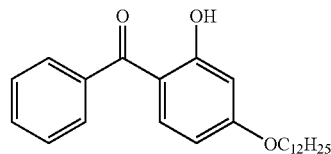

UV Absorbent UV-103:

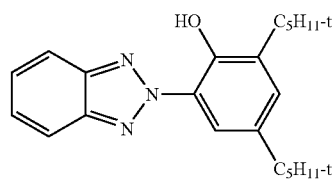

UV Absorbent UV-104:

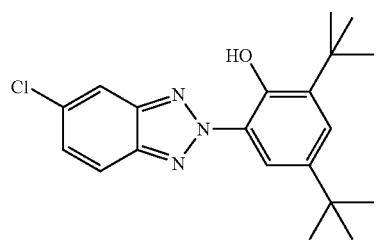

(Measurement of Optical Properties)

Using "WR COBRA" (by Oji Scientific Instruments), the cellulose acylate films 101 to 105 were analyzed in an environment at 25° C. and 60% relative humidity for their Re and Rth at 446 nm, 548 nm and 628 nm. The results are given in Table 2.

TABLE 2

| Cellulose Acylate | Re (nm) | | | Rth (nm) | | |
|---|---|---|---|---|---|---|
| Film | 446 nm | 548 nm | 628 nm | 446 nm | 548 nm | 628 nm |
| 101 | −1 | 0 | 0 | −15 | −9 | −5 |
| 102 | −1 | 0 | 1 | −5 | 1 | 4 |
| 103 | 1 | 0 | 0 | 0 | 3 | 5 |
| 104 | 0 | 0 | 0 | 9 | 14 | 17 |
| 105 | −2 | 0 | 1 | 27 | 36 | 42 |

TABLE 1

| Cellulose Acylate Film | Degree of Acetylation of Cellulose Acylate | Additive 1 | | Additive 2 | | Wavelength Dispersion-Controlling Agent 1 | | Wavelength Dispersion-Controlling Agent 2 | |
|---|---|---|---|---|---|---|---|---|---|
| | | type | amount[a] | type | amount[a] | type | amount[a] | type | amount[a] |
| 101 | 2.94 | A-12 | 12 | — | — | UV-101 | 1.6 | UV-19 | 1.6 |
| 102 | 2.95 | D-5 | 12 | — | — | UV-101 | 1.2 | — | — |
| 103 | 2.91 | D-5 | 16 | — | — | UV-19 | 5.1 | — | — |
| 104 | 2.95 | D-5 | 9 | — | — | UV-101 | 3.2 | — | — |
| 105 | 2.86 | triphenyl phosphate | 8 | biphenyl phosphate | 4 | UV-103 | 1.2 | UV-104 | 0.4 |

[a] part by mass

Reference Example 2

<Formation of Optical Compensatory Film A>

An isotropic norbornene film having a thickness of 105 μm was 180% mono-stretched in the cross direction at 175° C., using a tenter, to obtain a stretched norbornene film having a thickness of 63 μm.

A polyimide having a weight-average molecular weight (Mw) of 120,000, produced from 2,2'-bis(3,4-dicarboxyphenyl)hexafluoropropane (6FDA) and 2,2'-bis(trifluoromethyl)-4,4'-diaminobiphenyl (PFMBTFMB), was dissolved in cyclohexanone to prepare a 15 wt. % polyimide solution. The solution was applied onto the stretched norbornene film. Next, this was heated at 100° C. for 10 minutes to thereby form a completely transparent and flat polyimide film having a thickness of 5.5 μm on the stretched norbornene film. Then, this was 4% mono-stretched in the machine direction at 180° C. to obtain an optical compensatory film A.

Reference Example 3

<Formation of Optical Compensatory Film B>

An optical compensatory film B (laminate of retardation film and biaxial film) used in Constitution 1 in FIG. 1 was formed according to the method mentioned below.

Preparation of Cellulose Acylate Solution

The following composition was put into a mixing tank and stirred to dissolve the ingredients to prepare a cellulose acetate solution.

Composition of Cellulose Acylate Solution:

| | |
|---|---|
| Cellulose acylate (CA-1) (having a degree of acylation of 1.75, a degree of benzoylation of 0.65, and a degree of 6-benzoyl conversion of 0.90) | 100 parts by mass |
| Plasticizer, triphenyl phosphate (the wavelength of its absorption maximum is shorter than 280 nm) | 6.0 parts by mass |
| Plasticizer, biphenyl phosphate (the wavelength of its absorption maximum is shorter than 280 nm) | 3.0 parts by mass |
| Methylene chloride (first solvent) | 402.0 parts by mass |
| Methanol (second solvent) | 60.0 parts by mass |

Preparation of Mat Agent Solution

The following composition was put into a disperser and stirred to dissolve the ingredients to prepare a mat agent solution.

Composition of Mat Agent Solution:

| | |
|---|---|
| Silica particles having a mean particle size of 20 nm (AEROSIL R972, by Nippon Aerosil) | 2.0 parts by mass |
| Methylene chloride (first solvent) | 75.0 parts by mass |
| Methanol (second solvent) | 12.7 parts by mass |
| Cellulose acylate solution | 10.3 parts by mass |

Preparation of Retarder Solution

The following composition was put into a mixing tank and stirred under heat to dissolve the ingredients to prepare a retarder solution.

Composition of Retarder Solution:

| | |
|---|---|
| Retarder (41) (the wavelength of its absorption maximum is shorter than 250 nm) | 20.0 parts by mass |
| Methylene chloride (first solvent) | 58.4 parts by mass |
| Methanol (second solvent) | 8.7 parts by mass |
| Cellulose acylate solution | 12.8 parts by mass |

94.3 parts by mass of the cellulose acylate solution, 1.3 parts by mass of the mat agent solution and 4.4 parts by mass of the retarder solution were, after filtered, mixed, and then this was cast, using a band caster. Having a residual solvent content of 35% by mass, the web was peeled from the band. Using a tenter, this was stretched at 120° C. in the cross direction to a draw ratio of 55% at a stretching speed of 40%/min. Then, held at a draw ratio of 48%, this was kept heated at 120° C. for 30 seconds. Next, the clips were removed, and this was dried at 120° C. for 30 minutes to produce a stretched cellulose acylate film. The residual solvent content of the thus-produced, stretched cellulose acylate film was 0.1% by mass, and the thickness thereof was 92 μm.

(Saponification of Stretched Cellulose Acylate Film)

A solution having the composition mentioned below was applied onto the stretched cellulose acylate film (CAF1) in an amount of 5.2 mL/m$^2$, and dried at 60° C. for 10 seconds. The surface of the film was washed with running water for 10 seconds, and then air at 25° C. was jetted thereto to dry the film surface.

(Composition of Saponification Solution)

| | |
|---|---|
| Isopropyl alcohol | 818 parts by mass |
| Water | 167 parts by mass |
| Propylene glycol | 187 parts by mass |
| EMALEX (by Nippon Emulsion) | 10 parts by mass |
| Potassium hydroxide | 67 parts by mass |

(Formation of Alignment Film Layer)

On one surface of the saponified, stretched cellulose acylate film (CAF1), a coating solution having the composition mentioned below was applied in an amount of 24 mL/m$^2$, using a wire bar coater, #14. This was dried with hot air at 60° C. for 60 seconds and then with hot air at 90° C. for 150 seconds.

Next, the formed film was rubbed in the direction of 90° to the stretching direction (this almost corresponds to the slow axis) of the saponified stretched cellulose acylate film (CAF1)

Composition of Coating Solution for Alignment Film:

| | |
|---|---|
| Modified polyvinyl alcohol mentioned below | 20 parts by mass |
| Water | 360 parts by mass |
| Methanol | 120 parts by mass |
| Glutaraldehyde (crosslinking agent) | 1.0 part by mass |

Modified Polyvinyl Alcohol:

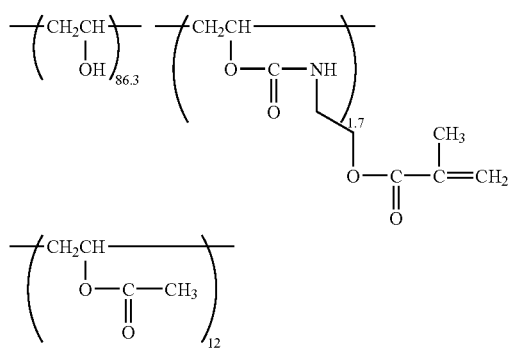

(Formation of Optically-Anisotropic Layer)

A coating solution having the composition mentioned below was applied to the alignment film in an amount of 15.4 mL/m², using a wire bar coater, #4. This was stuck to a metal frame, heated in a thermostat tank at 100° C. for 2 minutes whereby the liquid crystalline compound was aligned. Next, using a 120 W/cm high pressure mercury lamp at 90° C., this was irradiated with UV light for 1 minute whereby the liquid crystalline compound was polymerized. Then, this was left cooled to room temperature.

Composition of Coating Solution for Optically-Anisotropic Layer:

| | |
|---|---|
| Rod-shaped liquid crystalline compound I-6 (the wavelength of its maximum absorption is longer than 280 nm) | 100 parts by mass |
| Crosslinking group-having polymer (1) | 0.7 parts by weight |
| Fluorine-containing polymer (Dai-Nippon Ink's Megafac F-780-F) | 0.5 parts by mass |
| Optical polymerization initiator (Ciba-Geigy's Irgacure 907) | 2.9 parts by mass |
| Sensitizer (Nippon Kayaku's Kayacure DETX) | 1.0 part by mass |
| Methyl ethyl ketone | 253 parts by mass |

In the manner as above, an optical compensatory film B was produced.

Reference Example 4

A laminate of an optical compensatory film C (laminate of plate A and plate C) and a low retardation film used in Constitution 2 in FIG. 1 was formed in the manner mentioned below.

<Formation of Plate C>

(Saponification of Cellulose Acylate Film)

A commercially-available cellulose acylate film (FUJI-TAC TD80UL) was dipped in an aqueous 2.3 mol/L sodium hydroxide solution at 55° C. for 2 minutes. This was washed in a washing bath at room temperature, and neutralized with 0.05 mol/L sulfuric acid at 30° C. Again, this was washed with a washing bath at room temperature, and then dried with hot air at 100° C.

(Formation of Alignment Film Layer)

On one surface of the saponified cellulose acylate film, a coating solution having the composition mentioned below was applied in an amount of 24 mL/m², using a wire bar coater, #14. This was dried with hot air at 60° C. for 60 seconds and then with hot air at 90° C. for 150 seconds.

Next, the formed film was rubbed in the direction of 90° to the stretching direction (this almost corresponds to the slow axis) of the saponified cellulose acylate film (CAF1).

Composition of Coating Solution for Alignment Film:

| | |
|---|---|
| Modified polyvinyl alcohol mentioned below | 20 parts by mass |
| Water | 360 parts by mass |
| Methanol | 120 parts by mass |
| Glutaraldehyde (crosslinking agent) | 1.0 part by mass |

Modified Polyvinyl Alcohol:

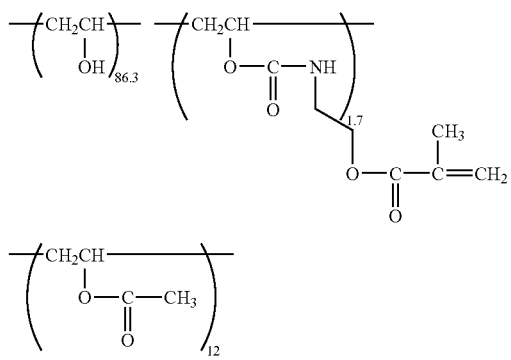

(Formation of Optically-Anisotropic Layer)

A coating solution having the composition mentioned below was applied to the alignment film in an amount of 15.4 mL/m², using a wire bar coater, #4. This was stuck to a metal frame, heated in a thermostat tank at 135° C. for 2 minutes whereby the liquid crystalline compound was aligned. Next, using a 120 W/cm high pressure mercury lamp at 90° C., this was irradiated with UV light for 1 minute whereby the liquid crystalline compound was polymerized. Then, this was left cooled to room temperature.

Composition of Coating Solution for Optically-Anisotropic Layer:

| | |
|---|---|
| Disc-shaped liquid crystalline compound (D) | 100 parts by mass |
| Ethylene oxide-modified trimethylolpropane triacrylate, V#360 (by Osaka Organic Chemistry) | 9.1 parts by mass |
| Mean tilt angle-controlling agent (E) | 1.1 parts by weight |
| Fluorine-containing polymer (F) | 0.2 parts by mass |
| Optical polymerization initiator (Ciba-Geigy's Irgacure 907) | 3.3 parts by mass |
| Sensitizer (Nippon Kayaku's Kayacure DETX) | 1.1 parts by mass |
| Methyl ethyl ketone | 253 parts by mass |

Rod-Shaped Liquid crystalline Compound (D):

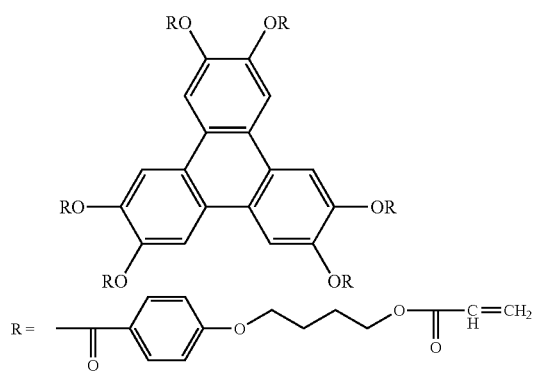

Mean Tilt Angle-Controlling Agent (E):

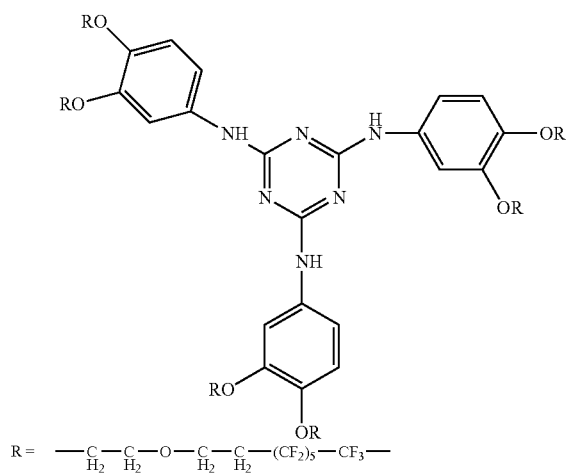

Fluorine-Containing Polymer (F):

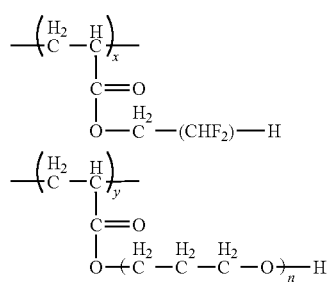

<Formation of Laminate of Plate A and Plate C>

Only the optically anisotropic layer was peeled from the plate C formed in the above, and using an adhesive, this was stuck to a polycarbonate film of a copolymer containing a monomer unit of forming a polymer having a different chromatic dispersion property (trade name, Pure Ace WR (by Teijin)) (plate A).

<Saponification of Low Retardation Cellulose Acylate Film>

The cellulose acylate film 101 formed in Reference Example 1 was dipped in an aqueous 2.3 mol/L sodium hydroxide solution at 55° C. for 3 minutes. This was washed in a water bath at room temperature, and neutralized with 0.05 mol/L sulfuric acid at 30° C. Again, this was washed in a water bath at room temperature, and dried with hot air at 100° C. In that manner, the surface of the cellulose acylate film 101 was saponified (this is hereinafter referred to as protective film E).

<Formation of Optical Compensatory Film C>

An adhesive prepared by mixing an aqueous 5 mas. % solution of polyvinyl alcohol resin (Kuraray's PVA217, having a degree of polymerization of 1700 and a degree of saponification f 88%) and an aqueous 25 mas. % solution of oxazoline group-having water-soluble polymer (Nippon Shokubai's WS700) in a ratio by weight of 7/3 was applied to the saponified cellulose acylate film 101, and this was stuck to the laminate of plate A+ plate C produced in the above, on the polycarbonate film side thereof.

Reference Example 5

<Formation of Optical Compensatory Film D>

A 1 wt. % polyvinyl alcohol solution was applied to the saponified cellulose acylate film 101, and dried at 90° C. to form thereon a film having a thickness of about 0.01 μm. Its surface was rubbed to form an alignment film, and then a cholesteric liquid crystal solution containing a liquid crystalline compound (G), a chiral agent (H) and a polymerization initiator was applied thereto, heated at 90° C. for 1 minutes for UV cross-linking to thereby form a retardation film having at thickness of 2.5 μm, Re of 0 nm and Rth of 185 nm.

Liquid crystalline Compound (G):

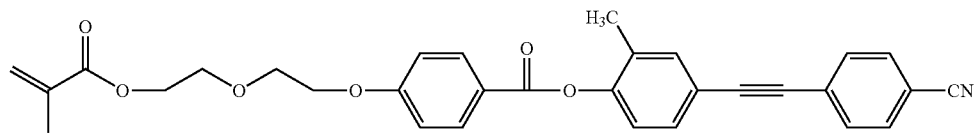

Chiral Agent (H):

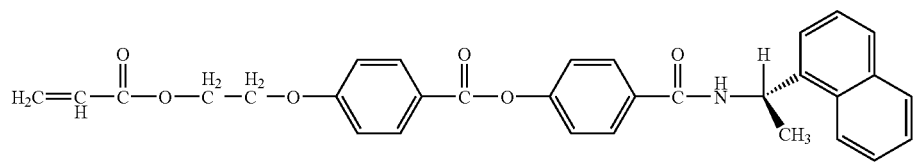

<Formation of Optical Compensatory Film E>

(Preparation of Polymer Solution)

7.90 g (21.6 mmol) of 6-(2,4-dimethoxyphenyl)-6-azapentacyclo[9.2.1.1$^{3,9}$.0$^{2,10}$.0$^{4,8}$]tetradec-12-ene-5,7-dione having the following formula (A) as a norbornene monomer (Im); 5.01 g (21.6 mmol) of 8-methyl-8-methoxycarbonyltetracyclo-[4.4.0.1$^{2,5}$.1$^{7,10}$)-3-dodecene having the following structural formula (C) as a norbornene monomer (IIm); 0.27 g of 1-hexene as a molecular weight-controlling agent; and 51.5 g of toluene as a solvent were put into a nitrogen-purged reactor, and heated at 80° C. As a polymerization catalyst, 0.13 mL of triethylaluminium/toluene solution (0.6 mol/L) and 0.34 mL of methanol-modified tungsten hexachloride/toluene solution (0.025 mol/L) were added to the reaction system, and reacted at 80° C. for 4 hours to obtain a polymer solution containing a norbornene ring-cleaved polymer.

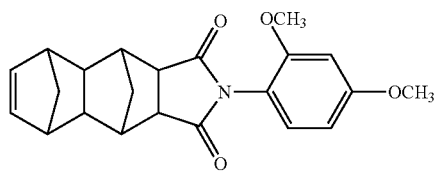

Formula (A)

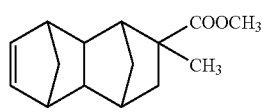

Formula (C)

(Preparation of Ring-Cleaved Polymer Resin)

The obtained polymer solution was put into an autoclave, and 300 g of toluene was added thereto. Next, as a hydrogenation catalyst, RuHCl(CO) [P(C$_6$H$_5$)$_3$]$_3$ was added to the reaction system, in an amount of 2500 ppm relative to the monomer amount used in the system, and this was hydrogenated under a hydrogen gas pressure of from 9 to 10 MPa, at a reaction temperature of from 160 to 165° C. and for a reaction time of 4 hours. After the reaction, the resulting reaction solution was poured into a large amount of methanol for precipitation, thereby obtaining a hydrogenated norbornene ring-cleaved polymer. The norbornene ring-cleaved polymer is referred to as resin (P1).

(Formation of Stretched Film)

The resin (P1) obtained in the above was dissolved in toluene to a concentration of 30%. Using INVEX Labocoater by Inoue Metal Industry, this was applied to a PET film having a thickness of 100 µm (Toray's Lumilar U94), which had been surface-treated with an acrylic acid agent for hydrophilication (for increasing the surface adhesiveness), in such an amount that the thickness of the dry film could be 350 µm, and this was then dried for primary drying at 50° C. and then at 100° C. for secondary drying. The resin film was peeled from the PET film, and this is referred to as (P1-F).

Heated at 228° C. in a tenter, this was stretched by 1.7 times at a stretching speed of 300%/min, then kept as such in an atmosphere at 221° C. for about 1 minute, and thereafter cooled to room temperature and taken out to obtain an optical compensatory film (E).

Reference Example 6

<Formation of Biaxial Film F>

An ARTON film (by JSR) having a thickness of 188 µm was stretched by 130% in the machine direction and by 135% in the cross direction at 175° C. to obtain a film having a thickness of 120 µm. The film has an optical property of Re=50 nm and Rth=250 nm.

Using COBRA WR, the optical compensatory films A to C and the biaxial film D produced in the manner as above were analyzed for their optical properties in an environment at 25° C. and 60% RH. The results are given in Table 3.

TABLE 3

| Sample | Re (nm) | | | | | Rth (nm) | | | | |
|---|---|---|---|---|---|---|---|---|---|---|
| | 446 nm | 548 nm | 628 nm | 446 nm/ 548 nm | 628 nm/ 548 nm | 446 nm | 548 nm | 628 nm | 446 nm/ 548 nm | 628 nm/ 548 nm |
| Optical Compensatory Layer A | 47 | 52 | 56 | 0.90 | 1.08 | 256 | 250 | 240 | 1.02 | 0.96 |
| Optical Compensatory Layer B | 38 | 63 | 80 | 0.60 | 1.27 | 252 | 230 | 220 | 1.10 | 0.96 |
| Optical Compensatory Layer C | 87 | 110 | 124 | 0.79 | 1.13 | 255 | 245 | 239 | 1.04 | 0.98 |

TABLE 3-continued

| | Re (nm) | | | | | Rth (nm) | | | | |
|---|---|---|---|---|---|---|---|---|---|---|
| Sample | 446 nm | 548 nm | 628 nm | 446 nm/ 548 nm | 628 nm/ 548 nm | 446 nm | 548 nm | 628 nm | 446 nm/ 548 nm | 628 nm/ 548 nm |
| Optical Compensatory Layer D | 1 | 1 | 1 | 1.00 | 1.00 | 178 | 164 | 158 | 1.09 | 0.96 |
| Optical Compensatory Layer E | 100 | 135 | 146 | 0.74 | 1.08 | 53 | 70 | 76 | 0.76 | 1.09 |
| Biaxial Film F | 51 | 50 | 50 | 1.02 | 1.00 | 252 | 250 | 249 | 1.01 | 1.00 |

Reference Example 7

Formation of Polarizing Plate:

(Alkali Treatment of Cellulose Acylate Film)

In the same manner as in Reference Example 4, the surfaces of the cellulose acylate films 102 to 105, and the cellulose acylate surfaces of the optical compensatory film B, optical compensatory film C and the optical compensatory film D were saponified.

Reference Example 8

(Surface Treatment of Optical Compensatory Films A, E and Biaxial Film F)

Using a corona discharger by Kasuga Electric, the norbornene film surface of the optical compensatory film A was corona-discharged under a condition of 12 W·min/m² for hydrophilication.

Also, the surfaces of the optical compensatory film E and the biaxial film F were processed in the same manner as above for hydrophilication.

Reference Example 9

<Formation of Polarizing Plate 101>

(Saponification of Polarizer-Protective Film)

A commercially-available cellulose acylate film (Fuji Photo Film's FUJITAC TD80) was dipped in an aqueous 1.5 mol/L sodium hydroxide solution at 55° C. for 1 minute. This was washed in a water bath at room temperature, and neutralized with 0.05 mol/L sulfuric acid at 30° C. Again, this was washed in a water bath at room temperature, and then dried with hot air at 100° C. (this is hereinafter referred to as protective film G).

(Formation of Polarizer)

A polyvinyl alcohol film having a degree of polymerization of 1700 and a thickness of 39 μm was swollen in a water bath at 30° C., and then stretched by about 4 times in a soaking bath comprising an aqueous solution of iodine and potassium iodide, at 30° C. Next, this was stretched and crosslinked in a crosslinking bath containing boric acid and potassium iodide at 50° C. to an overall draw ratio of 5.5 times. Then, this was dipped in an aqueous potassium iodide solution at 35° C. for 10 seconds for color tone control. Then, this was washed with water and dried to obtain a polarizer having a thickness of 18 μm. The water content of the polarizer was 14%. The birefringence (Δn) of the polarizer at a wavelength of 900 nm was 0.0482; the transmittance thereof was 43%; and the degree of polarization thereof was 99.9%.

The birefringence of the sample was obtained by determining the retardation value (Δnd) thereof according to a parallel Nicol rotation method with light having a wavelength of 900 nm and dividing it by the thickness d (nm) of the sample.

The transmittance was obtained as follows: The sample was analyzed with a spectrophotometer (DOT-3, by Murakami Color Technology Laboratory), and the data were processed for visibility correction for 2-degree visual field (C light source) according to JIS Z8701. The resulting value Y is the transmittance of the sample.

The degree of polarization was determined as follows: The same two polarizers were put one on another in such a manner that their polarization axes could be in parallel to each other, and the transmittance of the laminate (H0) was determined in the same manner as above. On the other hand, the two were put one on another in such a manner that their polarization axes could be perpendicular to each other, and the transmittance of the laminate (H90) was determined also in the same manner as above. From these, the degree of polarization of the sample was obtained according to the following formula. The parallel transmittance (H0) and the perpendicular transmittance (H90) were both processed for visibility correction to be the value Y.

Degree of Polarization (%)=$\sqrt{\{(H0-H90)/(H0+H90)\}} \times 100$ (Preparation of Adhesive)

10 parts of a polyester-based urethane (Mitsui-Takeda Chemical's Takelac XW-74-C154) and 1 part of an isocyanate-based crosslinking agent (Mitsui-Takeda Chemical's Takenate WD-725) were dissolved in water to prepare a solution having a controlled solid content of 20%. This was used as an adhesive.

(Formation of Polarizing Plate 101)

The adhesive solution was applied to both surfaces of the polarizer, which was then sandwiched between the saponified low retardation film 101 and the protective film G and laminated. This was cured by drying in an oven at 40° C. for 72 hours to produce Polarizing Plate 101.

Reference Example 10

(Formation of Polarizing Plates 102 to 105)

Using cellulose acylate films 102 to 105, Polarizing Plates 102 to 105 were produced like Polarizing Plate 101.

Reference Example 11

(Formation of Polarizing Plates A, E and F)

The adhesive solution was applied to the optical compensatory film A, the optical compensatory film E and the biaxial film F that had been surface-treated in Reference Example 6, and the protective film G and the polarizer produced in the above were attached to them in such a manner that the film could be sandwiched between the two. The resulting laminate was cured by drying in an oven at 40° C. for 72 hours to produce Polarizing Plates A, E and F. In the Polarizing Plate A, the films were laminated in such a manner that the hydrophilicated norbornene film of the optical compensatory film A could face the polarizer.

(Formation of Polarizing Plates B, C and D)

The adhesive solution was applied to the optical compensatory film B, which was then sandwiched between the protective film A and the polarizer. The resulting laminate was cured by drying in an oven at 40° C. for 72 hours to produce Polarizing Plate B. In this, the films were laminated in such a manner that the cellulose acylate film could face the polarizer. The optical compensatory films C and D were worked in the same manner to produce Polarizing Plates C and D.

Example 1

(Formation of Liquid crystal Display Device (a)]

Figure 3:
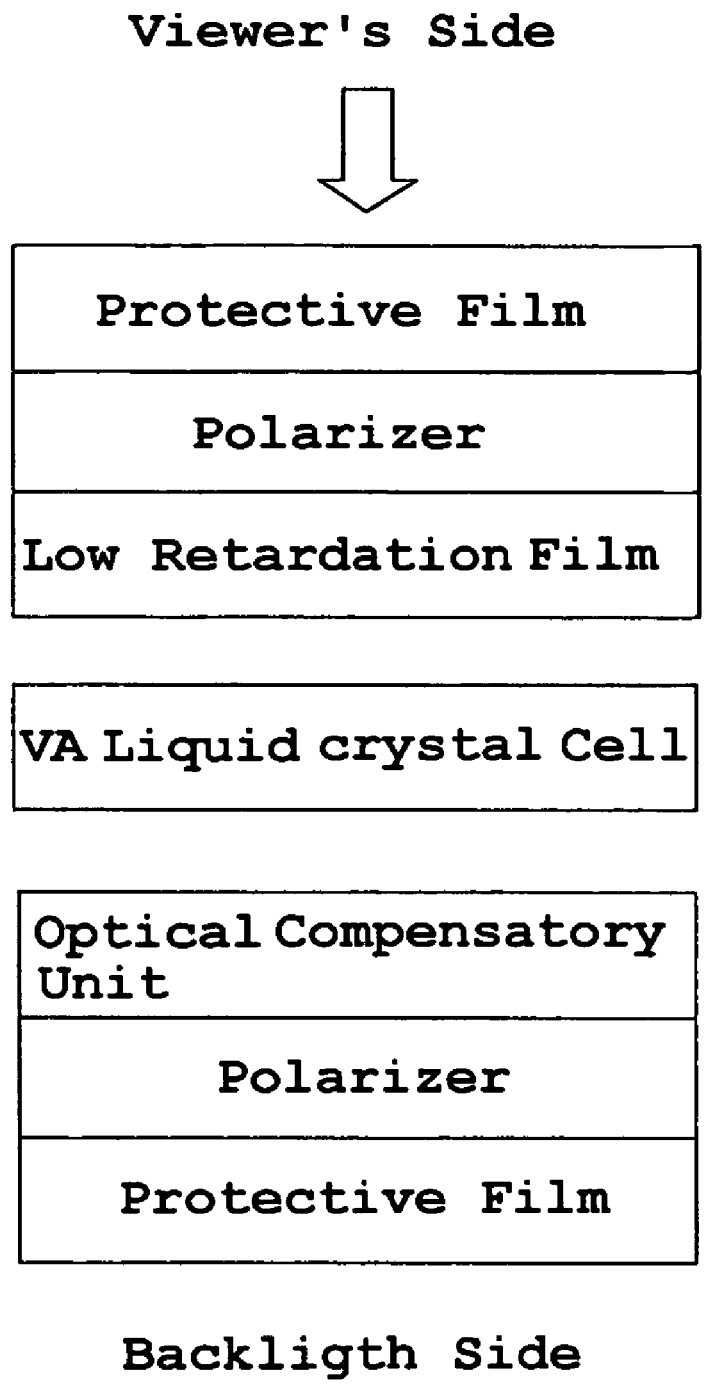
FIG. 3 is a schematic view showing a preferred configuration example of an optical compensatory film and a polarizer-protective film in the invention.

In Example 1, a liquid crystal display device (FIG. 3) was fabricated as follows: the polarizing plate (101) produced in Reference Example 7 was used as the upper polarizing plate in such a manner that the cellulose acylate film 101 (low retardation film, protective film E) in the invention could be on the side of the liquid crystal cell; and the polarizing plate (A) produced in Reference Example 9 was used as the lower polarizing plate in such a manner that the polyimide layer in the invention could be on the side of the liquid crystal cell. Using an adhesive, each one of these was stuck on the viewer's side and on the backlight side. These were disposed in cross-Nicol configuration of such that the transmission axis of the polarizing plate on the viewer's side could be in the vertical direction and the transmission axis of the polarizing plate on the backlight side could be in the horizontal direction. In that manner, a liquid crystal display device (a) was fabricated.

Changing the upper polarizing plate and the lower polarizing plate as in Table 4 below, liquid crystal display devices (a) to (j) of the invention were fabricated.

Example 2

(Viewing Angle-Dependent Color Tone Change)

At a polar angle 60°, the liquid crystal display devices (a) to (j) fabricated in Example 1 were tested for the color expression change at an azimuth angle of 0° and an azimuth angle of 80°, using a color analyzer (ELDIM's Ezcontrast). On an x-y chromaticity diagram, the absolute values Δx and Δy of the color expression change were obtained. The results are given in Table 4.

TABLE 4

| Liquid Crystal Display Device | Upper Polarizing plate | Lower Polarizing plate | Δx | Δy | Remarks |
|---|---|---|---|---|---|
| (a) | 101 | B | 0.18 | 0.17 | Invention |
| (b) | 102 | B | 0.21 | 0.2 | Invention |
| (c) | 103 | B | 0.17 | 0.16 | Invention |
| (d) | 104 | B | 0.22 | 0.21 | Invention |
| (e) | 105 | B | 0.31 | 0.30 | Comparative |
| (f) | 101 | F | 0.33 | 0.32 | Comparative |
| (g) | 105 | F | 0.41 | 0.39 | Comparative |
| (h) | 101 | A | 0.25 | 0.24 | Invention |
| (i) | 101 | C | 0.23 | 0.21 | Invention |
| (j) | D | E | 0.2 | 0.19 | Invention |

From the results in Table 4, it is understood that the liquid crystal display devices (a) to (d), (h) to (j) of the invention are better than the comparative liquid crystal display devices (e) to (g) in that the viewing angle-dependent color tone change of the former is smaller than that of the latter.

The present disclosure relates to the subject matter contained in Japanese Patent Application No. 223456/2005 filed on Aug. 1, 2005 and Japanese Patent Application No. 121750/2006 filed on Apr. 26, 2006, which are expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A liquid crystal display device comprising a liquid crystal cell, two polarizing plates, each polarizing plate being disposed on a side of the liquid crystal cell, and at least two optical compensatory films, each optical compensatory film being disposed between one of the polarizing plates and the liquid crystal cell, wherein each polarizing plate comprises a polarizer and two protective films disposed on both sides of the polarizer, and at least one of the protective films on the side toward the liquid crystal cell satisfies the relation of the following formulae (1) and (2) within a wavelength range of from 400 to 700 nm, one of the optical compensatory films satisfies the relation of the following formulae (9) to (12), and the other one of the optical compensatory films satisfies the following formulae (13) to (16):

$$0 \text{ nm} \leq Re(\lambda) \leq 5 \text{ nm} \quad (1)$$

$$-20 \text{ nm} \leq Rth(\lambda) \leq 20 \text{ nm} \quad (2)$$

$$50 \text{ nm} < Re(548) < 200 \text{ nm} \quad (9)$$

$$30 \text{ nm} < Rth(548) < 150 \text{ nm} \quad (10)$$

$$0.5 < Re(446)/Re(548) < 1 \quad (11)$$

$$1.0 < Re(628)/Re(548) < 2.0 \quad (12)$$

$$0 \text{ nm} \leq Re(548) < 10 \text{ nm} \quad (13)$$

$$100 \text{ nm} < Rth(548) < 300 \text{ nm} \quad (14)$$

$$1.0 < Rth(446)/Rth(548) < 2.0 \quad (15)$$

$$0.5 < Rth(628)/Rth(548) < 1.0 \quad (16)$$

wherein $Re(\lambda)$ represents an in-plane retardation at a wavelength $\lambda$ and $Rth(\lambda)$ represents a retardation in the thickness direction of the film at a wavelength $\lambda$, wherein the optical compensatory films satisfying the following formulae (13) to (16) is formed on a protective film of cellulose acylate.

2. The liquid crystal display device according to claim 1, wherein the optical compensatory film satisfying the formulae (13) to (16) is formed on a protective film of cellulose acylate that satisfies the relation of the formulae (1) and (2) and/or the following formula (17):

$$-10 \text{ nm} \leq Rth(446) - Rth(629) \leq 10 \text{ nm} \quad (17).$$

* * * * *